(12) United States Patent
Ishihara et al.

(10) Patent No.: US 6,674,798 B2
(45) Date of Patent: Jan. 6, 2004

(54) MOTION VECTOR DETECTING DEVICE CAPABLE OF ACCOMMODATING A PLURALITY OF PREDICTIVE MODES

(75) Inventors: Kazuya Ishihara, Hyogo (JP); Shinichi Uramoto, Hyogo (JP); Shinichi Nakagawa, Hyogo (JP); Tetsuya Matsumura, Hyogo (JP); Satoshi Kumaki, Hyogo (JP); Atsuo Hanami, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 274 days.

(21) Appl. No.: 09/961,139

(22) Filed: Sep. 24, 2001

(65) Prior Publication Data
US 2002/0009144 A1 Jan. 24, 2002

Related U.S. Application Data

(63) Continuation of application No. 08/376,204, filed on Jan. 20, 1995.

(30) Foreign Application Priority Data

Jan. 21, 1994 (JP) ................................................. 6-5432
Nov. 29, 1994 (JP) ............................................. 6-321525

(51) Int. Cl.[7] ................................................ H04N 7/36
(52) U.S. Cl. .............................. 375/240.16; 348/413.1; 348/699; 375/240.12
(58) Field of Search ....................... 375/240.16, 240.17, 375/240.12; 348/413.1, 699; H04N 7/36

(56) References Cited

U.S. PATENT DOCUMENTS 5,400,087 A * 3/1995 Uramoto et al. ....... 375/240.16
5,453,799 A * 9/1995 Yang et al. ............ 375/240.17
5,940,145 A * 8/1999 Burl ........................ 348/413.1

FOREIGN PATENT DOCUMENTS

DE 4138517 A1 5/1993
DE 4206280 A1 7/1993
DE 4322343 A1 1/1994
JP 3-68597 10/1991

OTHER PUBLICATIONS

"A Versatile and Powerful Chip for Real Time Motion Estimation", A. Artieri et al, ICASSP 89 1989, pp. 2453–2456.
"Coding Algorithms and BLSI Impementations for Digital TV and HDTV Satellite Broadcasting", Musmann, Hans et al., *ETT*, vol. 4, Nov. 1, 1993, pp. 11–21.
S. Hartwig, W. Endemann, "Digitale Bildcodierung" Fernseh– u. Kino–Technik, 1992, No. 10, pp. 687–696.
Hans Georg Musmann, Peter Pirsch, "Advances in Picture Coding", Proceedings of the IEEE, vol. 73, pp 523–548, Apr. 1985.

* cited by examiner

*Primary Examiner*—Howard Britton
(74) *Attorney, Agent, or Firm*—McDermott, Will & Emery

(57) ABSTRACT

A processor array includes element processors which are arranged in a matrix in correspondence to respective pixels of a template block, which is a current picture image pixel block. Each element processor stores pixel data of a search window block, which is a corresponding reference picture image pixel block, and obtains an evaluation function value component with respect to the template block pixel data. A summing part sorts the evaluation function components received from the respective element processors of the processor array in accordance with a plurality of predictive modes and sums up the components for the respective sorts, for forming evaluation function values for the respective predictive modes. A comparison part compares the evaluation function values received from the summing part for each predictive mode, to decide a displacement vector providing the best similarity as a motion vector for each predictive mode. It is possible to simultaneously detect motion vectors according to a plurality of predictive modes. It is possible to detect motion vectors employed for moving image predictive compensation in accordance with a plurality of predictive modes at a high speed with a small hardware volume.

7 Claims, 120 Drawing Sheets

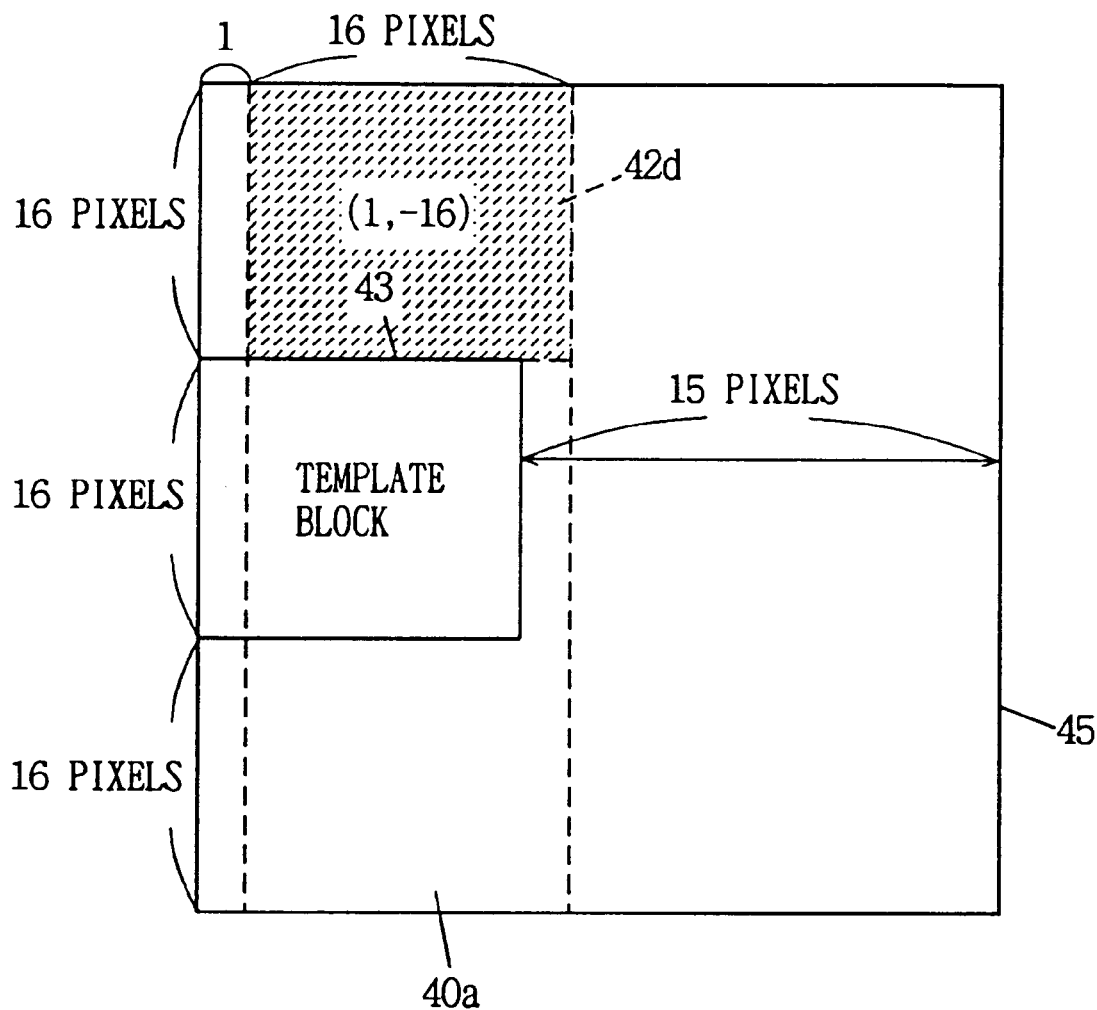

PIXELS IN THE SAME FIELD

FIG. 31

| | | | |
|---|---|---|---|
| a 0,0 | a 0,1 | ········· | a 0,15 |
| a 1,0 | a 1,1 | ········· | a 1,15 |
| | | ⋮ | |
| a 6,0 | a 6,1 | ········· | a 6,15 |
| a 7,0 | a 7,1 | | a 7,15 |
| a 8,0 | a 8,1 | | a 8,15 |
| a 9,0 | a 9,1 | | a 9,15 |
| | | ⋮ | |
| a 14,0 | a 14,1 | | a 14,15 |
| a 15,0 | a 15,1 | | a 15,15 |

PE#0U, PE#1U — 43u
PE#0L, PE#1L — 43l

PROCESSING UNIT = 768 CYCLES

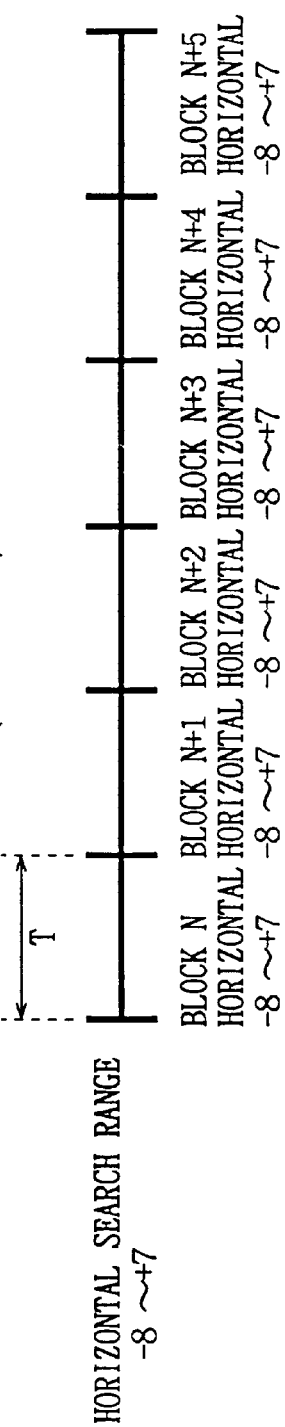
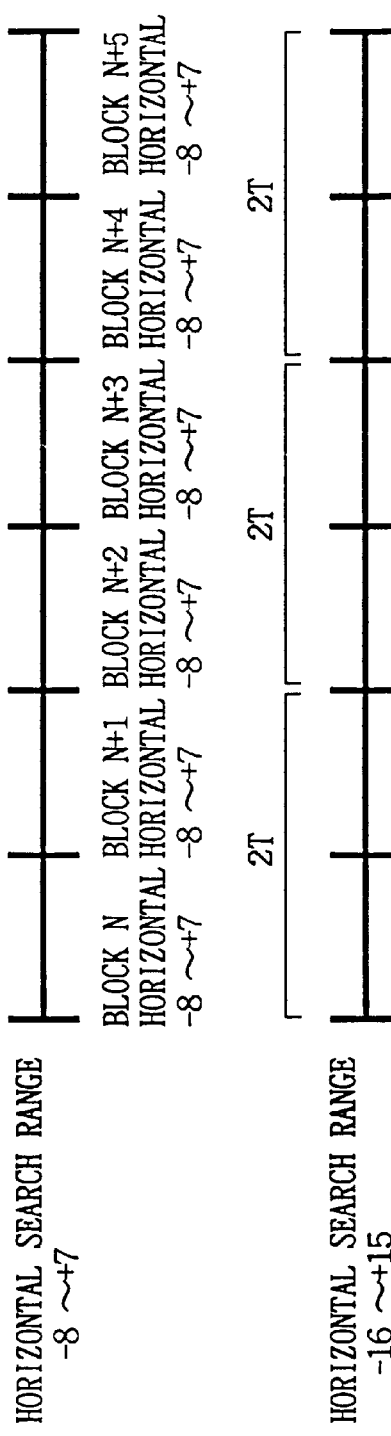
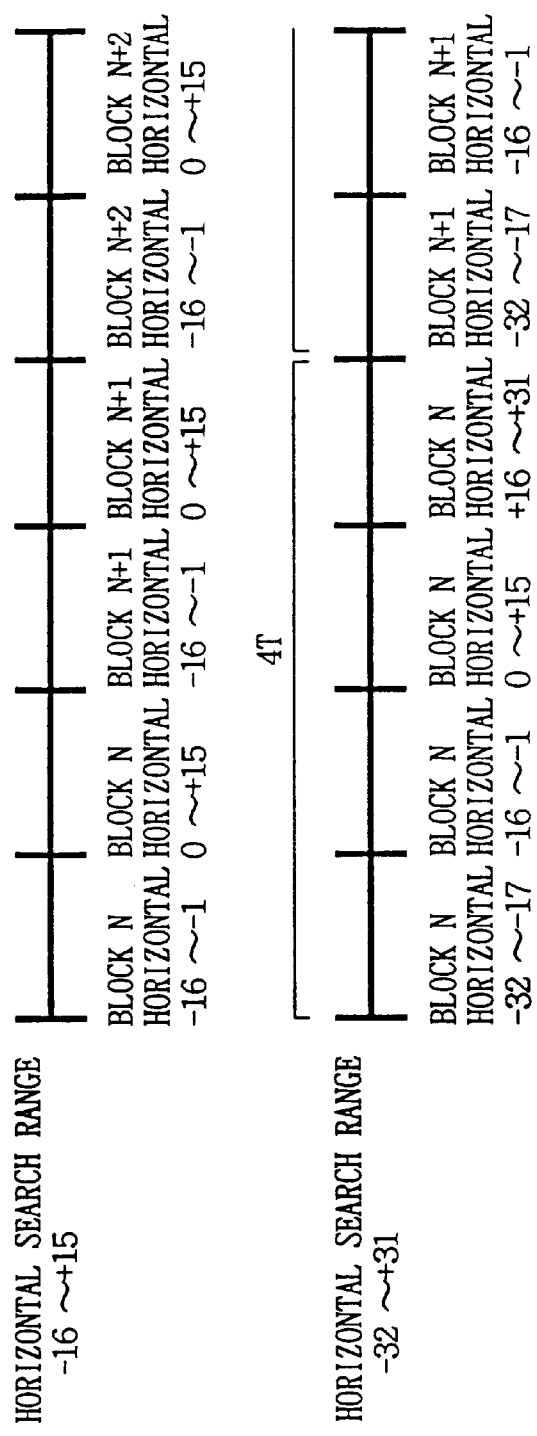
FIG. 37A
FIG. 37B
FIG. 37C

: SEARCH WINDOW PIXEL DATA = COMMON

- SEARCH AREA
- TEMPLATE BLOCK
- : PROCESSING UNIT
  8 HORIZONTAL DISPLACEMENTS,
  33 VERTICAL DISPLACEMENTS,
- : 8·(8+32)=320 CYCLES

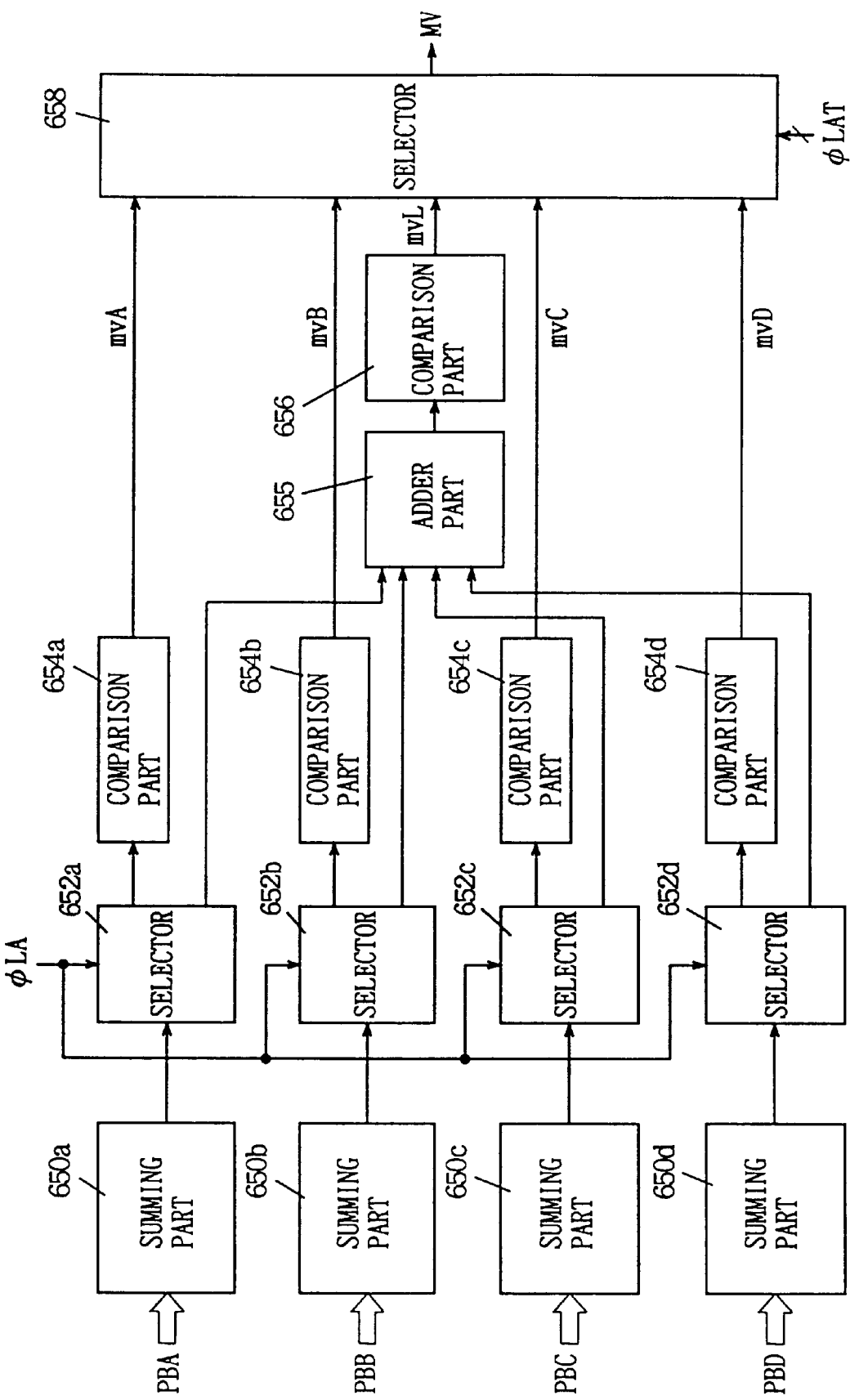
F I G. 5 8

H VECTOR

| | -16 | -15 | -14 | -13 | -12 | -11 | -10 | -9 | -8 | -7 | -6 | -5 | -4 | -3 | -2 | -1 | 0 |
|---|---|---|---|---|---|---|---|---|---|---|---|---|---|---|---|---|---|
| -16 | 32 | 31 | 30 | 29 | 28 | 27 | 26 | 25 | 24 | 23 | 22 | 21 | 20 | 19 | 18 | 17 | 16 |
| -15 | 31 | 30 | 29 | 28 | 27 | 26 | 25 | 24 | 23 | 22 | 21 | 20 | 19 | 18 | 17 | 16 | 15 |
| -14 | 30 | 29 | 28 | 27 | 26 | 25 | 24 | 23 | 22 | 21 | 20 | 19 | 18 | 17 | 16 | 15 | 14 |
| -13 | 29 | 28 | 27 | 26 | 25 | 24 | 23 | 22 | 21 | 20 | 19 | 18 | 17 | 16 | 15 | 14 | 13 |
| -12 | 28 | 27 | 26 | 25 | 24 | 23 | 22 | 21 | 20 | 19 | 18 | 17 | 16 | 15 | 14 | 13 | 12 |
| -11 | 27 | 26 | 25 | 24 | 23 | 22 | 21 | 20 | 19 | 18 | 17 | 16 | 15 | 14 | 13 | 12 | 11 |
| -10 | 26 | 25 | 24 | 23 | 22 | 21 | 20 | 19 | 18 | 17 | 16 | 15 | 14 | 13 | 12 | 11 | 10 |
| -9 | 25 | 24 | 23 | 22 | 21 | 20 | 19 | 18 | 17 | 16 | 15 | 14 | 13 | 12 | 11 | 10 | 9 |
| -8 | 24 | 23 | 22 | 21 | 20 | 19 | 18 | 17 | 16 | 15 | 14 | 13 | 12 | 11 | 10 | 9 | 8 |
| -7 | 23 | 22 | 21 | 20 | 19 | 18 | 17 | 16 | 15 | 14 | 13 | 12 | 11 | 10 | 9 | 8 | 7 |
| -6 | 22 | 21 | 20 | 19 | 18 | 17 | 16 | 15 | 14 | 13 | 12 | 11 | 10 | 9 | 8 | 7 | 6 |
| -5 | 21 | 20 | 19 | 18 | 17 | 16 | 15 | 14 | 13 | 12 | 11 | 10 | 9 | 8 | 7 | 6 | 5 |
| -4 | 20 | 19 | 18 | 17 | 16 | 15 | 14 | 13 | 12 | 11 | 10 | 9 | 8 | 7 | 6 | 5 | 4 |
| -3 | 19 | 18 | 17 | 16 | 15 | 14 | 13 | 12 | 11 | 10 | 9 | 8 | 7 | 6 | 5 | 4 | 3 |
| -2 | 18 | 17 | 16 | 15 | 14 | 13 | 12 | 11 | 10 | 9 | 8 | 7 | 6 | 5 | 4 | 3 | 2 |
| -1 | 17 | 16 | 15 | 14 | 13 | 12 | 11 | 10 | 9 | 8 | 7 | 6 | 5 | 4 | 3 | 2 | 1 |
| 0 | 16 | 15 | 14 | 13 | 12 | 11 | 10 | 9 | 8 | 7 | 6 | 5 | 4 | 3 | 2 | 1 | 0 |
| 1 | 17 | 16 | 15 | 14 | 13 | 12 | 11 | 10 | 9 | 8 | 7 | 6 | 5 | 4 | 3 | 2 | 1 |
| 2 | 18 | 17 | 16 | 15 | 14 | 13 | 12 | 11 | 10 | 9 | 8 | 7 | 6 | 5 | 4 | 3 | 2 |
| 3 | 19 | 18 | 17 | 16 | 15 | 14 | 13 | 12 | 11 | 10 | 9 | 8 | 7 | 6 | 5 | 4 | 3 |
| 4 | 20 | 19 | 18 | 17 | 16 | 15 | 14 | 13 | 12 | 11 | 10 | 9 | 8 | 7 | 6 | 5 | 4 |
| 5 | 21 | 20 | 19 | 18 | 17 | 16 | 15 | 14 | 13 | 12 | 11 | 10 | 9 | 8 | 7 | 6 | 5 |
| 6 | 22 | 21 | 20 | 19 | 18 | 17 | 16 | 15 | 14 | 13 | 12 | 11 | 10 | 9 | 8 | 7 | 6 |
| 7 | 23 | 22 | 21 | 20 | 19 | 18 | 17 | 16 | 15 | 14 | 13 | 12 | 11 | 10 | 9 | 8 | 7 |
| 8 | 24 | 23 | 22 | 21 | 20 | 19 | 18 | 17 | 16 | 15 | 14 | 13 | 12 | 11 | 10 | 9 | 8 |
| 9 | 25 | 24 | 23 | 22 | 21 | 20 | 19 | 18 | 17 | 16 | 15 | 14 | 13 | 12 | 11 | 10 | 9 |
| 10 | 26 | 25 | 24 | 23 | 22 | 21 | 20 | 19 | 18 | 17 | 16 | 15 | 14 | 13 | 12 | 11 | 10 |
| 11 | 27 | 26 | 25 | 24 | 23 | 22 | 21 | 20 | 19 | 18 | 17 | 16 | 15 | 14 | 13 | 12 | 11 |
| 12 | 28 | 27 | 26 | 25 | 24 | 23 | 22 | 21 | 20 | 19 | 18 | 17 | 16 | 15 | 14 | 13 | 12 |
| 13 | 29 | 28 | 27 | 26 | 25 | 24 | 23 | 22 | 21 | 20 | 19 | 18 | 17 | 16 | 15 | 14 | 13 |
| 14 | 30 | 29 | 28 | 27 | 26 | 25 | 24 | 23 | 22 | 21 | 20 | 19 | 18 | 17 | 16 | 15 | 14 |
| 15 | 31 | 30 | 29 | 28 | 27 | 26 | 25 | 24 | 23 | 22 | 21 | 20 | 19 | 18 | 17 | 16 | 15 |
| 16 | 32 | 31 | 30 | 29 | 28 | 27 | 26 | 25 | 24 | 23 | 22 | 21 | 20 | 19 | 18 | 17 | 16 |

V VECTOR

| V\H | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| -16 | 17 | 18 | 19 | 20 | 21 | 22 | 23 | 24 | 25 | 26 | 27 | 28 | 29 | 30 | 32 |
| -15 | 16 | 17 | 18 | 19 | 20 | 21 | 22 | 23 | 24 | 25 | 26 | 27 | 28 | 29 | 31 |
| -14 | 15 | 16 | 17 | 18 | 19 | 20 | 21 | 22 | 23 | 24 | 25 | 26 | 27 | 28 | 30 |
| -13 | 14 | 15 | 16 | 17 | 18 | 19 | 20 | 21 | 22 | 23 | 24 | 25 | 26 | 27 | 29 |
| -12 | 13 | 14 | 15 | 16 | 17 | 18 | 19 | 20 | 21 | 22 | 23 | 24 | 25 | 26 | 28 |
| -11 | 12 | 13 | 14 | 15 | 16 | 17 | 18 | 19 | 20 | 21 | 22 | 23 | 24 | 25 | 27 |
| -10 | 11 | 12 | 13 | 14 | 15 | 16 | 17 | 18 | 19 | 20 | 21 | 22 | 23 | 24 | 26 |
| -9 | 10 | 11 | 12 | 13 | 14 | 15 | 16 | 17 | 18 | 19 | 20 | 21 | 22 | 23 | 25 |
| -8 | 9 | 10 | 11 | 12 | 13 | 14 | 15 | 16 | 17 | 18 | 19 | 20 | 21 | 22 | 24 |
| -7 | 8 | 9 | 10 | 11 | 12 | 13 | 14 | 15 | 16 | 17 | 18 | 19 | 20 | 21 | 23 |
| -6 | 7 | 8 | 9 | 10 | 11 | 12 | 13 | 14 | 15 | 16 | 17 | 18 | 19 | 20 | 22 |
| -5 | 6 | 7 | 8 | 9 | 10 | 11 | 12 | 13 | 14 | 15 | 16 | 17 | 18 | 19 | 21 |
| -4 | 5 | 6 | 7 | 8 | 9 | 10 | 11 | 12 | 13 | 14 | 15 | 16 | 17 | 18 | 20 |
| -3 | 4 | 5 | 6 | 7 | 8 | 9 | 10 | 11 | 12 | 13 | 14 | 15 | 16 | 17 | 19 |
| -2 | 3 | 4 | 5 | 6 | 7 | 8 | 9 | 10 | 11 | 12 | 13 | 14 | 15 | 16 | 18 |
| -1 | 2 | 3 | 4 | 5 | 6 | 7 | 8 | 9 | 10 | 11 | 12 | 13 | 14 | 15 | 17 |
| 0 | 1 | 2 | 3 | 4 | 5 | 6 | 7 | 8 | 9 | 10 | 11 | 12 | 13 | 14 | 16 |
| 1 | 2 | 3 | 4 | 5 | 6 | 7 | 8 | 9 | 10 | 11 | 12 | 13 | 14 | 15 | 17 |
| 2 | 3 | 4 | 5 | 6 | 7 | 8 | 9 | 10 | 11 | 12 | 13 | 14 | 15 | 16 | 18 |
| 3 | 4 | 5 | 6 | 7 | 8 | 9 | 10 | 11 | 12 | 13 | 14 | 15 | 16 | 17 | 19 |
| 4 | 5 | 6 | 7 | 8 | 9 | 10 | 11 | 12 | 13 | 14 | 15 | 16 | 17 | 18 | 20 |
| 5 | 6 | 7 | 8 | 9 | 10 | 11 | 12 | 13 | 14 | 15 | 16 | 17 | 18 | 19 | 21 |
| 6 | 7 | 8 | 9 | 10 | 11 | 12 | 13 | 14 | 15 | 16 | 17 | 18 | 19 | 20 | 22 |
| 7 | 8 | 9 | 10 | 11 | 12 | 13 | 14 | 15 | 16 | 17 | 18 | 19 | 20 | 21 | 23 |
| 8 | 9 | 10 | 11 | 12 | 13 | 14 | 15 | 16 | 17 | 18 | 19 | 20 | 21 | 22 | 24 |
| 9 | 10 | 11 | 12 | 13 | 14 | 15 | 16 | 17 | 18 | 19 | 20 | 21 | 22 | 23 | 25 |
| 10 | 11 | 12 | 13 | 14 | 15 | 16 | 17 | 18 | 19 | 20 | 21 | 22 | 23 | 24 | 26 |
| 11 | 12 | 13 | 14 | 15 | 16 | 17 | 18 | 19 | 20 | 21 | 22 | 23 | 24 | 25 | 27 |
| 12 | 13 | 14 | 15 | 16 | 17 | 18 | 19 | 20 | 21 | 22 | 23 | 24 | 25 | 26 | 28 |
| 13 | 14 | 15 | 16 | 17 | 18 | 19 | 20 | 21 | 22 | 23 | 24 | 25 | 26 | 27 | 29 |
| 14 | 15 | 16 | 17 | 18 | 19 | 20 | 21 | 22 | 23 | 24 | 25 | 26 | 27 | 28 | 30 |
| 15 | 16 | 17 | 18 | 19 | 20 | 21 | 22 | 23 | 24 | 25 | 26 | 27 | 28 | 29 | 31 |
| 16 | 17 | 18 | 19 | 20 | 21 | 22 | 23 | 24 | 25 | 26 | 27 | 28 | 29 | 30 | 32 |

H VECTOR

| | -16 | -15 | -14 | -13 | -12 | -11 | -10 | -9 | -8 | -7 | -6 | -5 | -4 | -3 | -2 | -1 | 0 |
|---|---|---|---|---|---|---|---|---|---|---|---|---|---|---|---|---|---|
| -16 | 48 | 47 | 46 | 45 | 44 | 43 | 42 | 41 | 40 | 39 | 38 | 37 | 36 | 35 | 34 | 33 | 32 |
| -15 | 47 | 46 | 45 | 44 | 43 | 42 | 41 | 40 | 39 | 38 | 37 | 36 | 35 | 34 | 33 | 32 | 31 |
| -14 | 46 | 45 | 44 | 43 | 42 | 41 | 40 | 39 | 38 | 37 | 36 | 35 | 34 | 33 | 32 | 31 | 30 |
| -13 | 45 | 44 | 43 | 42 | 41 | 40 | 39 | 38 | 37 | 36 | 35 | 34 | 33 | 32 | 31 | 30 | 29 |
| -12 | 44 | 43 | 42 | 41 | 40 | 39 | 38 | 37 | 36 | 35 | 34 | 33 | 32 | 31 | 30 | 29 | 28 |
| -11 | 43 | 42 | 41 | 40 | 39 | 38 | 37 | 36 | 35 | 34 | 33 | 32 | 31 | 30 | 29 | 28 | 27 |
| -10 | 42 | 41 | 40 | 39 | 38 | 37 | 36 | 35 | 34 | 33 | 32 | 31 | 30 | 29 | 28 | 27 | 26 |
| -9 | 41 | 40 | 39 | 38 | 37 | 36 | 35 | 34 | 33 | 32 | 31 | 30 | 29 | 28 | 27 | 26 | 25 |
| -8 | 40 | 39 | 38 | 37 | 36 | 35 | 34 | 33 | 32 | 31 | 30 | 29 | 28 | 27 | 26 | 25 | 24 |
| -7 | 39 | 38 | 37 | 36 | 35 | 34 | 33 | 32 | 31 | 30 | 29 | 28 | 27 | 26 | 25 | 24 | 26 |
| -6 | 38 | 37 | 36 | 35 | 34 | 33 | 32 | 31 | 30 | 29 | 28 | 27 | 26 | 25 | 24 | 26 | 22 |
| -5 | 37 | 36 | 35 | 34 | 33 | 32 | 31 | 30 | 29 | 28 | 27 | 26 | 25 | 24 | 26 | 22 | 21 |
| -4 | 36 | 35 | 34 | 33 | 32 | 31 | 30 | 29 | 28 | 27 | 26 | 25 | 24 | 26 | 22 | 21 | 20 |
| -3 | 35 | 34 | 33 | 32 | 31 | 30 | 29 | 28 | 27 | 26 | 25 | 24 | 26 | 22 | 21 | 20 | 19 |
| -2 | 34 | 33 | 32 | 31 | 30 | 29 | 28 | 27 | 26 | 25 | 24 | 26 | 22 | 21 | 20 | 19 | 18 |
| -1 | 33 | 32 | 31 | 30 | 29 | 28 | 27 | 26 | 25 | 24 | 26 | 22 | 21 | 20 | 19 | 18 | 17 |
| 0 | 32 | 31 | 30 | 29 | 28 | 27 | 26 | 25 | 24 | 26 | 22 | 21 | 20 | 19 | 18 | 17 | 16 |
| 1 | 31 | 30 | 29 | 28 | 27 | 26 | 25 | 24 | 26 | 22 | 21 | 20 | 19 | 18 | 17 | 16 | 15 |
| 2 | 30 | 29 | 28 | 27 | 26 | 25 | 24 | 26 | 22 | 21 | 20 | 19 | 18 | 17 | 16 | 15 | 14 |
| 3 | 29 | 28 | 27 | 26 | 25 | 24 | 26 | 22 | 21 | 20 | 19 | 18 | 17 | 16 | 15 | 14 | 13 |
| 4 | 28 | 27 | 26 | 25 | 24 | 26 | 22 | 21 | 20 | 19 | 18 | 17 | 16 | 15 | 14 | 13 | 12 |
| 5 | 27 | 26 | 25 | 24 | 26 | 22 | 21 | 20 | 19 | 18 | 17 | 16 | 15 | 14 | 13 | 12 | 11 |
| 6 | 26 | 25 | 24 | 26 | 22 | 21 | 20 | 19 | 18 | 17 | 16 | 15 | 14 | 13 | 12 | 11 | 10 |
| 7 | 25 | 24 | 26 | 22 | 21 | 20 | 19 | 18 | 17 | 16 | 15 | 14 | 13 | 12 | 11 | 10 | 9 |
| 8 | 24 | 26 | 22 | 21 | 20 | 19 | 18 | 17 | 16 | 15 | 14 | 13 | 12 | 11 | 10 | 9 | 8 |
| 9 | 26 | 22 | 21 | 20 | 19 | 18 | 17 | 16 | 15 | 14 | 13 | 12 | 11 | 10 | 9 | 8 | 7 |
| 10 | 22 | 21 | 20 | 19 | 18 | 17 | 16 | 15 | 14 | 13 | 12 | 11 | 10 | 9 | 8 | 7 | 6 |
| 11 | 21 | 20 | 19 | 18 | 17 | 16 | 15 | 14 | 13 | 12 | 11 | 10 | 9 | 8 | 7 | 6 | 5 |
| 12 | 20 | 19 | 18 | 17 | 16 | 15 | 14 | 13 | 12 | 11 | 10 | 9 | 8 | 7 | 6 | 5 | 4 |
| 13 | 19 | 18 | 17 | 16 | 15 | 14 | 13 | 12 | 11 | 10 | 9 | 8 | 7 | 6 | 5 | 4 | 3 |
| 14 | 18 | 17 | 16 | 15 | 14 | 13 | 12 | 11 | 10 | 9 | 8 | 7 | 6 | 5 | 4 | 3 | 2 |
| 15 | 17 | 16 | 15 | 14 | 13 | 12 | 11 | 10 | 9 | 8 | 7 | 6 | 5 | 4 | 3 | 2 | 1 |
| 16 | 16 | 15 | 14 | 13 | 12 | 11 | 10 | 9 | 8 | 7 | 6 | 5 | 4 | 3 | 2 | 1 | 0 |

V VECTOR

| V\H | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| -16 | 32 | 33 | 34 | 35 | 36 | 37 | 38 | 39 | 40 | 41 | 42 | 43 | 44 | 45 | 46 | 47 |
| -15 | 31 | 32 | 33 | 34 | 35 | 36 | 37 | 38 | 39 | 40 | 41 | 42 | 43 | 44 | 45 | 46 |
| -14 | 30 | 31 | 32 | 33 | 34 | 35 | 36 | 37 | 38 | 39 | 40 | 41 | 42 | 43 | 44 | 45 |
| -13 | 29 | 30 | 31 | 32 | 33 | 34 | 35 | 36 | 37 | 38 | 39 | 40 | 41 | 42 | 43 | 44 |
| -12 | 28 | 29 | 30 | 31 | 32 | 33 | 34 | 35 | 36 | 37 | 38 | 39 | 40 | 41 | 42 | 43 |
| -11 | 27 | 28 | 29 | 30 | 31 | 32 | 33 | 34 | 35 | 36 | 37 | 38 | 39 | 40 | 41 | 42 |
| -10 | 26 | 27 | 28 | 29 | 30 | 31 | 32 | 33 | 34 | 35 | 36 | 37 | 38 | 39 | 40 | 41 |
| -9 | 25 | 26 | 27 | 28 | 29 | 30 | 31 | 32 | 33 | 34 | 35 | 36 | 37 | 38 | 39 | 40 |
| -8 | 24 | 25 | 26 | 27 | 28 | 29 | 30 | 31 | 32 | 33 | 34 | 35 | 36 | 37 | 38 | 39 |
| -7 | 26 | 24 | 25 | 26 | 27 | 28 | 29 | 30 | 31 | 32 | 33 | 34 | 35 | 36 | 37 | 38 |
| -6 | 22 | 26 | 24 | 25 | 26 | 27 | 28 | 29 | 30 | 31 | 32 | 33 | 34 | 35 | 36 | 37 |
| -5 | 21 | 22 | 26 | 24 | 25 | 26 | 27 | 28 | 29 | 30 | 31 | 32 | 33 | 34 | 35 | 36 |
| -4 | 20 | 21 | 22 | 26 | 24 | 25 | 26 | 27 | 28 | 29 | 30 | 31 | 32 | 33 | 34 | 35 |
| -3 | 19 | 20 | 21 | 22 | 26 | 24 | 25 | 26 | 27 | 28 | 29 | 30 | 31 | 32 | 33 | 34 |
| -2 | 18 | 19 | 20 | 21 | 22 | 26 | 24 | 25 | 26 | 27 | 28 | 29 | 30 | 31 | 32 | 33 |
| -1 | 17 | 18 | 19 | 20 | 21 | 22 | 26 | 24 | 25 | 26 | 27 | 28 | 29 | 30 | 31 | 32 |
| 0 | 16 | 17 | 18 | 19 | 20 | 21 | 22 | 26 | 24 | 25 | 26 | 27 | 28 | 29 | 30 | 31 |
| 1 | 15 | 16 | 17 | 18 | 19 | 20 | 21 | 22 | 26 | 24 | 25 | 26 | 27 | 28 | 29 | 30 |
| 2 | 14 | 15 | 16 | 17 | 18 | 19 | 20 | 21 | 22 | 26 | 24 | 25 | 26 | 27 | 28 | 29 |
| 3 | 13 | 14 | 15 | 16 | 17 | 18 | 19 | 20 | 21 | 22 | 26 | 24 | 25 | 26 | 27 | 28 |
| 4 | 12 | 13 | 14 | 15 | 16 | 17 | 18 | 19 | 20 | 21 | 22 | 26 | 24 | 25 | 26 | 27 |
| 5 | 11 | 12 | 13 | 14 | 15 | 16 | 17 | 18 | 19 | 20 | 21 | 22 | 26 | 24 | 25 | 26 |
| 6 | 10 | 11 | 12 | 13 | 14 | 15 | 16 | 17 | 18 | 19 | 20 | 21 | 22 | 26 | 24 | 25 |
| 7 | 9 | 10 | 11 | 12 | 13 | 14 | 15 | 16 | 17 | 18 | 19 | 20 | 21 | 22 | 26 | 24 |
| 8 | 8 | 9 | 10 | 11 | 12 | 13 | 14 | 15 | 16 | 17 | 18 | 19 | 20 | 21 | 22 | 26 |
| 9 | 7 | 8 | 9 | 10 | 11 | 12 | 13 | 14 | 15 | 16 | 17 | 18 | 19 | 20 | 21 | 22 |
| 10 | 6 | 7 | 8 | 9 | 10 | 11 | 12 | 13 | 14 | 15 | 16 | 17 | 18 | 19 | 20 | 21 |
| 11 | 5 | 6 | 7 | 8 | 9 | 10 | 11 | 12 | 13 | 14 | 15 | 16 | 17 | 18 | 19 | 20 |
| 12 | 4 | 5 | 6 | 7 | 8 | 9 | 10 | 11 | 12 | 13 | 14 | 15 | 16 | 17 | 18 | 19 |
| 13 | 3 | 4 | 5 | 6 | 7 | 8 | 9 | 10 | 11 | 12 | 13 | 14 | 15 | 16 | 17 | 18 |
| 14 | 2 | 3 | 4 | 5 | 6 | 7 | 8 | 9 | 10 | 11 | 12 | 13 | 14 | 15 | 16 | 17 |
| 15 | 1 | 2 | 3 | 4 | 5 | 6 | 7 | 8 | 9 | 10 | 11 | 12 | 13 | 14 | 15 | 16 |
| 16 | 0 | 1 | 2 | 3 | 4 | 5 | 6 | 7 | 8 | 9 | 10 | 11 | 12 | 13 | 14 | 15 |

FIG. 70

H VECTOR

| V VECTOR | -16 | -15 | -14 | -13 | -12 | -11 | -10 | -9 | -8 | -7 | -6 | -5 | -4 | -3 | -2 | -1 | 0 |
|---|---|---|---|---|---|---|---|---|---|---|---|---|---|---|---|---|---|
| -16 | 16 | 15 | 14 | 13 | 12 | 11 | 10 | 9 | 8 | 7 | 6 | 5 | 4 | 3 | 2 | 1 | 0 |
| -15 | 17 | 16 | 15 | 14 | 13 | 12 | 11 | 10 | 9 | 8 | 7 | 6 | 5 | 4 | 3 | 2 | 1 |
| -14 | 18 | 17 | 16 | 15 | 14 | 13 | 12 | 11 | 10 | 9 | 8 | 7 | 6 | 5 | 4 | 3 | 2 |
| -13 | 19 | 18 | 17 | 16 | 15 | 14 | 13 | 12 | 11 | 10 | 9 | 8 | 7 | 6 | 5 | 4 | 3 |
| -12 | 20 | 19 | 18 | 17 | 16 | 15 | 14 | 13 | 12 | 11 | 10 | 9 | 8 | 7 | 6 | 5 | 4 |
| -11 | 21 | 20 | 19 | 18 | 17 | 16 | 15 | 14 | 13 | 12 | 11 | 10 | 9 | 8 | 7 | 6 | 5 |
| -10 | 22 | 21 | 20 | 19 | 18 | 17 | 16 | 15 | 14 | 13 | 12 | 11 | 10 | 9 | 8 | 7 | 6 |
| -9 | 23 | 22 | 21 | 20 | 19 | 18 | 17 | 16 | 15 | 14 | 13 | 12 | 11 | 10 | 9 | 8 | 7 |
| -8 | 24 | 23 | 22 | 21 | 20 | 19 | 18 | 17 | 16 | 15 | 14 | 13 | 12 | 11 | 10 | 9 | 8 |
| -7 | 25 | 24 | 23 | 22 | 21 | 20 | 19 | 18 | 17 | 16 | 15 | 14 | 13 | 12 | 11 | 10 | 9 |
| -6 | 26 | 25 | 24 | 23 | 22 | 21 | 20 | 19 | 18 | 17 | 16 | 15 | 14 | 13 | 12 | 11 | 10 |
| -5 | 27 | 26 | 25 | 24 | 23 | 22 | 21 | 20 | 19 | 18 | 17 | 16 | 15 | 14 | 13 | 12 | 11 |
| -4 | 28 | 27 | 26 | 25 | 24 | 23 | 22 | 21 | 20 | 19 | 18 | 17 | 16 | 15 | 14 | 13 | 12 |
| -3 | 29 | 28 | 27 | 26 | 25 | 24 | 23 | 22 | 21 | 20 | 19 | 18 | 17 | 16 | 15 | 14 | 13 |
| -2 | 30 | 29 | 28 | 27 | 26 | 25 | 24 | 23 | 22 | 21 | 20 | 19 | 18 | 17 | 16 | 15 | 14 |
| -1 | 31 | 30 | 29 | 28 | 27 | 26 | 25 | 24 | 23 | 22 | 21 | 20 | 19 | 18 | 17 | 16 | 15 |
| 0 | 32 | 31 | 30 | 29 | 28 | 27 | 26 | 25 | 24 | 23 | 22 | 21 | 20 | 19 | 18 | 17 | 16 |
| 1 | 33 | 32 | 31 | 30 | 29 | 28 | 27 | 26 | 25 | 24 | 23 | 22 | 21 | 20 | 19 | 18 | 17 |
| 2 | 34 | 33 | 32 | 31 | 30 | 29 | 28 | 27 | 26 | 25 | 24 | 23 | 22 | 21 | 20 | 19 | 18 |
| 3 | 35 | 34 | 33 | 32 | 31 | 30 | 29 | 28 | 27 | 26 | 25 | 24 | 23 | 22 | 21 | 20 | 19 |
| 4 | 36 | 35 | 34 | 33 | 32 | 31 | 30 | 29 | 28 | 27 | 26 | 25 | 24 | 23 | 22 | 21 | 20 |
| 5 | 37 | 36 | 35 | 34 | 33 | 32 | 31 | 30 | 29 | 28 | 27 | 26 | 25 | 24 | 23 | 22 | 21 |
| 6 | 38 | 37 | 36 | 35 | 34 | 33 | 32 | 31 | 30 | 29 | 28 | 27 | 26 | 25 | 24 | 23 | 22 |
| 7 | 39 | 38 | 37 | 36 | 35 | 34 | 33 | 32 | 31 | 30 | 29 | 28 | 27 | 26 | 25 | 24 | 23 |
| 8 | 40 | 39 | 38 | 37 | 36 | 35 | 34 | 33 | 32 | 31 | 30 | 29 | 28 | 27 | 26 | 25 | 24 |
| 9 | 41 | 40 | 39 | 38 | 37 | 36 | 35 | 34 | 33 | 32 | 31 | 30 | 29 | 28 | 27 | 26 | 25 |
| 10 | 42 | 41 | 40 | 39 | 38 | 37 | 36 | 35 | 34 | 33 | 32 | 31 | 30 | 29 | 28 | 27 | 26 |
| 11 | 43 | 42 | 41 | 40 | 39 | 38 | 37 | 36 | 35 | 34 | 33 | 32 | 31 | 30 | 29 | 28 | 27 |
| 12 | 44 | 43 | 42 | 41 | 40 | 39 | 38 | 37 | 36 | 35 | 34 | 33 | 32 | 31 | 30 | 29 | 28 |
| 13 | 45 | 44 | 43 | 42 | 41 | 40 | 39 | 38 | 37 | 36 | 35 | 34 | 33 | 32 | 31 | 30 | 29 |
| 14 | 46 | 45 | 44 | 43 | 42 | 41 | 40 | 39 | 38 | 37 | 36 | 35 | 34 | 33 | 32 | 31 | 30 |
| 15 | 47 | 46 | 45 | 44 | 43 | 42 | 41 | 40 | 39 | 38 | 37 | 36 | 35 | 34 | 33 | 32 | 31 |
| 16 | 48 | 47 | 46 | 45 | 44 | 43 | 42 | 41 | 40 | 39 | 38 | 37 | 36 | 35 | 34 | 33 | 32 |

H VECTOR

| V \ H | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| -16 | 0 | 1 | 2 | 3 | 4 | 5 | 6 | 7 | 8 | 9 | 10 | 11 | 12 | 13 | 14 | 15 |
| -15 | 1 | 2 | 3 | 4 | 5 | 6 | 7 | 8 | 9 | 10 | 11 | 12 | 13 | 14 | 15 | 16 |
| -14 | 2 | 3 | 4 | 5 | 6 | 7 | 8 | 9 | 10 | 11 | 12 | 13 | 14 | 15 | 16 | 17 |
| -13 | 3 | 4 | 5 | 6 | 7 | 8 | 9 | 10 | 11 | 12 | 13 | 14 | 15 | 16 | 17 | 18 |
| -12 | 4 | 5 | 6 | 7 | 8 | 9 | 10 | 11 | 12 | 13 | 14 | 15 | 16 | 17 | 18 | 19 |
| -11 | 5 | 6 | 7 | 8 | 9 | 10 | 11 | 12 | 13 | 14 | 15 | 16 | 17 | 18 | 19 | 20 |
| -10 | 6 | 7 | 8 | 9 | 10 | 11 | 12 | 13 | 14 | 15 | 16 | 17 | 18 | 19 | 20 | 21 |
| -9 | 7 | 8 | 9 | 10 | 11 | 12 | 13 | 14 | 15 | 16 | 17 | 18 | 19 | 20 | 21 | 22 |
| -8 | 8 | 9 | 10 | 11 | 12 | 13 | 14 | 15 | 16 | 17 | 18 | 19 | 20 | 21 | 22 | 23 |
| -7 | 9 | 10 | 11 | 12 | 13 | 14 | 15 | 16 | 17 | 18 | 19 | 20 | 21 | 22 | 23 | 24 |
| -6 | 10 | 11 | 12 | 13 | 14 | 15 | 16 | 17 | 18 | 19 | 20 | 21 | 22 | 23 | 24 | 25 |
| -5 | 11 | 12 | 13 | 14 | 15 | 16 | 17 | 18 | 19 | 20 | 21 | 22 | 23 | 24 | 25 | 26 |
| -4 | 12 | 13 | 14 | 15 | 16 | 17 | 18 | 19 | 20 | 21 | 22 | 23 | 24 | 25 | 26 | 27 |
| -3 | 13 | 14 | 15 | 16 | 17 | 18 | 19 | 20 | 21 | 22 | 23 | 24 | 25 | 26 | 27 | 28 |
| -2 | 14 | 15 | 16 | 17 | 18 | 19 | 20 | 21 | 22 | 23 | 24 | 25 | 26 | 27 | 28 | 29 |
| -1 | 15 | 16 | 17 | 18 | 19 | 20 | 21 | 22 | 23 | 24 | 25 | 26 | 27 | 28 | 29 | 30 |
| 0 | 16 | 17 | 18 | 19 | 20 | 21 | 22 | 23 | 24 | 25 | 26 | 27 | 28 | 29 | 30 | 31 |
| 1 | 17 | 18 | 19 | 20 | 21 | 22 | 23 | 24 | 25 | 26 | 27 | 28 | 29 | 30 | 31 | 32 |
| 2 | 18 | 19 | 20 | 21 | 22 | 23 | 24 | 25 | 26 | 27 | 28 | 29 | 30 | 31 | 32 | 33 |
| 3 | 19 | 20 | 21 | 22 | 23 | 24 | 25 | 26 | 27 | 28 | 29 | 30 | 31 | 32 | 33 | 34 |
| 4 | 20 | 21 | 22 | 23 | 24 | 25 | 26 | 27 | 28 | 29 | 30 | 31 | 32 | 33 | 34 | 35 |
| 5 | 21 | 22 | 23 | 24 | 25 | 26 | 27 | 28 | 29 | 30 | 31 | 32 | 33 | 34 | 35 | 36 |
| 6 | 22 | 23 | 24 | 25 | 26 | 27 | 28 | 29 | 30 | 31 | 32 | 33 | 34 | 35 | 36 | 37 |
| 7 | 23 | 24 | 25 | 26 | 27 | 28 | 29 | 30 | 31 | 32 | 33 | 34 | 35 | 36 | 37 | 38 |
| 8 | 24 | 25 | 26 | 27 | 28 | 29 | 30 | 31 | 32 | 33 | 34 | 35 | 36 | 37 | 38 | 39 |
| 9 | 25 | 26 | 27 | 28 | 29 | 30 | 31 | 32 | 33 | 34 | 35 | 36 | 37 | 38 | 39 | 40 |
| 10 | 26 | 27 | 28 | 29 | 30 | 31 | 32 | 33 | 34 | 35 | 36 | 37 | 38 | 39 | 40 | 41 |
| 11 | 27 | 28 | 29 | 30 | 31 | 32 | 33 | 34 | 35 | 36 | 37 | 38 | 39 | 40 | 41 | 42 |
| 12 | 28 | 29 | 30 | 31 | 32 | 33 | 34 | 35 | 36 | 37 | 38 | 39 | 40 | 41 | 42 | 43 |
| 13 | 29 | 30 | 31 | 32 | 33 | 34 | 35 | 36 | 37 | 38 | 39 | 40 | 41 | 42 | 43 | 44 |
| 14 | 30 | 31 | 32 | 33 | 34 | 35 | 36 | 37 | 38 | 39 | 40 | 41 | 42 | 43 | 44 | 45 |
| 15 | 31 | 32 | 33 | 34 | 35 | 36 | 37 | 38 | 39 | 40 | 41 | 42 | 43 | 44 | 45 | 46 |
| 16 | 32 | 33 | 34 | 35 | 36 | 37 | 38 | 39 | 40 | 41 | 42 | 43 | 44 | 45 | 46 | 47 |

$P(H, V) = |H| + (+V + 16)$

F I G. 87
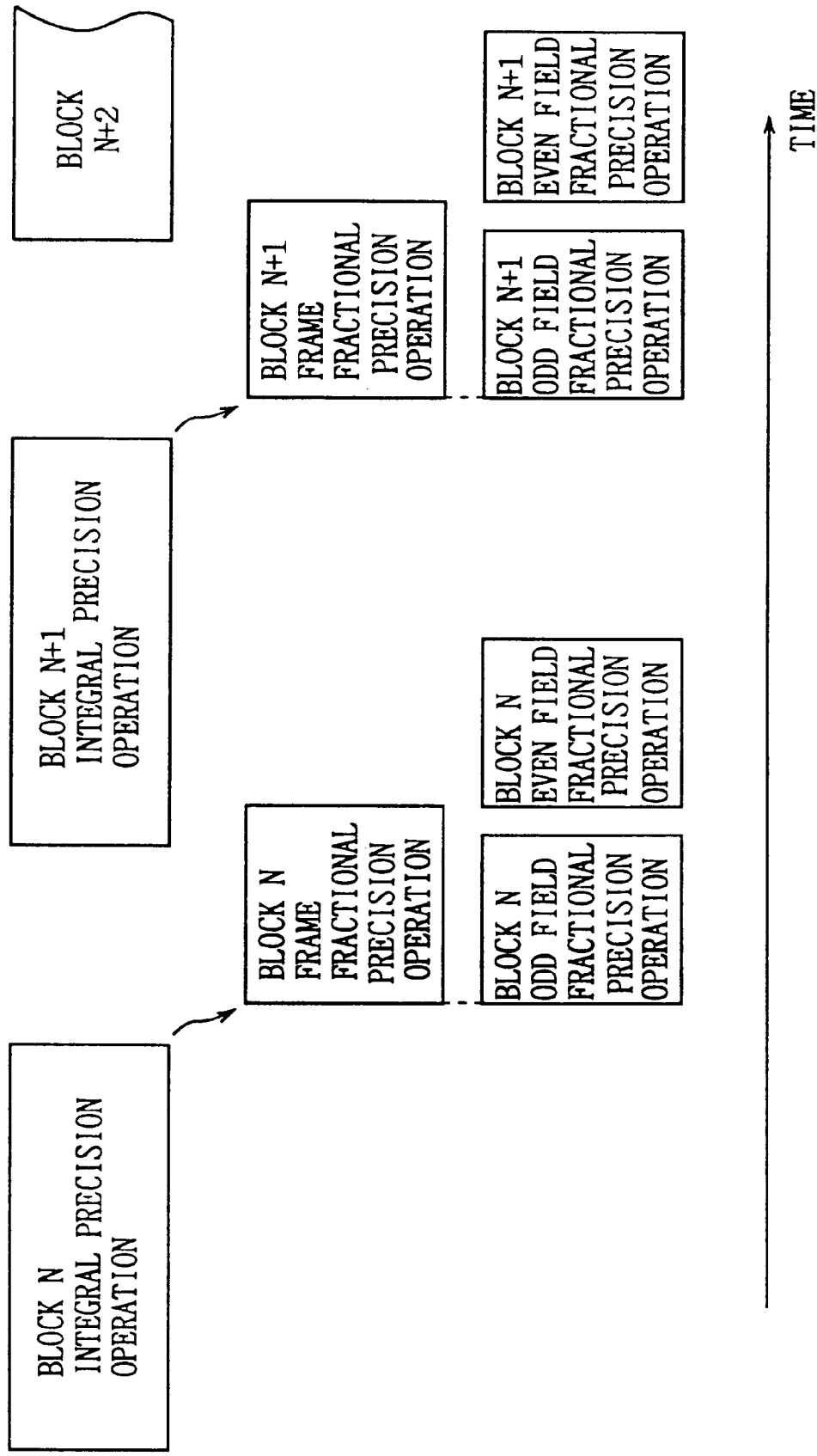

16 PIXELS

| MB (0,0) | MB (1,0) | MB (2,0) | MB (3,0) | MB (4,0) |
|---|---|---|---|---|
| MB (0,1) | MB (1,1) | MB (2,1) | MB (3,1) | MB (4,1) |
| MB (0,2) | MB (1,2) | MB (2,2) | MB (3,2) | MB (4,2) |
| MB (0,3) | MB (1,3) | MB (2,3) | MB (3,3) | MB (4,3) |
| MB (0,4) | MB (1,4) | MB (2,4) | MB (3,4) | MB (4,4) |

16 PIXELS

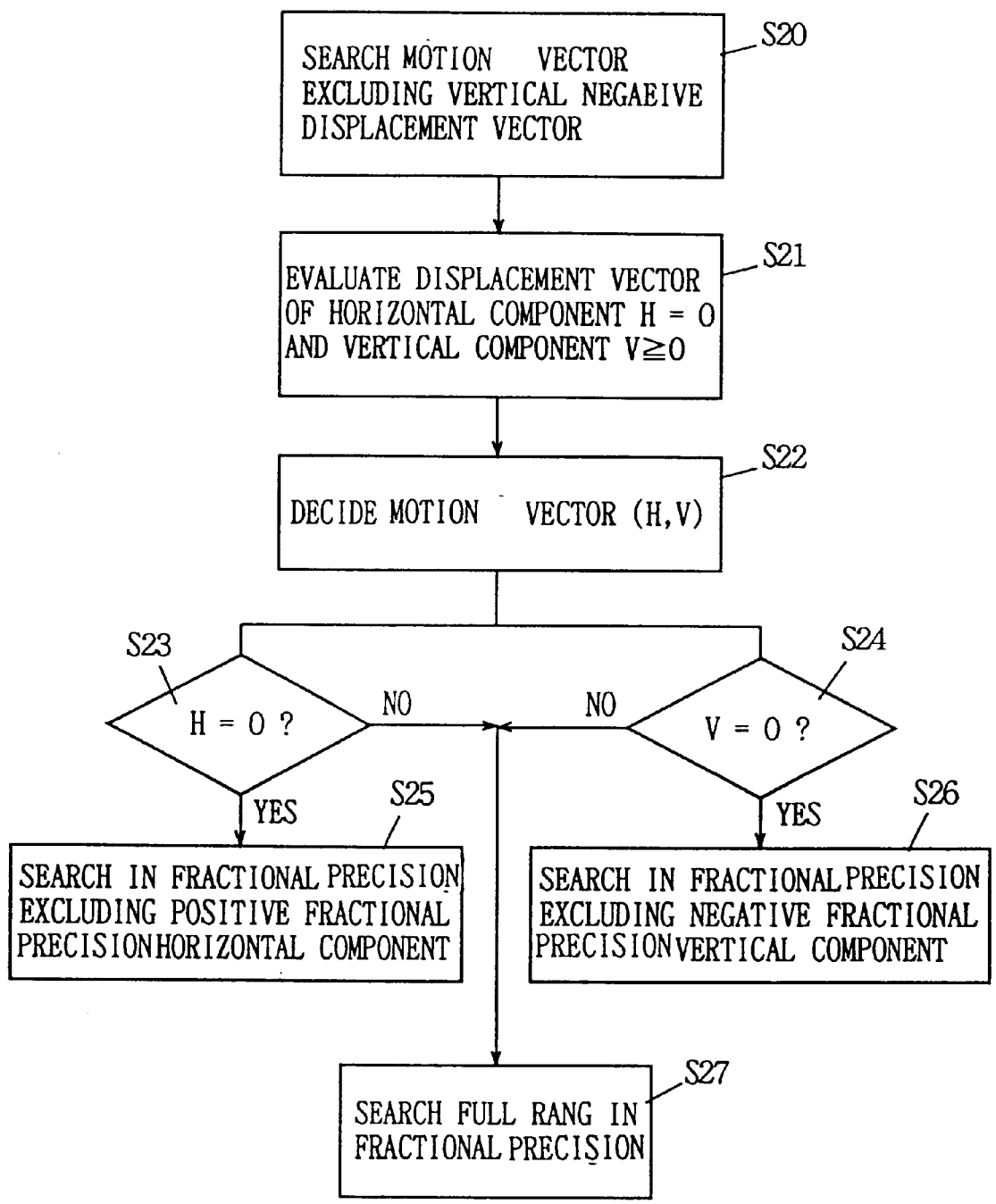

FIG. 105
```
              T           T
           ←─────→←─────→
MB(1,4)    ├─────┼─────┤
MB(2,4)
MB(3,4)    HORIZONTAL HORIZONTAL
LOWER END  -16 ~-1    0 ~+15
           LOWER      LOWER
           INHIBITION INHIBITION
```
FIG. 106A
```
                  T         T
               ←─────→←─────→
MB(4,4)        ├─────┼─────┤
LOWER
RIGHT END  HORIZONTAL HORIZONTAL
           -16 ~-1    0 ~+15
           LOWER      LOWER RIGHT
           INHIBITION INHIBITION
```
FIG. 106B
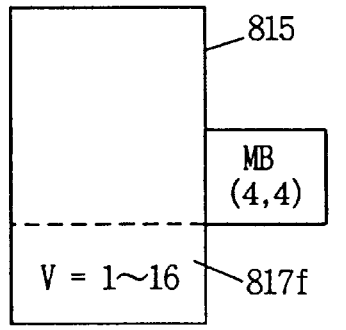
FIG. 106C
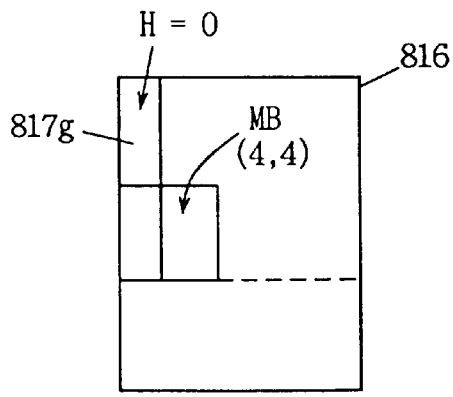

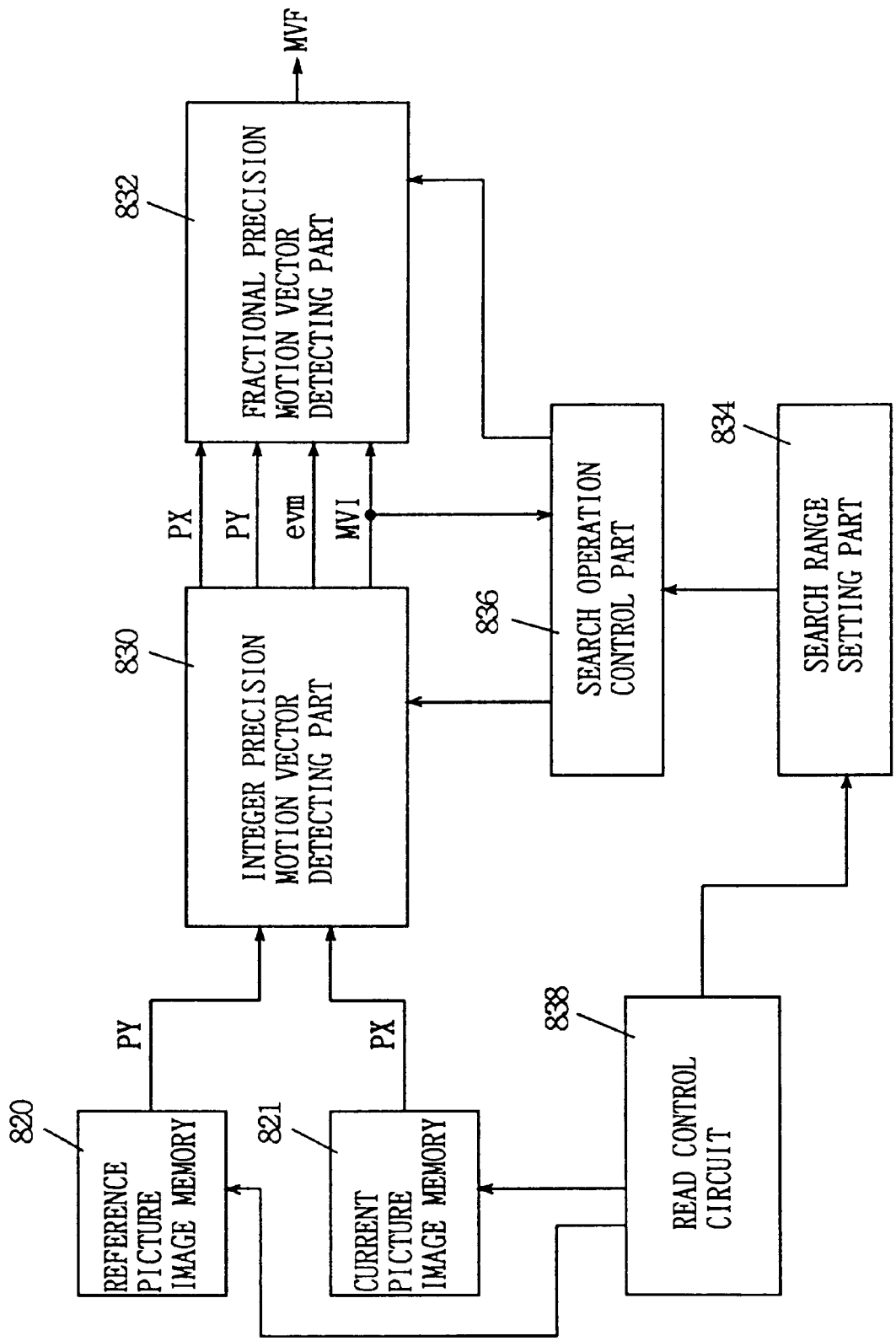
F I G. 107

FIG. 115
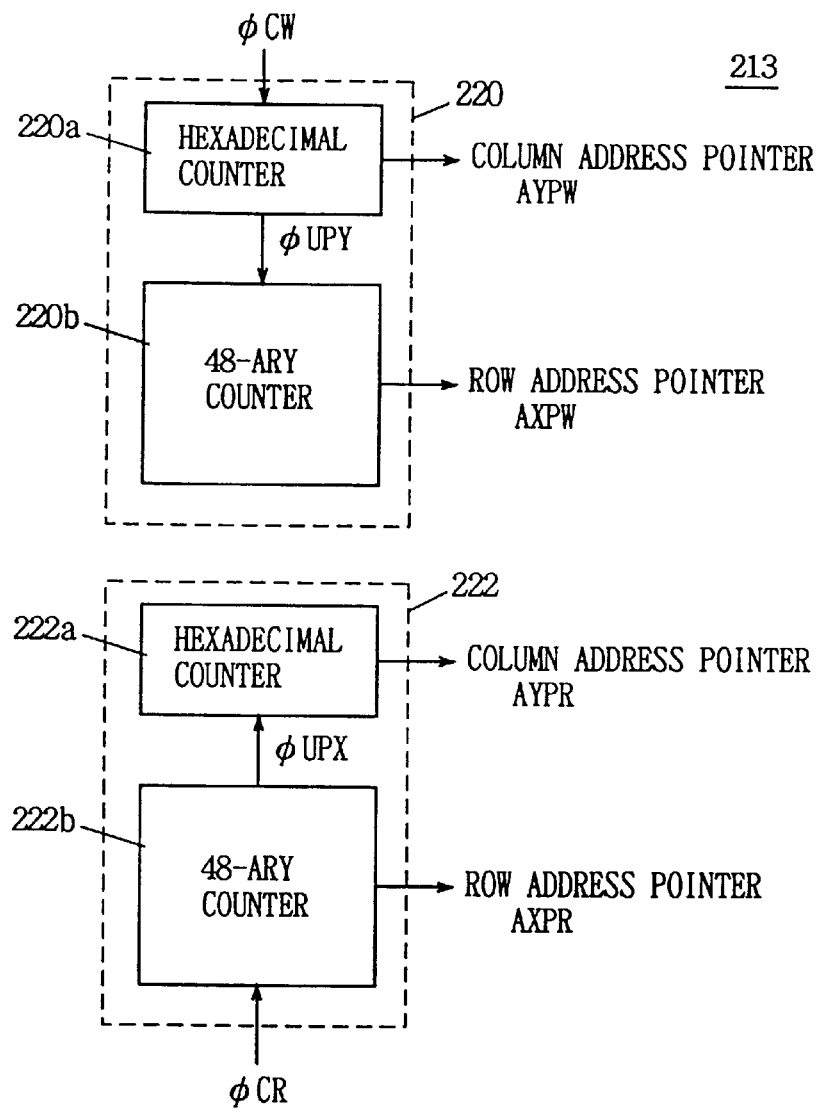
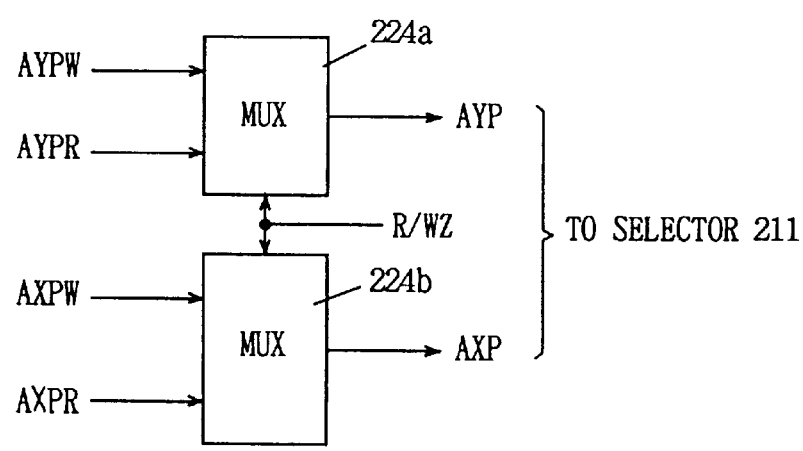

FIRST FIELD

SECOND FIELD

: WRITE FIELD PICTURE IMAGE

: READ FIELD PICTURE IMAGE

FIG. 142A
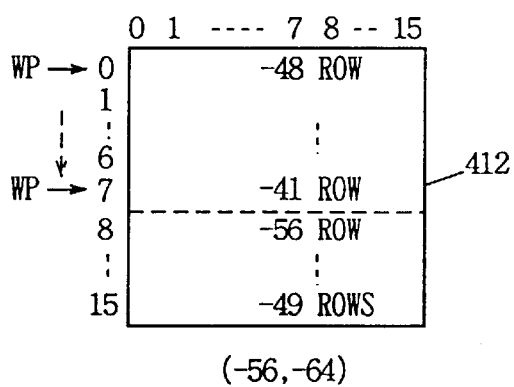 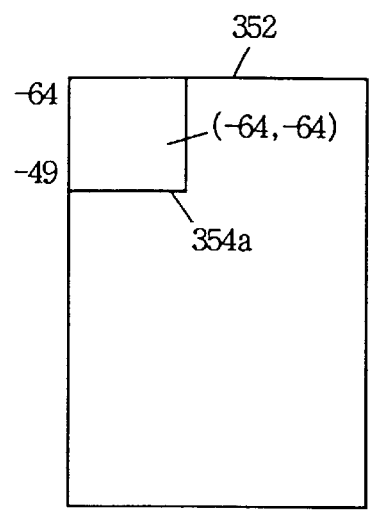
FIG. 142B
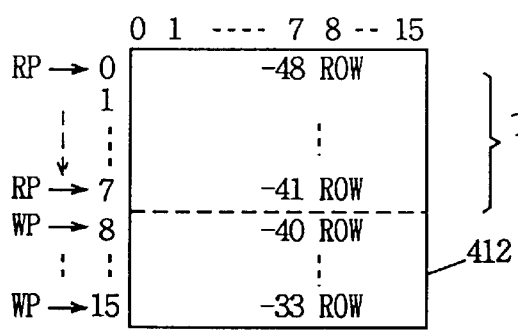 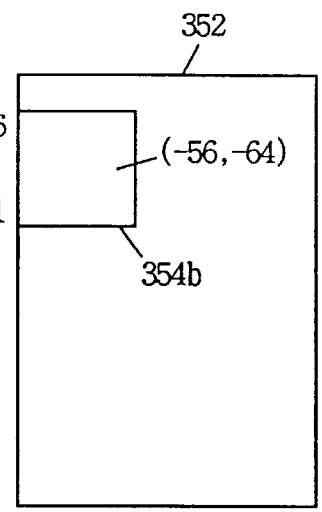
FIG. 142C
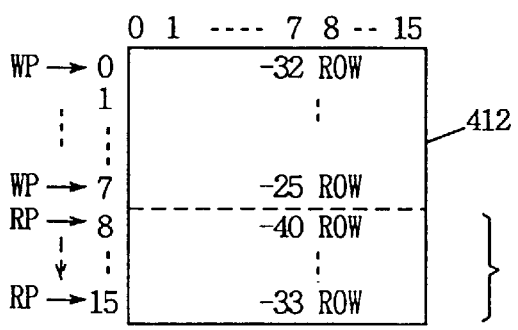 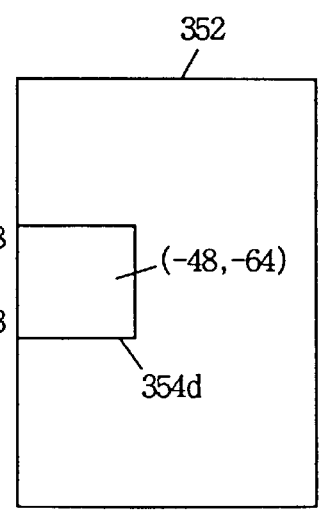

MOTION VECTOR DETECTING DEVICE CAPABLE OF ACCOMMODATING A PLURALITY OF PREDICTIVE MODES

This application is a continuation of application Ser. No. 08/376,204 filed Jan. 20, 1995.

BACKGROUND OF THE INVENTION

1. Field of the Invention

The present invention relates to devices for detecting motion vectors which are employed for motion compensation of a moving picture image in predictive coding.

2. Description of the Background Art

A data compression technique of reducing an amount of data is indispensable for transmitting or storing picture signals having a large amount of data. Picture data have considerable redundancy resulting from correlation between adjacent pixels and human perceptional characteristics. A data compression technique of suppressing the data redundancy for reducing the volume of data for transmission of data is called high efficiency coding. One of such high efficiency coding systems is a frame-to-frame predictive coding system, which is adapted to carry out the following processing:

A predictive error, which is a difference between each pixel data of a current screen (frame or field) to be currently coded and each pixel data of the same position of a precedent screen to be referred to is calculated, so that the predictive error as calculated is thereafter employed for coding. According to this method, it is possible to code picture images having small movements in high efficiency, due to high correlation between the screens. As to picture images having large movements, however, errors are disadvantageously increased due to small correlation between screens, leading to increase in volume of data to be transmitted.

In order to solve the aforementioned problem, a frame-to-frame (field-to-field) predictive coding system with motion compensation is adapted to carry out the following processing: First, motion vectors are previously calculated through pixel data of a current screen (frame or field) and a precedent screen before calculating predictive errors. A predictive picture image of the precedent screen is moved in accordance with the motion vector as calculated. Picture data in a position which is displaced from that of the precedent screen by the motion vector are regarded as reference pixels, which in turn are employed as predicted values. Then, predictive errors between respective pixels of the precedent screen as moved and the current screen are calculated so that the predictive errors and the motion vectors are transmitted.

FIG. 151 is a block diagram schematically showing an overall structure of a conventional encoder for coding picture data in accordance with the predictive coding system with motion compensation. Referring to FIG. 151, the encoder includes a preprocessing circuit 910 for carrying out prescribed preprocessing on picture signals as received, a source coding circuit 912 for eliminating redundancy from the signals preprocessed by the preprocessing circuit 910 and quantizing input signals, and a video multiplex coding circuit 914 for coding signals received from the source coding circuit 912 in accordance with a prescribed format and multiplexing the coded signals to a code train of a predetermined data structure.

The preprocessing circuit 910 converts input picture signals to those of a common intermediate format (CIF) through time and space filters, and performs filter processing for noise removal.

The source coding circuit 912 performs orthogonal transformation processing such as discrete cosine transformation (DCT) on received signals as well as motion compensation for input signals, while quantizing picture data subject to the orthogonal transformation.

The video multiplex coding circuit 914 performs two-dimensional variable-length coding on received picture signals with variable-length coding of various attributes, such as motion vectors, of blocks which are units of data processing, and thereafter multiplexes the signals to a code train of a predetermined data structure.

The encoder further includes a transmission buffer 916 for buffering picture data from the video multiplex coding circuit 914, and a transmission coding circuit 918 for adapting the picture data from the transmission buffer 916 to a transmission channel.

The transmission buffer 916 smooths information generating speeds to a constant speed. The transmission coding circuit 918 executes addition of error checking bits and sound signal data.

FIG. 152 illustrates an exemplary structure of the source coding circuit 912 shown in FIG. 151. Referring to FIG. 152, the source coding circuit 912 includes a motion compensation predictor 920 for detecting motion vectors with respect to input picture signals received from the preprocessing circuit 910 and forming reference picture images motion-compensated in accordance with the motion vectors, a loop filter 922 for performing filter processing on reference picture image pixel data received from the motion compensation predictor 920, a subtracter 924 for obtaining differences between outputs of the loop filter 922 and input picture signals, an orthogonal transformer 926 for orthogonally transforming outputs of the subtracter 924, and a quantizer 928 for quantizing data orthogonally transformed by the orthogonal transformer 926.

The motion compensation predictor 920, the structure of which is described later in detail, includes a frame memory for storing pixel data of a precedent frame, for detecting motion vectors and forming motion-compensated reference picture image pixel data in accordance with input picture signal data and pixel data in the frame memory. The loop filter 922 is provided to improve the picture quality.

The orthogonal transformer 926 carries out orthogonal transformation such as DCT transformation on data received from the subtracter 924 in units of blocks of a prescribed size (8 by 8 pixels in general). The quantizer 928 quantizes the orthogonally transformed pixel data.

The motion compensation predictor 920 and the subtracter 924 execute frame-to-frame prediction with motion compensation, for eliminating time redundancy in a motion image. Further, spatial redundancy in motion image signals is eliminated by orthogonal transformation through the orthogonal transformer 926.

The source coding circuit 912 further includes an inverse quantizer 930 for transforming the data quantized in the quantizer 928 to the original signal states, an inverse orthogonal transformer 932 for performing inverse orthogonal transformation on outputs of the inverse quantizer 930, and an adder 934 for adding up outputs of the loop filter 922 and the inverse orthogonal transformer 932. The inverse quantizer 930 and the inverse orthogonal transformer 932 form a picture image which is employed in frame-to-frame prediction for a subsequent frame. The picture data as generated are written in the frame memory which is included in the motion compensation predictor 920. The adder 934 adds picture signals (frame-to-frame difference data) to the outputs of the loop filter 922, whereby the picture data of the current frame are reproduced. In general, such inverse quantization, inverse orthogonal transformation and addition are called local decoding processes. Calculation of the motion vectors is now described more specifically. In general, a block matching method is employed for calculating the motion vectors.

As shown in FIG. 153A, consider that a picture image A in a (m−1)-th frame is moved to A' in an m-th frame. In the block matching method, the screen (one frame in this case) is divided into blocks each including P by Q pixels (P=Q in general). A precedent frame is searched for a block which is most approximate to that of interest in the current frame. Displacement from the interested block to the most approximate block in the precedent frame is called a motion vector. Description is now made in more detail.

As shown in FIG. 153B, it is assumed that the m-th frame is to be coded. The frame is divided into blocks each having N by N pixels (P=Q=N). It is assumed that pixel data in the upper leftmost pixel position (Nk, N1) in the block of the N by N pixels in the m-th frame has a value Xm(Nk, N1). The sum of absolute values of differences between corresponding pixels in the block of the precedent frame having pixel positions displaced by a vector (i, j) and the block in the current frame is obtained. Then, the displacement vector (i, j) is changed to various values, to obtain the sum of respective absolute differential values. The absolute differential value sum is generally called an evaluation function value. The position (i, j) providing the minimum absolute differential value sum is defined as the motion vector.

It is necessary to transmit one motion vector every pixel block. If the block size is reduced, the volume of information to be transmitted is increased to disable effective data compression. If the block size is increased, on the other hand, it is difficult to perform effective movement detection. In general, therefore, the block size is set at 16 by 16 pixels, and a motion vector search range (maximum change width of i, j) is set at −15 to +15. Motion vector calculation by the block matching method is now described more specifically.

FIG. 154 illustrates a specific method of calculating a motion vector by the block matching method. Consider a picture image 950 which is formed by 352 dots (pixels) by 288 lines, as shown in FIG. 154. The picture image 950 is divided into a plurality of blocks in units of 16 by 16 pixel groups. The motion vector is detected in the units of these blocks. It is assumed that a search block (hereinafter referred to as a search area) is formed by a block 956 which is larger by ±16 pixels in the horizontal and vertical directions on the screen with reference to a block 954 in a precedent frame, which is in the same position as a target block (hereinafter referred to as a template block) 952 for motion vector detection. Motion vector search for the template block 952 is executed in this search area 956. The motion vector searching method in accordance with block matching comprises the following processing steps:

A block (shown by the vector (i, j) in FIG. 154) having displacement corresponding to a motion vector candidate is obtained. Evaluation function value such as a sum of absolute differential values (or square differential sum) of respective pixels in the block as obtained and those in corresponding positions of the template block 952 is obtained.

The aforementioned operation is executed on all displacements in a range of (−16, −16) to (+16, +16) as the vector (i, j). Evaluation function values (evaluation values) are obtained with respect to all predictive picture image blocks (all picture image blocks in the search area 956), and thereafter a predictive picture image block having the minimum evaluation function value is detected. A vector which is directed from a block (the block 954 shown by a vector (0, 0) in FIG. 154) provided on the same position (hereinafter referred to as the right back) as the template block 952 toward the predictive picture image block having the minimum evaluation function value is decided as the motion vector for this template block 952.

FIG. 155 illustrates an overall structure of a conventional hardware-implemented motion vector detecting device, such as that described in "Proceeding" by A. Artieri et al., IEEE ICASSP '89 (1989), pp. 2453–2456, for example. Referring to FIG. 155, the motion vector detecting device includes a search area input register 962 for inputting pixel data of a search area by one column of the search area, a processor array 966 including a plurality of processors which are arranged in a matrix of rows and columns of the same size as evaluation points (motion vector candidates) of a template block, search area side registers 964a and 964b for storing data of the same column in the search area with respect to the processor array 966, and a motion vector detecting part 968 for detecting a motion vector in accordance with an operation result of the processor array 966.

In the processor array 966, the processors are arranged in correspondence to respective evaluation points, i.e., respective displacement vectors (i, j). Namely, a processor Pij which is arranged on an i-th row and a j-th column calculates a displacement vector D(i, j).

FIG. 156 illustrates the structure of each processor 970 which is included in the processor array 966 shown in FIG. 155. Referring to FIG. 156, the processor 970 includes a three-input register 972 receiving search area pixel data transmitted from three processors in the horizontal and vertical directions of the processor array 966 for passing one of the inputs in response to a selection signal SEL, a distortion calculating part 974 for calculating distortion (absolute differential value sum) on the basis of search area pixel data Y received from the three-input register 972 and externally supplied template block pixel data X, and a two-input register 976 receiving distortion D from the distortion calculating part 974 and that from a horizontally adjacent processor provided in the processor array 966 for selecting and passing either one in accordance with a selection signal To.

Such processors 970 shown in FIG. 156 are two-dimensionally arranged in the processor array 966 shown in FIG. 155 in correspondence to the evaluation points in the search area, i.e., all displacement vectors regarded as candidates for motion vectors. The template pixel data X are supplied to the respective processors 970 of the processor array 966 (see FIG. 155) in common. The processors 970 are also supplied with corresponding picture data in a search area block. When the template block pixel data X is X(m, n), for example, the processor Pij is supplied with search area block pixel data Y(i+m, j+n). Search window data are transferred through the search area side registers 964a and 964b shown in FIG. 155 and the processors 970 provided in the processor array 966. In order to correctly supply the search area block pixel data Y(i+m, j+n) to each processor with respect to the externally supplied template block pixel data X(m, n), it is necessary to scan the template block and the search area block with certain regularity.

FIG. 157 illustrates a template block data scanning mode in the aforementioned motion vector detecting device.

Referring to FIG. 157, a template block 999 is first downwardly scanned from the above along a column, and then pixel data of the adjacent column are upwardly scanned from the below so that template block pixel data are formed and successively supplied to the motion vector detecting device. This scanning method is called "snake scanning". The search area block pixel data which are supplied to the processor array 966 are also scanned in accordance with the "snake scanning" of the template pixel data. Each processor 970 must vertically or leftwardly transfer the search area pixel data in FIG. 156 depending on the position in the processor array 966. The three-input register 972 is adapted to implement such three-directional data transfer. The two-input register 976 (see FIG. 156) is adapted to transmit distortion data which is calculated by the processor 970 to the motion vector detecting part 968 (see FIG. 155), in order to obtain a displacement vector providing the minimum distortion (evaluation function value) in the motion vector detecting part 968 after the evaluation function value of each displacement vector is calculated. The motion vector detecting part 968 detects the minimum distortion among those received from the respective processors 970 of the processor array 966 and obtains the position of the processor providing the minimum distortion, thereby deciding this position as the motion vector. The operation of the motion vector detecting device shown in FIG. 155 is now briefly described.

The processor Pij which is arranged on the i-th row and the j-th column in the processor array 966 calculates distortion D(i, j) which is expressed as follows:

$$D(i, j) = \Sigma |X(m, n) - Y(m+i, n+j)|$$

The sum $\Sigma$ is obtained with respect to m and n. Ranges of change of m and n are decided by the size of the template block.

Consider that pixels are arranged in m rows and n columns in a template block 980, as shown in FIG. 158. In a first cycle, each processor 970 of the processor array 966 stores search area block pixel data 982. A pixel X(1, 1) in the first row and first column of the template block 980 is externally supplied to all processors 970 of the processor array 966 in common. Each processor 970 of the processor array 966 obtains absolute differential value of the search area block (search window) pixel data Y stored therein and the template block pixel data X as received and accumulates the same.

In a next cycle, the search area block is downwardly shifted in the processor array 966 by one row in FIG. 158. The processor array 966 stores search area block (search window) pixel data 983. In this state, next pixel data X(2, 1) is supplied from the template block 980. The processor Pij ensures search window pixel data Y(m+i, n+j+1). Absolute differential values are again obtained and accumulated through these pixel data. This operation is repeated M times.

When the aforementioned operation is repeated M times, search area pixel data in a column of the search area are externally written through the search area input register 962 shown in FIG. 155. Unnecessary picture data of one column of the search area are discarded. Thus, new search area pixel data are stored in the search area side registers 964a and 964b and the processor array 966. This operation is repeatedly executed every column.

Namely, calculation of absolute differential value sums is executed first through the search window (block including all rows in the search area). Upon completion of M cycles, similar calculation is executed through pixel data of a next search window (block which is rightwardly adjacent by one column in the search area). Thereafter similar operations are executed for a search window 994, . . . When calculation is finally executed on all pixel data of a search area 996, the processor Pij obtains and stores the distortion D(i, j). The distortion D(i, j) obtained in the processor Pij is transmitted to the motion vector detecting part 968, so that the displacement vector providing the minimum distortion is detected as the motion vector.

Some systems are proposed in relation to a predictive picture image detecting method in a frame-to-frame (or field-to-field) predictive coding system with motion compensation. In order to attain better coding efficiency, it is necessary to select the optimum predictive picture image detecting system after performing motion detection in accordance with a plurality of predictive picture image detecting systems for detecting motion vectors in accordance with the optimum predictive picture image detecting method. A screen may be formed in a unit of a field or a frame. One frame is formed by two fields (even and odd fields). The following predictive picture image detecting systems are provided for the respective cases, for example:

(A) For coding pixel data in units of fields:

(a) A field picture image is divided into a plurality of blocks in a unit of P by Q pixels, for detecting a single motion vector (forming a single predicted picture image) every block.

(b) Each divided block is further vertically divided into two parts on the screen, for detecting a single motion vector every part. Thus, motion vectors for upper and lower halves are detected (two predicted picture images are formed) with respect to each block of P by Q pixels.

(B) For coding pixels in units of frames:

(a) A frame picture image is divided into a plurality of blocks in a unit of block of P by Q pixels, for detecting a single motion vector (forming a single predicted picture image) every block.

(b) Each block of P by Q pixels is divided into two pixel groups of pixels existing in the same fields, i.e., one and the other respectively, belonging to odd and even fields, for detecting a single motion vector every pixel group. Thus, motion vectors for pixel groups belonging to the even and odd fields are detected (two predicted picture images are formed) for every block of P by Q pixels.

In the aforementioned structure of the motion vector detecting device, the respective processors in the processor array are arranged in correspondence to displacement vectors (evaluation points) which are candidates for the motion vector. Further, the processors receive the same template block pixel data. Therefore, the processors can only obtain distortion (evaluation function values) in accordance with the same predictive pixel system, and it is impossible to detect a plurality of motion vectors in parallel in accordance with a plurality of predictive picture image detecting systems. When the template block pixel data X(m, n) to be supplied is decided, the search window pixel data Y(m+i, n+j) which is supplied correspondingly is also uniquely decided as clearly understood from the above equation of the distortion D(i, j) calculated by the processor Pij. In order to execute a plurality of predictive picture image detecting systems for improving coding efficiency, therefore, it is necessary to provide motion vector detecting devices at least in correspondence to a plurality of predictive picture image detecting systems and to drive these detecting devices in parallel with each other, disadvantageously leading to increase in device scale as well as in power consumption.

In the aforementioned motion vector detecting device, further, the same template block pixel data are supplied in common to all processors in the processor array. Therefore, strong driving power is required for a circuit for writing the pixel data of the template block, disadvantageously leading to increase in current consumption in the template block pixel data write circuit as well as in power consumption for the overall device.

In the aforementioned motion vector detecting device, in addition, the respective processors are arranged in correspondence to the displacement vectors (evaluation points) forming candidates for the motion vectors. When a search area is in a range of +16 to −16 in the vertical direction and −16 to +16 in the horizontal direction, the number of the displacement vectors forming the candidates for the motion vectors is 33×33=1089. Thus, the number of the processors is extremely increased to increase the occupied area of the device.

In each cycle of the arithmetic operation, data are transferred in the processor array through the processors. In this case, it is necessary to drive one input of each of three-input registers which are provided for deciding the data transfer direction between the processors. Thus, power consumption in data transfer is disadvantageously increased.

Motion vector search systems include a full search system and a hierarchical search system. The full search system is adapted to obtain evaluation function values (absolute differential value sums or square differential sums) for all displacement vectors (evaluation points) in a search area, for obtaining a motion vector from the evaluation function values of all evaluation points. The hierarchical search system, an example of which is described in Japanese Patent Publication No. 3-68597 (1991), is adapted to decide representative evaluation points of those in a search area (to cull or thin out the evaluation points), for obtaining evaluation function values as to the representative evaluation points. A representative evaluation point which provides the minimum evaluation function value is obtained from the evaluation function values of the representative evaluation points, and regarded as the optimum representative evaluation point. Then, evaluation function values are obtained as to all evaluation points in a region of a prescribed size around the optimum representative evaluation point, and the optimum evaluation point is obtained from the evaluation function values, to decide a motion vector.

In the hierarchical search system, it is not necessary to obtain the evaluation function values as to all evaluation points in the search area, whereby the device scale can be reduced and the motion vector detecting time can be reduced. However, this system is inferior in accuracy to the full search system since the evaluation points are culled for detecting the motion vector. On the other hand, the full search system is disadvantageously increased in device scale, although the same is superior in accuracy to the hierarchical search system. Assuming that the number of times of operations per unit time is constant and devices are formed by the same volumes of hardware, accuracy is deteriorated in the hierarchial search system although predictive picture images can be obtained for a wide search area, while accuracy of the motion vectors is excellent in the full search system although the search area thereof is narrowed.

Particularly in a motion picture coding system which is now being standardized in ISO (International Organization for Standardization), it is necessary to detect movements through a screen which is in a position separated by several frames or fields in time, since prediction is made through screens which are precedent and subsequent in time to a current screen picture image. An example of such an operation is B picture motion vector detection in a storage medium coding technique. In the storage medium coding technique, picture data are stored in a storage medium with no restriction in time base. With respect to picture data called B pictures, therefore, there are forward prediction for detecting predictive picture images through past picture images, inverse prediction for detecting predictive picture images through future picture images, and interpolative prediction for making prediction through precedent and subsequent screens. When prediction is made through such precedent and subsequent screens, it is necessary to widen the search area in order to follow quick movements, since if the search area is narrow, the picture images jut out of the search area to disable correct motion vector detection. It is regarded as being preferable to perform searching in a search area which is in a range of ±64 to ±128 pixels in both of horizontal and vertical directions about a template block. In order to implement such a wide search area without increasing the device scale, it is necessary to utilize the aforementioned hierarchical search system.

As to a motion predictive system which is on the premiss of the conventional hierarchical search system, however, it is possible to merely detect predictive picture images in accordance with a motion detection system along a single predictive mode, and there has not yet been proposed a hierarchical search system to be employed in the aforementioned motion detecting system with a plurality of predictive modes.

SUMMARY OF THE INVENTION

An object of the present invention is to provide a motion vector detecting device which can detect predictive picture images in correspondence to a plurality of predictive modes without increasing the device scale.

Another object of the present invention is to provide a motion vector detecting device which can detect predictive picture images (motion vectors) at a high speed in accordance with a plurality of predictive modes without increasing the consumed current and complicating the device structure.

Still another object of the present invention is to provide a motion vector detecting device which can detect motion vectors in high accuracy in accordance with a hierarchical search system without increasing the device scale.

A further object of the present invention is to provide a motion vector detecting device which can detect motion vectors for respective ones of a plurality of predictive modes (predictive picture image detection systems) in accordance with a hierarchical search system at a high speed in a simple circuit structure.

A motion vector detecting device according to a first aspect of the present invention includes evaluation circuitry for obtaining evaluation function values indicating similarity levels between a current picture image block of a prescribed size, being the target of motion vector detection in a current screen picture image, and each of a plurality of reference picture image blocks in a region related to the current picture image block in a reference screen in accordance with a plurality of predictive modes at a time, and motion vector decision circuitry receiving the evaluation function values for the respective reference blocks and with respect to the plurality of predictive modes from the evaluation circuitry for deciding motion vectors as to the respective predictive modes for the current picture image block in a parallel manner.

A motion vector detecting device according to a second aspect of the present invention includes first calculation circuitry executing block matching between a current picture image block, being the target of motion vector detection, and each of reference picture image blocks corresponding to representative evaluation points among all evaluation points in a search region having a prescribed size in a reference screen which is related to the current picture image block in accordance with a plurality of predictive modes in a parallel manner for obtaining an optimum representative evaluation point exhibiting the best similarity for each of the plurality of predictive modes, second calculation circuitry which is provided in correspondence to each of the plurality of predictive modes for performing block matching between the current picture image block and the reference picture image block in accordance with the optimum representative evaluation points for respective predictive modes from the first calculation circuitry on all evaluation points included in a region of a prescribed size in a search region including the corresponding optimum representative evaluation point in accordance with each of the corresponding predictive modes for calculating optimum vectors and optimum evaluation function values for the corresponding predictive modes, and motion vector decision circuitry for deciding motion vectors for the current picture image block from the optimum vectors in accordance with outputs of the second calculation circuitry.

In the motion vector detecting device according to the first aspect of the present invention, the evaluation circuitry calculates evaluation function values corresponding to the plurality of predictive modes (predictive picture image detection systems) respectively in a parallel manner and the motion vector decision circuitry decides motion vectors for the respective predictive modes in accordance with outputs of the evaluation circuitry, whereby motion vectors can be detected in correspondence to a plurality of predictive modes at a high speed without increasing the device scale.

In the motion vector detecting device according to the second aspect of the present invention, the first calculation circuitry culls evaluation points for deciding optimum evaluation point candidates and then the second calculation circuitry calculates optimum vectors for the plurality of predictive modes respectively thereby finally deciding the motion vectors, whereby the motion vectors can be detected at a high speed without increasing the device scale.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 illustrates positional relation between the template block and the search window block in the state shown in FIG. 17B;

FIG. 31 illustrates the structure of a divided template block employed in a full search system motion vector detecting device according to a third embodiment of the present invention;

FIGS. 37A–37C illustrate a specific operation sequence according to fourth embodiment;

FIG. 58 illustrates a construction of an arithmetic part and a comparison part of the motion vector detecting device according to the sixth embodiment;

FIG. 66 shows a first priority decision criterion of a priority decision circuit shown in FIG. 65;

FIG. 67 shows a first priority decision criterion of the priority decision circuit shown in FIG. 65;

FIG. 68 shows a second priority decision criterion of the priority decision circuit shown in FIG. 65;

FIG. 69 shows a second priority decision criterion of the priority decision circuit shown in FIG. 65;

FIG. 70 shows a third priority decision criterion of the priority decision circuit shown in FIG. 65;

FIG. 71 shows a third priority decision criterion of the priority decision circuit shown in FIG. 65;

FIG. 87 illustrates an operational sequence of the motion vector detecting device according to the ninth embodiment;

FIG. 99 is a flow chart describing an operation of detecting a motion vector for the template block at the upper right end on the screen;

FIG. 105 is a diagram showing inhibition signals generated for a template block at a lowermost end on a screen;

FIGS. 106A thru 106C are diagrams showing inhibition signals generated for a template block at a lower right end on a screen and limitation of a motion vector search area therefor;

FIG. 107 illustrates an overall arrangement of a motion vector detecting device according to the tenth embodiment;

FIG. 115 illustrates a specific structure of a frame-to-frame address generator shown in FIG. 114;

FIGS. 120A and 120B illustrate address generation sequences of the address generator shown in FIG. 118;

FIG. 121 illustrates another structure of the screen format conversion system shown in FIG. 113;

FIGS. 122A and 122B illustrate address generation sequences of a field-to-field address generator shown in FIG. 121;

FIGS. 123A and 123B illustrate address generation sequences of a frame-to-field address generator shown in FIG. 121;

FIG. 124 illustrates an exemplary structure of the frame-to-field address generator shown in FIG. 121;

FIG. 125 illustrates other structures of the screen format conversion circuit and a search window buffer memory shown in FIG. 113

FIG. 126 illustrates an exemplary structure of a frame-to-field address generator shown in FIG. 125;

FIG. 127 is a timing chart showing the operation of the address generator shown in FIG. 126;

FIG. 128 illustrates a method of generating a field picture image from a frame picture image by the address generator shown in FIG. 126;

FIG. 129 illustrates a modification of a data buffer shown in FIG. 4;

FIG. 130 illustrates a modification of the data buffer shown in FIG. 129;

FIG. 131 illustrates still another structure of the data buffer shown in FIG. 125;

Figure 131:
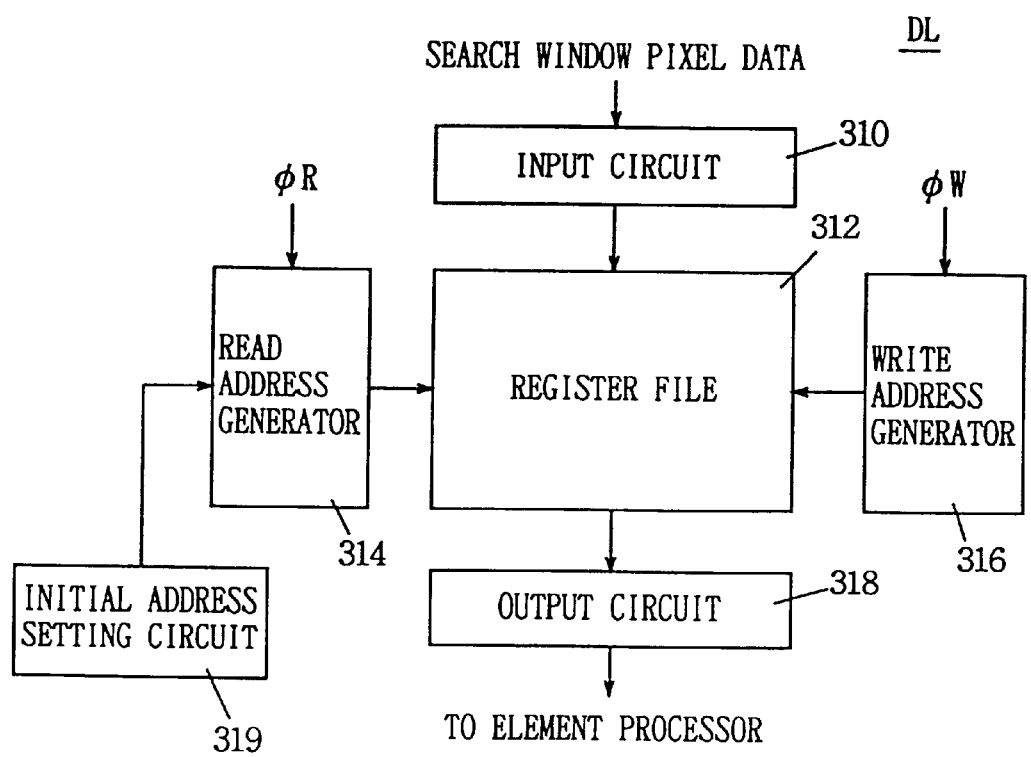
Figure 132:
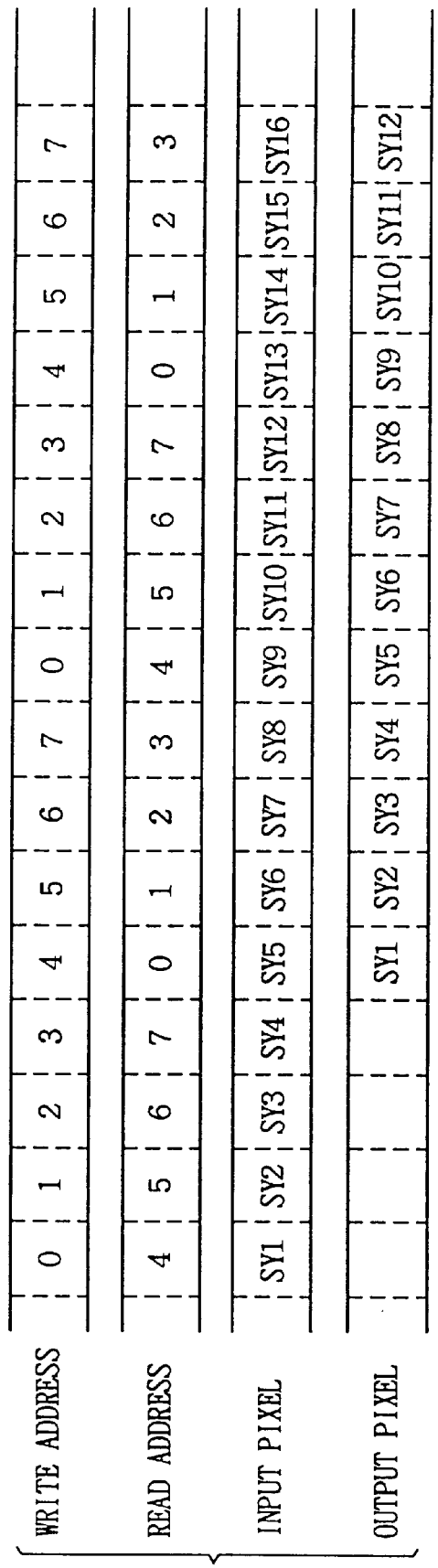
Figure 134:
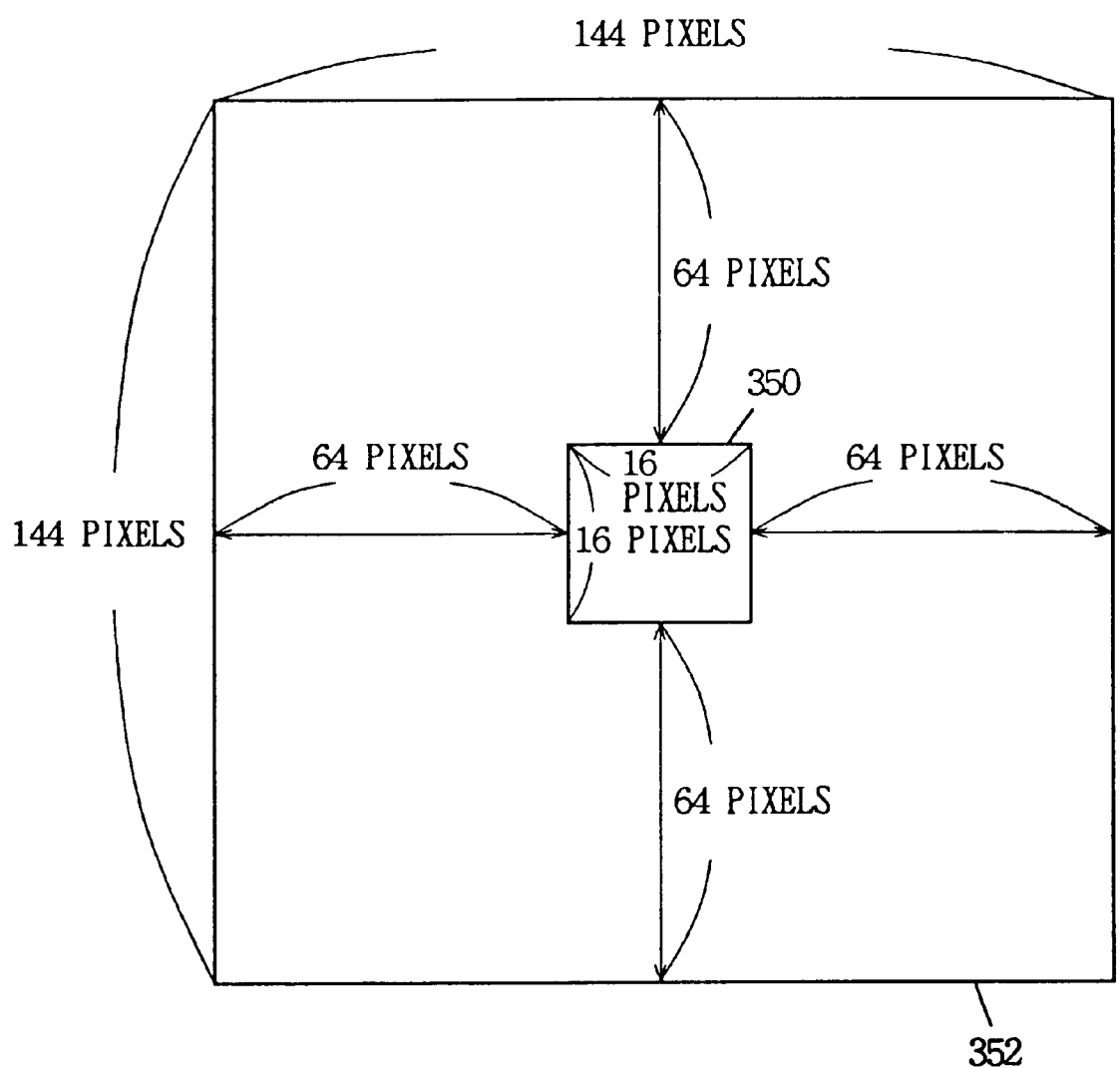
Figure 135A:
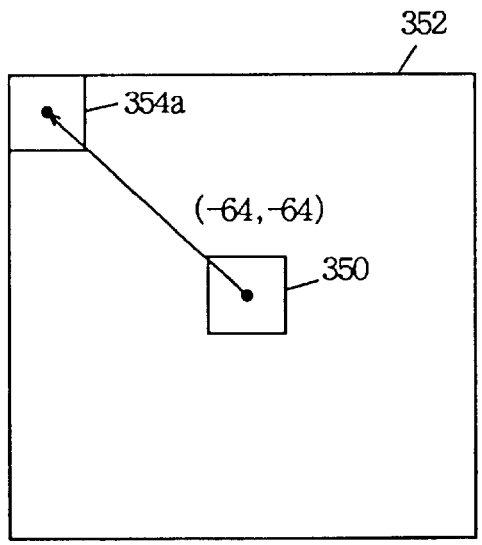
Figure 135B:
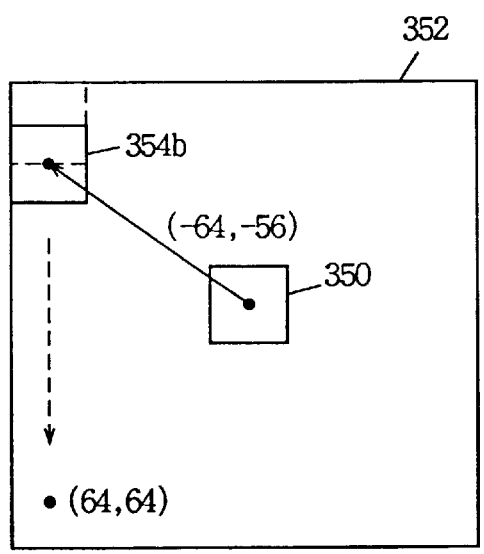
Figure 135C:
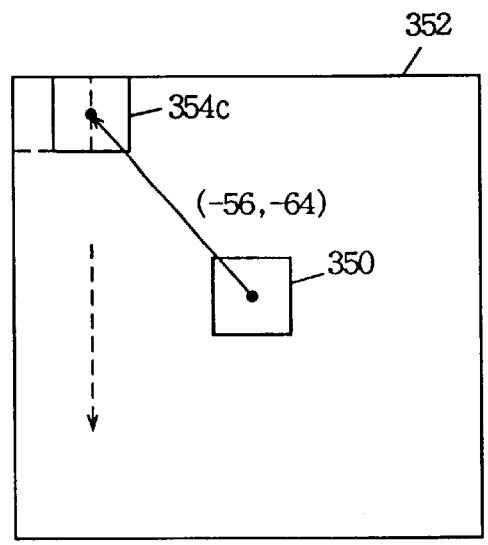
Figure 136:
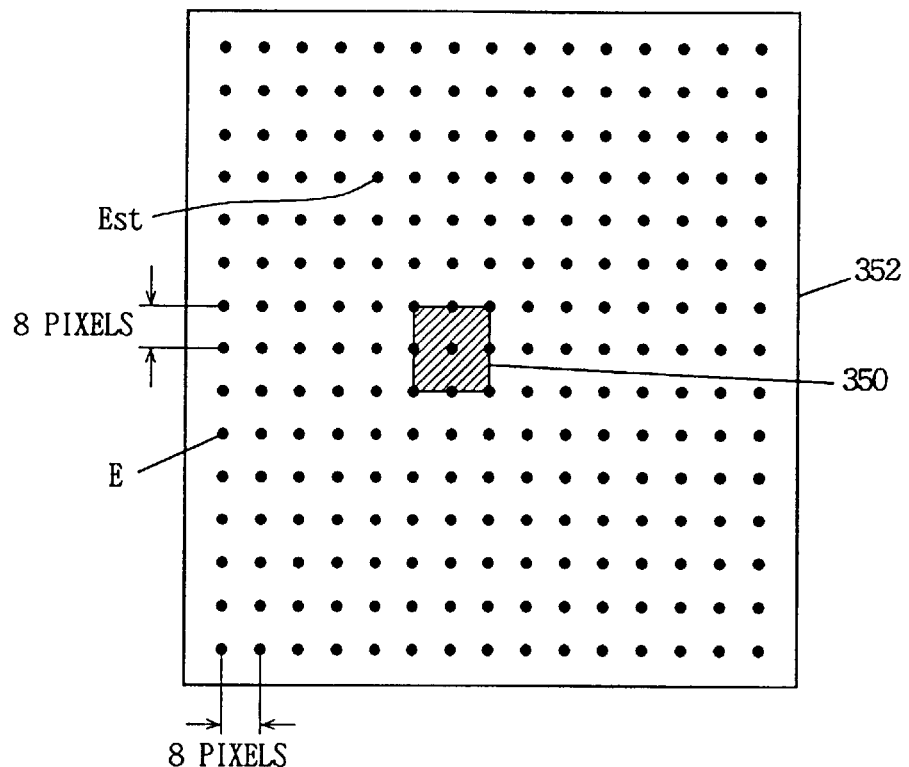
Figure 137:
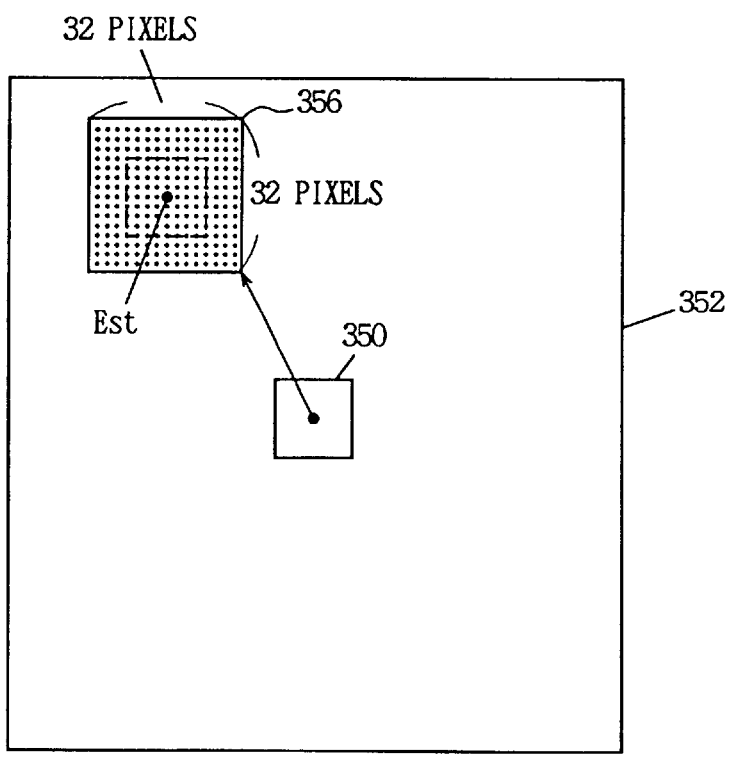
Figure 138:
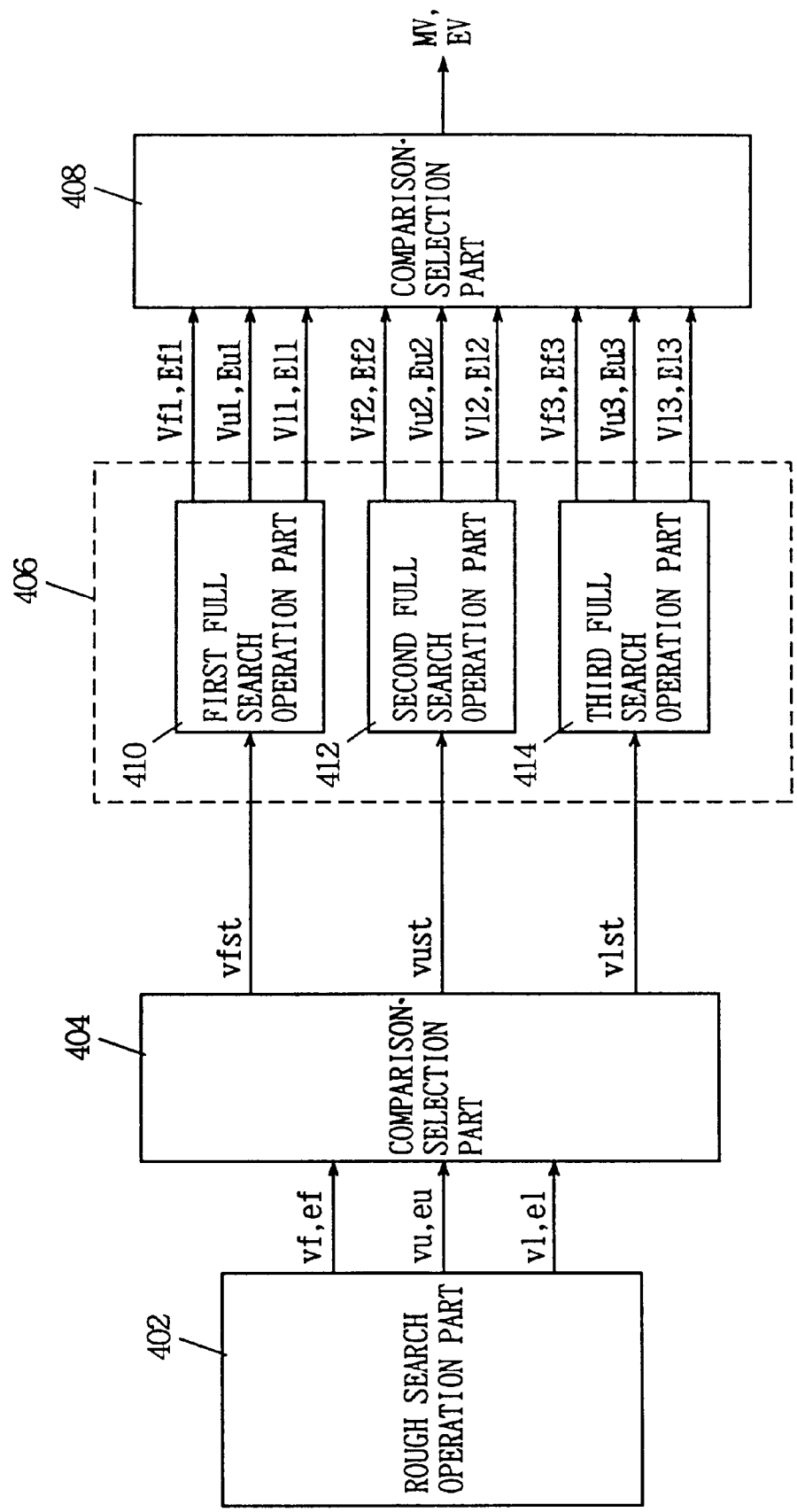
Figure 139:
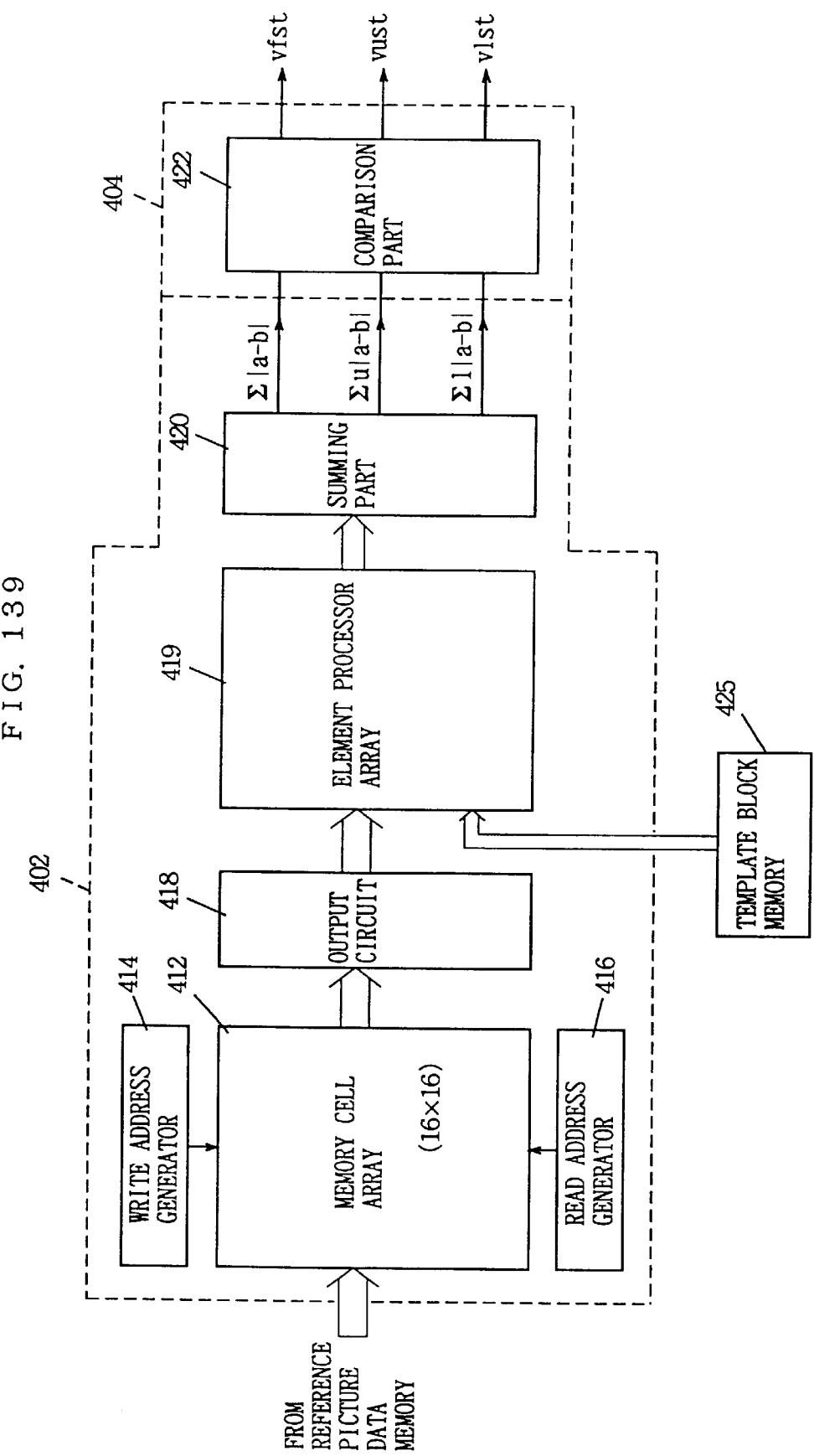
Figure 140:
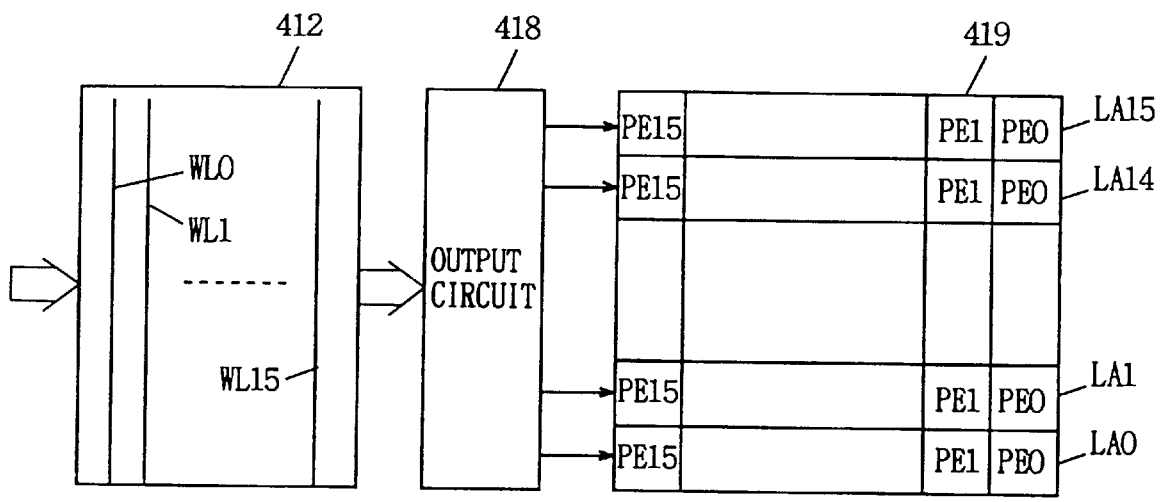
Figure 141:
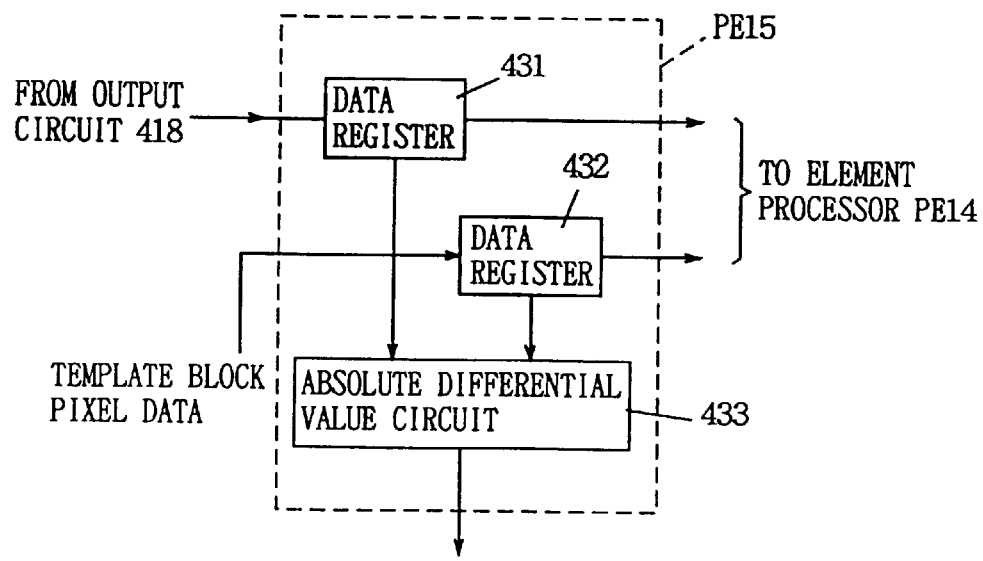
Figure 143:
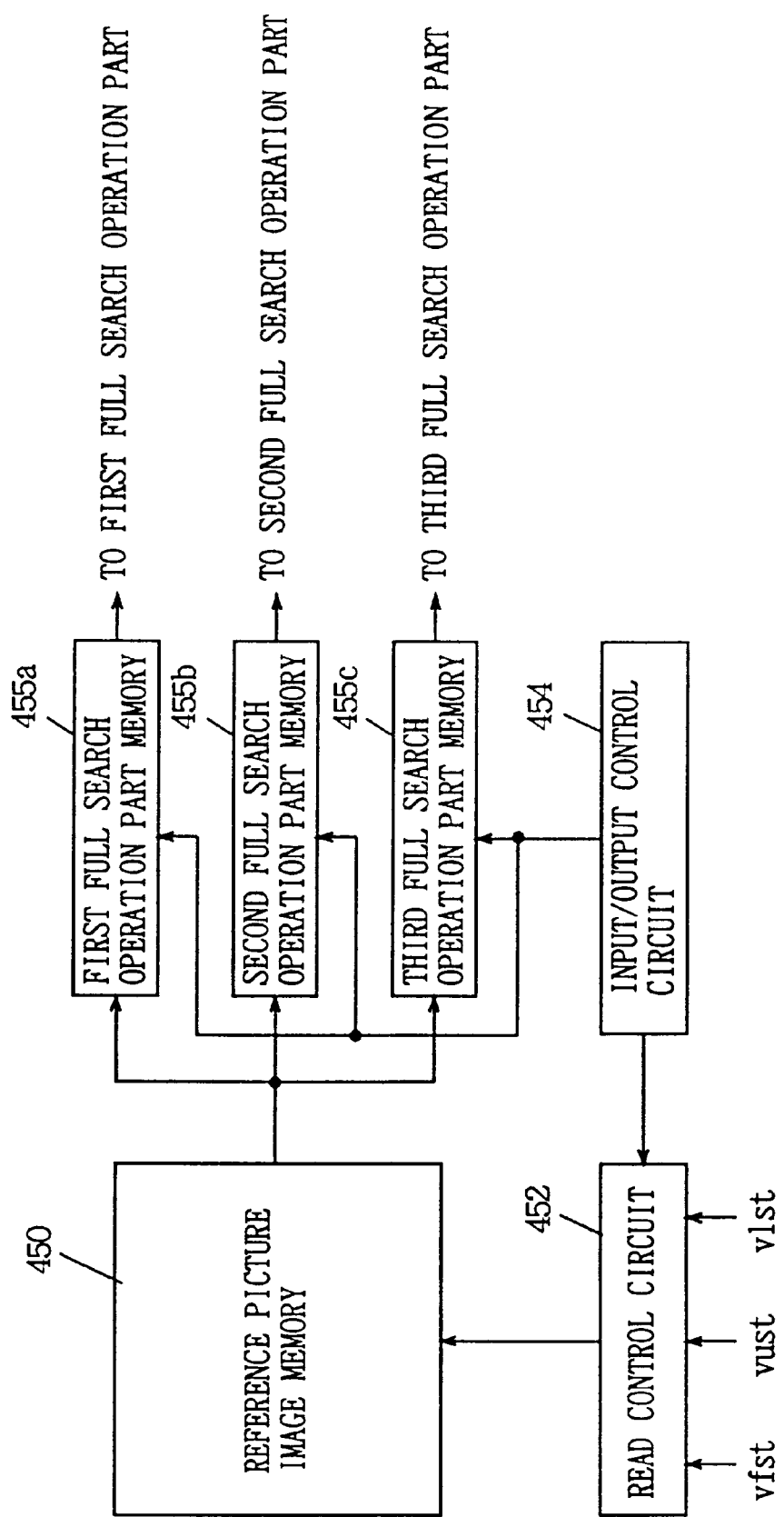
Figure 144:
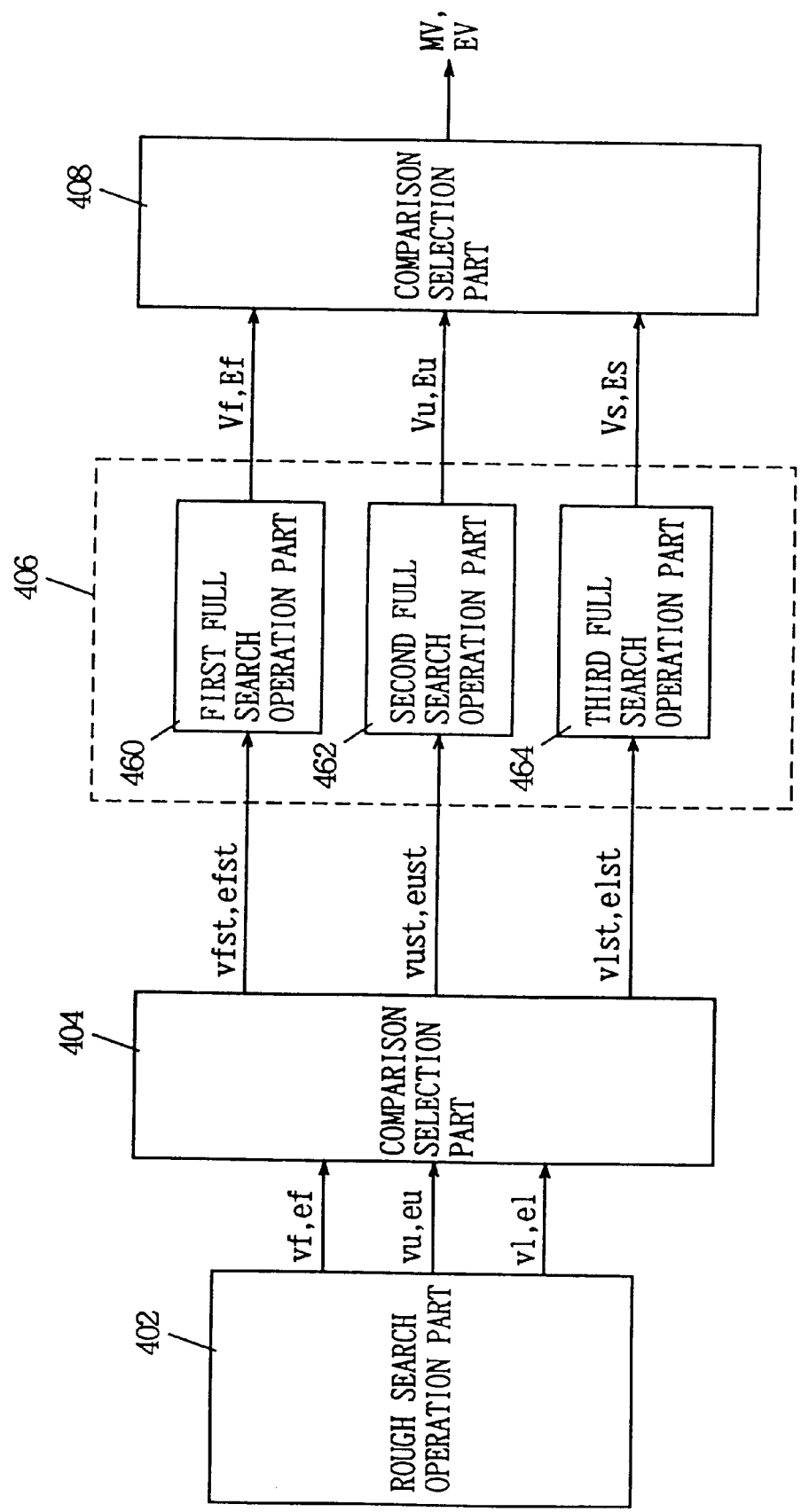
Figure 145A:
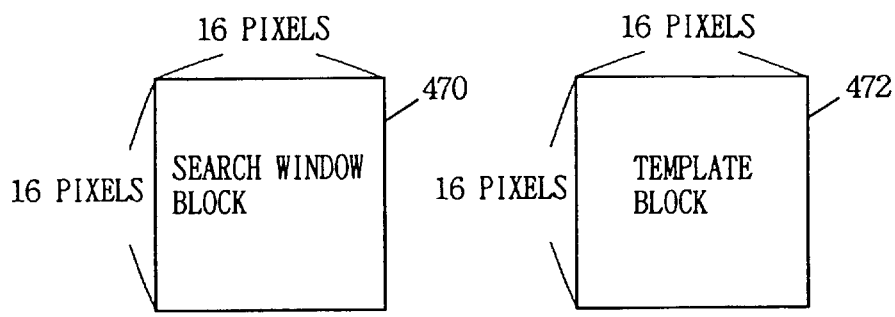
Figure 145B:
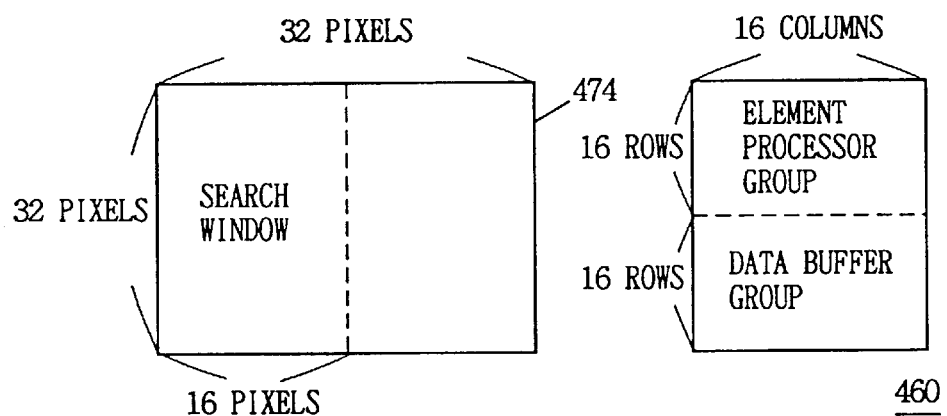
Figure 146:
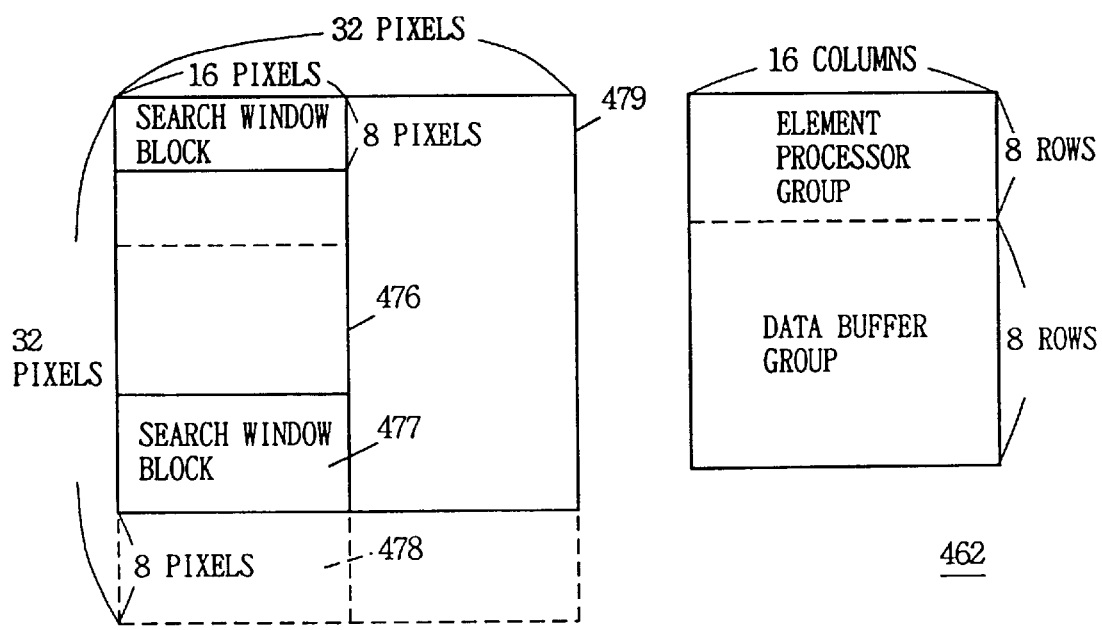
Figure 147:
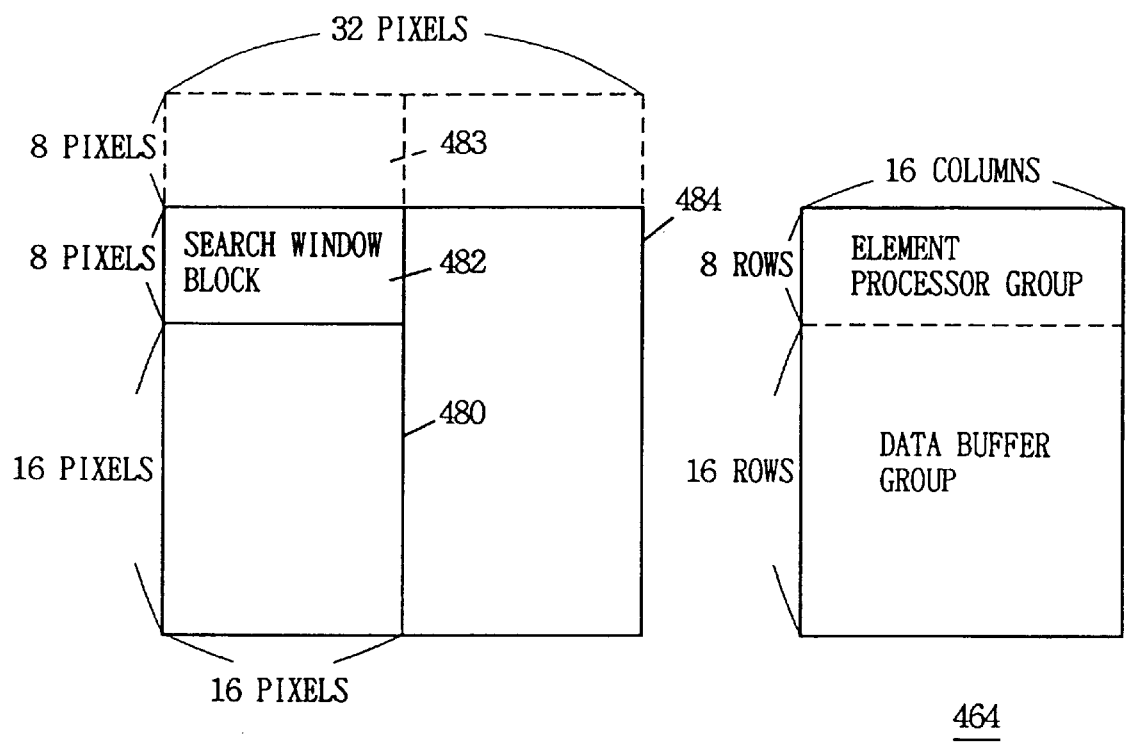
Figure 148:
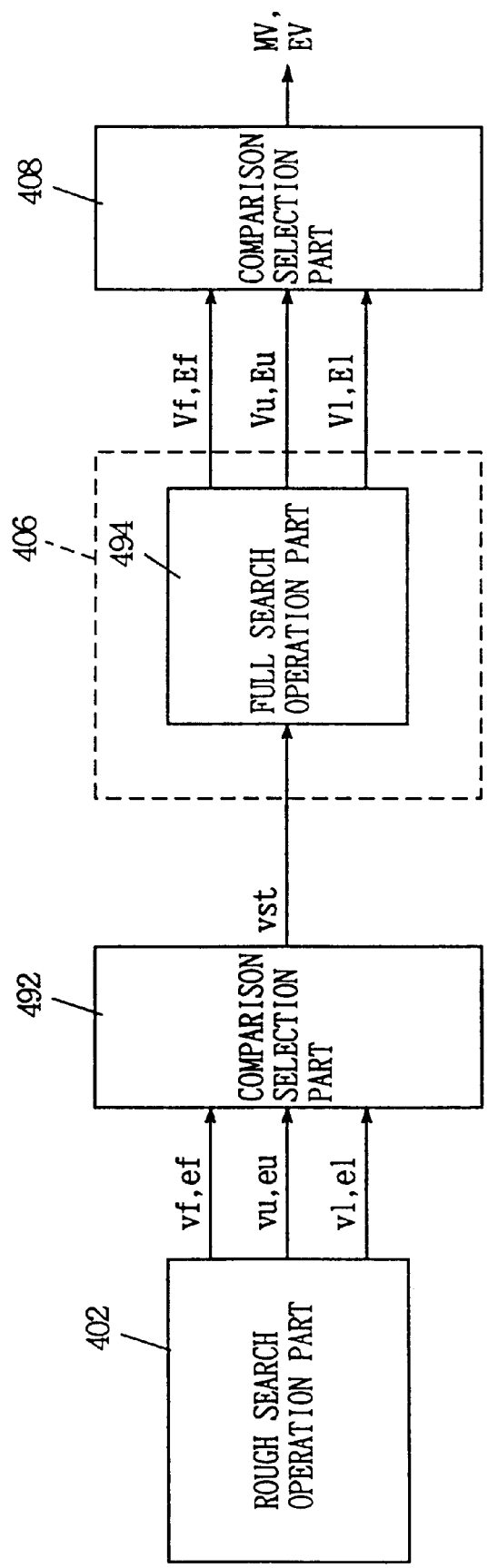
Figure 149:
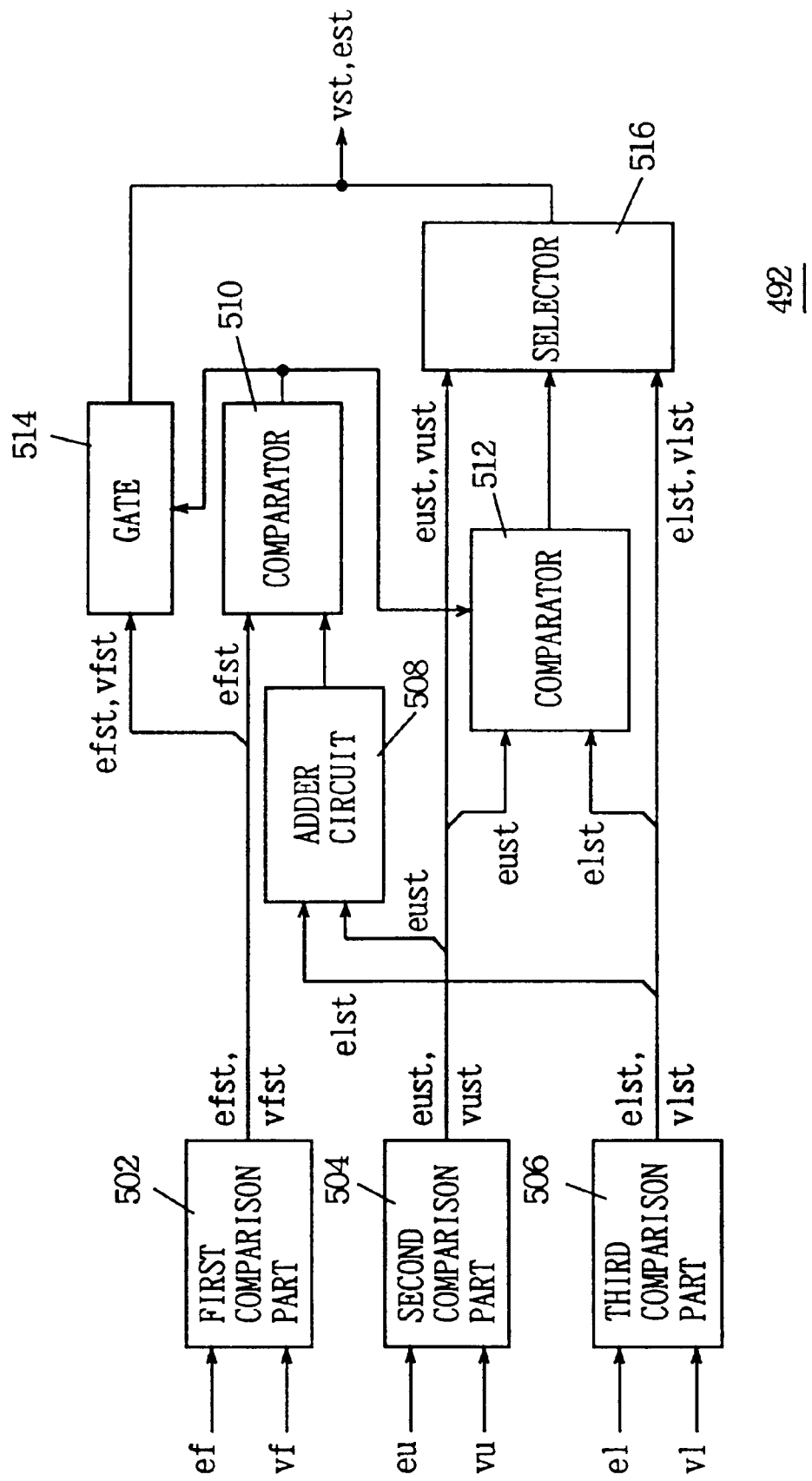
Figure 150:
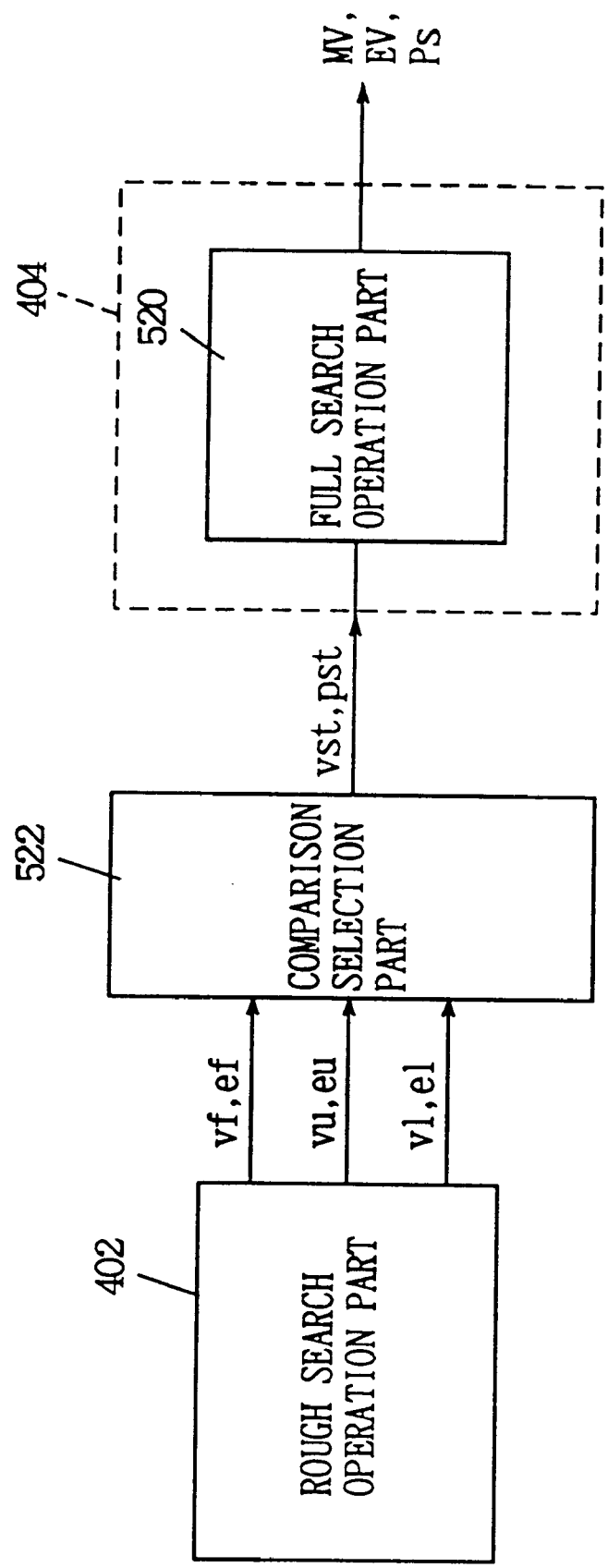
Figure 151:
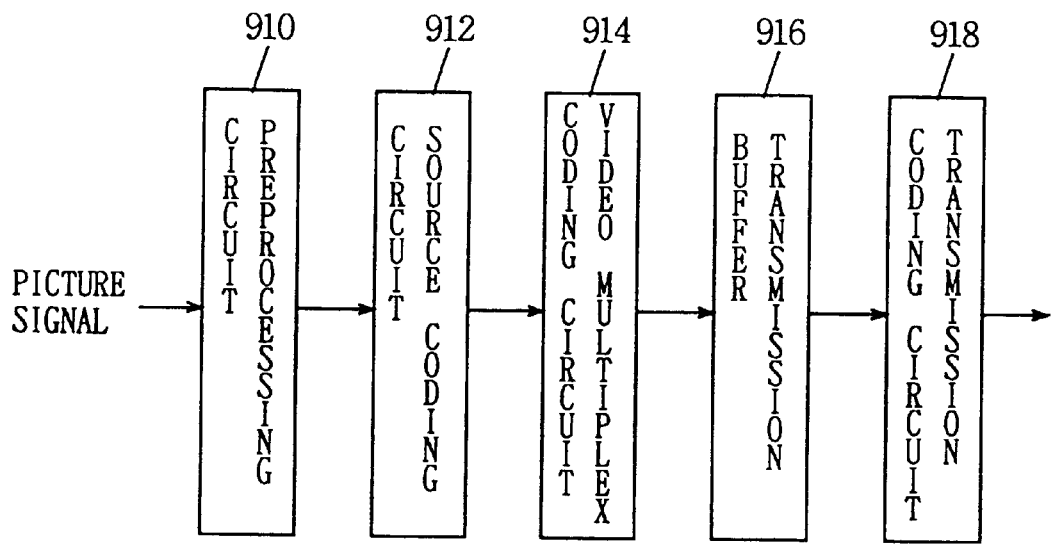
Figure 152:
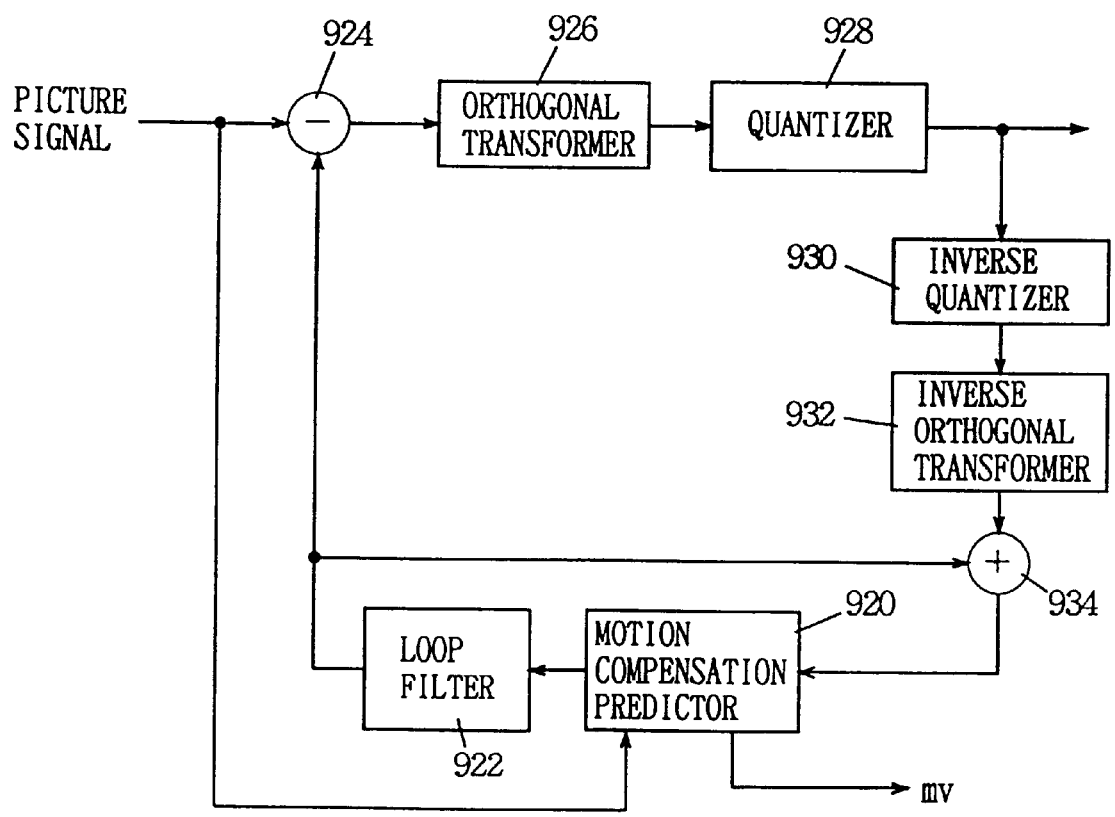
Figure 153A:
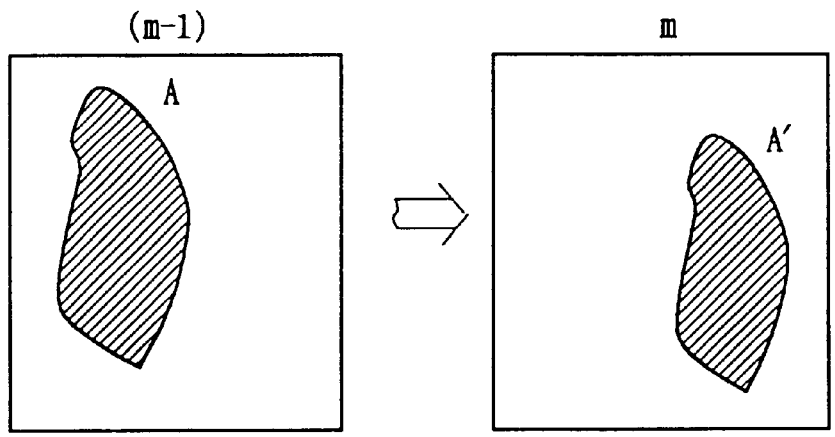
Figure 153B:
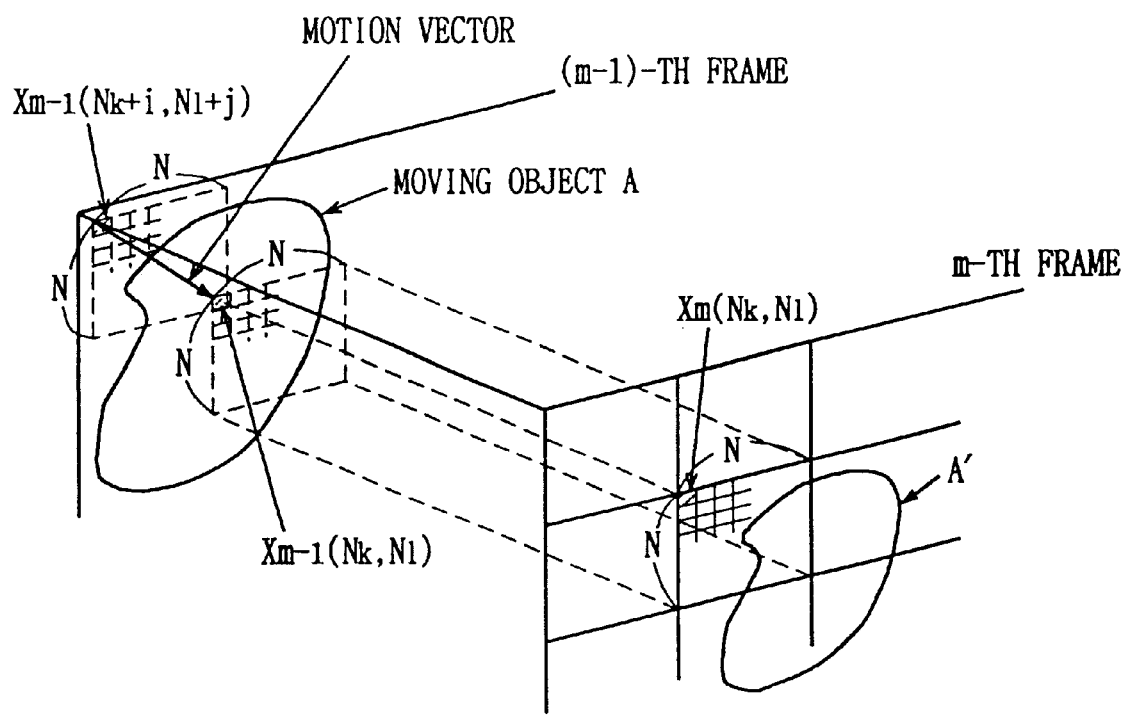
Figure 154:
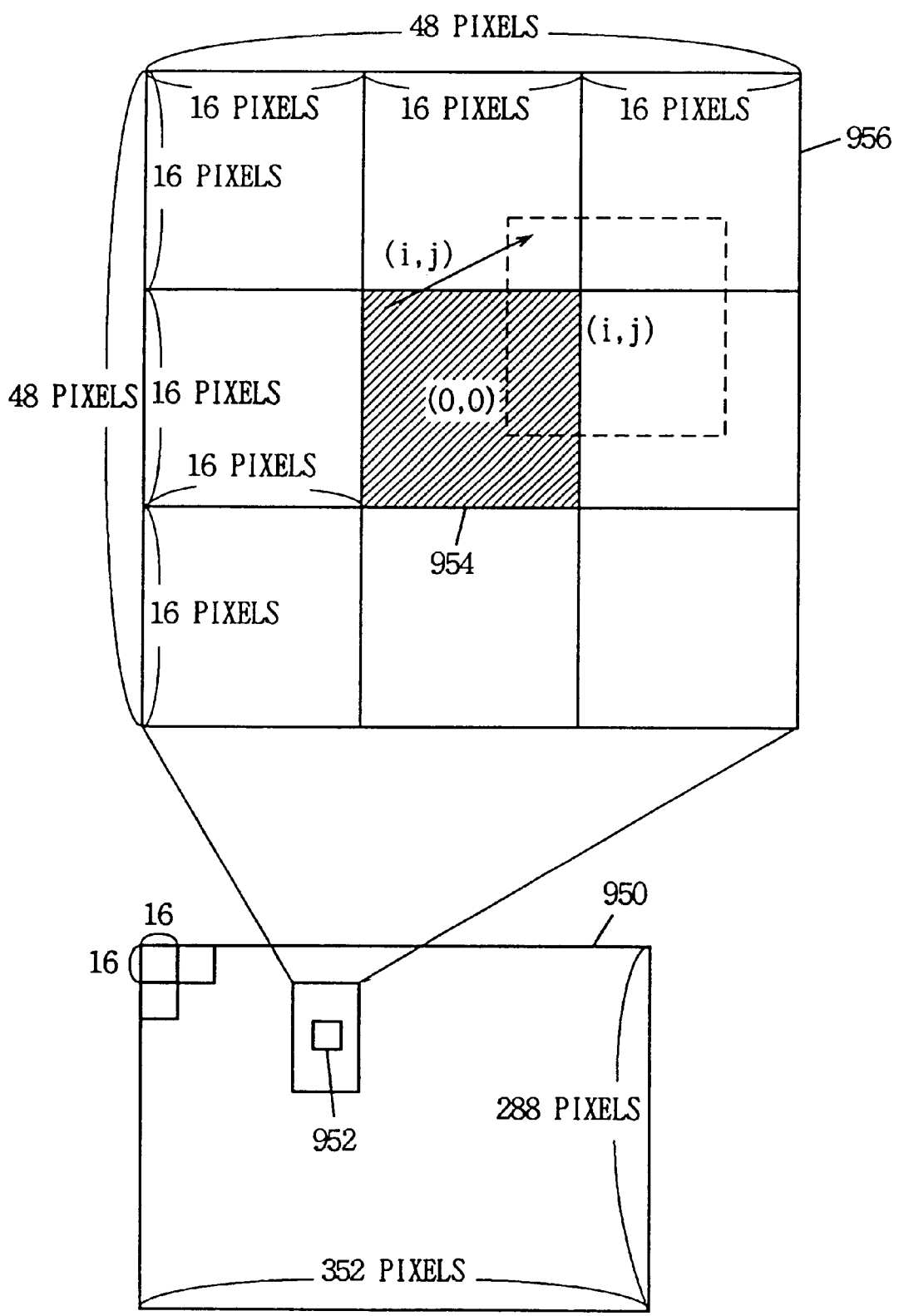
Figure 155:
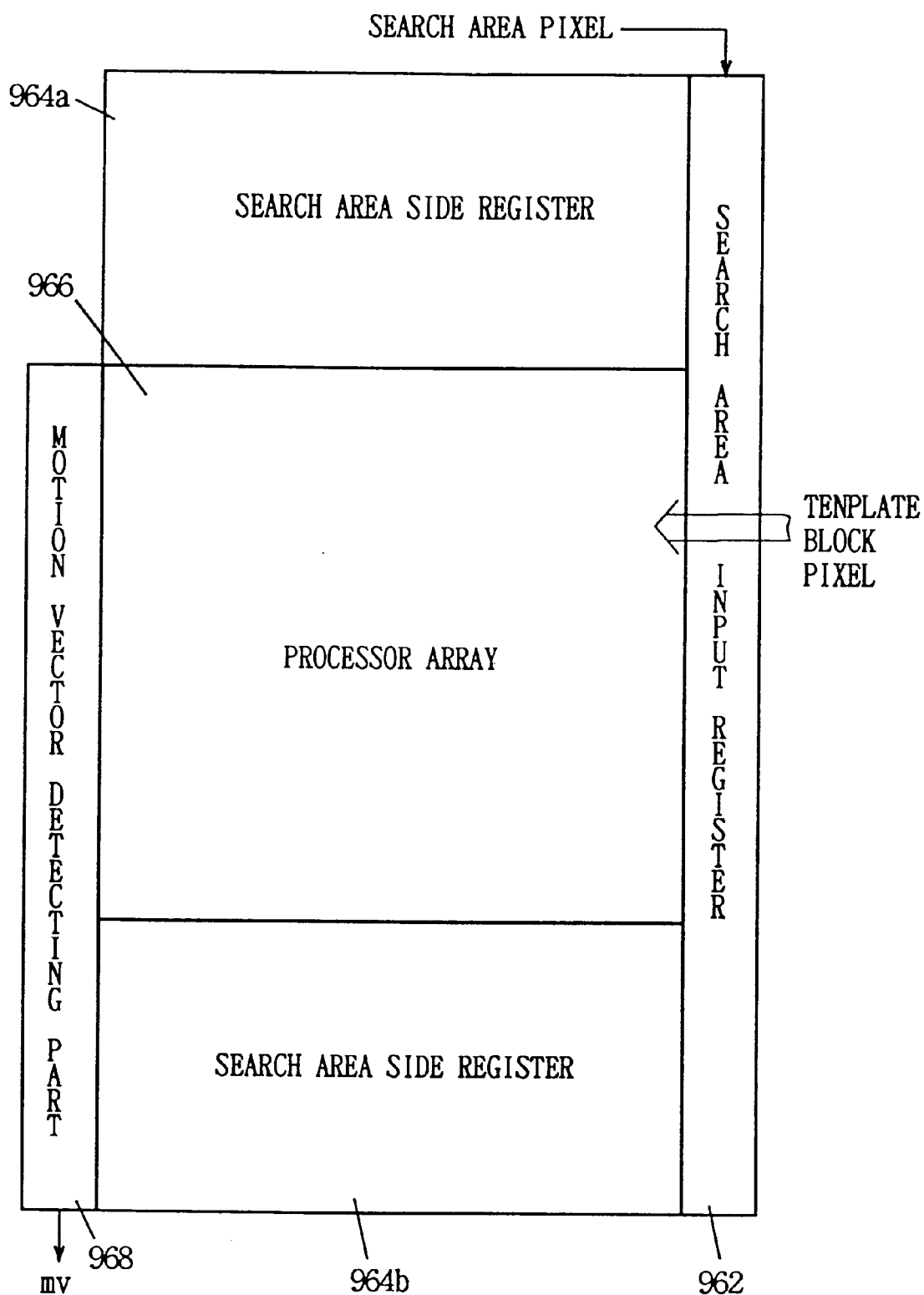
Figure 156:
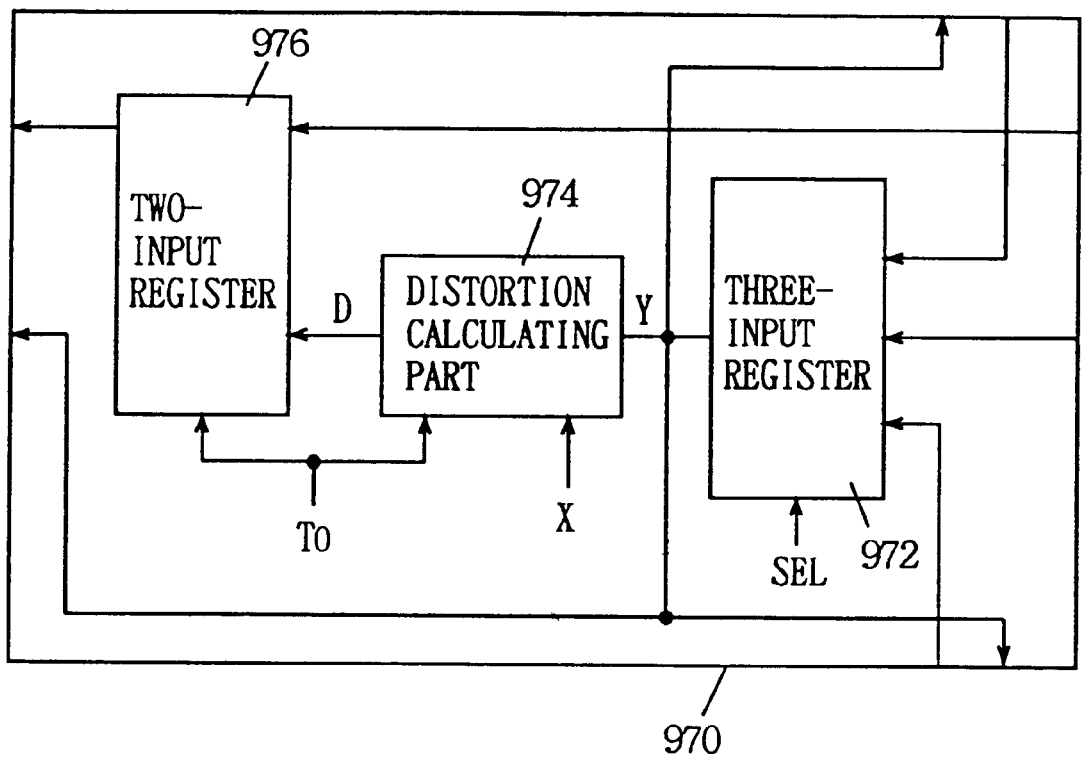
Figure 157:
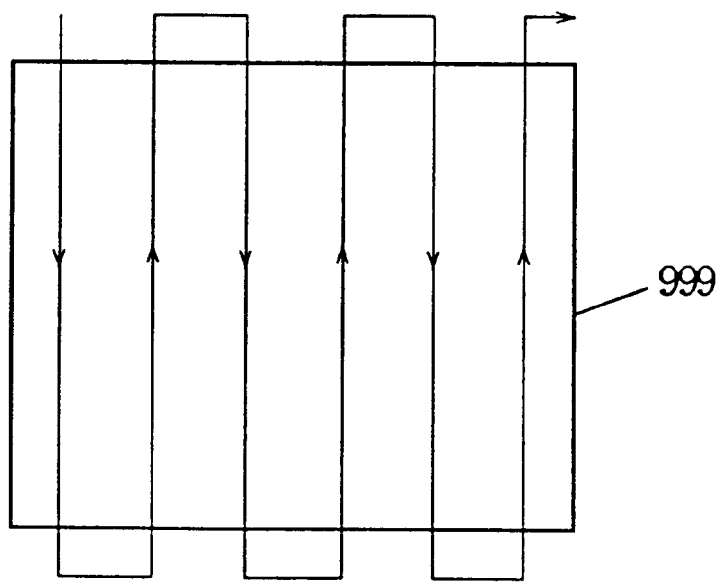
Figure 158:
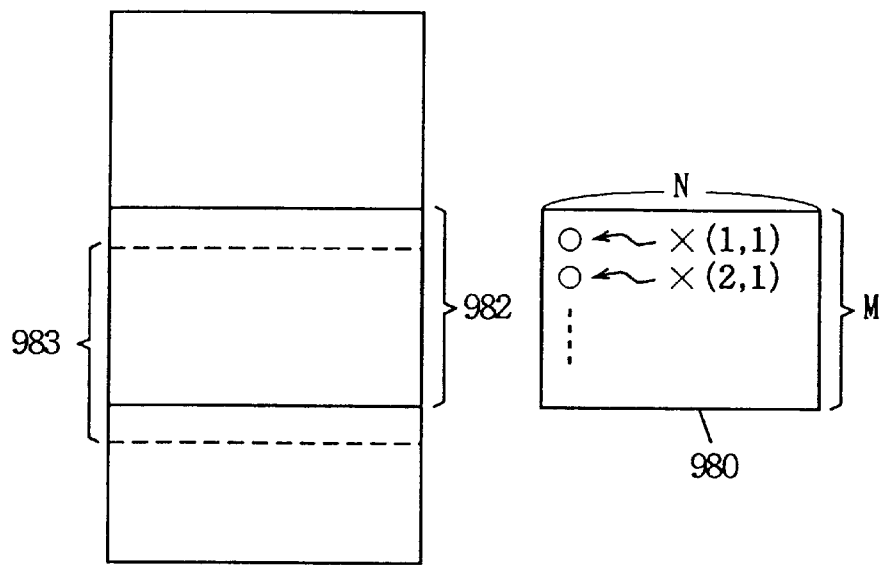
Figure 159:
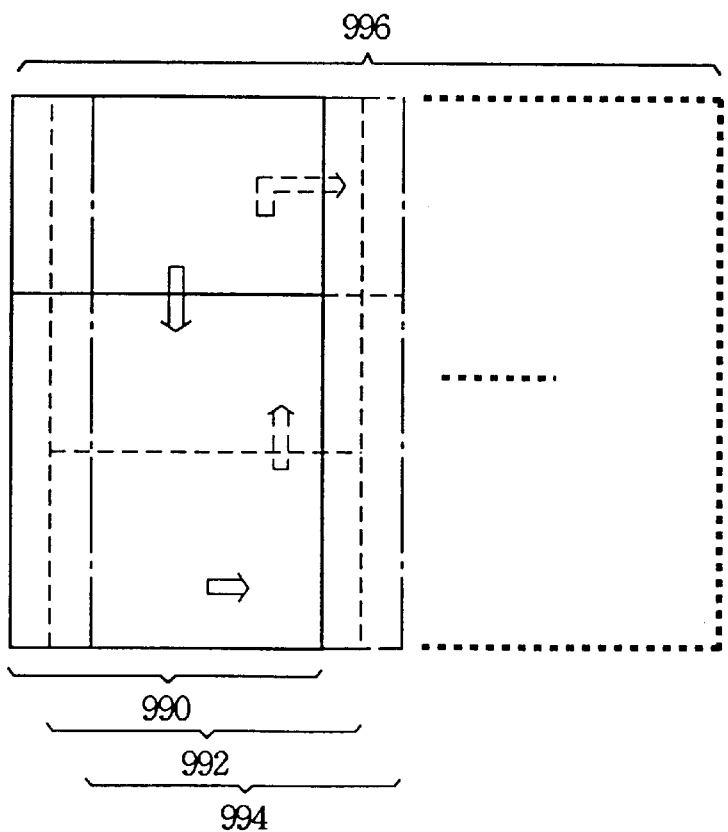

FIG. 132 is a diagram for illustrating the operation of the data buffer shown in FIG. 131;

FIGS. 133A to 133E are diagrams for illustrating the operation of the data buffer shown in FIG. 131;

FIG. 134 illustrates exemplary structures of a template block and a search area which are employed in a hierarchical search system motion vector detecting operation;

FIGS. 135A to 135C are diagrams for illustrating a first stage operation of the hierarchical search system motion vector detection;

FIG. 136 illustrates distribution of representative evaluation points after completion of the first stage operation in the hierarchical search system motion vector detection;

FIG. 137 is a diagram for illustrating a second stage operation of the hierarchical search system motion vector detection;

FIG. 138 schematically illustrates a first embodiment of a hierarchical search system motion vector detecting device according to the present invention;

FIG. 139 schematically illustrates the structure of a rough search operation part shown in FIG. 138;

FIG. 140 schematically illustrates structures of an element processor array and a memory cell array shown in FIG. 139;

FIG. 141 schematically illustrates the structure of a lowermost element processor shown in FIG. 140;

FIGS. 142A to 142C illustrate a data transfer operation from the memory cell array to the element processor array shown in FIG. 139;

FIG. 143 schematically illustrates the structure of a reference picture image pixel data transfer control system for a dense search operation part shown in FIG. 138;

FIG. 144 schematically illustrates the structure of a second embodiment of a hierarchical search system motion vector detecting device according to the present invention;

FIGS. 145A and 145B schematically illustrate the structure of a first full search operation part shown in FIG. 144;

FIG. 146 schematically illustrates the structure of a second full search operation part shown in FIG. 144;

FIG. 147 schematically illustrates the structure of a third full search operation part shown in FIG. 144;

FIG. 148 schematically illustrates a third embodiment of a hierarchical search system motion vector detecting device according to the present invention;

FIG. 149 schematically illustrates the structure of a comparison/selection part for obtaining an optimum representative evaluation point shown in FIG. 148;

FIG. 150 schematically illustrates the structure of a fourth embodiment of a hierarchical search system motion vector detecting device according to the present invention;

FIG. 151 illustrates the overall structure of a conventional picture signal coding circuit;

FIG. 152 illustrates the structure of a source coding circuit shown in FIG. 151;

FIGS. 153A and 153B are diagrams for illustrating a picture image motion compensating operation;

FIG. 154 illustrates an exemplary arrangement of a search area and a template block for carrying out motion compensation by a block matching method and relation to motion vectors;

FIG. 155 schematically illustrates the overall structure of a conventional motion vector detecting device;

FIG. 156 illustrates the structure of each element processor included in a processor array shown in FIG. 155;

FIG. 157 illustrates methods of scanning a template block and a search window in the motion vector detecting device shown in FIG. 155;

FIG. 158 illustrates the operation of the motion vector detecting device shown in FIG. 155; and FIG. 159 is a diagram for illustrating the operation of the motion vector detecting device shown in FIG. 155.

DESCRIPTION OF THE PREFERRED EMBODIMENTS

Figure 1:
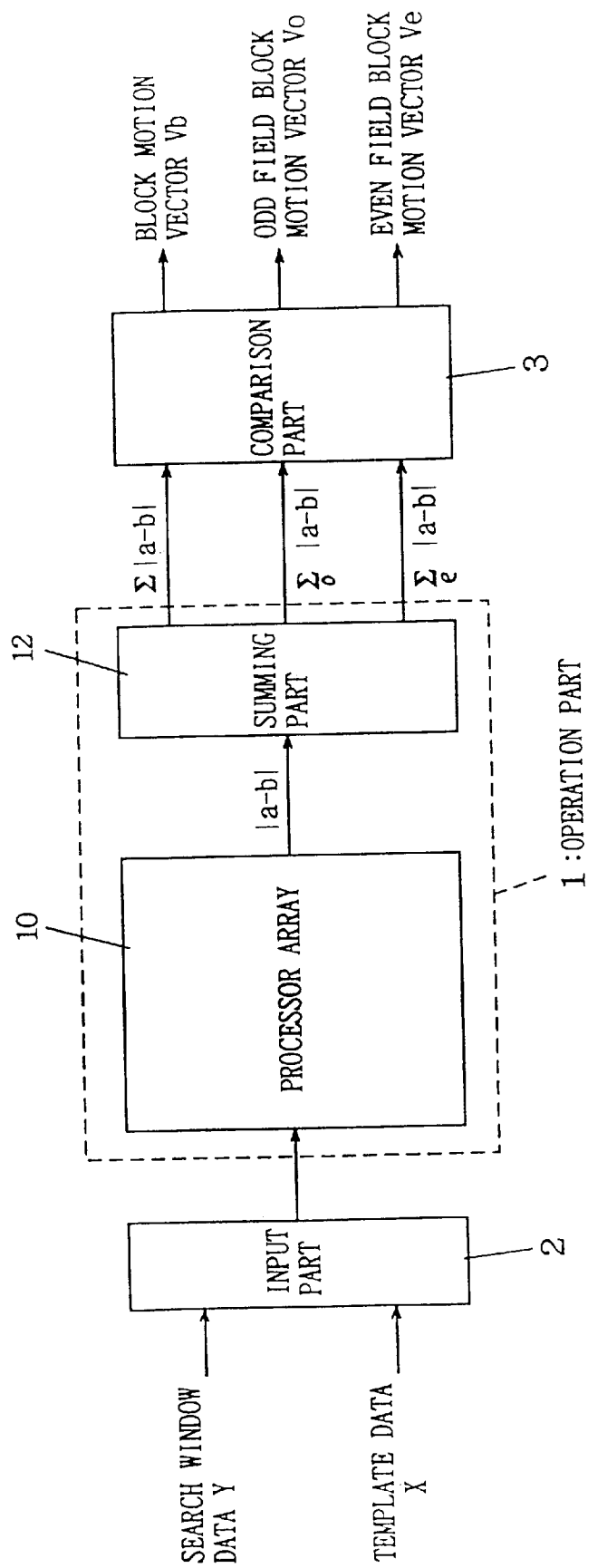
FIG. 1 schematically illustrates the overall structure of a full search system motion vector detecting device according to a first embodiment of the present invention.

FIG. 1 is a block diagram schematically showing the overall structure of a motion vector detecting device according to an embodiment of the present invention. The structure shown in FIG. 1 is adapted to code pixels in units of frames.

Referring to FIG. 1, the motion vector detecting device includes an input part 2 for receiving search window pixel data Y (the search window is described later) included in a prescribed region of a search area and template block pixel data X and outputting the data X and Y at prescribed timings respectively, an operation part 1 for calculating three evaluation function values (absolute differential value sums) $\Sigma|a-b|$, $\Sigma_o|a-b|$ and $\Sigma_e|a-b|$ as to displacement vectors for one template block on the basis of the data X and Y received from the input part 2, and a comparison part 3 for receiving the three evaluation function values $\Sigma|a-b|$, $\Sigma_o|a-b|$ and $\Sigma_e|a-b|$ obtained in the operation part 1, obtaining minimum evaluation function values for the respective evaluation function values and deciding displacement vectors corresponding to the respective minimum evaluation function values as motion vectors. The value $\Sigma|a-b|$ corresponds to an evaluation function value of a frame predictive mode for obtaining an evaluation function value through all pixels of a current picture image block (template block). Symbols a and b show template block pixel data and corresponding pixel data in a reference picture image block (search window block) respectively. The value $\Sigma_o|a-b|$ corresponds to an evaluation function value in accordance with an odd field predictive mode for detecting a predictive picture image through pixels included in an odd field. The value $\Sigma_e|a-b|$ expresses an evaluation function value calculated in accordance with an even field predictive mode for detecting a predictive picture image through pixels included in an even field.

The comparison part 3 outputs the motion vectors decided in accordance with the respective predictive modes, i.e., a block motion vector Vb which is decided in accordance with the frame predictive mode, an odd field block motion vector Vo which is decided in accordance with the odd field predictive mode, and an even field block motion vector Ve which is decided in accordance with the even field predictive mode in parallel with each other.

The operation part 1, the structure of which is described in detail later, includes a processor array 10 including a plurality of element processors which are arranged in the form of a two-dimensional array in correspondence to respective pixels of the template block, and a summing part 12 for sorting operation result values (absolute differential values in this embodiment) outputted from the respective element processors of the processor array 10 in accordance with the predictive modes and adding up the result values for the respective sorts for obtaining the sums. The summing part 12 outputs the evaluation function values $\Sigma|a-b|$, $\Sigma_o|a-b|$ and $\Sigma_e|a-b|$ corresponding to the respective predictive modes in parallel with each other.

The element processors included in the processor array 10 store respective template block pixel data and pixel data of a reference picture image block in a search area related to the template block are unidirectionally transmitted successively through the element processors. The element processors provided in the processor array 10 execute operations of the template block pixel data and pixel data in a single reference picture image block (hereinafter referred to as a search window block). Outputs of the element processors are in parallel with each other. Thus, each element processor calculates a component of an evaluation function value indicating correlation between a single template block and a single search window block. In the processor array 10, the template block pixel data are resident during the cycle of obtaining the motion vector as to the template block. The search window block pixel data are shifted by one pixel between the element processors of the processor array 10 every operation cycle (evaluation function calculation cycle).

The element processors are arranged in correspondence to respective pixels of the template block. In the odd and even field predictive modes, the element processors calculate evaluation function values through pixels belonging to odd and even fields of the template block (and the search window block) respectively. A frame includes even and odd fields, and odd and even field pixels are alternately arranged with respect to horizontal scanning lines of a screen. Therefore, outputs of the element processors which are arranged in correspondence to the even field pixels express components of an evaluation function value in accordance with the even field predictive mode, while those of the element processors which are arranged in correspondence to the odd field pixels express components of an evaluation function value in accordance with the odd field predictive mode. Thus, it is possible to calculate evaluation function values corresponding to a plurality of predictive modes respectively by sorting the outputs of the element processors depending on the location in the processor array 10. Evaluation function values of even and odd fields are simply added up for the frame predictive mode. The structure of the operation part 1 shown in FIG. 1 is now described more specifically.

Figure 2:
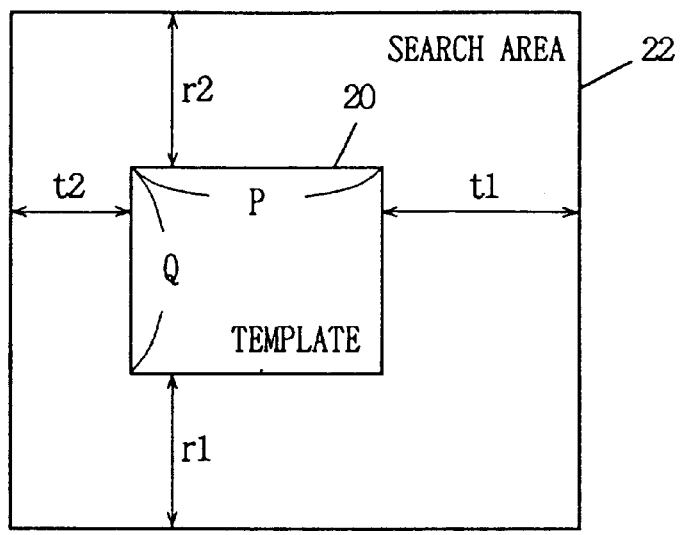
FIG. 2 illustrates sizes of a template block and a search area which are employed in the motion vector detecting device shown in FIG. 1.

FIG. 2 illustrates sizes of a template block 20 and a search area 22 which are employed in this embodiment. The template block 20 includes pixels which are arranged in Q rows and P columns. The search area 22 has a horizontal search range of +t1 to −t2 and a vertical search range of +r1 to −r2. In other words, the search area 22 includes (t2+P+t1)×(r2+Q+r1) pixels.

Figure 3:
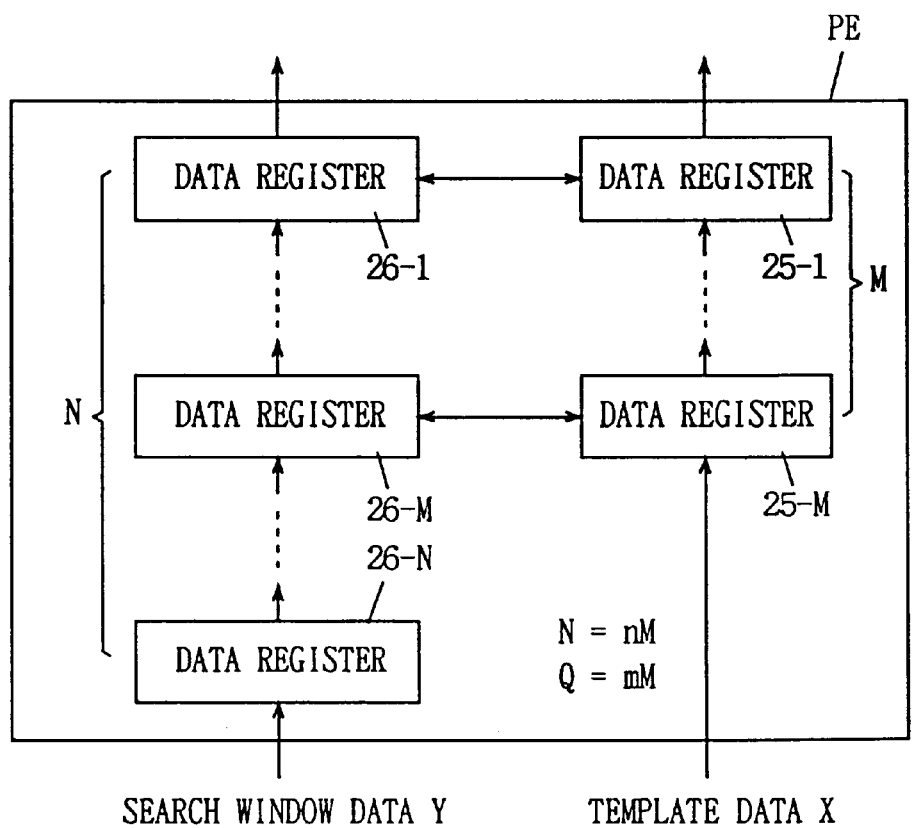
FIG. 3 schematically illustrates the structure of each element processor included in a processor array of the motion vector detecting device shown in FIG. 1.

FIG. 3 schematically illustrates the structure of each element processor PE included in the processor array 10 shown in FIG. 1. Referring to FIG. 3, the element processor PE includes M data registers 25-1 to 25-M which are cascade-connected for storing the template block pixel data X. These data registers 25-1 to 25-M each store different template block pixel data X. The element processor PE further includes N stages of data registers 26-1 to 26-N which are cascade-connected with each other for storing search window pixel data. The number N is an integer multiple of (n times) the number M. Further, the number Q of the rows of the template block 20 shown in FIG. 2 is an integer multiple of (m times) the stage number M of the data registers 25-1 to 25-M.

The element processor PE executes a prescribed operation (absolute differential value operation) through the template block pixel data X which are stored in the M data registers 25-1 to 25-M. The data registers 26-1 to 26-N for storing the search window pixel data may be in one-to-one correspondence to the data registers 25-1 to 25-M for storing the template block pixel data X (N=M), so that the prescribed operation is executed through the data stored in the respective corresponding registers. Alternatively, another combination may be employed.

Each element processor PE executes operations related to M template block pixel data (hereinafter simply referred to as template data). Arithmetic means (not shown in FIG. 3) of the element processor PE is utilized in a multiplexing mode for the M data registers 25-1 to 25-M. In this case, therefore, each element processor PE is provided with only one arithmetic means. The number of the element processors PE is reduced by providing a plurality of data registers for storing the template data in each element processor PE. The outputs of the plurality of data registers for storing the template data are selected in the multiplexing mode and supplied to the arithmetic means for execution of operations so that the operations are carried out a plurality of times in a transfer period of the search window block pixel data (hereinafter referred to as search window data), whereby a plurality of components of an evaluation function value are outputted in a multiplexing mode from each element processor PE and hence it is possible to reduce the hardware of the summing part 12 for adding up the outputs of the element processors provided in the processor array 10, since the number of input signal lines for the summing part 12 can be reduced. The search window data Y and the template data X are only unidirectionally transmitted, as shown by arrows in FIG. 3.

Figure 4:
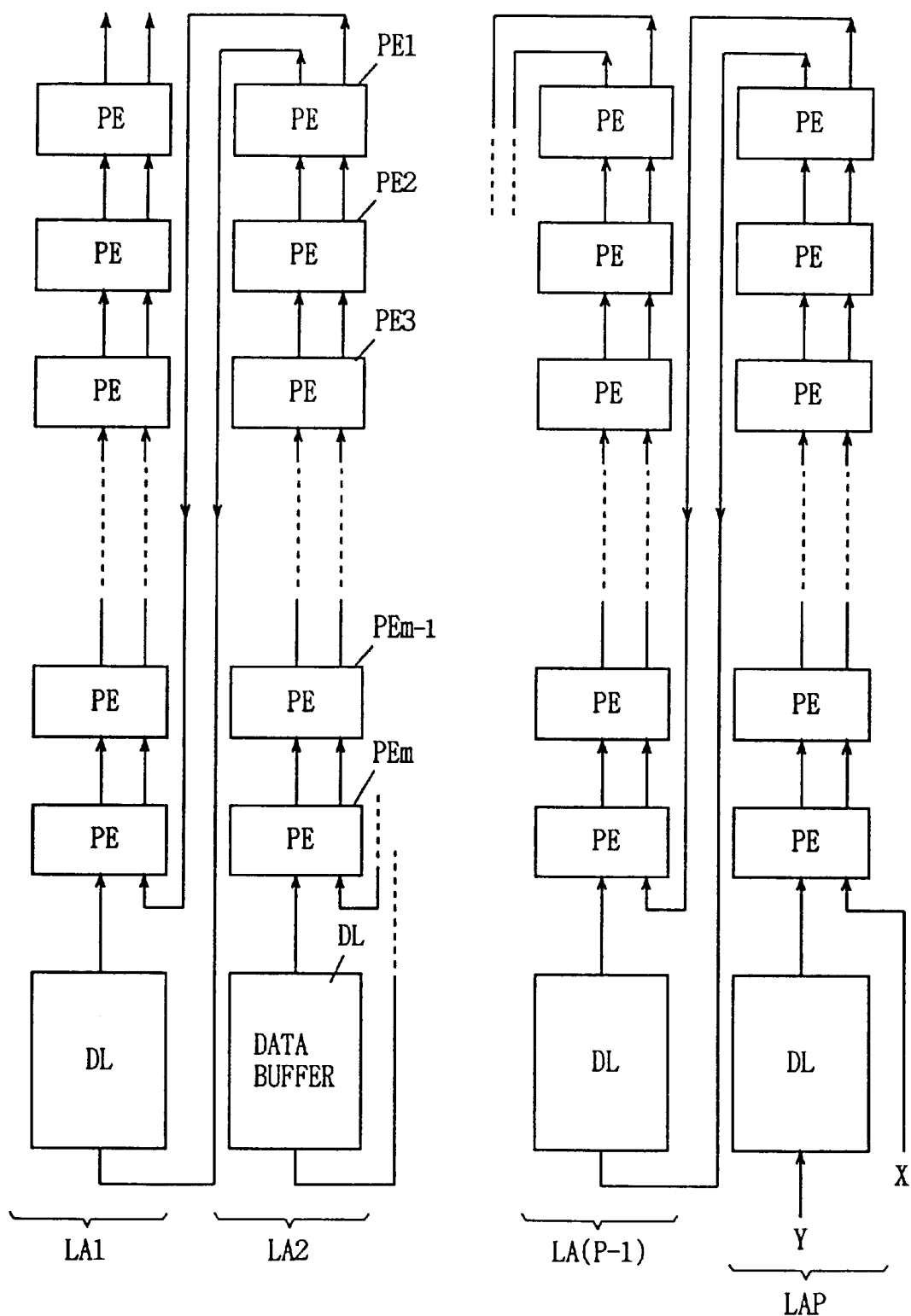
FIG. 4 illustrates the structure of the processor array shown in FIG. 1.

FIG. 4 illustrates the structure of the processor array 10 shown in FIG. 1. Referring to FIG. 4, the processor array 10 includes linear processor arrays LA1 to LAP which are arranged in P columns. Each of the linear processor arrays LA1 to LAP, which are identical in structure to each other, includes m element processors PE1 to PEm arranged in cascade connection and a data buffer DL for storing R (=r1+r2) search window data while also serving as delay means.

The element processors PE1 to PEm unidirectionally (vertically in FIG. 4) transmit the search window data and the template data in each linear processor array LA (generically denoting LA1 to LAP). In data transfer to an adjacent linear processor array, the uppermost element processor PE1 supplies the search window data to the data buffer DL which is included in the upstream (left in FIG. 4) linear processor array while supplying the template data to the lowermost element processor PEm of the upstream linear processor array. In other words, the search window data Y are successively unidirectionally transmitted in the processor array through the element processors PE and the data buffers DL, while the template data X are unidirectionally transmitted only through the element processors PE. While the element processors PE are arranged in a matrix of rows and columns in the structure shown in FIG. 4, each linear processor array receives the search window data and the template data which are outputted from the uppermost element processor of the precedent linear processor array and hence the linear processor arrays LA1 to LAP are connected with each other in a cascade mode, whereby the processor array 10 is substantially equivalent to a one-dimensional processor array.

Each data buffer DL has a delay function or a buffer function as described above, to receive and output the search window data in a first-in first-out (FIFO) mode. The data buffer DL may be formed by R data latches having shift functions (R stages of shift registers), or a register file storing R data.

Figure 5A:
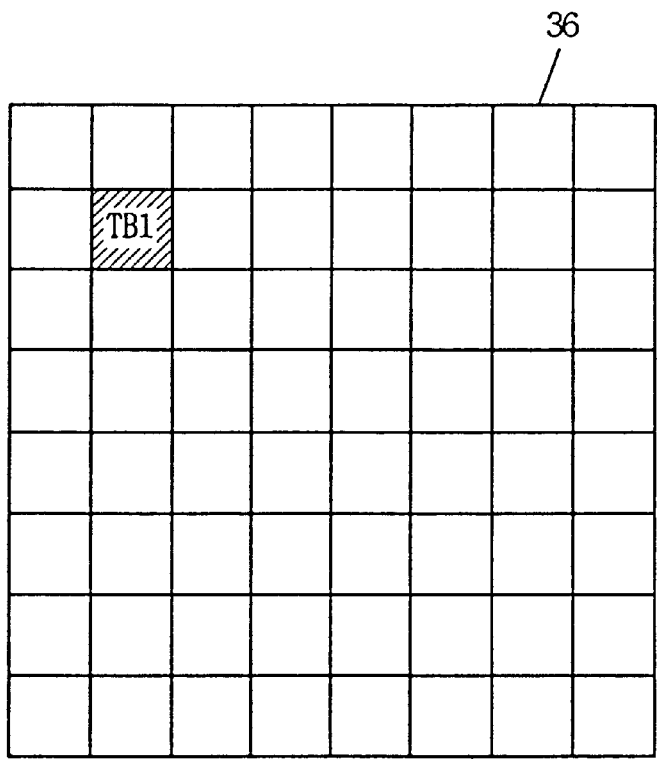
FIG. 5A illustrates the structure a divided screen and that of a macro block serving as a unit of block matching.

Consider that one frame picture image 36 is divided into 8×8=64 macro blocks as shown in FIG. 5A, so that motion vectors are detected for the respective macro blocks. A macro block which is shown by slant lines in the one frame picture image 36 is assumed to be a template block TB1. Motion vectors are detected for the template block TB1 in accordance with the three predictive modes respectively.

Figure 5B:
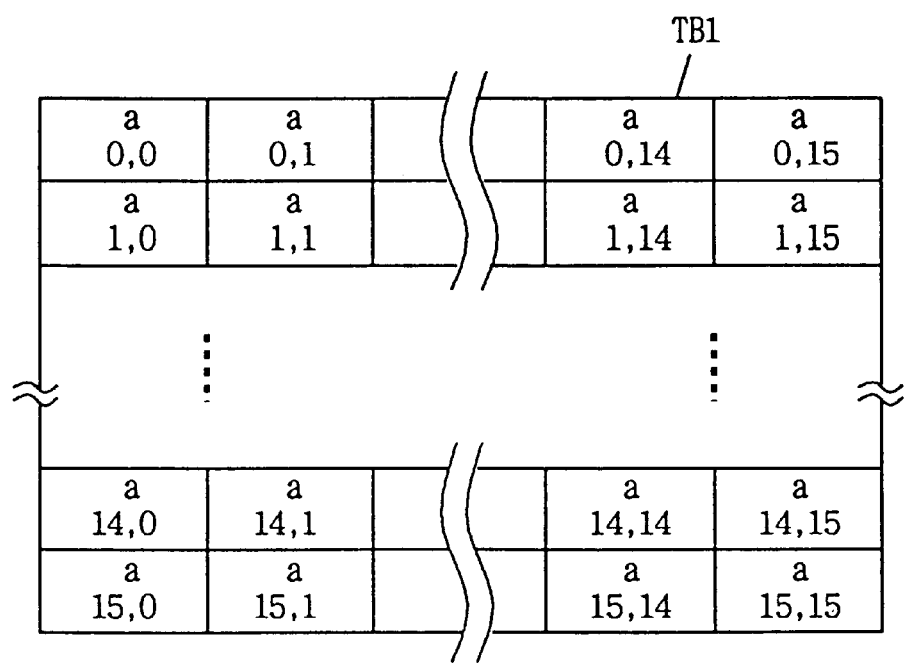
FIG. 5B illustrates an exemplary structure of the template block.

It is assumed that the template block TB1 includes template data a(0, 0) to a(15, 15) which are arranged in 16 rows and 16 columns, as shown in FIG. 5B. In this template block TB1, pixels belonging to even and odd fields are respectively arranged on alternate rows. A system of detecting a motion vector by calculating an evaluation function value through all template block pixels a(0, 0) to a(15, 15) shown in FIG. 5B corresponds to the frame predictive system, and a block motion vector Vb is decided.

Figure 6A:
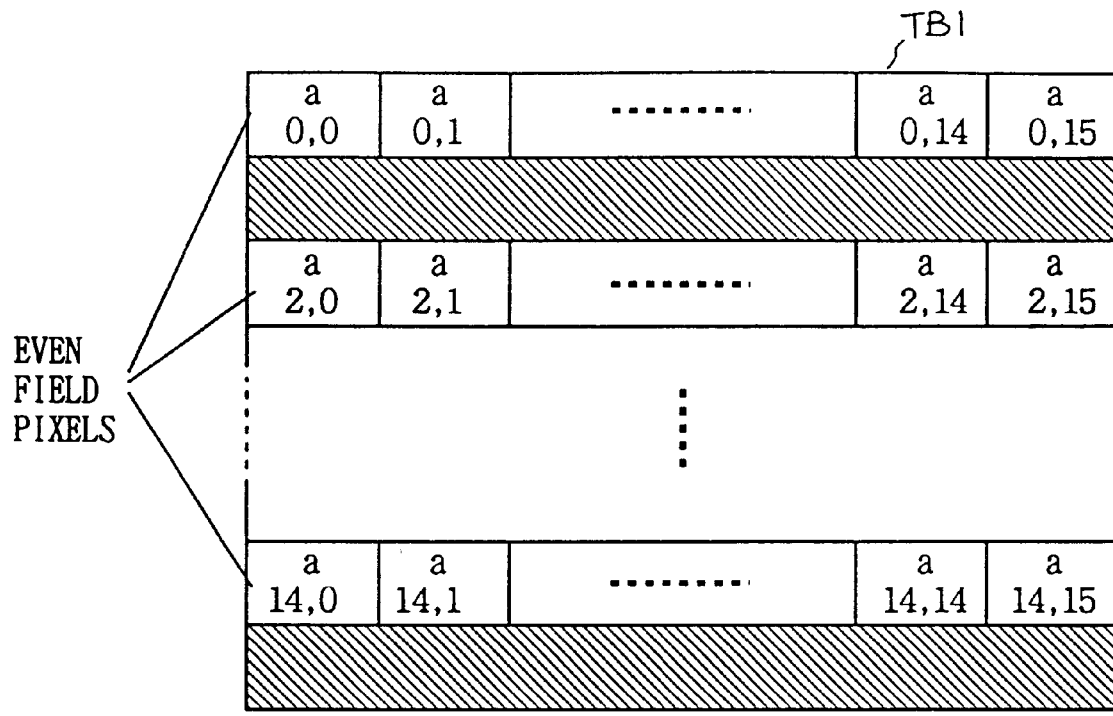
FIGS. 6A and 6B illustrate the structures of even and odd field sub template blocks, respectively.

As shown in FIG. 6A, a predictive mode of calculating evaluation function values through pixels a(2k, 0) to a(2k, 15) which are included in even fields arranged in even rows of zeroth, second, . . . 15th rows of the template block TB1 provides an even field block motion vector Ve, where k=0 to 7.

Figure 6B:
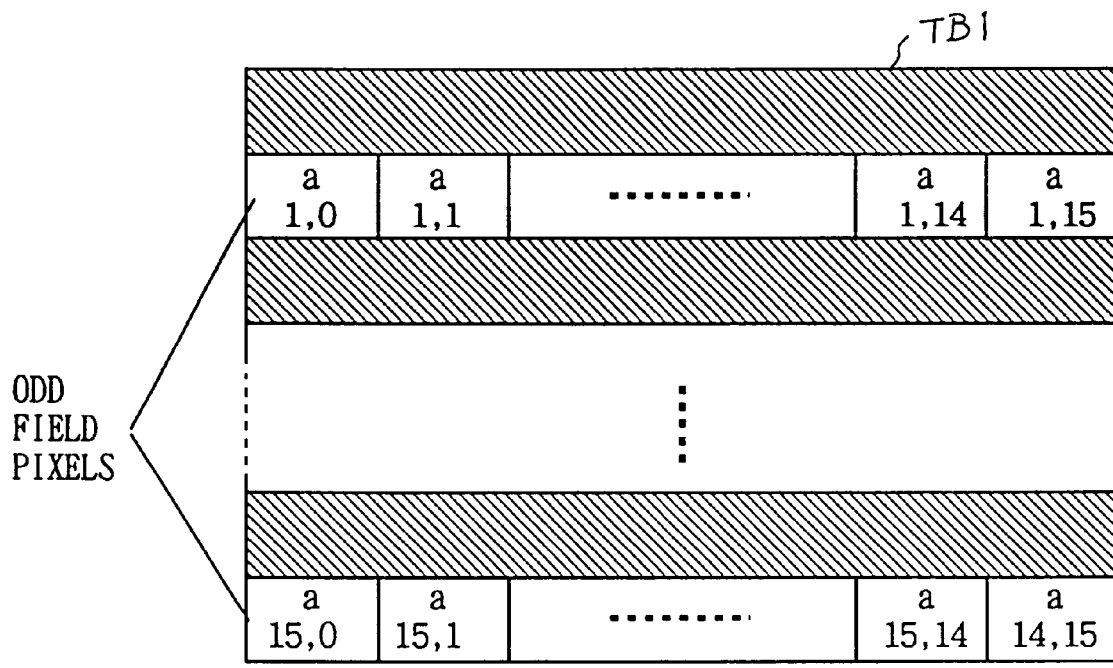

As shown in FIG. 6B, a predictive mode of calculating evaluation function values through pixels a(2k+1, 0) to a(2k+1, 15) which are arranged on the first to 15th rows of the template block TB1 is the odd field predictive mode, which provides an odd field block motion vector Vo.

Figure 7:
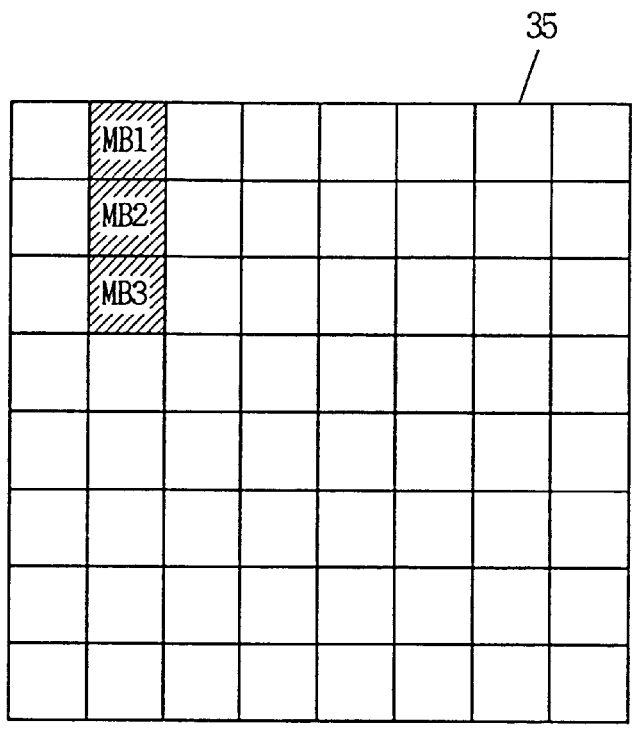
FIG. 7 illustrates the structure of a divided reference picture image screen and regions with macro block pixel data stored in the processor array.
Figure 8:
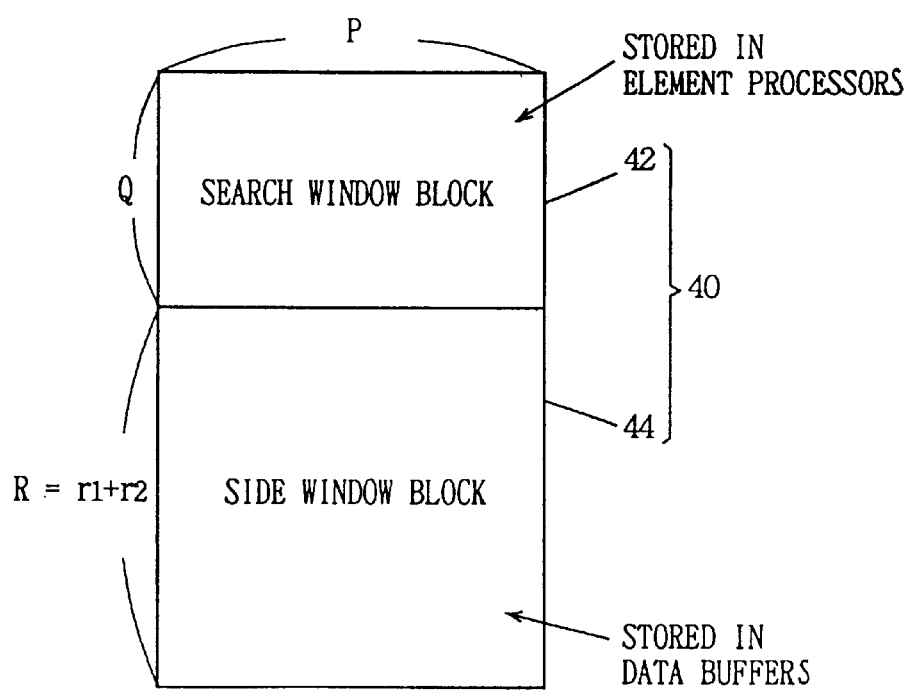
FIG. 8 illustrates a state of reference picture image pixel data stored in the processor array shown in FIG. 1.

In order to search a reference picture image for detecting a predictive picture image, the processor array 10 stores three macro blocks MB1, MB2 and MB3 shown by slant lines in a precedent frame picture image 35, as shown in FIG. 7. Data of the pixels included in the template block TB1 shown in FIG. 5A are stored in the respective data registers 25-1 to 25-M of the element processors PE. Each element processor PE stores Q/m vertically arranged template block pixel data. As to the search window block pixel data, on the other hand, each element processor PE stores Q·n/m vertically adjacent pixel data. As shown in FIG. 8, therefore, the element processors PE of the processor array 10 store P·Q search window pixel data, including Q vertical pixel data and P horizontal pixel data, in total. The P·Q pixel data are hereinafter referred to as search window block pixel data. The remaining R (=r1+r2)·P search window pixel data are stored in the data buffers DL. A block which is formed by the pixel data stored in the data buffers DL is hereinafter referred to as a side window block 44.

The combination of the search window block 42 and the side window block 44 shown in FIG. 8 is hereinafter referred to as a search window 40.

Figure 9:
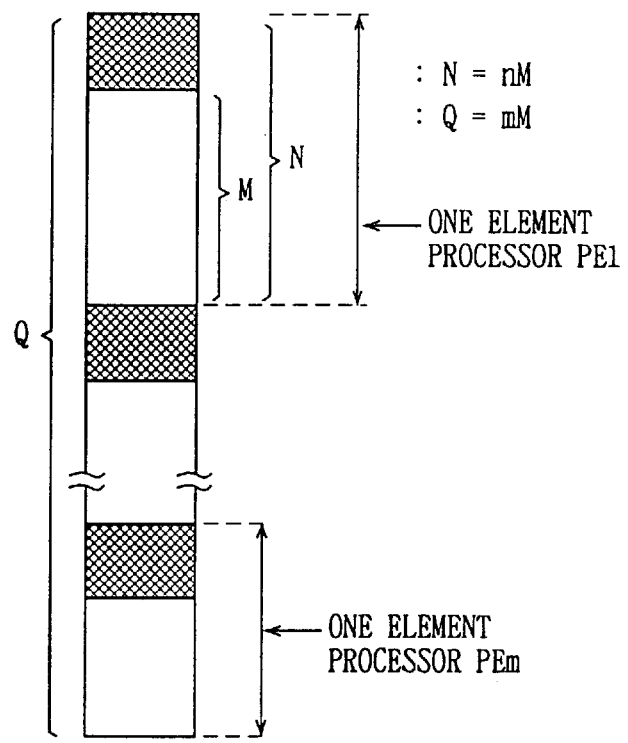
FIG. 9 illustrates states of reference block picture image pixel data and current picture image block pixel data stored in a linear processor array provided in the processor array shown in FIG. 1.
Figure 10:
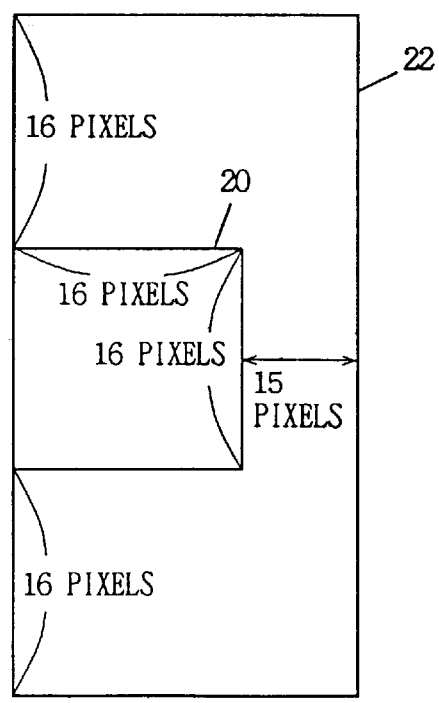
FIG. 10 illustrates specific examples of a motion vector search range and a current picture image block.

In general, each element processor PE stores M template block pixel data and N search window pixel data, as shown in FIG. 9. The element processors PE1 to PEm of each linear processor array store Q vertically adjacent search window pixel data and template pixel data. A specific operation is now described.

In order to simplify the following description, the following conditions are assumed:
template block size: P=Q=16
motion vector search range: r1=r2=16, t2=0, t1=15, m=16 and M=N=1

In the above assumption, the motion vector search area 22 includes (16+16+16)×(16+15)=1488 pixels as to the frame picture image. The size of the template block 20 is 16×16= 256 pixels. From the condition of M=N=1, each element processor PE stores one search window block pixel data and one template block pixel data.

Figure 11:
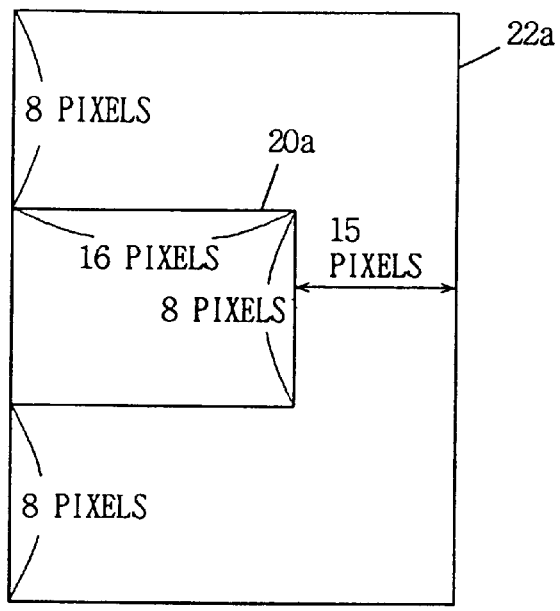
FIG. 11 illustrates specific examples of the current picture image block and the search area in employment of the odd or even field sub template block.

FIG. 11 shows the structure of the search area as to odd and even field pixels under the above assumption. As shown in FIG. 11, the template block of a frame structure includes even and odd field pixels. Therefore, a sub template block 20a which is formed by even or odd field pixels provides a structure of 16 by 8 pixels. The search area includes even and odd field pixels, too, and hence a sub search area 22a has (8+8+8)×(16+15)=744 pixels as to the even or odd field pixels. Namely, displacement vectors are different between predictive modes in the units of frames and in those in fields, since the row number of the macro blocks in the units of frames is twice that of the macro blocks in the units of fields.

Figure 12:
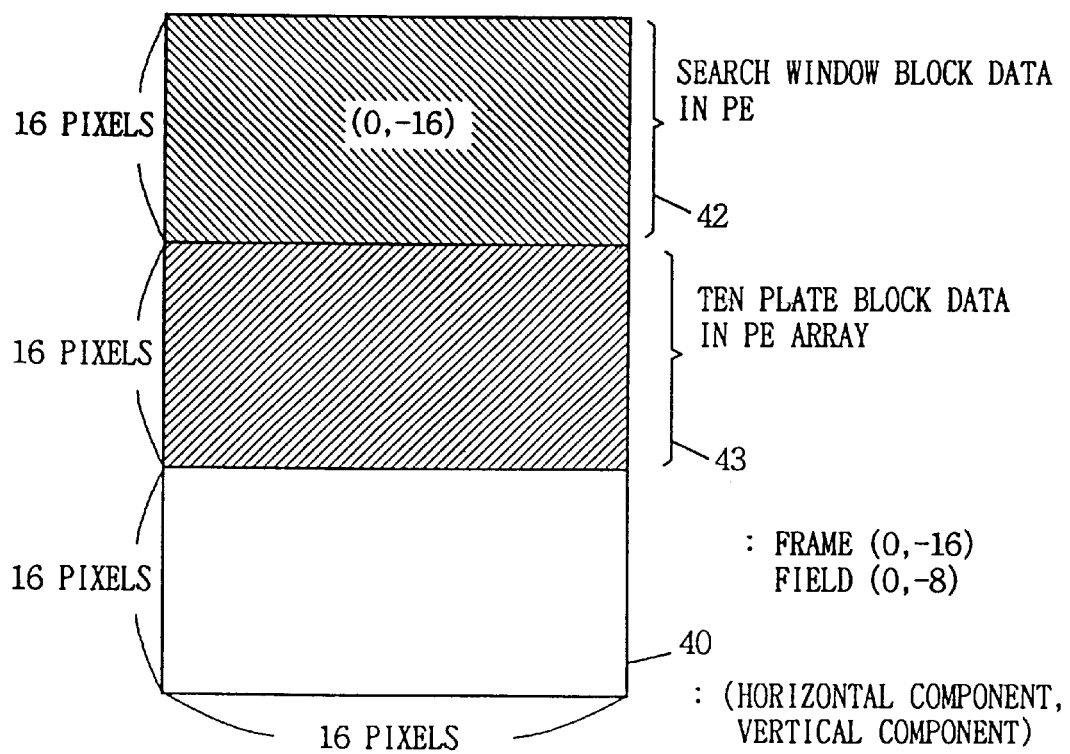
FIG. 12 illustrates states of reference picture image block pixel data and template block pixel data stored in the processor array shown in FIG. 1.

FIG. 12 shows states of data stored in the processor array in an initial operation cycle for motion vector detection. Referring to FIG. 12, pixel data of the template block 43, which is formed by 16 rows by 16 columns of pixel data, are stored in corresponding element processors PE in the processor array 10. In correspondence to this, 16 rows by 16 columns of pixel data of the search window block 42 are stored in element processors PE of the processor array 10. This state corresponds to a frame displacement vector (0, −16) for the template block 22. The frame displacement vector is employed for carrying out a predictive operation in accordance with the frame predictive mode. A displacement vector for odd field pixels in the search window block 42 is employed for the odd sub template block 20a which is formed by the odd field pixels, and hence this corresponds to an odd field displacement vector (0, −8), while it also corresponds to a displacement vector for the even field with respect to an even sub template block 20a including only pixels included in the even fields, i.e., an even field displacement vector (0, −8).

In this state, absolute differential values which are components of evaluation functions of the template block pixel data and the corresponding search window block pixel data stored in the respective element processors PE are obtained. The absolute differential values obtained in the respective element processors PE are transmitted to the summing part 12 shown in FIG. 1. The summing part 12 calculates independently and in parallel the sum (odd sub block evaluation function value) of the absolute differential values transmitted from the element processors PE corresponding to the odd sub template block and the sum (even sub block evaluation function value) of the absolute differential values transmitted from the element processors PE which are arranged in correspondence to the even sub template block. The even and odd sub block evaluation function values as calculated are thereafter added up with each other. This addition corresponds to calculation of the sum of the absolute differential values transmitted from all element processors PE of the processor array 10, whereby an evaluation function value (block evaluation function value) in accordance with the frame predictive mode for the template block is obtained. Through the above operation, evaluation function values for respective displacement vectors along the three predictive modes are obtained. The predictive modes are different from each other merely in the employed pixels, and hence it is possible to calculate evaluation function values for a plurality of predictive modes in parallel by sorting outputs of the element processors PE.

Then, only the search window block pixel data are transferred by one pixel while holding the template block pixel data in the element processors PE of the processor array 10.

Figure 13A:
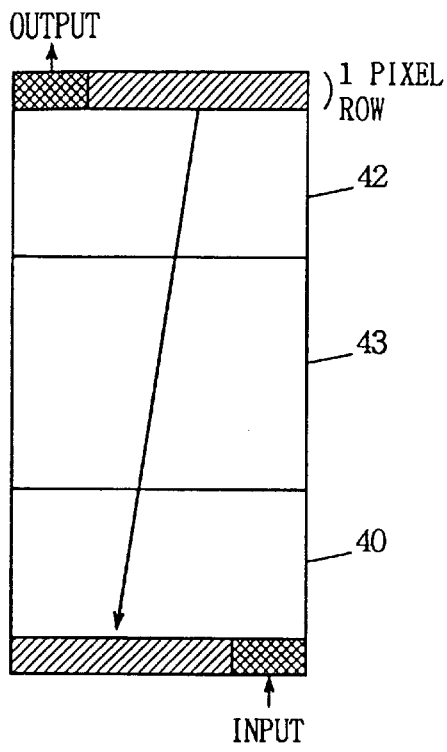
FIG. 13A illustrates a state of search window pixel data transferred in the processor array in horizontal shift of a search window by one column.

In this state, the data of the uppermost row in the search window block 42 is transferred to the data buffer DL of the adjacent column as shown in FIG. 13A, so that the first data of the search window block 42 is shifted out. Search window block pixel data are newly inputted in parallel with this operation. FIG. 13A shows the search window block pixel data as shifted out and as newly shifted in by slant lines in FIG. 13A.

Figure 13B:
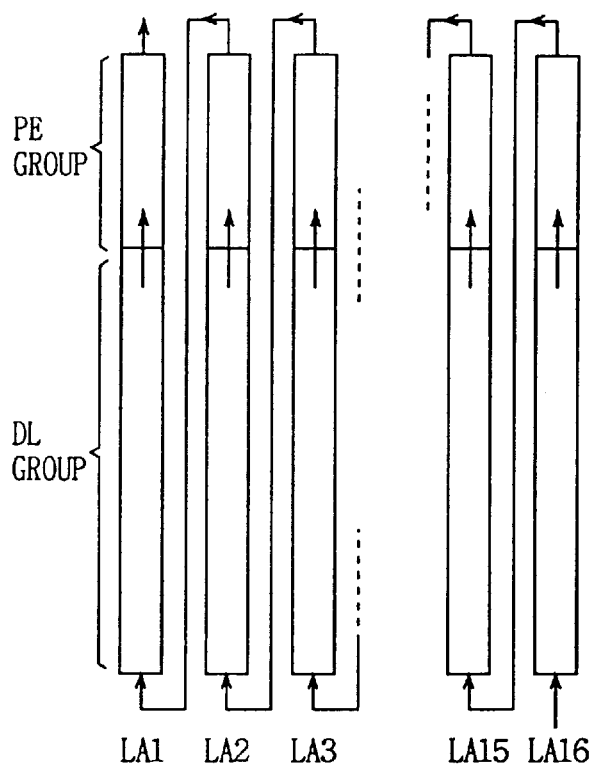
FIG. 13B illustrates a state of motion of the search window pixel data in the processor array.

In this state, the element processors PE of the processor array 10 store pixel data of a search window block 42a which is downwardly displaced by one row in the search window 40, as shown in FIG. 13B. Namely, the search window pixel data are upwardly shifted by one pixel in each of the linear processor arrays LA1 to LA16, as shown in FIG. 13B. The search window pixel data newly shifted in the linear processor arrays LA1 to LA16 are stored in the data buffers DL. The data newly shifted in the processor groups (PE groups) are supplied from the corresponding data registers. Namely, the element processor groups (PE groups) store the data of the search window block which is downwardly displaced by one pixel row in the search window, by the pixel shifting operation.

Figure 13C:
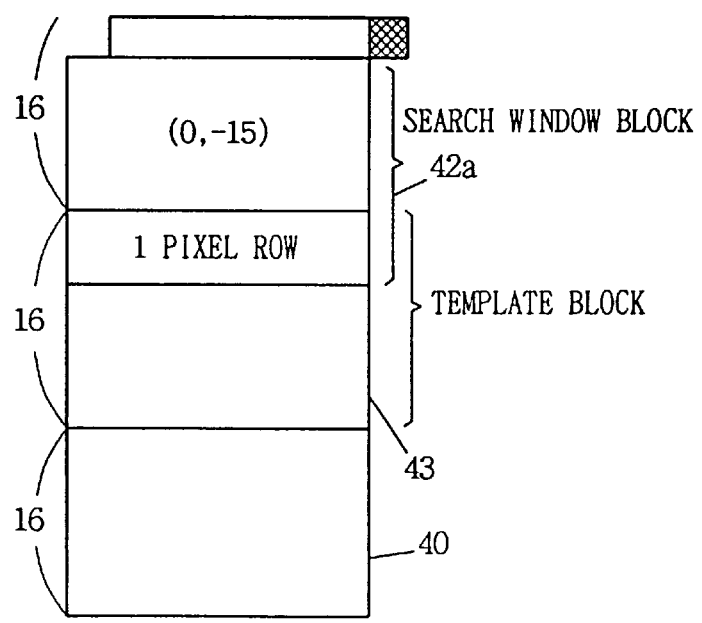
FIG. 13C illustrates a state of distribution of the search window pixel data, inputted and stored in the processor array, in the search area.

In this state, the block displacement vector for the template block 43 and the search window block 42a is (0, −15), as shown in FIG. 13C.

Figure 14A:
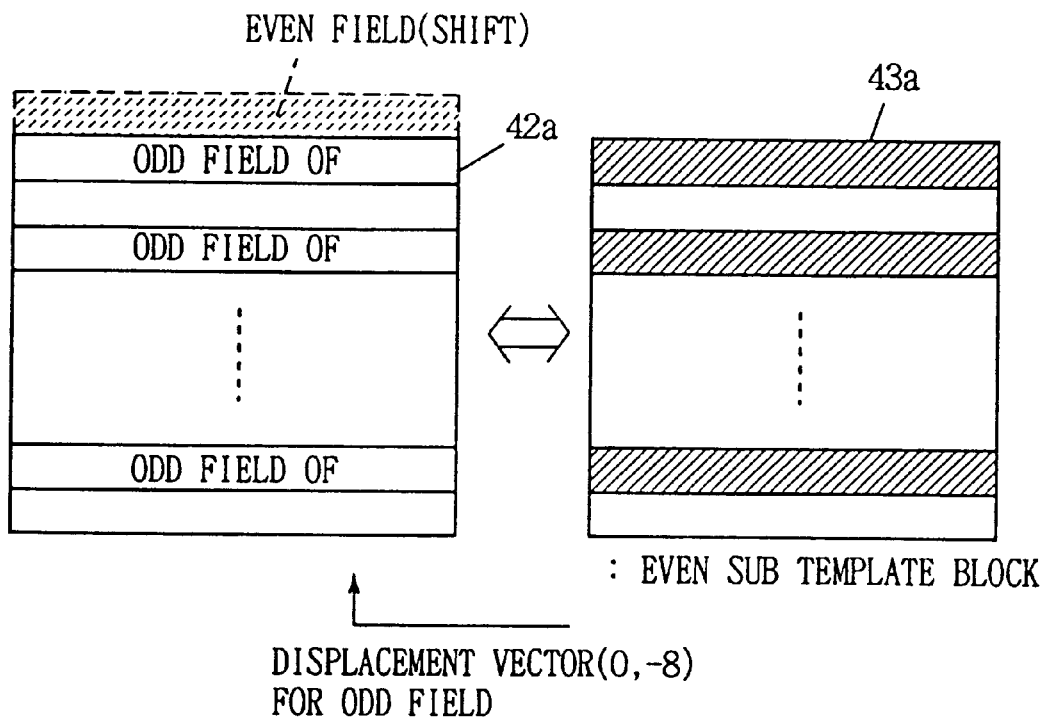
FIG. 14A illustrates a displacement vector of the even field sub template block with respect to an odd field.

In this shift operation, even field pixels are shifted out and in by a single row in the search window block 42a. Namely, the displacement vector for the even field is moved by (0, −1). The displacement vector for the odd field is included in the search window block 42a, and remains unchanged. Therefore, an even sub template block 43a (including processors in regions shown by slant lines) has a displacement vector (0, −8) for the odd field OF, as shown in FIG. 14A.

Figure 14B:
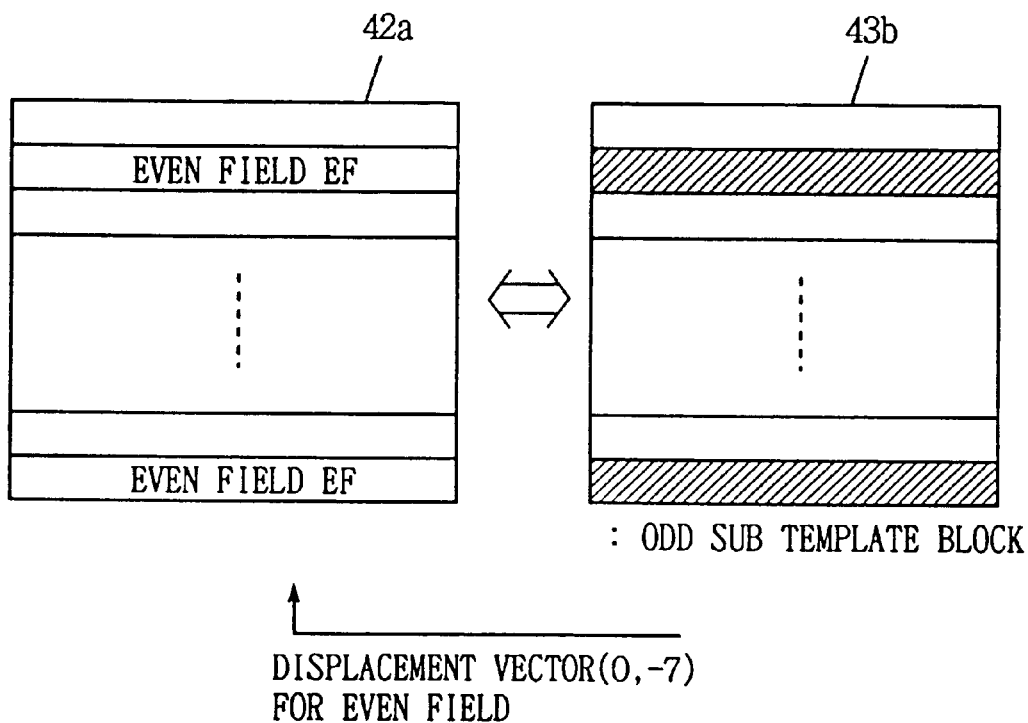
FIG. 14B illustrates a displacement vector of the odd field sub template block with respect to an even field.

As shown in FIG. 14B, on the other hand, an odd sub template block 43b (slant lines) has a displacement vector (0, −7) for an even field EF. A summing operation of absolute difference values is again carried out similarly to the above, whereby evaluation function values of the template block, the even sub template block and the odd sub template block are outputted. Thus, evaluation function values for the even and odd fields are alternately outputted as those of the even sub template block 43a. Similarly, evaluation function values for the odd and even fields are alternately outputted also with respect to the odd sub template block 43b. In the even field predictive mode, the pixels of the even sub template block are employed for obtaining the motion vector from both of the odd and even fields, while the motion vector is also detected from both of the even and odd fields for the odd sub template block.

Figure 15A:
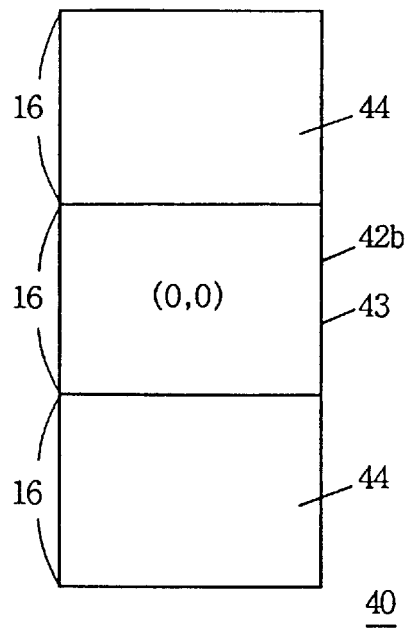
FIGS. 15A and 15B illustrate data stored in the processor array and positions in the search area in an evaluation function value calculating operation.
Figure 15B:
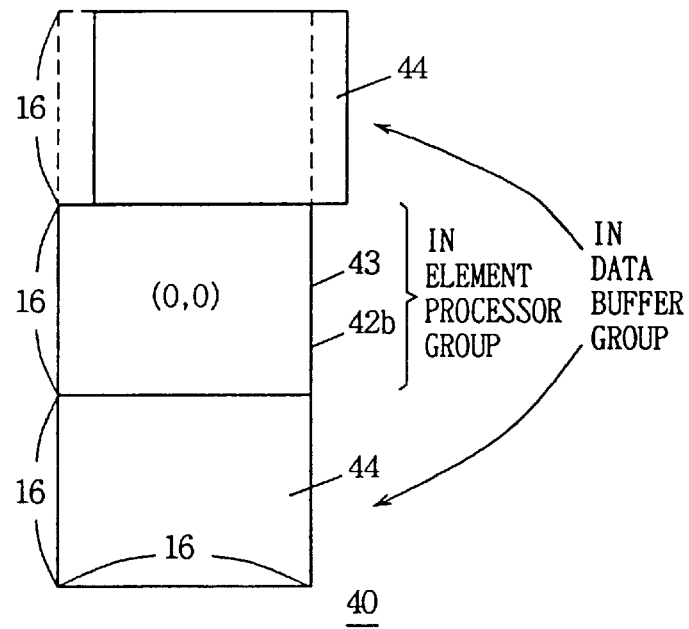

The aforementioned operation is so repeated that displacement vector (0, 0) is for the even and odd fields with respect to the even and odd sub template blocks 43a and 43b respectively when that for the template block 43 reaches (0, 0). In this state, a search window block 42b in the search window 40 corresponds to a position which is just at the back of the template block 43. In this state, each data of the search window 40 stored in the processor array 10 is in a position which is rightwardly displaced by one column in a region of 16 by 16 upper pixels, as shown in FIG. 15B. The element processor group stores the pixel data of the search window block 42b and the template block 43, while the remaining pixel data of the side window block 44 are stored in the data buffer group. Thus, it is possible to newly store search window pixel data of a next column in parallel with the operation of calculating the evaluation function values by shifting out data which are not required for the calculating operation by a single pixel while newly shifting in search window pixel data by a single pixel.

Figure 16A:
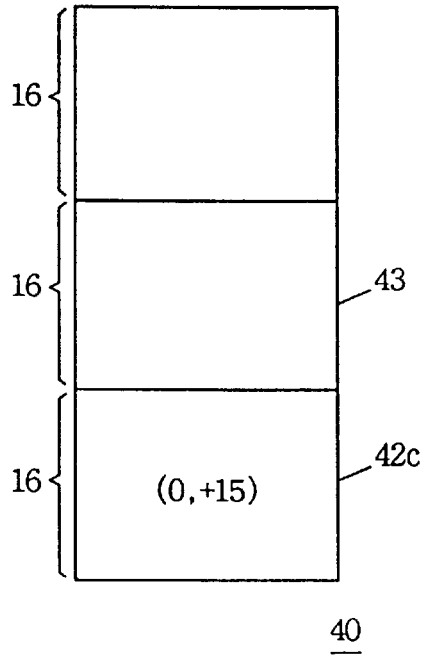
FIG. 16A shows a search window block reaching the lowermost portion of the search window.

The evaluation function value calculating operation is further repeated so that displacement vectors (0,+8) are for the even and odd fields with respect to the even and odd sub template blocks 43a and 43b respectively when that for the template block 43 reaches (0,+16). In this state, a search window block 42c is arranged in the lowermost region of the search window 40, as shown in FIG. 16A. After evaluation function values for respective displacement vectors of the three predictive modes are calculated in this state, unnecessary search window data PY1 is shifted out by one pixel from the processor array 10, while search window pixel data PY2 is newly shifted therein.

Figure 16B:
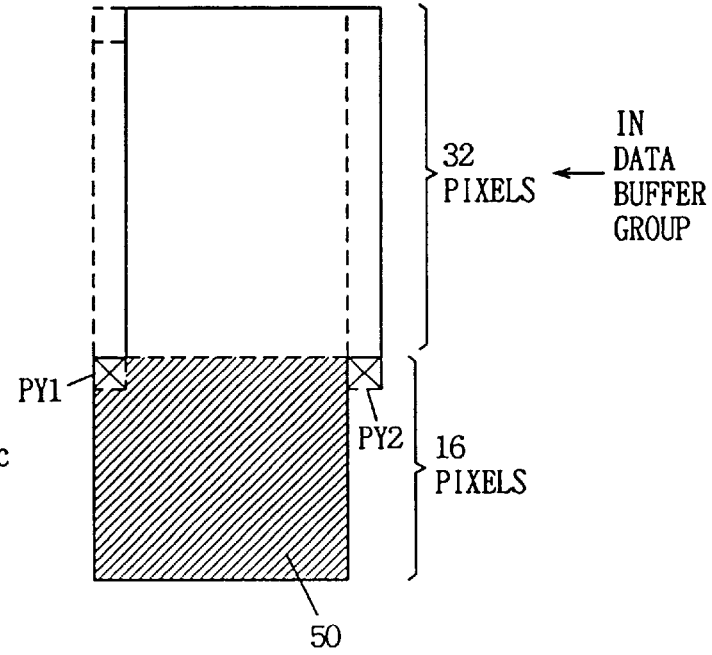
FIG. 16B shows the position of the search window pixel data stored in the processor array in the state shown in FIG. 16A.

In this state, pixel data of a region 50 shown by slant lines are stored in the element processors PE of the processor array 10, as shown in FIG. 16B. In a next step, evaluation function values are calculated for a search window which is rightwardly displaced by one column in the search area. In order to prepare pixel data of the search window required for the next step in the processor array 10, the shift operation is further repeated 15 times after the search window pixel data PY2 is shifted in. Thus, 15 pixel data which are arranged on the same column as the pixel data PY1 in FIG. 16B are successively shifted out in the region 50 shown by slant lines, while 15 pixel data following the pixel data PY2 are shifted therein. The data buffer group stores pixel data of 32 rows by 16 columns shown in FIG. 16B.

Figure 17A:
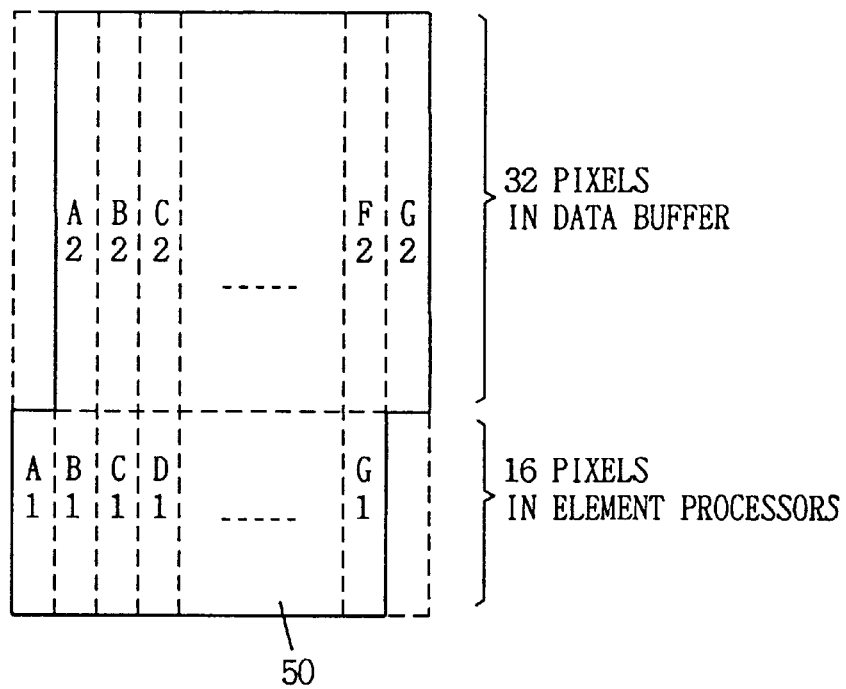
FIG. 17A illustrates a state of the search window pixel data stored in the processor array after evaluation function value calculation with respect to a single search window.
Figure 17B:
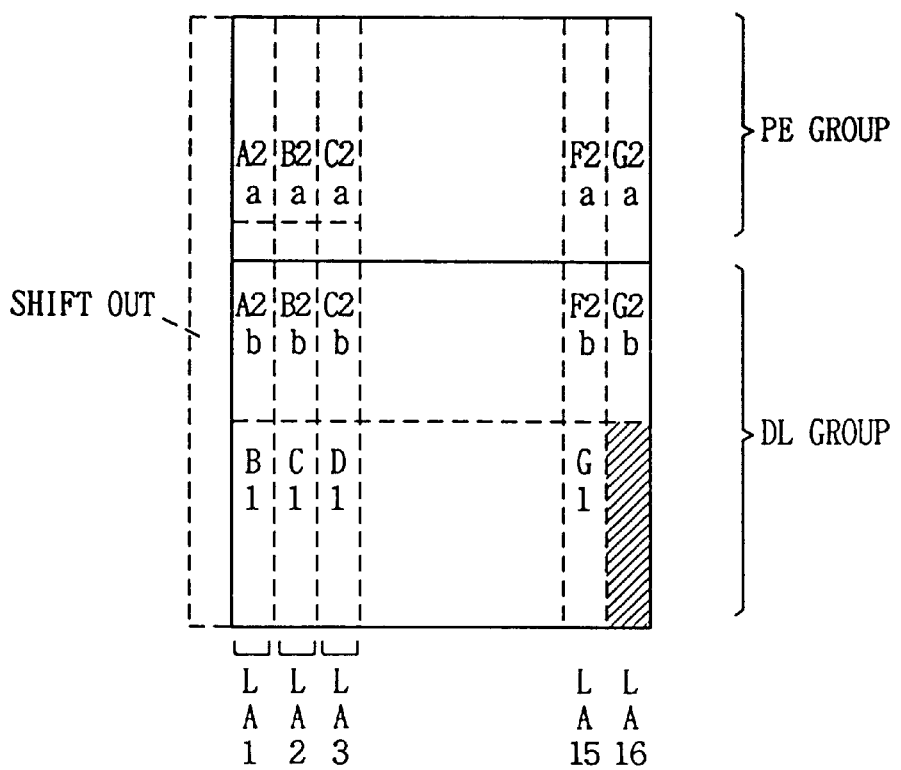
FIG. 17B illustrates a state of search window pixel data stored in the processor array after a 16 pixel data shift-in operation.

In the region 50, the element processors PE store pixel data groups A1 to G1, while remaining pixel data groups A2 to G2 are stored in the data buffers, as shown in FIG. 17A. The linear processor arrays store pixel data groups which are indicated by the same alphabetic characters such as pixel data A1 and A2, B1 and B2 etc. When the 16 pixels in the region 50 shown by slant lines in FIG. 16B are shifted in, therefore, all pixel data A1 entirely shifted out. In this state, the pixel data A2 to G2 which are stored in the data buffers DL are divided such that pixel data A2a to G2a belonging to upper half blocks are stored in the element processor group (PE group) and remaining pixel data A2b to G2b and pixel data B1 to G1 are stored in the data buffer group (DL group), as shown in FIG. 17B. The linear processor array LA16 stores the shifted in pixel data (shown by slant lines).

When the element processors and the data registers (buffers) are arranged to substantially form linear arrays in the processor array 10 as hereinabove described, it is possible to store pixel data of a search window 40a which is rightwardly displaced by one column in the processor array 10 while storing pixel data of a search window block 42d in the element processor group, as shown in FIG. 18. This state corresponds to a block displacement vector (1, −16) for the template block 43, while corresponding to displacement vector (1, −8) for the odd and even fields with respect to the odd and even sub template blocks respectively.

In this state, the aforementioned operation i.e., calculation of the absolute differential values and calculation of the sum, is again executed for deriving evaluation function values for the respective predictive modes.

Figure 19:
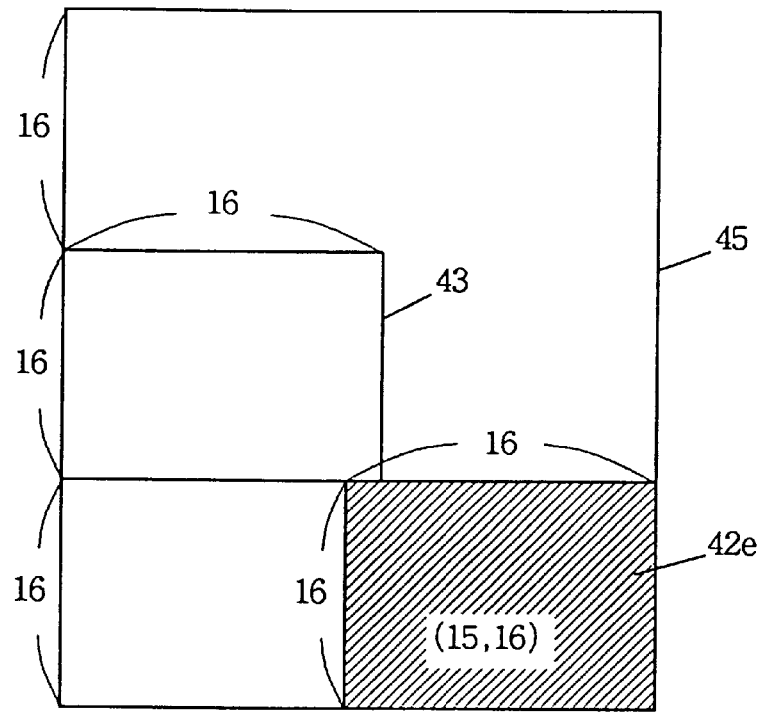
FIG. 19 shows a state of the search window block reaching the final position in the search area.

When the aforementioned operation is executed (16+16+16)×15+(16+16)=752 times, evaluation function values are calculated through a search window block 42e corresponding to a displacement vector (15, 16) for the template block 43, as shown in FIG. 19. This search window block 42e corresponds to a displacement vector (15, +8) for even and odd fields with respect to the even and odd sub template blocks respectively. Namely, evaluation function values for the search window block 42e which is positioned on the lower right corner of a search area 45 are calculated with respect to the template block 43, whereby calculation of all evaluation function values for this template block 43 is completed.

After execution of the calculation of the evaluation function values for the search window block 42e, minimum evaluation function values for the three predictive modes are obtained in the comparison part (see FIG. 1) with respect to all calculated evaluation function values, so that displacement vectors corresponding thereto are decided as motion vectors for the template block 43 and the odd and even sub template blocks respectively.

[Specific Structures of Respective Circuits]

Figure 20:
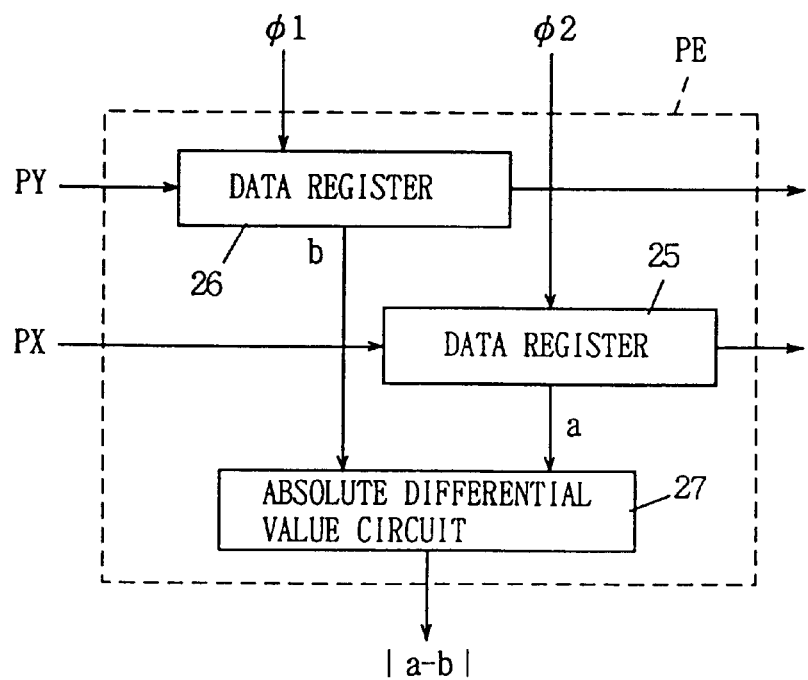
FIG. 20 illustrates an exemplary structure of each element processor included in the processor array shown in FIG. 1.

FIG. 20 shows a specific structure of each element processor PE. Referring to FIG. 20, the element processor PE includes a data register 25 for storing template block pixel data a, a data register 26 for storing search window pixel data b, and an absolute differential value circuit 27 for obtaining an absolute differential value of the pixel data a and b stored in the data registers 25 and 26. The data register 25 unidirectionally transmits the data stored therein in response to a clock signal $\phi 2$, while the data register 26 transfers pixel data received from an adjacent element processor or data buffer in accordance with a clock signal $\phi 1$. The data registers 25 and 26 can be formed by shift registers which transfer and latch data in response to clock signals. Alternatively, the data registers 25 and 26 can be implemented by memories having separate write and read paths. The absolute differential value circuit 27 is provided in accordance with a format of the pixel data a and b such as two's complement expression, absolute value expression or the like. The absolute differential value circuit 27 can be in an arbitrary circuit structure so far as the same can obtain the difference between the pixel data a and b and invert the sign of the differential value.

Figure 21:
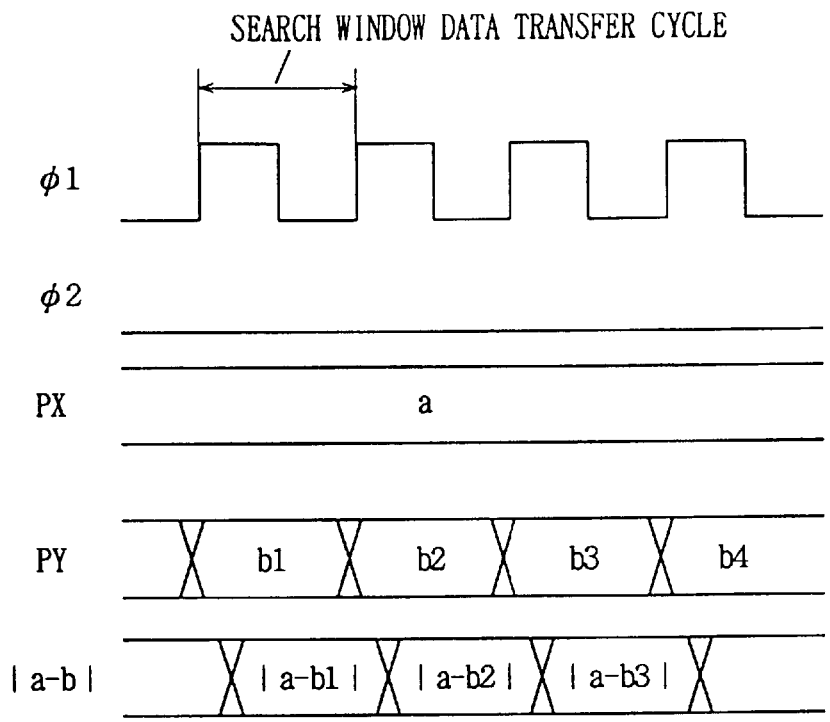
FIG. 21 is a timing chart showing the operation of the element processor shown in FIG. 20.

FIG. 21 is a waveform diagram illustrating the operation of the element processor PE shown in FIG. 20. As shown in FIG. 21, the clock signal $\phi 2$ is not generated but fixed in an inactive state (low level in FIG. 21) in a template block motion vector detection cycle. The clock signal $\phi 1$ decides a transfer cycle for search window pixel data PY. The search window pixel data PY are stored in and transferred to the data register 26 in accordance with the clock signal $\phi 1$. Template block pixel data PX in the data register 25 are not transferred but the data register 25 stores the template block pixel data a corresponding to the element processor PE. The pixel data b stored in the data register 26 are successively changed as b1, b2, ... every cycle of the clock signal $\phi 1$. The absolute differential value circuit 27 outputs absolute differential values |a−b1|, |a−b2|, ... every cycle. Due to this structure, components of evaluation function values are calculated in the respective element processors PE in the search window data transfer cycle.

In the structure shown in FIG. 21, a single data register is provided for storing each of the template block pixel data and the search window pixel data. Alternatively, a plurality of data registers may be so provided that the element processor PE is arranged in correspondence to a plurality of template block pixel data.

Figure 22:
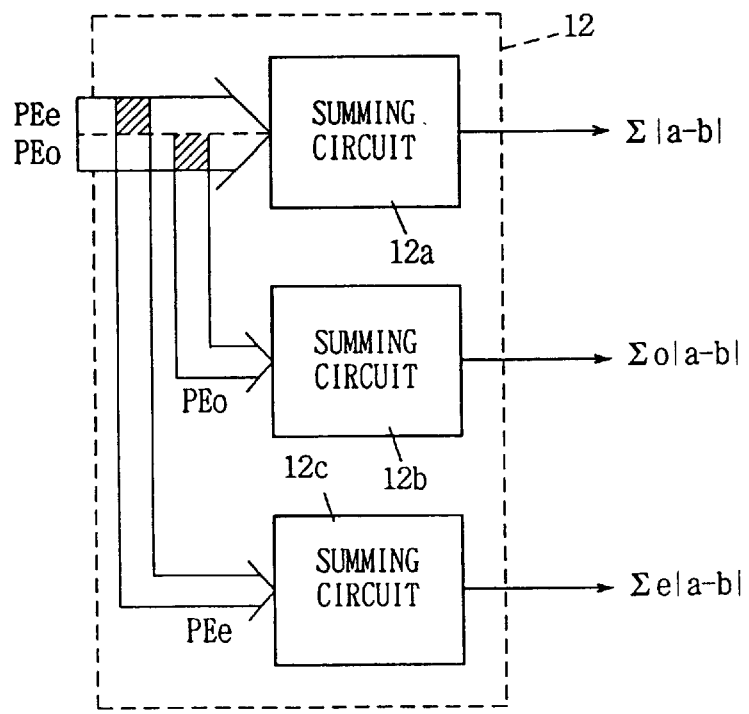
FIG. 22 illustrates a specific structure of a summing part shown in FIG. 1.

FIG. 22 illustrates the structure of the summing part 12 shown in FIG. 1. Referring to FIG. 22, the summing part 12 includes a summing circuit 12a for receiving all outputs of the element processors PE included in the processor array 10 and summing up the same, a summing circuit 12b for receiving outputs of element processors PEo (corresponding to pixels forming the odd sub template block) which are arranged in correspondence to the odd field pixels and summing up the same, and a summing circuit 12c for receiving outputs of element processors PEe (corresponding to pixels forming the even sub template block) which are arranged in correspondence to the even field pixels and summing up the same. The summing circuits 12a, 12b and 12c operate in parallel with each other, to output evaluation function values $\Sigma|a-b|$, $\Sigma_o|a-b|$ and $\Sigma_e|a-b|$ respectively. It is possible to output evaluation function values corresponding to the respective predictive modes in parallel with each other by providing the summing circuits 12a to 12c in correspondence to the respective predictive modes and driving the circuits 12a–12e in parallel with each other. Sorting of the element processors PE into the even field element processors PEe and the odd field element processors PEo is simply implemented by interconnection lines.

Figure 23:
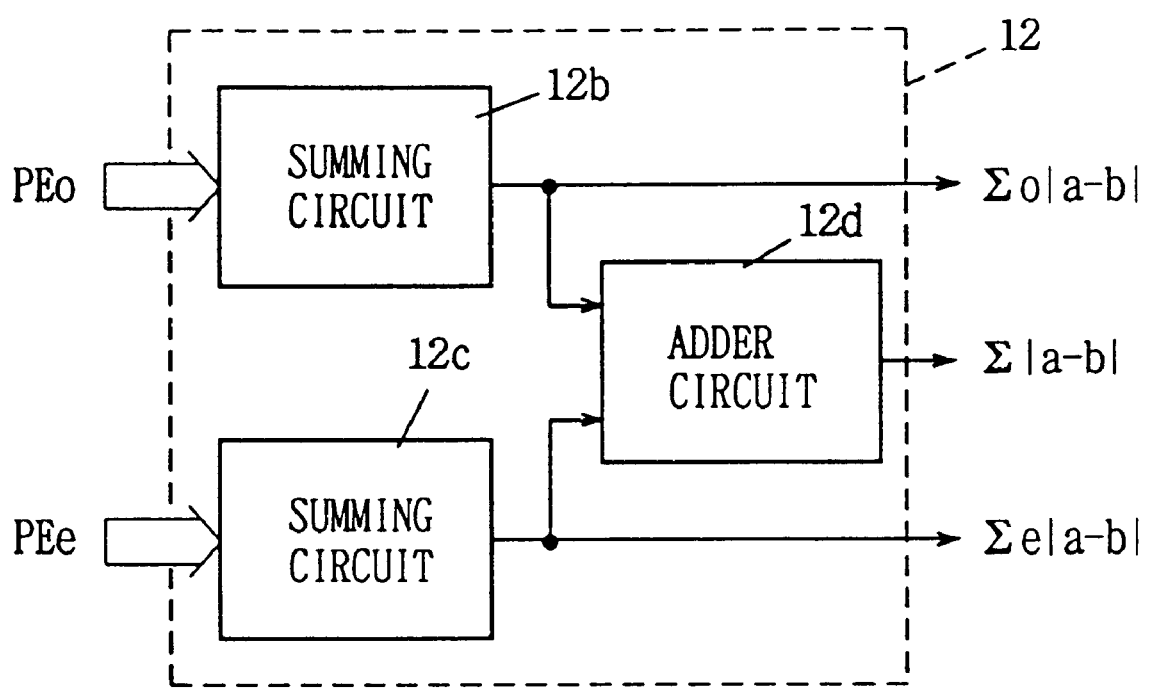
FIG. 23 illustrates another structure of the summing part shown in FIG. 1.

FIG. 23 illustrates another structure of the summing part 12. The summing part 12 shown in FIG. 23 includes an adder circuit 12d for adding up outputs of summing circuit 12b and 12c deriving evaluation function values of odd and even sub template blocks respectively, in place of the summing circuit 12a for summing up the outputs of all element processors PE. The adder circuit 12d outputs an evaluation function value $\Sigma|a-b|$ of the template block. The template block is obtained by adding up the odd and even sub template blocks. Therefore, it is possible to obtain the evaluation function value $\Sigma|a-b|$ for the template block by adding up the odd and even sub template block evaluation function values $\Sigma_o|a-b|$ and $\Sigma_e|a-b|$. The adder circuit 12d is a two-input adder circuit. Therefore, the device scale is extremely reduced as compared with the summing circuit 12a (see FIG. 22) for adding and summing up all outputs of the element processors PE provided in the processor array 10. Thus, it is possible to simultaneously calculate the evaluation function values for the plurality of predictive modes (the template block and the odd and even sub template blocks) without increasing the device scale of the summing part 12.

[Modification]

Figure 24:
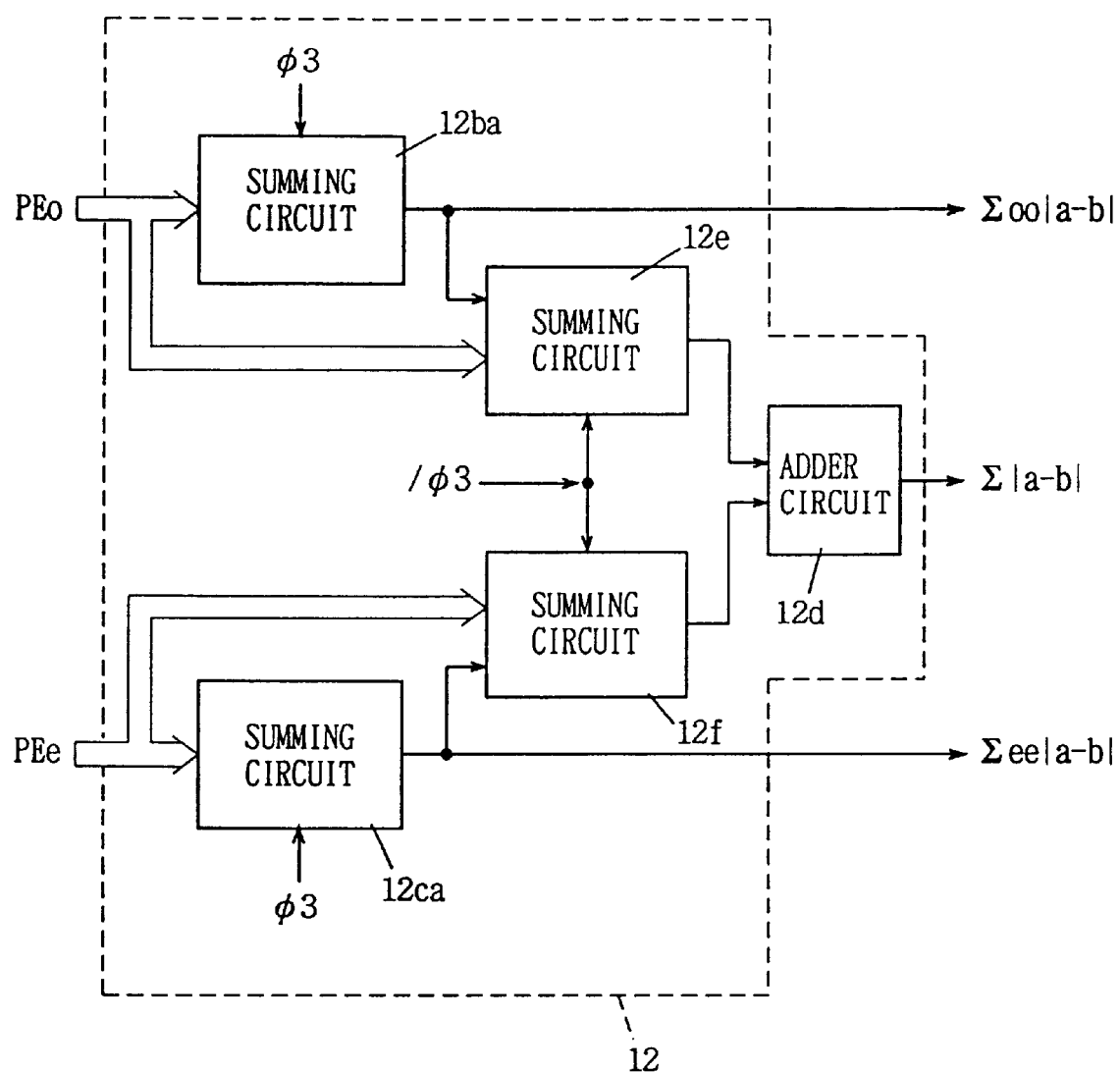
FIG. 24 illustrates still another structure of the summing part shown in FIG. 1.
Figure 25:
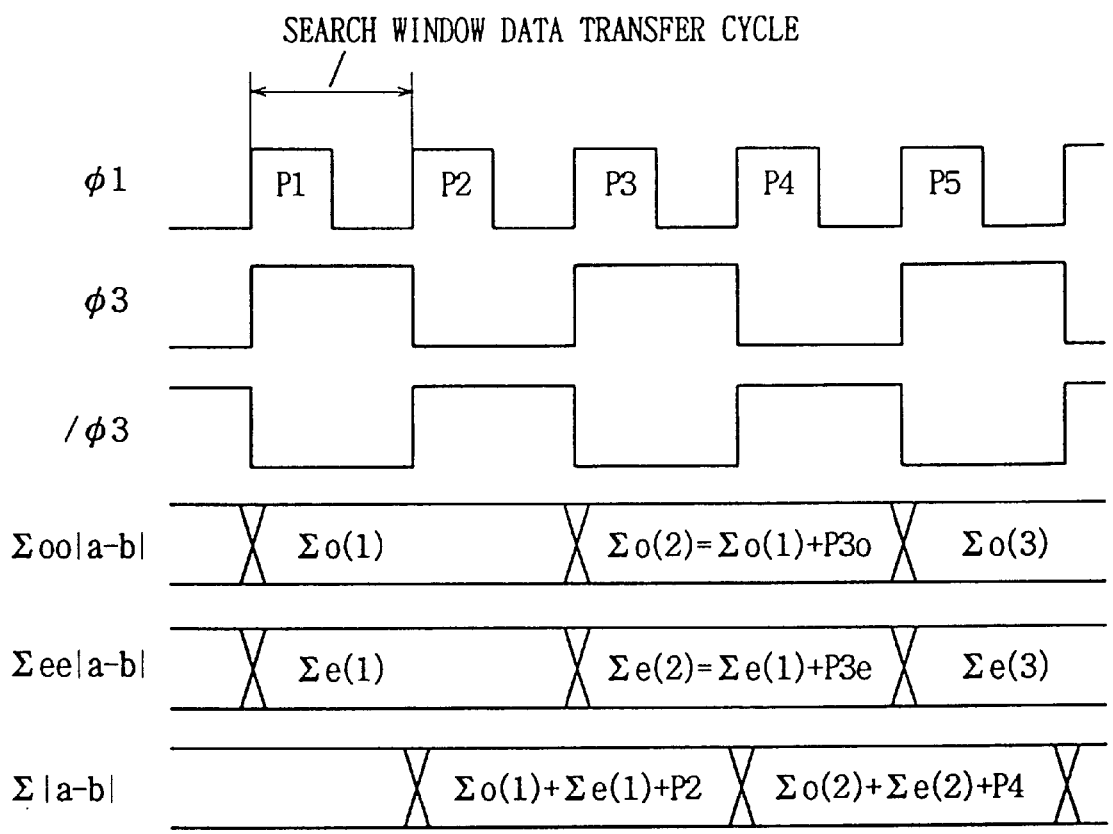
FIG. 25 is a timing chart showing the operation of the summing part shown in FIG. 24.

FIG. 24 illustrates a modification of the summing part 12 shown in FIG. 1. Referring to FIG. 24, the summing part 12 includes a summing circuit 12ba which receives outputs of element processors PEo corresponding to pixels of an odd sub template block for carrying out addition and summation in response to a clock signal $\phi 3$, a summing circuit 12ca which receives outputs of element processors PEe arranged in correspondence to pixels of the odd sub template block for carrying out summation in response to the clock signal $\phi 3$, a summing circuit 12e which receives outputs of the summing circuit 12a and the outputs of the element processors PEo arranged in correspondence to the pixels of the odd sub template block for carrying out summation in accordance with a clock signal $/\phi 3$, a summing circuit 12f which receives the outputs of the element processors PEe for the even sub template block and the summing circuit 12ca in accordance with the clock signal $/\phi 3$ for carrying out summation, and an adder circuit 12d for adding up outputs of the summing circuits 12e and 12f. The summing circuit 12ba outputs a performance evaluation value $\Sigma_{oo}|a-b|$. This evaluation function value is the sum for the pixels of the even sub template block and an odd field included in a search window block. The summing circuit 12ca outputs an absolute differential value sum $\Sigma_{ee}|a-b|$ of the pixels of the even sub template block and an even field included in the search window block as an evaluation function value. The adder circuit 12d outputs an evaluation function value $\Sigma|a-b|$ for the template block. The operation of the summing part 12 shown in FIG. 24 is now described with reference to FIG. 25 which is an operation waveform diagram thereof.

The clock signal $\phi 3$ has a period twice that of a clock signal $\phi 1$ defining a search window pixel data transfer cycle. The summing circuits 12ba and 12ca are activated to carry out summation when the clock signal φ3 is at a high level, while holding and outputting the results of the summation when the clock signal φ3 is in an inactive state of a low level. The summing circuits 12e and 12f carry out summation of supplied data when an inverted signal (180° out of phase) of the clock signal φ3, i.e., the clock signal /φ3 is at a high level, while holding and continuously outputting the results of the summation when the clock signal /φ3 is at a low level. The operation is now described with reference to FIG. 25.

It is assumed that all element processors PE of the processor array 10 output PE1. At this time, the clock signal φ3 goes high and the summing circuits 12ba and 12ca incorporate absolute differential values P1 (PEo and PEe) as supplied to carry out summation, and output results Σo(1) and Σe(1) respectively. The summing circuits 12e and 12f carry out no summation at this time, but hold and output results of summation in a precedent cycle.

When the clock signal φ3 falls to a low level, absolute differential values P2 are supplied from the element processors PE of the processor array 10. In this state, the summing circuits 12ba and 12ca carry out no operations but hold results of precedent summation. On the other hand, the summing circuits 12e and 12f execute operations, to sum up outputs of the summing circuits 12ba and 12ca and the currently supplied outputs P2 of the element processors PE. Therefore, the adder circuit 12d outputs an evaluation function value Σo(1)+Σe(1)+P2.

Then the clock signal φ1 rises to a high level, whereby the element processors PE output absolute differential values P3. The summing circuits 12ba and 12ca carry out summation, and output sums Σo(2) (=Σo(1)+P3o) and Σe(2) (=Σe(1)+P3e) respectively, where P3o and P3e represent outputs of the element processors which are provided in correspondence to the pixels of the odd and even sub template blocks respectively. Then, the element processors PE supply absolute differential values P4, whereby the summing circuits 12e and 12f carry out summation and the adder circuit 12d outputs Σo(2)+Σe(2)+P4. This operation is thereafter repeated.

Figure 26:
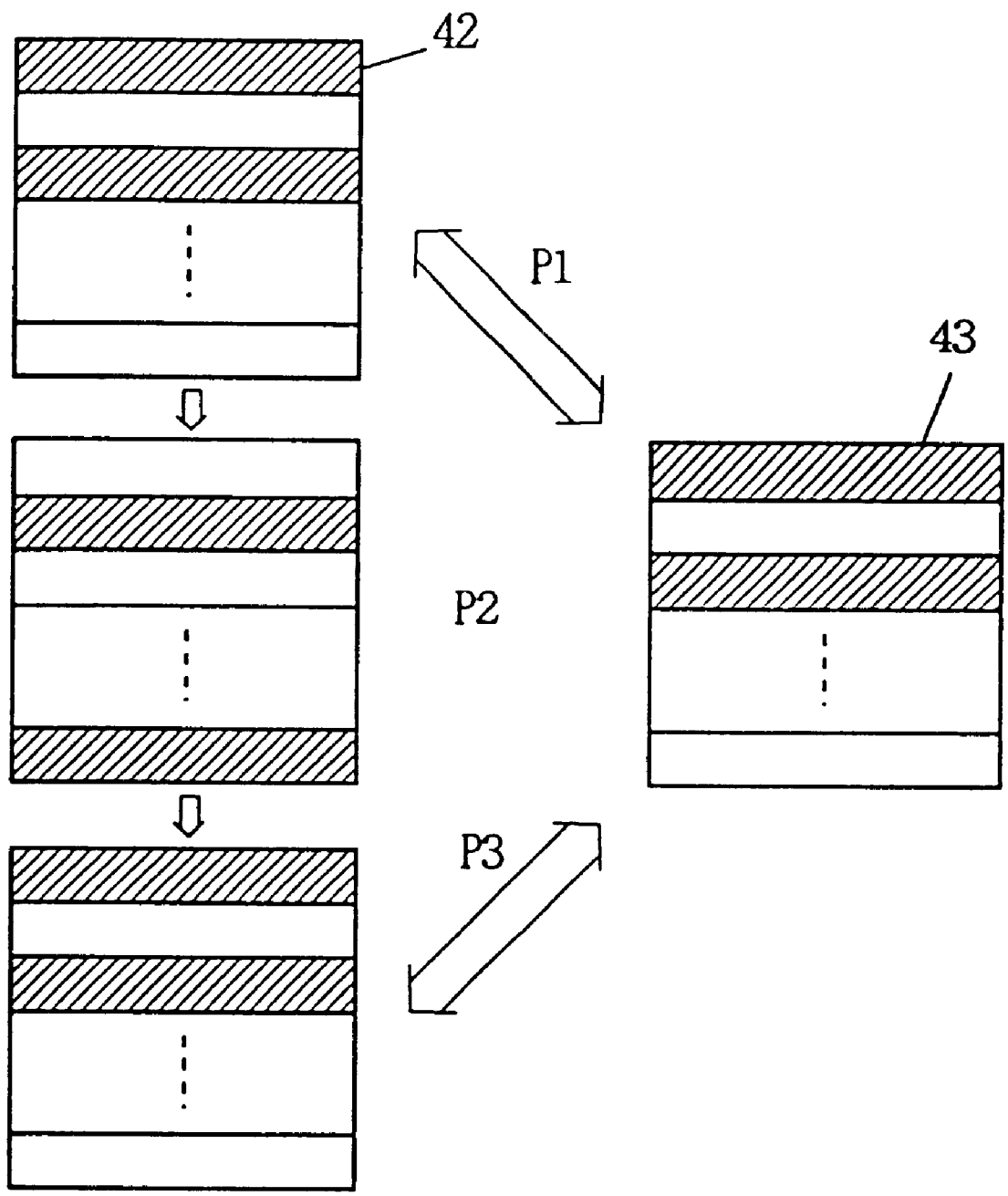
FIG. 26 illustrates the operation of the summing part shown in FIG. 24.

Namely, the summing circuits 12ba and 12ca carry out summation while culling alternate pixels respectively, and the summing circuits 12e and 12f carry out summation while compensating for the culled pixel data. As shown in FIG. 26, therefore, for each of sub template blocks (blocks formed by regions shown by slant lines in the template block 43), absolute differential values for the pixels included in the same field of a search window block 42 are taken. Namely, absolute differential values are obtained only through pixels belonging to odd fields in the search window block for the odd sub template block, while absolute differential value summation is carried out only through pixels of even fields in the search window block for the even sub template block. Thus, it is possible to implement (a) motion vector detection through employment of all pixel data in the template block and the search area in units of frames, (b) a mode of deciding the motion vector through only pixels belonging to the odd sub template block and the odd field of the search area, and (c) a mode of detecting the motion vector through only pixels belonging to the even sub template block and the even field of the search area.

Figure 27:
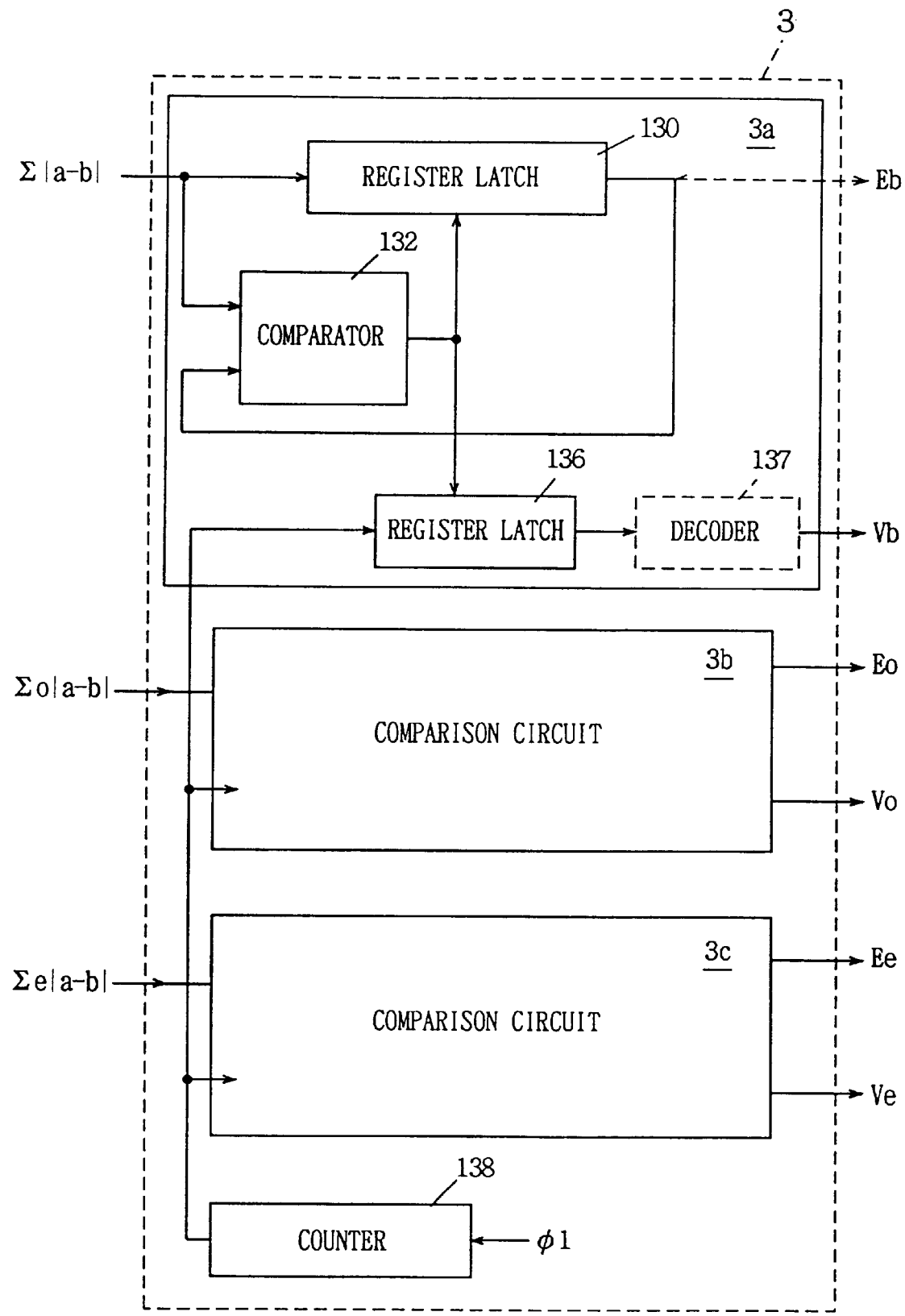
FIG. 27 illustrates the structure of a comparison part shown in FIG. 1.

FIG. 27 schematically illustrates the structure of the comparison part 3. Referring to FIG. 27, the comparison part 3 includes a comparison circuit 3a, 3b and 3c for obtaining motion vectors as to the template block and the odd and even sub template blocks; i.e., the block motion vectors Vb, Vo and Ve, respectively. The comparison circuits 3a to 3c are identical in structure to each other, and hence FIG. 27 shows only the specific structure of the comparison circuit 3a for obtaining the motion vector as to the template block, i.e., the block motion vector Vb.

The comparison circuit 3a includes a comparator 132 for comparing the evaluation function value Σ|a−b| as to the template block received from the summing part 12 with that stored in a register latch 130, and a register latch 136 for storing a count value received from a counter 138 in response to an output of the comparator 132. The comparator 132 generates data update instructing signals to the register latches 130 and 136 when the evaluation function value Σ|a−b| newly received from the summing part 12 is smaller than that stored in the register latch 130. The counter 138 counts the clock signal φ1, and generates a count value expressing the displacement vector. When an evaluation function value Σ|a−b| which is newly supplied from the summing part 12 is smaller than that previously stored in the register latch 130, therefore, the storage content of the register latch 130 is updated by the newly supplied evaluation function value, while the register latch 136 stores a count value currently received from the counter 138. The count value of the counter 138 is supplied to the comparison circuits 3b and 3c in common. Due to this structure, it is possible to detect a displacement vector providing the minimum evaluation function value in the search area while holding the minimum evaluation function value. The displacement vector value stored in the register latch 136 may be decoded by a decoder 137, to be converted to a value expressing the specific motion vector Vb. Or, the data held in the register latch 136 may be directly outputted as the motion vector. Further, the data stored in the register latch 130 may be outputted as an evaluation function value Eb for this motion vector.

The comparison circuits 3b and 3c are merely different from each other in values of the evaluation functions received from the summing part 12, and operations thereof are identical to that of the comparison circuit 3a.

[Second Embodiment]

Figure 28:
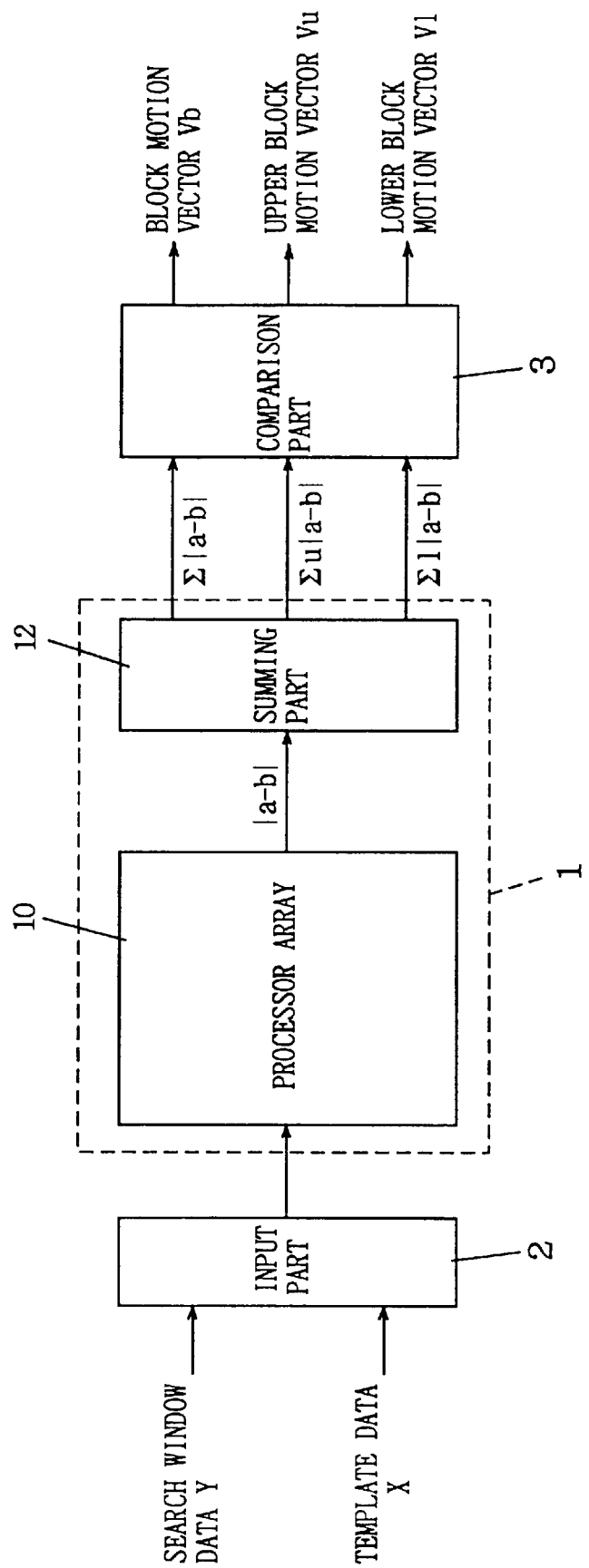
FIG. 28 illustrates the structure of a full search system motion vector detecting device according to a second embodiment of the present invention.

FIG. 28 schematically illustrates the overall structure of a motion vector detecting device according to a second embodiment of the present invention. In the structure shown in FIG. 28, a summing part 12 outputs evaluation function values Σ|a−b|, Σ$_u$|a−b| and Σ$_1$|a−b| as to a template block, an upper half block of the template block and a lower half block of the template block respectively. The structure of this summing part 12 is identical to that shown in FIG. 1, while connection between element processors which are included in a processor array 10 and summing circuits which are included in the summing part 12 is different from that shown in FIG. 1.

Figure 29:
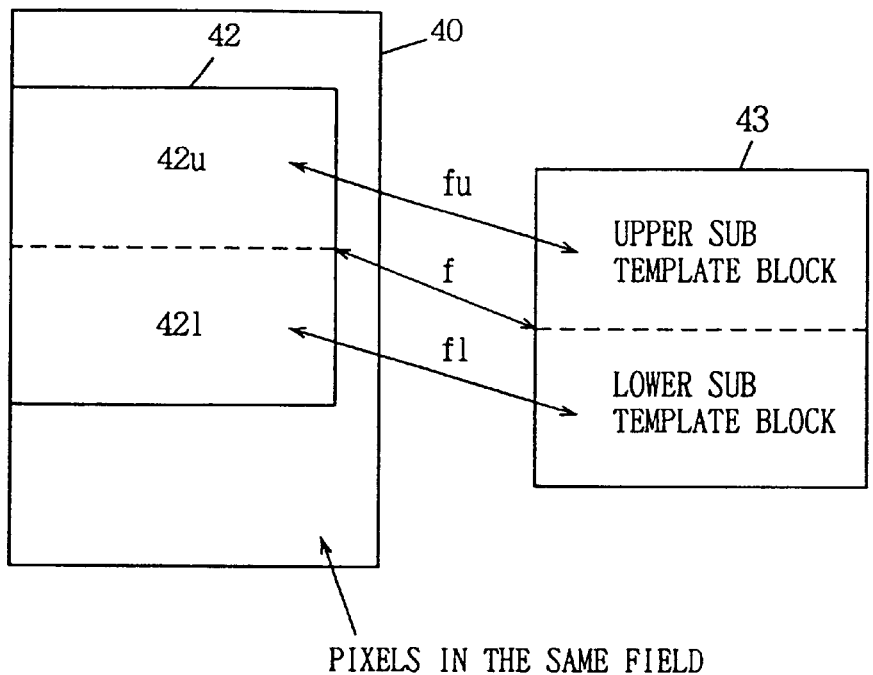
FIG. 29 illustrates structures of a template block and a search window block which are employed in the motion vector detecting device shown in FIG. 28.

In the structure of the motion vector detecting device shown in FIG. 28, a screen is formed by one field as shown in FIG. 29. A template block 43 is vertically divided into an upper sub template block 43u which is formed by pixels of the upper half block, and a lower sub template block 34l which is formed by pixels included in the lower half block.

Similarly, a search window block 42 is also divided into an upper half block 42u and a lower half block 42l. As to the upper sub template block 43u, an evaluation function value is calculated in accordance with a displacement vector fu with the upper half block 42u of the search window block 42. As to the lower sub template block 43l, evaluation function value is calculated in accordance with a displacement vector fl with the lower half block 42l of the search window block 42. Further, evaluation function value for displacement vector f as to the template block 43 and the search window block 42 is calculated.

In the processor array 10, the element processors obtain absolute differential values of corresponding pixel data in the template block 43 and the search window block 42 respectively. In one operation cycle, therefore, displacement vectors for the upper sub template block 43u, the lower sub template block 43l and the template block 43 are identical to each other.

It is possible to simultaneously calculate evaluation function values for the template block 43, the upper sub template block 43u and the lower sub template block 43l in one cycle by sorting the outputs of the element processors to the upper and lower sub template blocks 43u and 43l. The structure of the processor array 10 and pixel data transfer order are identical to those of the first embodiment shown in FIG. 1. The second embodiment is different from the first embodiment in a mode of sorting the element processors in a summing part, as hereafter described.

Figure 30:
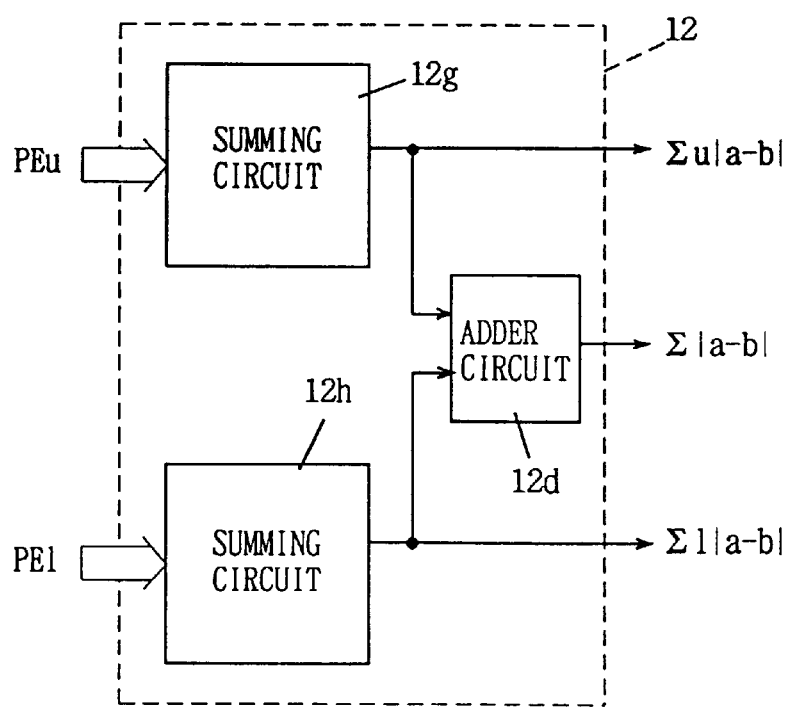
FIG. 30 illustrates the structure of a summing part shown in FIG. 28.

FIG. 30 illustrates the structure of a summing part 12 in the second embodiment. Referring to FIG. 30, the summing part 12 includes a summing circuit 12g for adding up outputs PEu of element processors which are arranged in correspondence to the upper sub template block 43u in the element processors PE included in the processor array 10, a summing circuit 12h for summing up outputs PEl of the element processors which are arranged in correspondence to the lower sub template block 43l in the element processors PE included in the processor array 10, and an adder circuit 12d for adding up outputs of the summing circuits 12g and 12h. The summing circuits 12g and 12h output the evaluation function values $\Sigma_u|a-b|$ and $\Sigma_l|a-b|$ with respect to the upper and lower sub template blocks 43u and 43l respectively. The adder circuit 12d outputs the evaluation function value $\Sigma|a-b|$ with respect to the template block 43. The sorting of the element processors PE into the upper and lower half blocks is implemented by interconnection lines.

A comparison part 3 is identical in structure to that of the first embodiment, so that an upper block motion vector Vu, a lower block motion vector Vl and a block motion vector Vb are decided in accordance with the evaluation function values $\Sigma_u|a-b|$, $\Sigma_l|a-b|$ and $\Sigma|a-b|$ respectively.

According to the aforementioned structure, it is possible to simultaneously execute the motion vector detection for a template block, that for an upper sub template block and that for a lower sub template block in a coding system of coding data in units of fields, thereby detecting optimum motion vectors in accordance with a plurality of predictive modes.

[Embodiment 3]

FIG. 31 shows correspondence between element processor groups and pixels of a template block in a motion vector detecting device according to a third embodiment of the present invention. Referring to FIG. 31, a template block 43 is formed by pixels which are arranged in 16 rows and 16 columns. The template block 43 is vertically divided on a screen into two blocks including an upper sub template block 43u which is formed by upper half block pixel data and a lower sub template block 43l including lower half block pixels. The element processor groups are also divided in correspondence to the sub template blocks 43u and 43l.

Then, the template block 43 is further divided into pixels of even and odd rows. FIG. 31 shows even rows including zeroth, second, . . . and 14th rows, and pixels of odd rows including first, third, . . . , and 15th rows. In accordance with this division, element processors PE are also divided into blocks corresponding to the even and odd row pixels respectively.

Therefore, the element processors PE are divided into four groups including an element processor group PE#0U corresponding to the pixels belonging to the upper sub template block 43u which are arranged on even rows, an element processor group PE#1U corresponding to the pixels belonging to the upper sub template block 43u which are arranged on odd rows, an element processor group PE#0L corresponding to the pixels belonging to the lower sub template block 43l which are arranged on even rows, and an element processor group PE1L corresponding to the pixels belonging to the lower sub template block 43l which are arranged on odd rows.

When the screens are formed in units of frames, the element processor groups PE#0U and PE#0L calculate evaluation function values with respect to even field sub template blocks, while the element processor groups PE#1U and PE#1L calculate evaluation function values with respect to odd field sub template blocks. When the screens are formed in units of fields, the element processor groups PE#0U and PE#1U calculate evaluation function values with respect to the upper sub template block 43u while the element processor groups PE#0L and PE#1L calculate evaluation function values with respect to the lower sub template block 43l. When the element processors PE are sorted to the four groups PE#0U, PE#1U, PE#0L and PE#1L as shown in FIG. 31, therefore, it is possible to calculate motion vectors in accordance with predictive modes which are defined for the respective screen structures by changing the combinations of the element processors PE in accordance with the screen structures.

Figure 32:
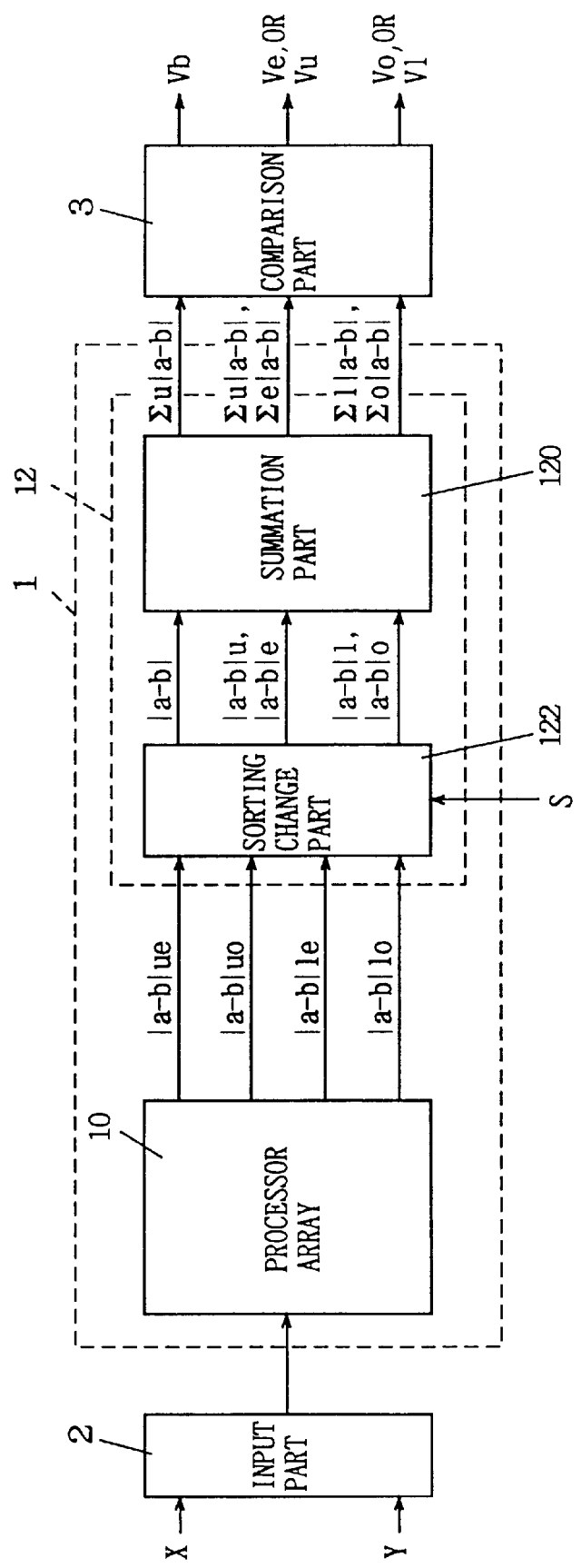
FIG. 32 illustrates the structure of the full search system motion vector detecting device according to the third embodiment of the present invention.

FIG. 32 illustrates the overall structure of the motion vector detecting device according to the third embodiment of the present invention. Referring to FIG. 32, element processors are divided into four groups PE#0U, PE#1U, PE#0L and PE#1L in a processor array 10 which is included in an operation part 1. In operation, therefore, the processor array 10 outputs absolute differential values |a−b|ue, |a−b|uo, |a−b|le and |a−b|lo in correspondence to the respective groups.

A summing part 12 includes a sorting change part 122 which changes the combination of the four absolute differential values received from the processor array 10 in response to a mode specifying signal S for grouping to absolute differential values in units of a template block and sub template blocks, and a summation part 120 for summing up the absolute differential values received from the sorting change part 122 for the respective sorts. The summation part 120 derives corresponding evaluation function values in accordance with the sorting of the absolute differential values received from the sorting change part 122, and supplies the evaluation function values to a comparison part 3. The comparison part 3 outputs a motion vector Vb for the template block and motion vectors Ve and Vo or Vu and Vl corresponding to the sub template blocks, in accordance with the evaluation function values received from the summation part 120.

When the mode specifying signal S specifies frame unit coding, the sorting change part 122 generates absolute differential value groups |a−b|, |a−b|o and |a−b|e for the template block, the odd sub template block and the even sub template block respectively. When the mode specifying signal S specifies field unit coding, on the other hand, the sorting change part 122 generates absolute differential value groups |a−b|, |a−b|u and |a−b|l in the unit of the template block, from the upper sub template block employing the upper half block and the lower sub template block formed by a lower half pixel group respectively.

As shown in FIG. 32, it is possible to readily form motion vectors which are employed for detecting predictive picture images in units of frames and fields respectively by changing the combination of the four absolute differential value groups outputted from the processor array 10 in the sorting change part 122 by the mode specifying signal. It is possible to implement a motion vector detecting device having high flexibility, which can accommodate coding of different screen formats.

[Modification]

Figure 33:
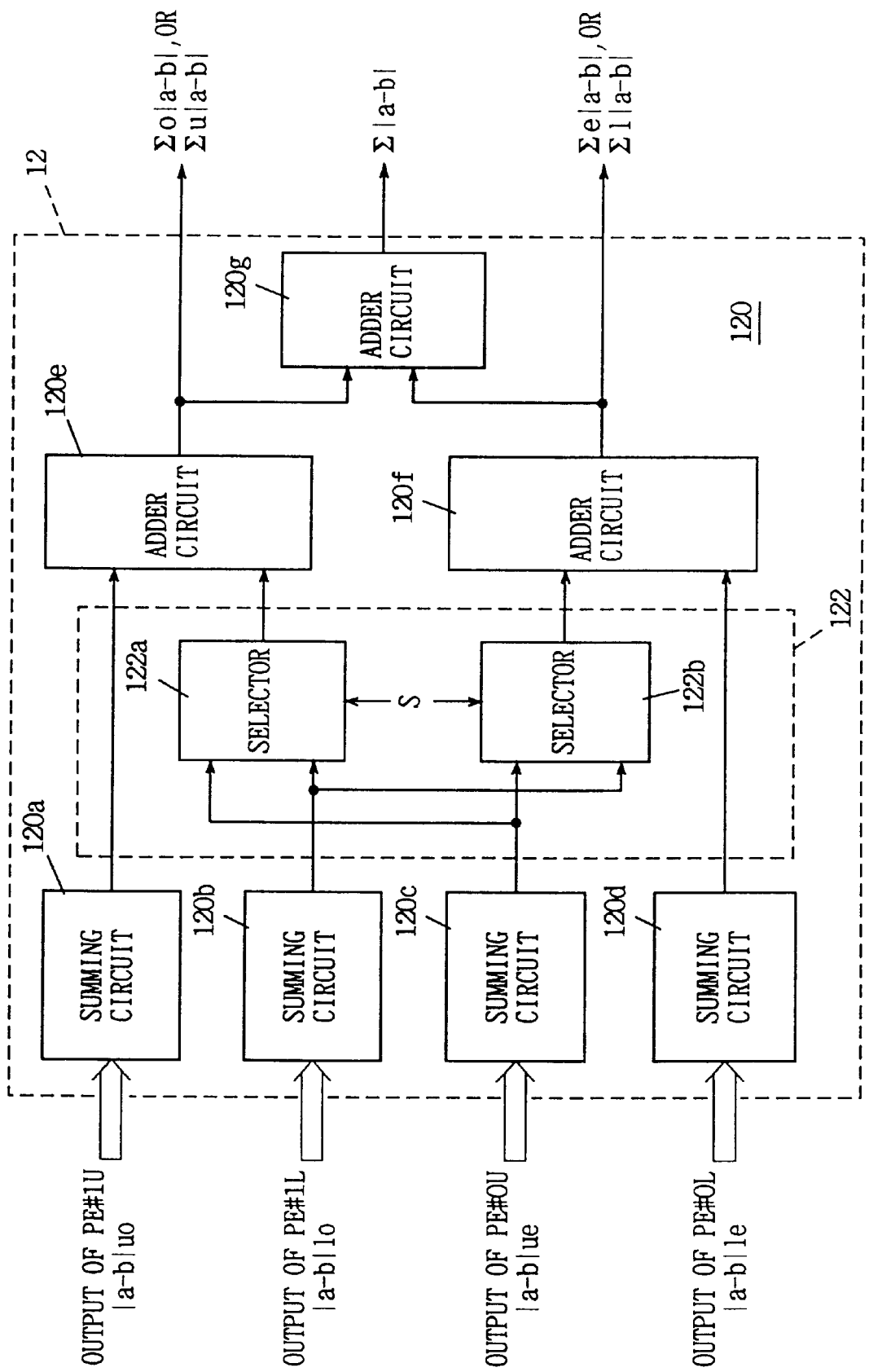
FIG. 33 schematically illustrates the structure of a summing part shown in FIG. 32.

FIG. 33 illustrates a modification of the summing part 122 shown in FIG. 32. Referring to FIG. 33, the summing part 12 includes summing circuits 120a, 120b, 120c and 120d which are provided in correspondence to element processor groups PE#1U, PE#1L, PE#0U and PE#0L provided in a processor array for summing up outputs |a−b|u0, |a−b|l0, |a−b|ue and |a−b|le from corresponding groups, and a sorting change part 122 which switches data transmission paths of two of the four summing circuits, i.e., the summing circuits 120b and 120c. The sorting change part 122 includes selectors 122a and 122b for switching the data transmission paths of the summing circuits 120b and 120c respectively. The selector 122a selects the output of the summing circuit 120b when a mode specifying signal S indicates frame unit coding, while the selector 122b selects the output of the summing circuit 120c when the mode specifying signal S indicates frame unit coding.

The summing part 12 further includes an adder circuit 120e which adds up outputs from the summing circuit 120a and the selector 122a, an adder circuit 120f which adds up outputs from the summing circuit 120d and the selector 122b, and an adder circuit 120g which adds up outputs of the adder circuits 120e and 120f respectively. The adder circuit 120e outputs an evaluation function value Σo|a−b| or Σu|a−b| for an odd or upper sub template block. The adder circuit 120g outputs an evaluation function value Σ|a−b| for a template block. The adder circuit 120f outputs an evaluation value Σe|a−b| or Σl|a−b| for an even or lower sub template block.

The structure in which the summing part 12 includes in an input part the summing circuits 120a to 120d in correspondence to the respective element processor groups and the transmission paths of the outputs of the two summing circuits 120b and 120c are switched, provides the following advantage:

When the structure of the summing part 12 shown in FIG. 32 is simply implemented and transmission paths for the outputs of the element processors are switched in response to the mode specifying signal, it is necessary to provide selectors for switching the transmission paths for the respective element processors. Consequently, the number of the selectors is increased to increase the device scale. On the other hand, each of the summing circuits 120b and 120c is in charge of a group of element processors, the number of which is halved as compared with the case of the provision for each of the summing circuits 12b and 12c shown in FIG. 23. Although the number of the summing circuits is increased in the structure shown in FIG. 33 as compared with that shown in FIG. 23, the occupied area thereof is not much increased. Only two selectors are required for switching the transmission paths for the summing circuits 120b and 120c, whereby the number of the elements can be remarkably reduced to reduce the device scale. The adder circuits 120e, 120f and 120g are two-input adder circuits which are smaller in scale than summing circuits. Thus, the occupied area of the device is not much increased by provision of the adder circuits 120e and 120f. Therefore, it is possible to extremely reduce the occupied area of the device by providing the summing circuits in the input part in correspondence to the respective element processor groups while switching the transmission paths for the outputs of two of the four summing circuits as shown in FIG. 33.

In place of the structure shown in FIG. 33, the selectors 122a and 122b may be adapted to receive the outputs of the element processor groups PE#1L and PE#0U with provision of a summing circuit for summing up outputs of one selector and the element processor group PE#1U and that for summing up outputs of the other selector and the remaining element processor group PE#0L. This structure substantially corresponds to that shown in FIG. 23.

[Embodiment 4]

Figure 34A:
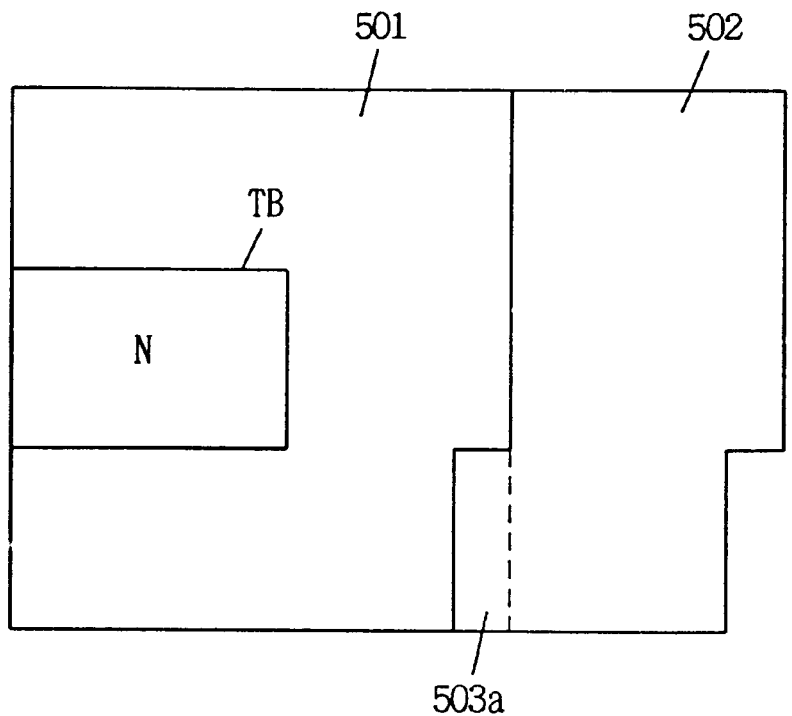
FIGS. 34A and 34B are diagrams illustrating an operation principle of a fourth embodiment of the present invention.
Figure 34B:
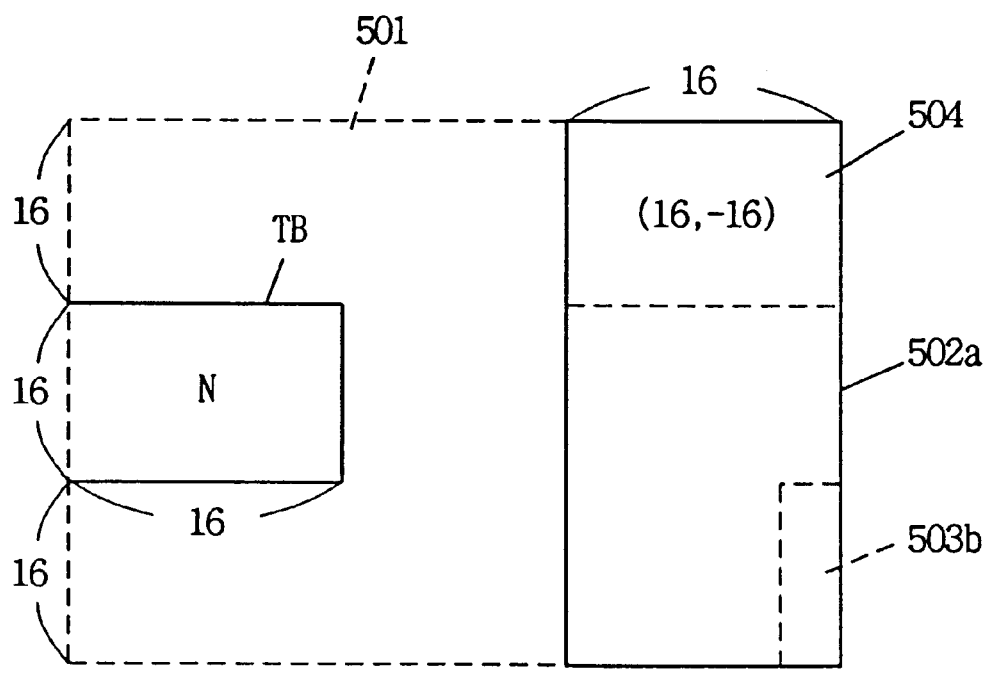

When the search window data are shifted (16+16+16)·15+(16+16)=752 times in the processor array by repeating shift-in and shift-out operations as hereinabove described, all displacement vectors (evaluation function values) are obtained as to a search area (search range) with respect to one template block (block N) as shown in FIG. 34A, so that it is possible to decide motion vectors with respect to the template block TB (block N). At this time, a region 503a is present in the processor array while search window pixel data of a search area 502 which is adjacent thereto are also stored in processors and data buffers of the processor array, as shown in FIG. 34A. When 16 pixels included in this region 503a are shifted out while subsequent 16 reference pixels (search window data) of the region 502 are shifted in, therefore, pixel data of a search window block 504 of the displacement vector (16, −16) are stored in the processor array, as shown in FIG. 34B. Assuming that 752+16=768 cycles form one processing unit, therefore, it is possible to search motion vectors in the range of 16 horizontal displacements×33 vertical displacements. Thus, it is possible to expand the horizontal search range for searching the motion vectors by repeating the processing unit a plurality of times, thereby widening the search area in the horizontal direction for searching the motion vectors.

When element processors are arranged in one-to-one correspondence to search window pixels of Q rows and P columns respectively and each data buffer stores R pixel data, motion vector search for a unit search area is executed in P·(Q+R) cycles. The number of displacement vectors searched at this time are (R+1) per shift-out operation for pixel data of a single column of the search window, and hence P·(R+1) displacement vectors can be evaluated. In this case, the horizontal search range is P.

Figure 35:
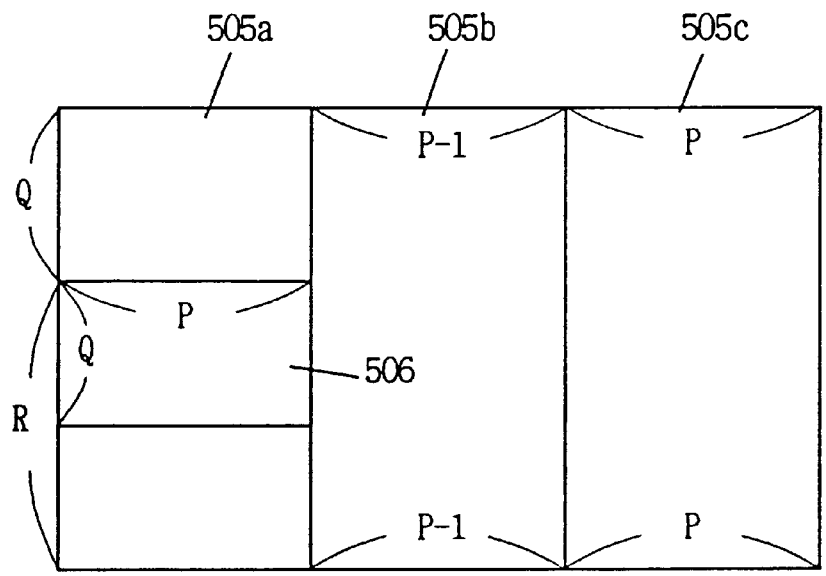
FIG. 35 is a diagram used for explaining an operation of extending a horizontal search area of the fourth embodiment.

Assuming that a search window block 506 has P columns and Q rows, a search window 505a is (Q+R)·P in size and search areas are formed by regions 505a and 505b as shown in FIG. 35, it is necessary to shift reference picture image pixel data (search window pixel data) (P−1)·(Q+R)+R times in order to evaluate all displacement vectors in the search areas 505a and 505b. When the reference picture image pixel data are further shifted R times, the processor array stores reference picture image pixel data included in a region 505c. Therefore, (P−1)·(Q+R)+R=P·(Q+R) cycles are required in total in order to store the pixel data of a search window of the region 505c in the processor array. (R+1) displacement vectors are evaluated in the respective columns of the search areas, whereby the number of the displacement vectors as evaluated is P·(R+1).

Figure 36:
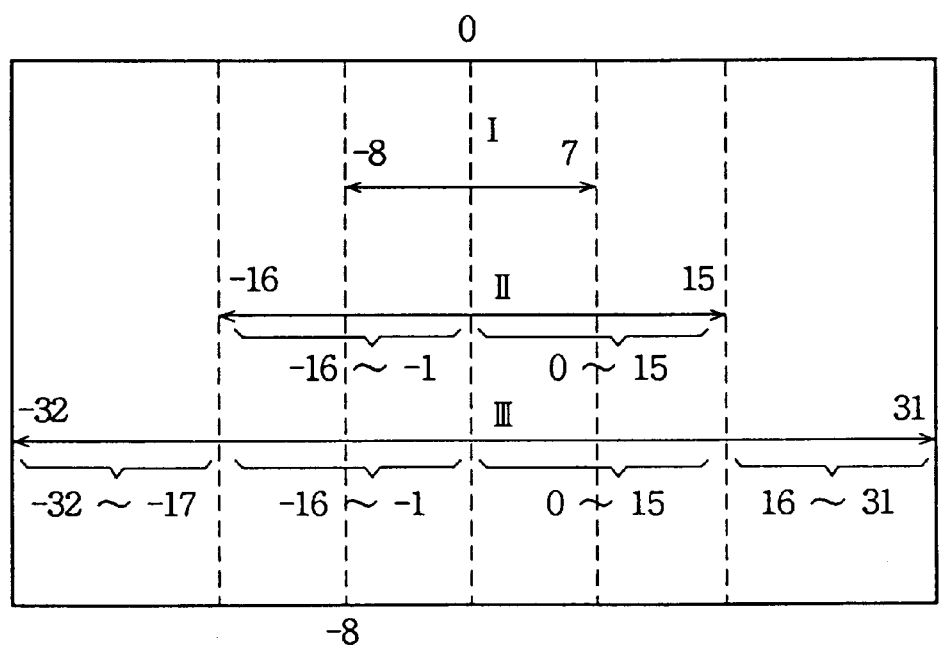
FIG. 36 illustrates a specific example of the extension of the horizontal search area of the fourth embodiment.

FIG. 36 shows specific examples of horizontal search ranges. Referring to FIG. 36, the horizontal search range of a case (I) is −8 to 7, and that of a case (II) is −16 to +15. In this case, motion vectors are searched as to the horizontal range of −16 to −1 in one processing unit and as to the horizontal range of 0 to +15 in another processing unit.

In a case (III), on the other hand, it is assumed that the horizontal search range is −32 to +31. In this case, four processing unit cycles are required so that motion vectors are searched as to the horizontal ranges of −32 to −17, −16 to −1, 0 to +15 and 16 to +31 respectively in respective processing units.

FIGS. 37A to 37C illustrate motion vector search operation sequences in various horizontal search ranges −8 to +7, −16 to +15 and −32 to +31 respectively.

As shown in FIG. 37A, template blocks are updated every processing unit time (768 cycles) as to the horizontal search range of −8 to +7. Namely, the motion vectors of the template blocks are decided every processing unit time T. FIG. 37A shows such a state that the motion vectors are successively decided as to template blocks N, N+1, . . .

As shown in FIG. 37B, two processing unit times 2T are required as to the horizontal search range of −16 to +15. The motion vectors are searched in the horizontal ranges of −16 to −1 and 0 to +15 in the first and second processing unit times respectively. Motion vectors for each single template block are decided every two processing unit times 2T.

As shown in FIG. 37C, four processing times 4T are required for a single template block as to the horizontal search range of −32 to +31, since motion vectors are detected as to 16 horizontal ranges in one processing unit time T.

When the vertical search range is −16 to +16, it is possible to search motion vectors in the range of 16 horizontal displacements and 33 vertical displacements assuming that the processing unit time is formed by 768 cycles as hereinabove described, whereby it is possible to readily expand the horizontal search range by grasping the processing unit time in advance.

FIGS. 37A to 37C show no template update cycle numbers, but only processing times required for deciding motion vectors as to each single template block are simply considered.

Figure 38:
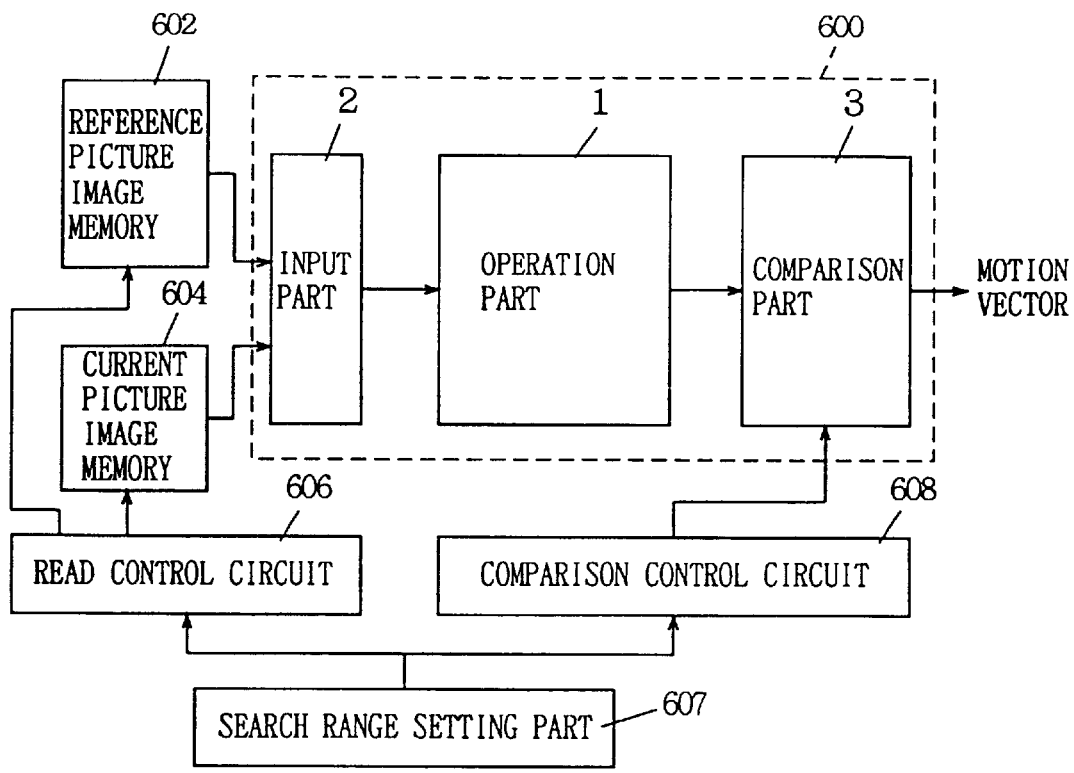
FIG. 38 illustrates an overall construction of a motion vector detecting device according to the fourth embodiment.

FIG. 38 illustrates the overall structure of a motion vector detecting device 600 which is employed for a fourth embodiment of the present invention. As described with reference to the previous embodiments, the motion vector detecting device 600 comprises an input part 2 for inputting search window pixel data and template block pixel data, an operation part 1 for performing prescribed arithmetic operations on the search window pixel data and the template block pixel data received from the input part 2 for forming evaluation function values with respect to displacement vectors, and a comparison part 3 for deciding motion vectors for the template blocks in accordance with the evaluation function values received from the operation part 1. FIG. 38 is so illustrated that only one motion vector is formed although evaluation function values and motion vectors are formed in accordance with three predictive modes respectively.

The motion vector detecting device 600 further includes a reference picture image memory 602 storing reference screen picture image pixel data, a current picture image memory 602 storing current screen pixel data, a read control circuit 606 for controlling pixel data read operations of the reference picture image memory 602 and the current picture image memory 604, a comparison control circuit 608 for controlling a comparison operation of the comparison part 3, i.e., a motion vector detecting operation, and a search range setting part 607 for setting a horizontal motion vector search range and supplying the set horizontal search range information to the read control circuit 606 and the comparison control circuit 608.

The comparison control circuit 608 sets the number of a motion vector detecting operation cycles in the comparison part 3 in accordance with the horizontal search range information received from the search range setting part 607. On the other hand, the read control circuit 606 sets a pixel data read region of the reference picture image memory 602 and a timing for reading the current picture image pixel data from the current image memory 604 in accordance with the horizontal search range information received from the search range setting part 607.

Figure 39:
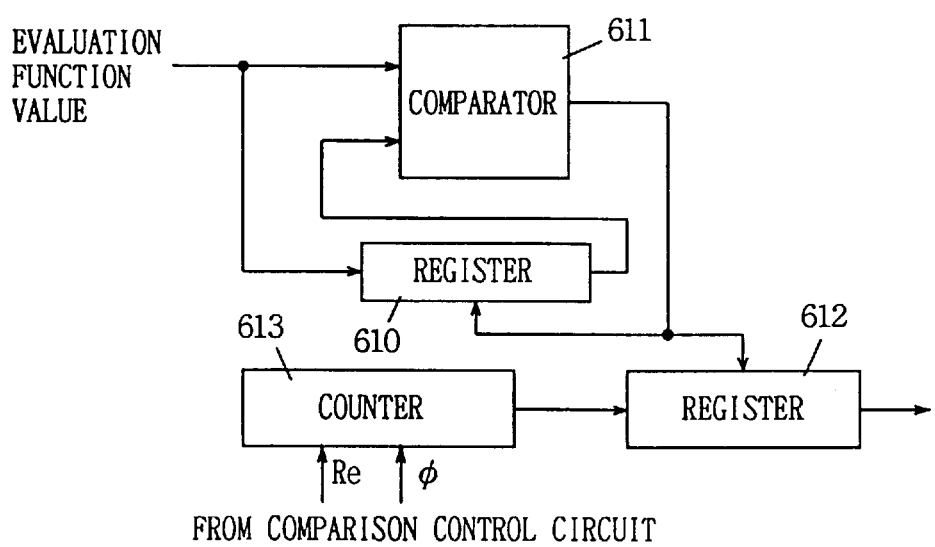
FIG. 39 illustrates an example of a comparison part shown in FIG. 38.

FIG. 39 shows an exemplary structure of the comparison part 3 shown in FIG. 38. Referring to FIG. 39, the comparison part 3 includes a register 610 storing motion vector candidate evaluation function values, a comparator 611 for comparing the candidate evaluation function values stored in the register 610 with evaluation function values received from the operation part 1, a counter 613 generating values indicating displacement vectors of the respective evaluation function values, and a register 612 storing the count values of the counter 613 as motion vector candidates in accordance with an output signal of the comparator 611. Contents of the registers 610 and 612 are updated when the comparator 611 indicates that an evaluation function value received from the operation part 1 is smaller than that stored in the register 610. Namely, the register 610 stores an evaluation function value currently received from the operation part 1, while the register 612 stores a count value received from the counter 613.

The counter 613 counts a clock signal $\phi$ which is supplied from the comparison control circuit 608 to generate displacement vector information, and its count value is reset in accordance with a reset signal Re which is generated in completion of a processing period. The comparison control circuit 608 changes a generation timing for the reset signal Re in accordance with the horizontal search range set information received from the search range setting part 607.

Figure 40:
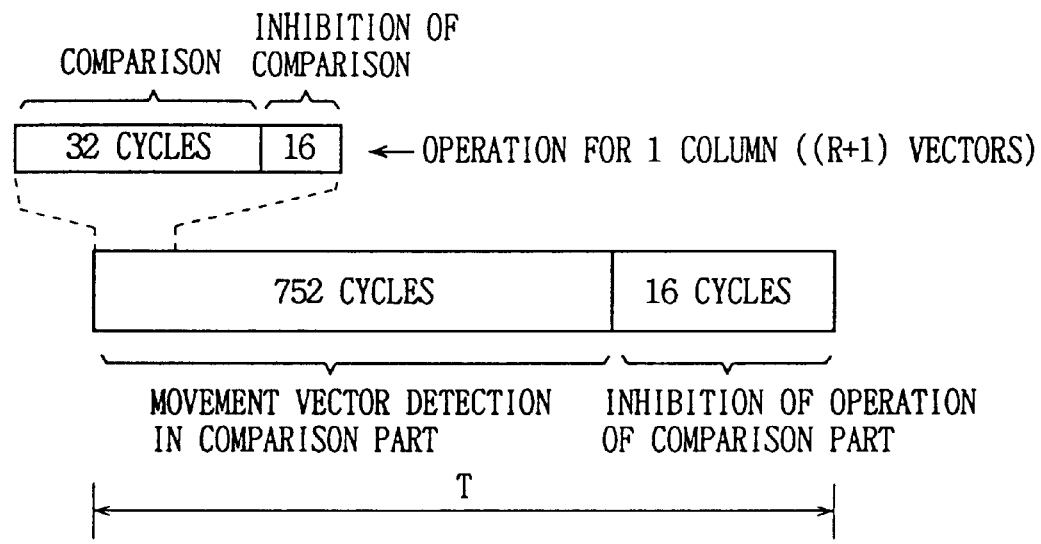
FIG. 40 is a diagram used for explaining an operation of a comparison part shown in FIG. 39.

FIG. 40 illustrates the operation of the comparison control circuit 608. As shown in FIG. 40, the comparison control circuit 608 supplies the clock signal $\phi$ to the counter 613 over 32 cycles, so that the counter 613 counts the same. The clock signal $\phi$ is not generated and inactivated in the next 16 cycles, in order to relatively move a template block, which has been relatively moved to the lowermost portion of the search window, again to an upper portion (−16 in the vertical direction). The shift operation is repeated for 752 cycles in a small unit of 48 cycles. Motion vectors are searched as to 16 horizontal displacements by the 752 cycles. Generation of the clock signal $\phi$ is again inhibited (inactivated) in the next 16 cycles. The 752 cycles +16 cycles correspond to one processing unit time T. The comparison control circuit 608 sets a motion vector search range in accordance with the horizontal search range information which is set by the search range setting part 607. In the range as set, the operation is repeated in the unit of operation cycles for one column, i.e., 48 cycles.

Figure 41:
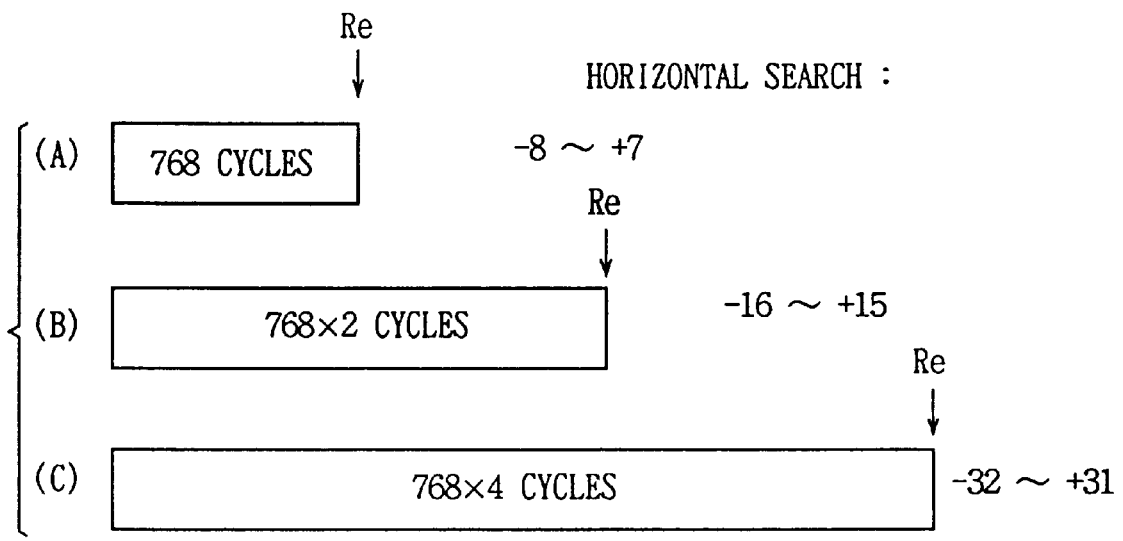
FIG. 41 is a diagram used for explaining the operation of the comparison part shown in FIG. 39.

FIG. 41 shows reset timings for the count values of the counter 613. As shown in FIG. 41, the reset signal Re is generated (activated) every 768 cycles when the horizontal search range is −8 to +7. The reset signal Re is generated every 768·2 cycles when the horizontal search range is −32 to +31, while the former is generated every 768·4 cycles when the latter is −32 to +31. It is possible to readily change the motion vector search range by varying the generation timing for the reset signal Re with the processing time.

As to the structure of the counter 613, counters indicating horizontal and vertical positions H and V may be provided separately from each other, while a binary counter may be simply employed to generate H information and V information in accordance with its count value.

When comparison is inhibited, update operations of the registers 610 and 612 (see FIG. 39) are also inhibited, as a matter of course. The output of the comparator 611 may be forcibly set in a register non-update state during a comparison inhibiting period. Alternatively, the comparing operation of the comparator 611 (see FIG. 39) may be inhibited.

Figure 42:
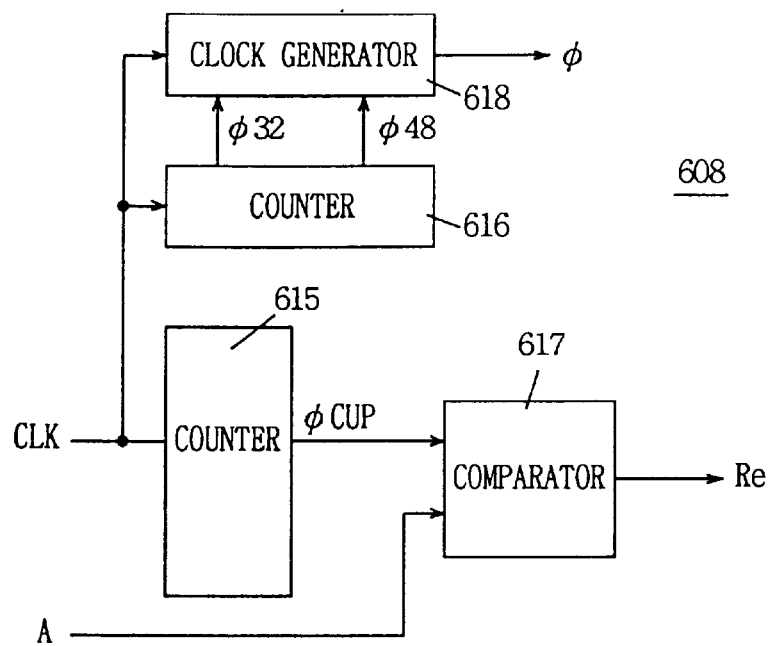
FIG. 42 illustrates an example of a comparison control circuit shown in FIG. 38.

FIG. 42 illustrates an exemplary structure of the comparison control circuit 608 shown in FIG. 38. Referring to FIG. 42, the comparison control circuit 608 includes counters 615 and 616 for counting a clock signal CLK which is generated in application of pixel data from the reference picture image memory 602 to a processor array (included in the operation part 1), a comparator 617 for comparing horizontal search range set information A received from the search range setting part 607 and a count-up signal φCUP from the counter 615 with each other, and a clock generator 618 for generating the clock signal φ in accordance with a 32-count indicating signal φ32 and a 48-count indicating signal φ48 received from the counter 616. The counter 615 generates the count-up signal φCUP when it counts the number of clock cycles included in one processing unit time. The horizontal search range set information A specifies what times as large as a unit search range the horizontal search range is. The comparator 617 compares the count-up signal φCUP from the counter 615 with the horizontal search range set information A, and generates (activates) the reset signal Re when the comparison indicates coincidence.

The counter 616 generates the count-up signal φ32 upon counting the clock signal CLK 32 times, while generating the count-up signal φ48 upon counting the signal CLK 48 times. The counter 616, the maximum count value of which is set at 48, generates the count-up signal 448 when pixel data of one column of the search window are processed. When the count-up signal φ32 is received from the counter 616, the clock generator 618 inactivates the clock signal φ until the next count-up signal φ48 is received. Until the count-up signal φ32 is generated (activated), the clock generator 618 generates the clock signal φ in accordance (synchronization) with the clock signal CLK. The clock signal φ from the clock generator 618 controls the count operation of the counter 613 (see FIG. 39) included in the comparison part 3.

It is possible to readily control the horizontal motion vector search range in the comparison part 3 by employing the structure of the comparison control circuit 608 shown in FIG. 42.

Figure 43:
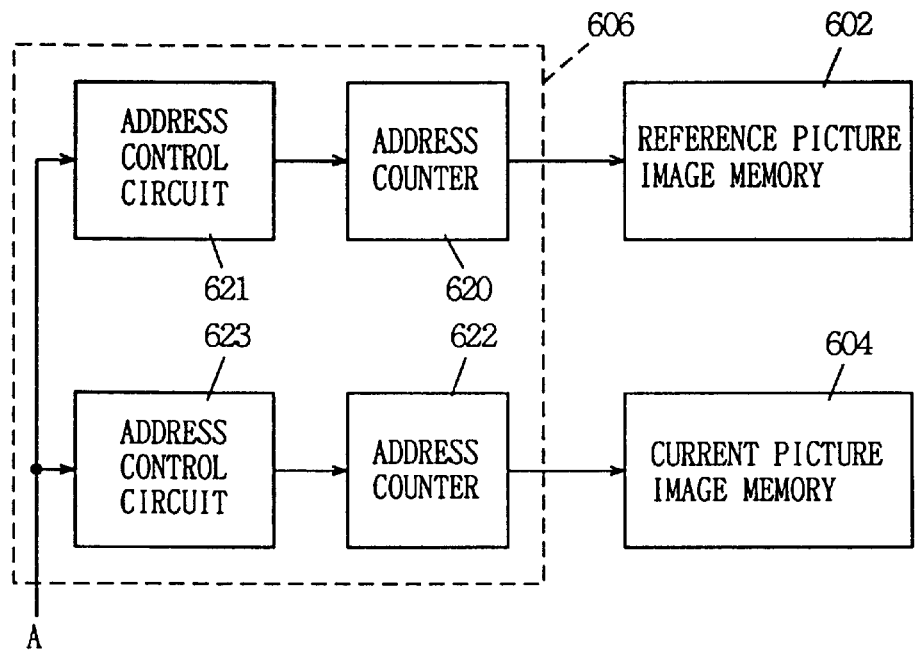
FIG. 43 schematically illustrates a construction of a read control circuit shown in FIG. 38.

FIG. 43 illustrates an exemplary structure of the read control circuit 606 shown in FIG. 38. Referring to FIG. 43, the read control circuit 606 includes an address counter 620 for generating read addresses for the reference picture image memory 602, an address control circuit 621 for setting an initial count value and a count range of the address counter 620 in accordance with the horizontal search range set information A, an address counter 622 for generating read addresses for the current picture image memory 604, and an address control circuit 623 for setting an operation timing and an initial address of the address counter 622 in accordance with the horizontal search range set information A. The address control circuit 621 sets the range of addresses related to horizontal pixel data among those generated from the address counter 620 in accordance with the horizontal search range information A. The address control circuit 623 generates a pointer indicating the position of a template block and supplies the same to the address counter 622. The address counter 622 generates the read addresses in accordance with the pointer information indicating the position of the template block, so that template block pixel data are read from the current picture image memory 604. The address control circuit 623 sets a generation timing for the pointer indicating the position of the template block to the address counter 622 at A·T in accordance with the horizontal search range set information A. In the address counter 620, on the other hand, a column address range in the reference picture image memory 602 is set at A times under control by the address control circuit 621. Thus, it is possible to read the reference picture image pixel data and the template block pixel data at desired timings respectively in response to the horizontal search range as specified.

While the horizontal search range can be set on a basis of an integer multiple of the processing unit time T as clearly understood from the operation of the comparison part 3 shown in FIG. 40, it is also possible to increase the horizontal search range column by column. Since a 32-cycle motion vector evaluating operation and a 16-cycle reference picture image pixel data input operation for next column vector evaluation are carried out in each column and the motion vector detecting operation is carried out in the units of the operations of the respective columns, it is also possible to increase/decrease the horizontal search range column by column. In this case, it is possible to utilize the aforementioned structure by forming the processing unit by one column and setting the horizontal search range information A at a value indicating the horizontal search range.

According to the fourth embodiment of the present invention, as hereinabove described, it is possible to change the horizontal search range for the motion vectors for setting the optimum horizontal search range depending on the application of the processing, thereby readily constructing a picture image coding system having high generality or versatility.

[Embodiment 5]

Figure 44:
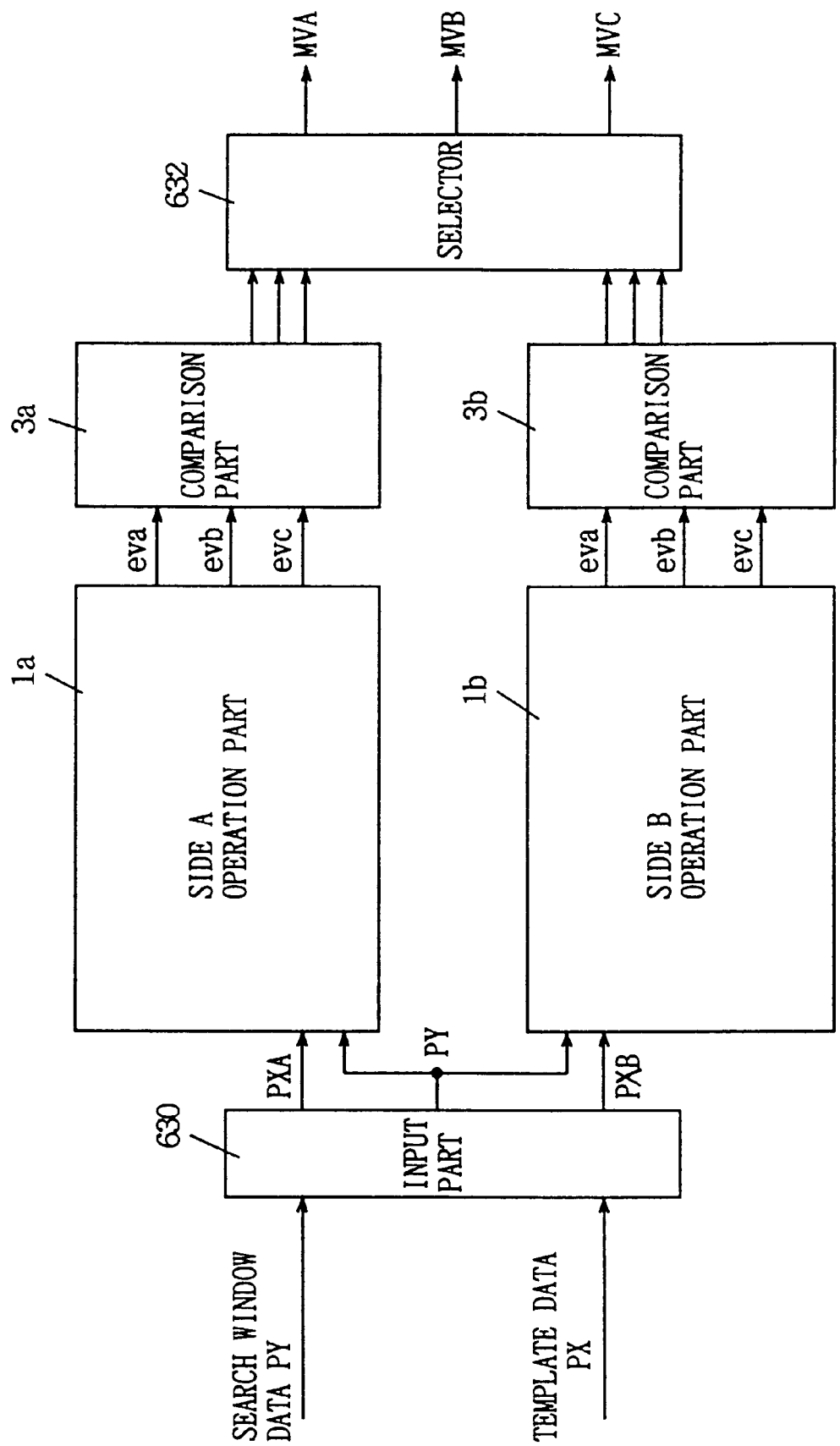
FIG. 44 schematically illustrates an overall arrangement of a motion vector detecting device according to a fifth embodiment of the present invention.

FIG. 44 schematically illustrates the overall structure of a motion vector detecting device according to a fifth embodiment of the present invention. Referring to FIG. 44, the motion vector detecting device includes a side A operation part 1a and a side B operation part 1b which are provided in parallel with each other. Each of the side A and B operation parts 1a and 1b includes the processor array 10 and the summing part 12 described with reference to the aforementioned embodiment (see FIG. 1). The motion vector detecting device further includes a comparison part 3a which receives evaluation function values eva, evb and evc generated by the side A operation part 1a in accordance with three predictive modes for deciding optimum motion vectors therefor respectively, a comparison part 3b which receives evaluation function values eva, evb and evc generated by the side B operation part 1b in accordance with a plurality of predictive modes for deciding optimum motion vectors therefor respectively, a selector 632 which alternately selects the motion vectors outputted from the comparison parts 3a and 3b for outputting motion vectors MVA, MVB and MVC of the side A and B operation parts 1a and 1b respectively, and an input part 630 which alternately supplies externally received template block pixel data PX to the side A and B operation parts 1a and 1b every processing unit time while supplying externally received search window pixel data PY to the side A and B operation parts 1a and 1b in common. Horizontal search ranges of the side A and B operation parts 1a and 1b are set at −16 to +15. Thus, each of the side A and B operation parts 1a and 1b requires two processing unit times, i.e., 2T, for processing each template block. Therefore, the input part 630 alternately updates template block pixel data every processing unit time T, while the selector 632 switches the motion vectors outputted from the comparison parts 3a and 3b every processing unit time T for outputting the same.

Figure 45:
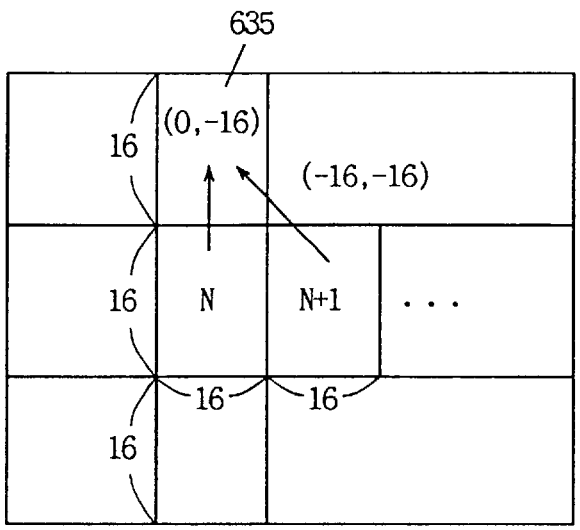
FIG. 45 is a diagram used for explaining an operation of the motion vector detecting device according to the fifth embodiment.

As shown in FIG. 45, a search window block 635 has displacement vectors (0, −16) and (−16, −16) with respect to template blocks N and N+1 respectively. The template block N is stored in the processor array of the side A operation part 1a, for example, while pixel data of the template block N+1 are stored in the side B operation part 1b. When search window pixel data PY are applied to the side A and B operation parts 1a and 1b in common, it is possible to search motion vectors for two template blocks in a parallel manner. Difference resides in movement detecting operation starting timings at the side A and B operation parts 1a and 1b.

Figure 46:
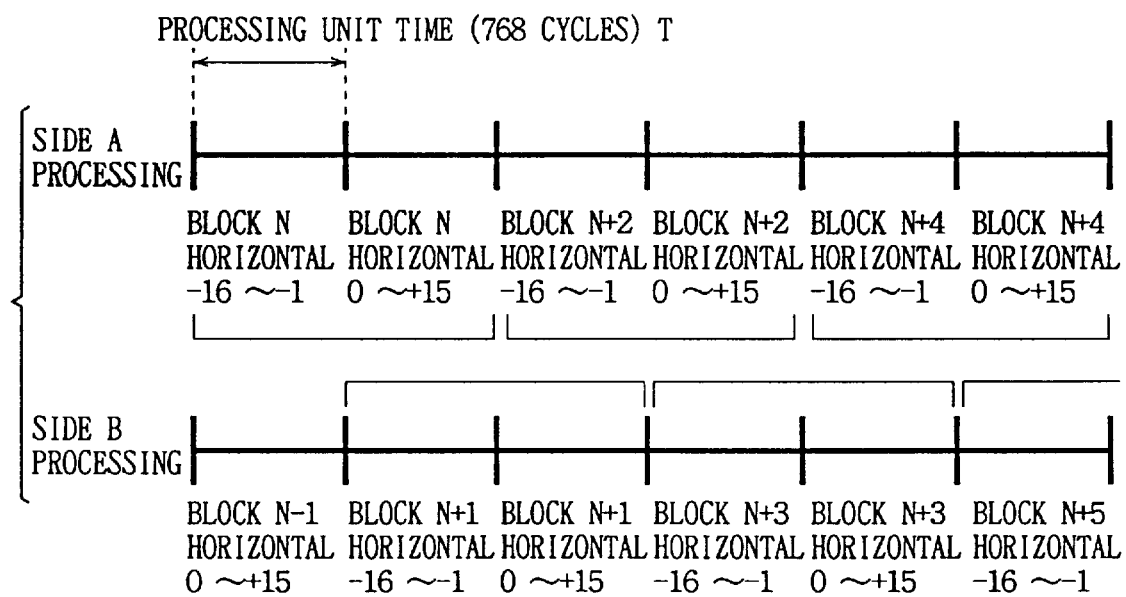
FIG. 46 is a diagram showing a specific operation sequence of the motion vector detecting device according to the fifth embodiment.

FIG. 46 illustrates processing sequences of the side A and B operation parts 1a and 1b. As shown in FIG. 46, the side A operation part 1a carries out a motion vector search operation as to the horizontal range of −16 to −1 of the template block N, while the side B operation part 1b carries out a motion vector search operation in the horizontal range of 0 to +15 as to the template block N−1. When the motion vector search operation in the horizontal range of 0 to +15 as to the template block N−1 is completed, the motion vectors as to the template block N−1 are decided. In the side A operation part 1a, on the other hand, a motion vector detecting operation is carried out in the horizontal range of 0 to +15 as to the block N in a next processing unit time T. In the side B operation part 1b, pixel data of the template block N+1 are stored through the input part 630, so that a motion vector detecting operation is carried out as to the horizontal range of −16 to −1 of the template block N+1. Thereafter the template block pixel data of the side A and B operation parts 1a and 1b are alternately updated every processing unit time T. Therefore, the comparison parts 3a and 3b alternately decide motion vectors according to the respective predictive modes and output the same every processing unit time T. The selector 632 switches its selection mode every processing unit time T, for selecting and outputting the motion vectors outputted from the comparison parts 3a and 3b.

As hereinabove described, it is possible to carry out motion vector detecting operations for the template blocks in a pipeline manner at a high speed by providing two operation parts and two comparison parts for storing pixel data of different template blocks in the respective operation parts and supplying the same search window pixel data to the operation parts in common. This is because the motion vectors are apparently decided every processing unit time T, although motion vector detection actually requires two processing unit times 2T.

Figure 47:
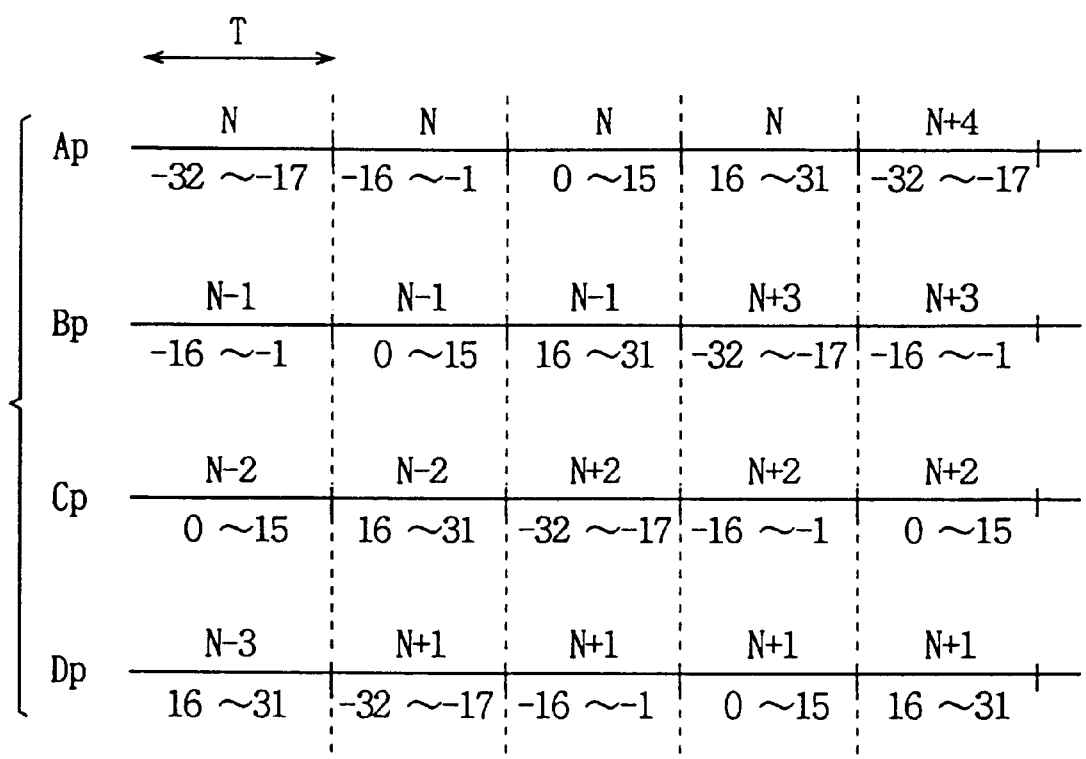
FIG. 47 is a diagram showing a specific operation sequence of the motion vector detecting device according to the fifth embodiment when four process unit times are employed as a processing time.

FIG. 47 illustrates operations as to four operation parts Ap-Dp and four comparison parts which are provided in parallel with each other. Referring to FIG. 47, the horizontal search range is set at −32 to +32, and a processing time 4T is required for motion vector detection as to each single template block. The respective operation parts Ap-Dp store pixel data of different template blocks, while they are supplied with the same search window pixel data in common. In this case, four template block pixel data are processed in a pipeline manner, so that the operation parts successively decide and output the motion vectors every processing time. Also in this case, therefore, it is possible to output the motion vectors every unit time T even when the processing time is 4T.

When the horizontal search range corresponds to the processing unit time T multiplied by A, it is possible to detect motion vectors as to A template blocks in a pipeline manner by providing A operation parts and A comparison parts and storing different template block pixel data in the respective operation parts.

As to the pipeline mode operation in FIG. 47, update times for the template block pixel data are neglected. When template block pixel data update times are considered every processing unit time so that motion vector detecting operations are started/restarted at the same timings in all operation parts after the template block pixel data are stored in any of the operation parts, it is possible to readily implement the motion vector detecting operation sequences shown in FIGS. 46 and 47.

The structures of the input part 630 and the selector 632 shown in FIG. 44 can be readily implemented since the input part 630 may be provided with a structure of successively relocating transmission paths for the template block pixel data in accordance with the number of the template blocks to be processed, and the selector 632 may employ a structure of successively selecting the outputs of the comparison parts 3a and 3b every processing unit time T. In this case, the structure of reading the template block pixel data from the current picture image memory 604 is identical to that of a case of updating the template block pixel data at the processing unit time T. Only a range for reading search window pixel data from the reference picture image memory 602 is varied with the processing time, and the structure of the fourth embodiment can be utilized for this.

According to the structure of the fifth embodiment of the present invention, as hereinabove described, a plurality of operation parts and a plurality of comparison parts are provided in parallel with each other so that different template block pixel data are supplied to different operation parts and comparison parts while search window pixel data are supplied to them in common, and the template blocks are updated every processing unit time, whereby motion vectors can be detected at a high speed in accordance with a plurality of predictive modes. Also when two operation parts and two comparison parts are employed, it is possible to change the horizontal vector search range by updating the template block pixels every two processing times 2T, whereby the horizontal motion vector search range can be readily changed. When the operation and comparison parts are formed on a single chip and the processing unit time T is set in each chip, further, it is possible to readily apply the present invention to a picture image coding system having different horizontal search ranges by providing A chips in parallel with each other, since the structure of the fourth embodiment may be provided in each chip.

[Embodiment 6]

Figure 48:
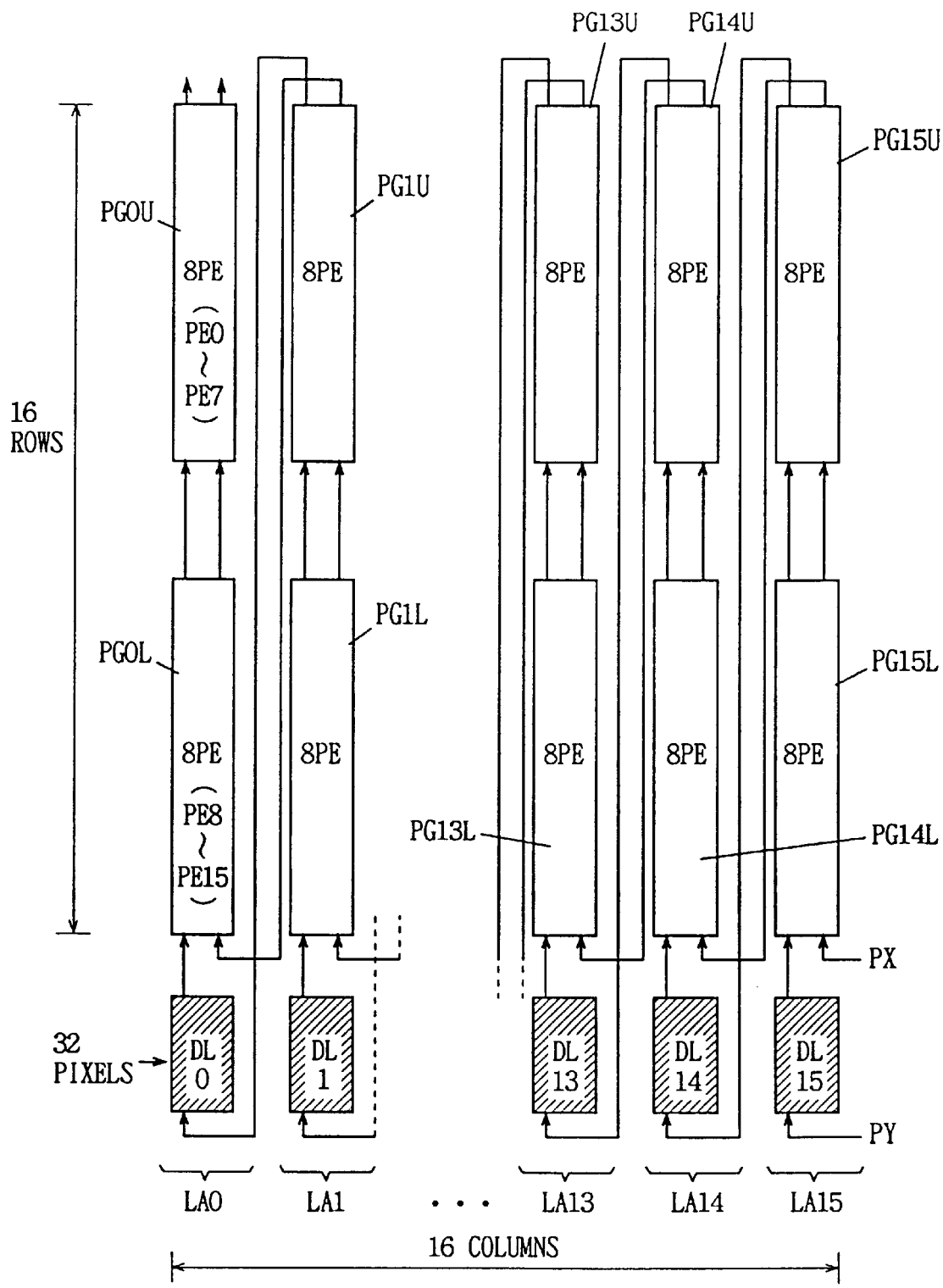
FIG. 48 illustrates an arrangement of a processor array in a motion vector detecting device according to a sixth embodiment of the present invention.

FIG. 48 schematically illustrates the overall structure of a processor array including element processors PE which are arranged in 16 rows by 16 columns,. Referring to FIG. 48, the element processors PE are arranged in one-to-one correspondence to respective pixels of template blocks having pixels which are arranged in 16 rows by 16 columns. Each element processor PE includes one register storing search window pixel data and one register storing template block pixel data (N=M=1 in FIG. 3).

Referring to FIG. 48, each of linear processor arrays LA0 to LA15 which are arranged in correspondence to respective columns of the template block includes 16 element processors PE and a data buffer DL (DL0 to DL15) storing 32 pixel data. Referring to FIG. 48, each of the linear processor arrays LA0 to LA15 includes an element processor group IGiU including eight element processors PE provided on an upstream side (upper portion in FIG. 48) and an element processor group PGiL including eight element processors provided on a downstream side (i=0 to 15), for the purpose of convenience for the following description. The element processors PE are so interconnected with each other as to one-dimensionally and unidirectionally transmit template block pixel data in the linear processor arrays LA0 to LA15, while the linear processor arrays LA0 to LA15 are so interconnected with each other as to one-dimensionally and unidirectionally transmit search window pixel data PY. Namely, the element processors PE and the data buffers DL are arranged in a systolic array.

In the structure shown in FIG. 48, it is possible to carry out operations similar to those of the aforementioned fourth embodiment. Namely, it is possible to search motion vectors as to a vertical search range of −16 to +16 for template blocks having pixels arranged in 16 rows and 16 columns. At this time, horizontal search ranges can be changed similarly to the fourth embodiment.

Figure 49:
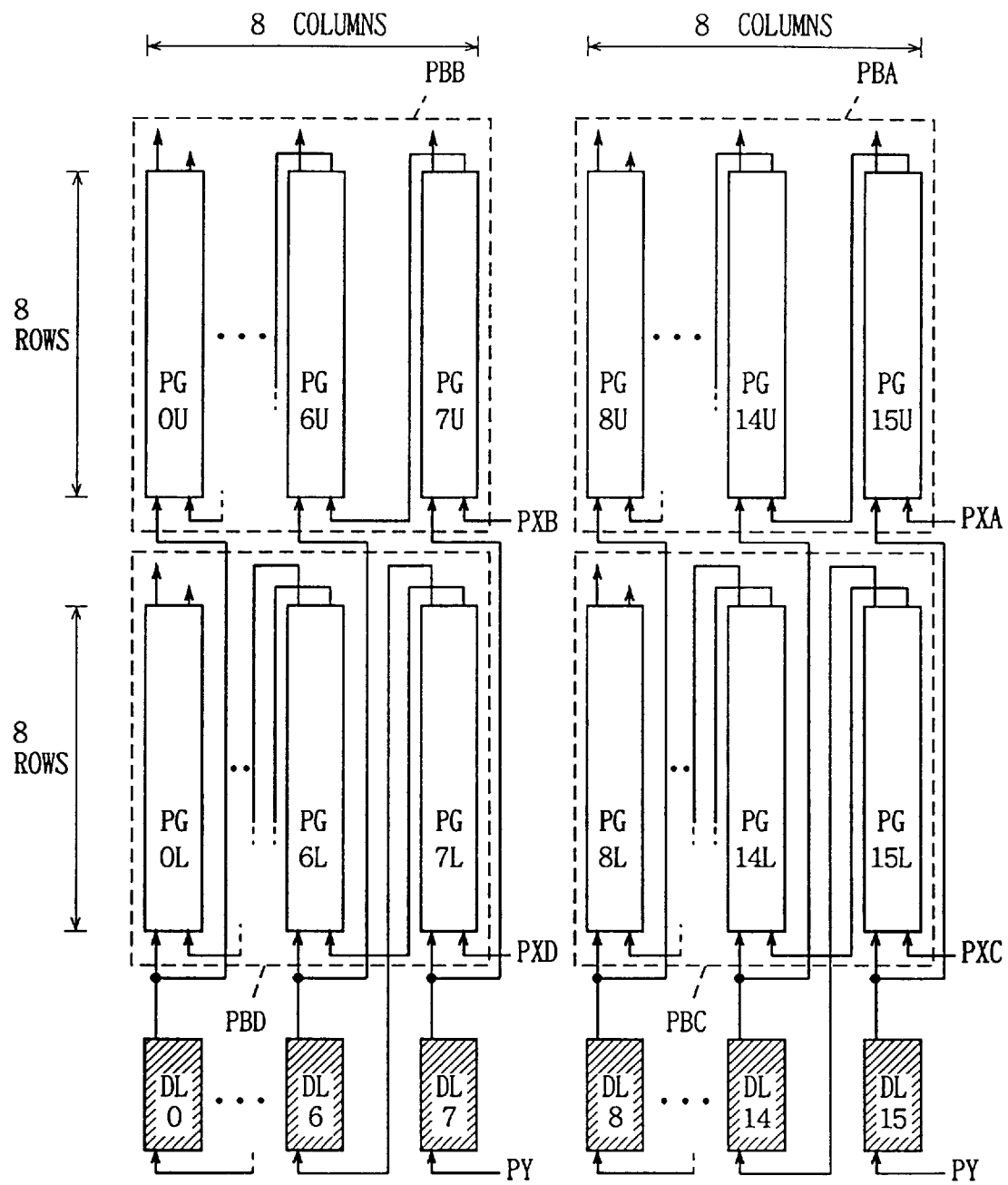
FIG. 49 illustrates an arrangement of the processor array when the processor array shown in FIG. 48 is rearranged in accordance with a template block size.

FIG. 49 schematically illustrates the overall structure of a processor array (operation part) which is formed by rearranging the processor array shown in FIG. 48 in correspondence to template blocks each formed by pixels which are arranged in eight rows and eight columns. Referring to FIG. 49, the processor array (operation part) includes four processor blocks PBA to PBD each including element processors PE which are arranged in eight rows and eight columns. The processor block PBA includes eight columns of processor groups PG8U to PG15U, while the processor block PBB includes processor groups PG0U to PG7U. The processor blocks PBC includes processor groups PG8L to PG15L, while the processor block PBD includes processor groups PG0L to PG7L.

The processor array includes the processor blocks which are arranged in two rows and two columns, and data buffers DL0 to DL15 divided in correspondence to the respective columns of the processor blocks. Namely, the data buffers DL0 to DL7 are provided in correspondence to the processor blocks PBB and PBD, while the data buffers DL8 to DL15 are provided in correspondence to the processor blocks PBA and PBC. Each of the data buffers DL0 to DL15 stores 32 pixel data.

The processor groups which are arranged on the same column receive search window pixel data from the corresponding data buffers. For example, the processor groups PG0U and PG0L receive the search window pixel data from the data buffer DL0. The respective processor groups PG0U to PG15U of the processor blocks PBA and PBB which are provided on the upstream side successively transfer the search window pixel data received from the corresponding data buffers DL0 to DL15 through the element processors PE provided therein and shift out the search window pixel data from the uppermost element processors PE respectively. Namely, the respective processor groups PG0U to PG15U simply carry out operations of serially transferring the search window pixel data and form no systolic array with respect to search window pixel data. On the other hand, the downstream side processor blocks PBC and PBD are so interconnected that the processor groups PG0L to PG7L and the corresponding data buffers DL0 to DL7 form a systolic array for one-dimensionally and only unidirectionally transferring the search window pixel data. Namely, the search window pixel data which are shifted out from the uppermost element processors PE of the processor groups are supplied to data buffers DL of the adjacent columns on the upstream side. Also in the processor block PBC, the processor groups PG8L to PG15L and the data buffers DL8 to DL15 form a systolic array for one-dimensionally and only unidirectionally transferring the search window pixel data.

As to template block pixel data, the element processors PE of the processor blocks PBA to PBD are interconnected with each other in the form of a systolic array for transferring the picture image data only along a one-dimensional direction.

Pixel data of different template blocks are supplied to and stored in the processor blocks PBA to PBD respectively. FIG. 49 is so illustrated that template block pixel data PXA to PXD indicating data of the different template blocks are supplied to the processor blocks PBA to PBD respectively. The operation is now described.

Figure 50:
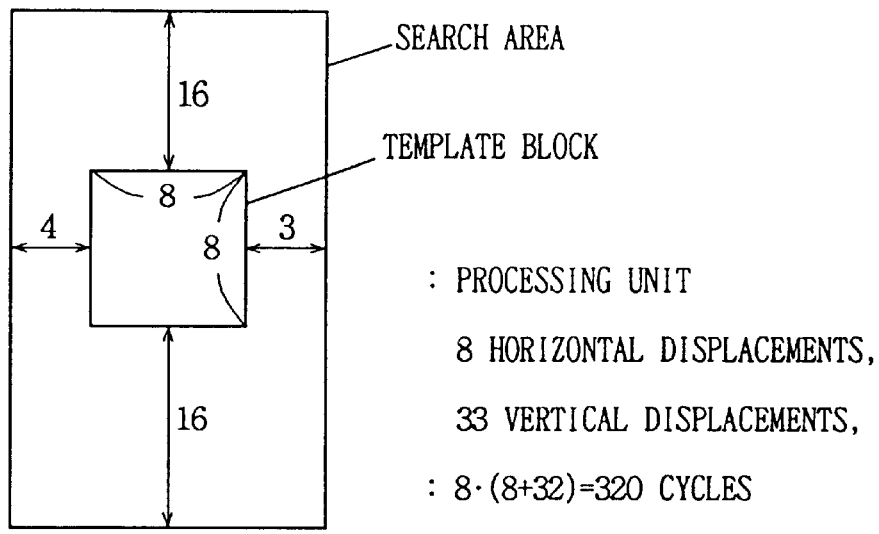
FIG. 50 illustrates a search area employed for the processor array shown in FIG. 49.

Since each template block is formed by eight rows and eight columns and each of the data buffers DL0 to DL15 stores 32 pixel data, a processing unit is formed by eight horizontal displacements and 33 vertical displacements (the processing unit time is P·(Q+R)), as shown in FIG. 50.

Figure 51:
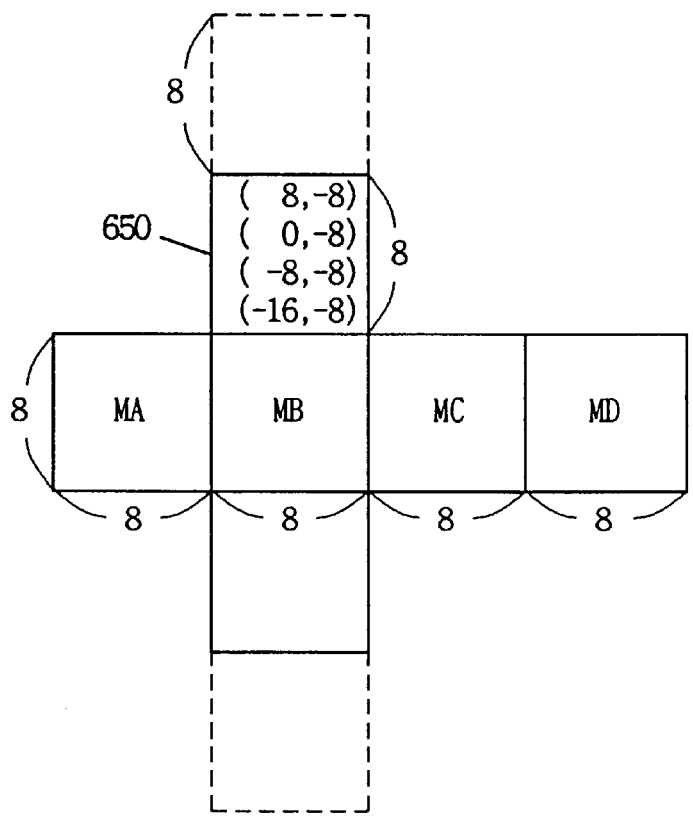
FIG. 51 is a diagram used for explaining an operation of the motion vector detecting device shown in FIG. 49.
Figure 52:
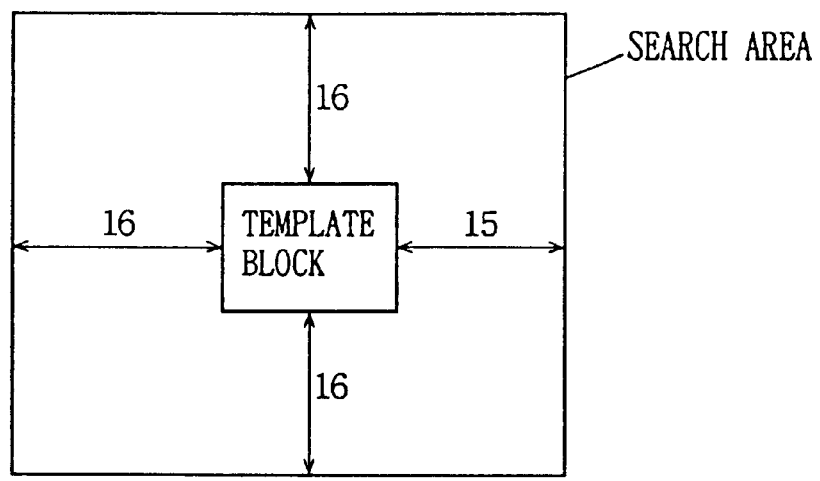
FIG. 52 illustrates a motion vector search area used in the motion vector detecting device according to the sixth embodiment.

Consider that the processor blocks PBA to PBD store pixel data of template blocks MA, MB, MC and MD respectively and a search window block 650 is stored as shown in FIG. 51. The displacement of the search window block 650 is (8, −8) with respect to the template block MA, (0, −8) with respect to the template block MB, (−8, −8) with respect to the template block MC, and (−16, −8) with respect to the template block MD. Therefore, a processing time is formed by four processing unit times, so that the processor blocks PBA to PBD carry out motion vector detecting operations in parallel with each other in a pipeline manner. Namely, motion vector detection is carried out in a search area of 33 horizontal displacements and 33 vertical displacements, as shown in FIG. 52.

Figure 53A:
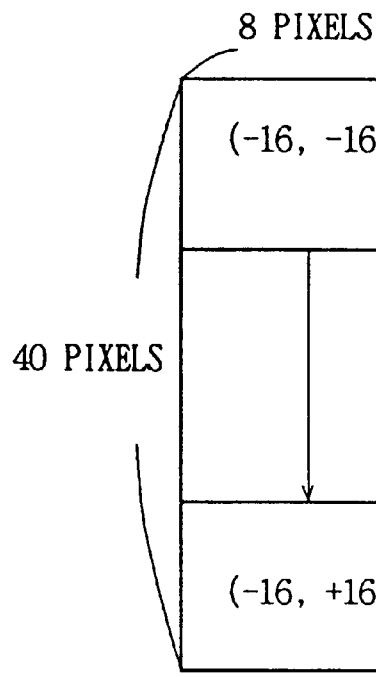
FIGS. 53A–53B illustrate a manner of reference picture image pixel data in a process unit time in the processor array according to the sixth embodiment.
Figure 53B:
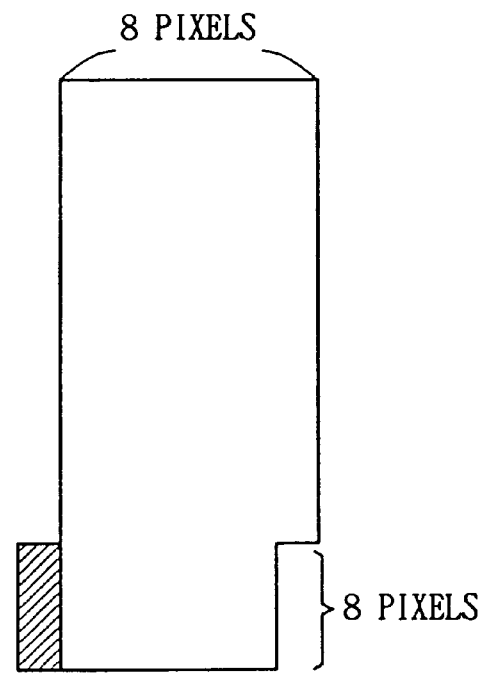

Consider a motion vector detecting operation of one search window in one processor block. As shown in FIG. 53A, the search window comprises pixels which are arranged in 40 rows and 8 columns. Consider that an uppermost search window block, having a displacement of (−16, −16), for example, reaches a displacement (−16, +16) upon 32 shift operations. In this case, only eight pixels shown by slant lines in FIG. 53B remain as search window pixel data to be subjected to the motion vector detecting operation. When the eight pixels shown in the slant region are shifted out, it is possible to calculate an evaluation value with respect to a motion vector in a next column, i.e., (−15, −16). Motion vector detecting operations are carried out as to horizontal displacements −16 to −9, −8 to −1, 0 to +7 and +8 to +15 in the respective four processing unit times. The processor blocks PBA to PBD execute motion vector detecting operations at different phases of the respective ones of the four processing unit times respectively.

Figure 54:
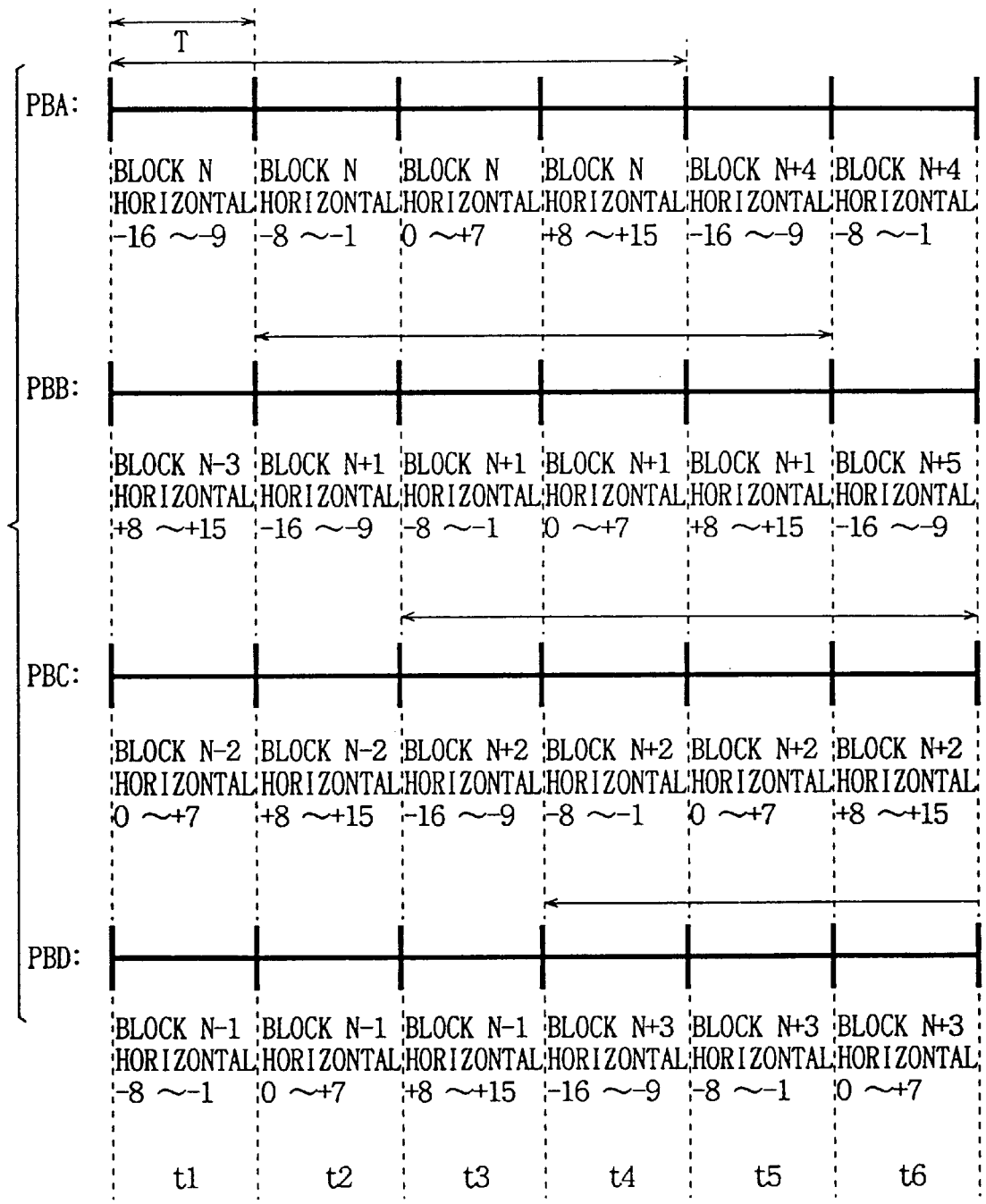
FIG. 54 illustrates a specific operation sequence of a motion vector detection in the motion vector detecting device according to the sixth embodiment.

FIG. 54 illustrates exemplary processing operation sequences in the processor blocks. The processing unit time T is (32+8)×8 320 cycles. In a period t1, the processor block PBA carries out motion vector detection as to the horizontal displacement of −16 to −9 of a template block N. The processor block PBD carries out motion vector detection in the horizontal displacement range of +8 to +15 with respect to a template block N−3. The processor block PBC carries out motion vector detection in the horizontal displacement range of 0 to +7 with respect to a template block N−2. The processor block PBC carries out motion vector detection in the horizontal displacement range of −8 to −1 with respect to a template block N−1. The template blocks N−3, N−2, N−1, N, N+1, . . . are successively arranged along the horizontal direction. The processor block PBA carries out a motion vector detecting operation in the horizontal displacement of +8 to +15 with respect to the block N at a time t4 after a lapse of four processing unit time, for deciding the motion vector for the template block N. The processor block PBB carries out a motion vector detecting operation in the horizontal range of +8 to +15 of the template block N−3 at the time t1, for deciding the motion vector for the template block N−3. A motion vector detecting operation as to the new template block N+1 is carried out from a next period t2.

In the processor block PBC, the motion vector search operation in the horizontal displacement +8 to +15 of the template block N−2 is completed in the period t2, for deciding the motion vector for the template block N−2. Motion vector search for the new template block N+2 is carried out from a next period t3.

As to the processor block PBD, the motion vector search operation as to the template block N−1 is completed in the period t3, for deciding the motion vector for the template block N−1. A motion vector search operation as to the new template block N+3 is carried out from a next period t4.

Namely, motion vector detecting operations as to new template blocks are started in the processor blocks PBA to PBD with the lag of one processing unit time. Upon completion of the respective processing unit times, a motion vector as to one template block is decided by any of the processing results of the processor blocks PBA to PBD As hereinabove described, it is possible to carry out motion vector detecting operations as to four template blocks in a pipeline manner by dividing the processor array into four and forming the processing time by four processing unit times.

In the aforementioned embodiment, the element processors PE arranged in correspondence to the template block pixels which are arranged in 16 rows and 16 columns are divided into four processor blocks each having element processors PE of eight rows and eight columns. When an element processor corresponds to one pixel, element processors which are arranged in P columns and Q rows are divided into processor blocks having element processors of (P/b) columns and (Q/c) rows, the processor blocks are arranged in b columns and c rows and each data buffer stores R pixel data, the processor blocks can evaluate b·c·(P/b)·(R+1) displacement vectors for detecting motion vectors by employing (P/b)·{(Q/c)+R} as the processing unit time. At this time, the processing time is b·c·(P/b)·{(Q/c)+R} cycles.

[Specific Structure]

Figure 55:
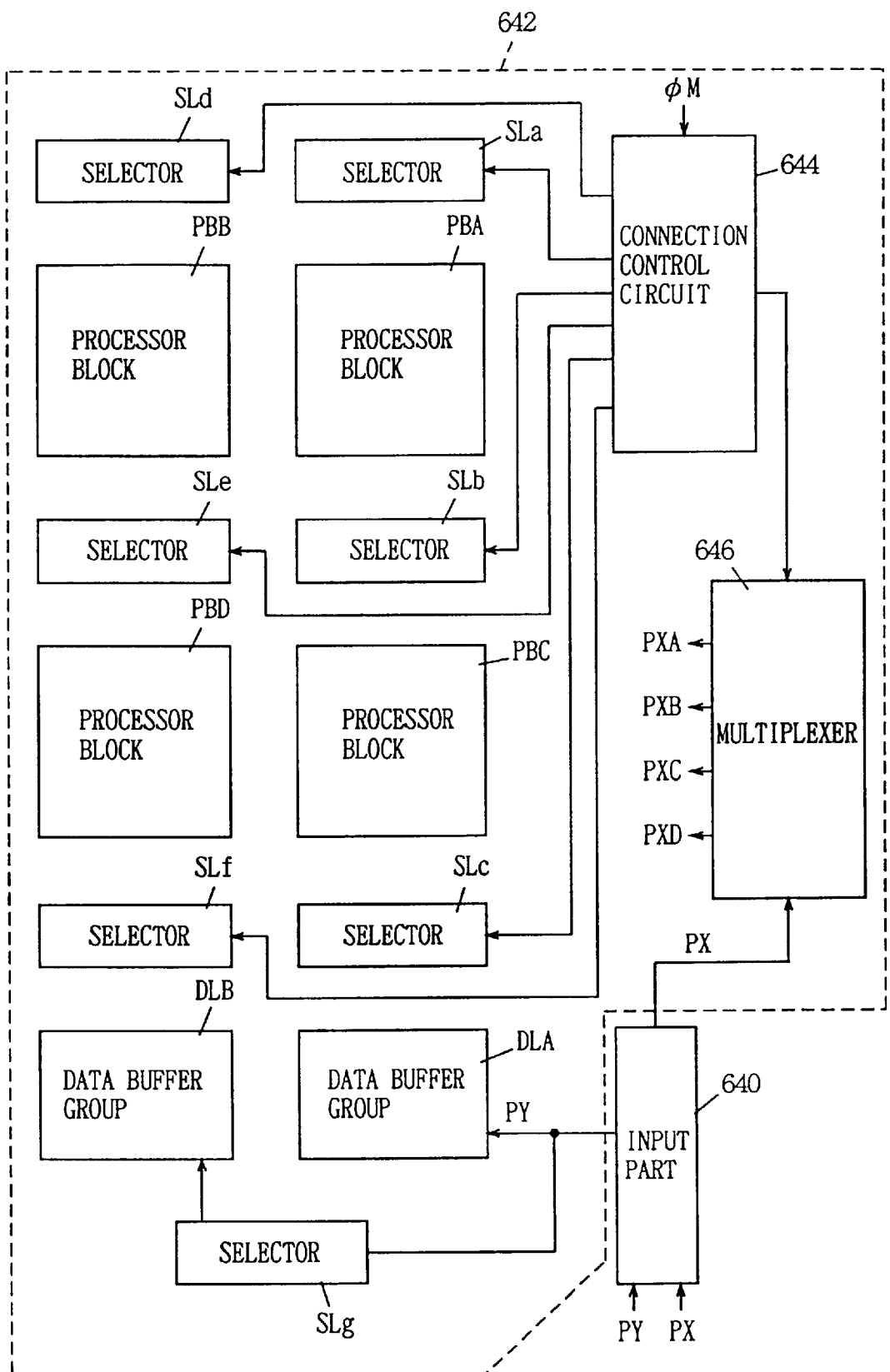
FIG. 55 illustrates an arrangement of a processor array of the motion vector detecting device according to the sixth embodiment.

FIG. 55 illustrates the structure of a principal part of a motion vector detecting device employed in the sixth embodiment of the present invention. Referring to FIG. 55, the structure of an operation part 642 is illustrated as to the motion vector detecting device.

Referring to FIG. 55, the operation part 642 includes four processor blocks PBA to PBD and data buffer groups DLA and DLB. The processor blocks PBA to PBD are identical in structure to those shown in FIG. 49 respectively. The data buffer groups DLA and DLB include the data buffers DL8 to DL15 and DL0 to DL7 shown in FIGS. 48 and 49 respectively.

In order to change the internal structure of the operation part 642 in accordance with sizes of template blocks, selectors SLa to SLg are provided for switching transfer paths for template block pixel data and search window pixel data in accordance with a control signal which is outputted from a connection control circuit 644. Internal structures of the selectors SLa to SLg are described later in detail. The connection control circuit 644 establishes connection of the selectors SLa to SLg in accordance with a mode specifying signal (template block size specifying signal) φM which is supplied from the exterior of the operation part 642 in this motion vector detecting device. The operation part 642 further includes a multiplexer 646 for selectively distributing search window pixel data PX received from an input part 640 to the processor blocks PBA to PBD under control by the connection control circuit 644. When the specifying signal φM indicates a template block size of eight rows and eight columns, the connection control circuit 644 switches an output path of the multiplexer 646 every processing unit time T. Thus, the template block pixel data PX of eight rows and eight columns which are received from the input part 640 every processing unit time T are successively supplied to the processor blocks PBA to PBD every processing unit time T. When the mode specifying signal φM specifies a template block size of 16 rows and 16 columns, on the other hand, the connection control circuit 644 selects only one prescribed output of the multiplexer 646 and supplies the same to the processor block PBC. The input part 640 receives search window pixel data PY and template block pixel data PX from reference and current picture image memories (not shown). When each template block has the size of 16 rows and 16 columns, template block pixel data are supplied from the exterior every four processing unit times 4T, so that the template block pixel data are updated in the processor blocks PBA to PBD. When each template block has the size of eight rows and eight columns, on the other hand, template block pixel data of eight rows and eight columns are supplied every processing unit time T, so that the template block pixel data are successively updated in the processor blocks PBA to PBD every processing unit time T.

Figure 56:
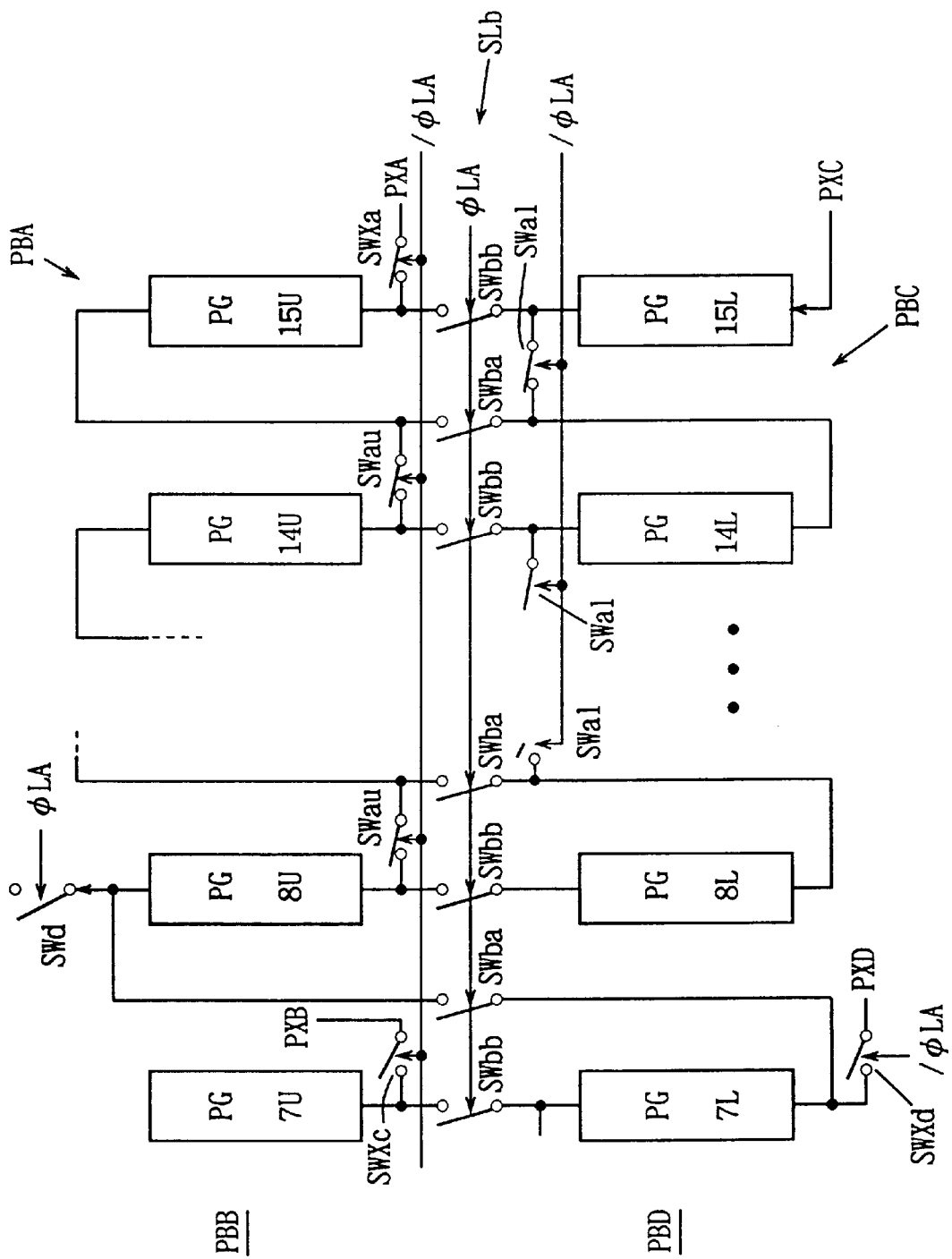
FIG. 56 schematically illustrates a construction of a portion related to template block pixel data in a selector shown in FIG. 55.

FIG. 56 schematically illustrates the structure of the selector SLb shown in FIG. 55. Switching elements, which are illustrated as being formed by mechanical switches in FIG. 56, are formed by transistor elements such as transfer gates or transmission gates. FIG. 56 shows only a structure which is related to a path for transferring the template block pixel data. A structure of the selector for transferring the search window pixel data is shown later.

The selector SLb includes switching elements SWau for connecting inputs and outputs of adjacent pairs of processor groups in the processor block PBA in activation of a signal /φLA, a switching element SWXa for supplying template block pixel data PXA to an input (lowermost element processor) of a processor group PG 15U in activation of the signal /φLA, switching elements SWal for connecting inputs and outputs of adjacent pairs of processor groups in the processor block PBC in activation of the signal /φLA, switching elements SWbb for connecting outputs and inputs of processor groups of the processor blocks PBA and PBC which are arranged on the same column, and switching elements SWba for connecting outputs of the processor groups of the processor block PBA with inputs of upstream processor groups of the processor block PBC.

A signal φLA is activated when the template block size of 16 rows and 16 columns is specified, while the signal /φLA is activated when the template block size of eight rows and eight columns is specified.

With respect to the processor group PG8U, a switching element SWd which is brought into a conducting state in activation of the signal /φLA is provided. The output of the processor group PG8U is connected to an input of the processor group PG7L of the processor block PBD through the switching element SWbb. The processor groups PG7U and PG7L of the processor blocks PBB and PBD are provided with switching elements SWXc and SWXd for transmitting template block pixel data PXB and PXD respectively in response to the signal /φLA. The switching elements SWXc and SWXd are brought into conducting states in activation of the signal /φLA.

The switching element Swd which conducts in response to the signal φLA is further provided on the output of the processor group PG8U. A switching element having a structure similar to that of the switching element SWd is provided on an output of the processor group PG8L, as shown in FIG. 56. The switching element SWd is adapted to directly supply template block pixel data to a next stage circuit so that the former are further processed in the latter.

It is possible to readily change the arrangement of the element processors PE depending on the size of template blocks by providing switching elements on the input and output parts of the processor groups respectively as shown in FIG. 56.

Namely, the processor groups are connected in the form of a systolic array in each of the processor blocks PBA to PBD in accordance with the template block size, or it is possible to form a systolic array in the overall processor blocks PBA to PBD.

Figure 57:
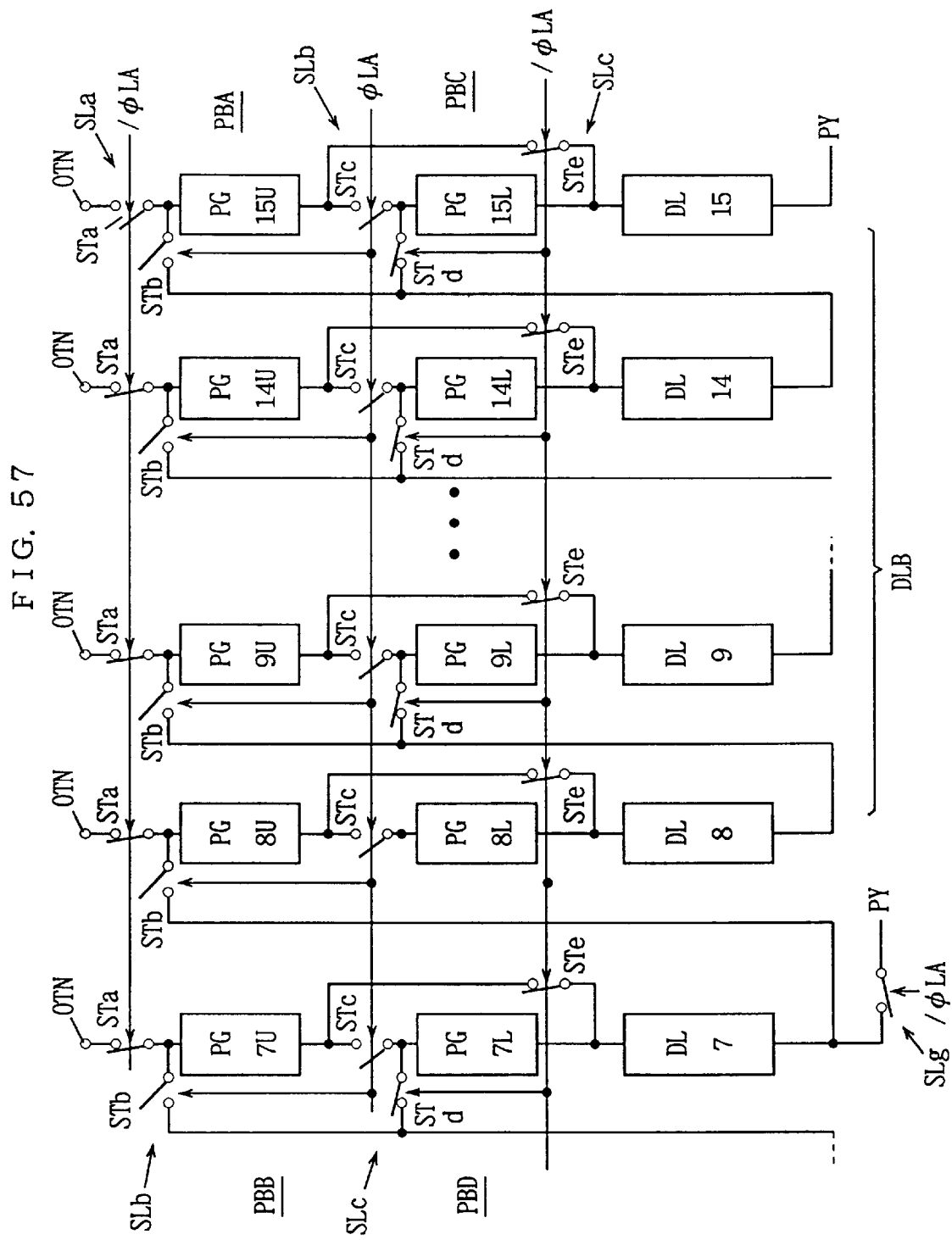
FIG. 57 schematically illustrates a construction of a portion related to reference picture image pixel data in the selector shown in FIG. 55.

FIG. 57 schematically illustrates the structures of portions of the selectors shown in FIG. 55 which are related to search window pixel data transfer. Switching elements, which are illustrated as being formed by mechanical switches also in FIG. 57, are formed by transistor elements. The selector SLa includes switching elements STa which are provided on the output parts of the processor groups PG8U to PG15U included in the processor block PBA for transferring pixel data outputted from the corresponding processor groups to output nodes OTN in response to a signal /φLA, and switching elements STb for transmitting pixel data outputted from the processor groups PG8U to PG15U to the input parts of upstream data buffers DL7 to DL14. The signal /φLA is activated when the template block size of eight rows and eight columns is specified similarly to the signal /φLA described with reference to FIG. 56, to bring the switching elements STa into conducting states. A signal φLA is activated when the template block size of 16 rows and 16 columns is specified, to bring the switching elements STb into conducting states.

The selector SLb includes switching elements STc for connecting outputs and inputs of processor groups which are arranged on the same columns in the processor blocks PBA and PBC in activation of the signal φLA, and switching elements STd for connecting outputs of the processor groups PG8L to PG15L to inputs of upstream data buffers DL7 to DL14.

The selector SLc includes switching elements STe which are provided on the respective output parts of the data buffers DL8 to DL15 to be brought into conducting states in activation of the signal /φLA for transmitting pixel data outputted from the corresponding data buffers DL8 to DL15 to inputs (lowermost element processors) of the processor groups PG8U to PG15U in the processor block PBA which are arranged on the same columns.

No switching element STd is provided on the output part of the processor group PG8L. The processor group PG8L and the data buffer DL7 are included in processor blocks corresponding to different template blocks, and hence it is not necessary to transfer search window pixel data from the processor group PG8L to the data buffer DL7. The output part of the processor group PG8L is provided with a switching element (not shown in FIG. 57) which is similar to the switching elements STa being brought into conducting states in activation of the signal /φLA.

The processor blocks PBB and PBD are also provided with structures similar to the selectors SLa, SLb and SLc in the processor blocks PBA and PBC. The data buffer DL7 is provided with a switching element as a selector SLg which conducts in activation of the signal /φLA for transmitting the search window pixel data PY to the input of the data buffer DL7.

FIG. 57 illustrates conducting/non-conducting states of the switching elements upon specification of the template block size of eight rows and eight columns, for example. It is possible to establish processor arrangement corresponding to the template block size by establishing the conducting/non-conducting states of the switching elements by the signals φLA and /φLA.

The switching elements STb are illustrated as being included in the selector SLa in the structure shown in FIG. 57. However, the switching elements STb may alternatively be provided in the selector SLb.

FIG. 58 illustrates the structure of a motion vector decision part employed in the sixth embodiment. FIG. 58 shows only the structure of a portion which is related to one predictive mode. The structure shown in FIG. 58 is basically provided in correspondence to each predictive mode (it is possible to make a modification such as common use of some circuit parts).

Referring to FIG. 58, the motion vector decision part includes summing parts 650a to 650d which are provided in correspondence to the processor blocks PBA for deriving evaluation function values by summing up the evaluation function value components received from the corresponding processor blocks respectively, and one-input two-output selectors 652a to 652d which are provided in correspondence to the summing parts 650a to 650d respectively. Each of the selectors 652a to 652d transmits the evaluation function value received from the corresponding summing part to its first output when the signal φLA is in an inactive state and the template block size of eight rows and eight columns is specified, while transmitting the received evaluation function value to its second output when the signal φLA is in an active state and the template block size of 16 rows and 16 columns is specified.

The motion vector detecting part further includes comparison parts 654a to 654d which are arranged in correspondence to the first outputs of the selectors 652a to 652d respectively, an adder part 655 for adding up the evaluation function values received from the second outputs of the selectors 652a to 652d respectively, a comparison part 656 for deciding the motion vectors for the template block of 16 rows and 16 columns by comparing the output data of the adder part 655, and a selector 658 for selecting the output data of the comparison parts 654a to 654d and 656 in accordance with a signal φLAT. The comparison parts 654a to 654d and 656 select the minimum values of the received evaluation function values respectively, to output data mvA to mvD and mvL indicating motion vectors as to the corresponding template blocks.

The comparison parts 654a to 654d may be inactivated in activation of the signal φLA, i.e., in specification of the template block size of 16 rows and 16 columns so that only the comparison part 656 is activated. Alternatively, operations of the adder part 655 and the comparison part 656 may be inhibited when the signal φLA is inactivated and the template block size of eight rows and eight columns is specified.

The selector 658 receives the motion vector data which are outputted from the comparison parts 654a to 654d. The signal φLAT which is supplied to the selector 658 is a multibit signal. Due to the signal φLAT, the selector 658 selects the motion vector data mvL outputted from the comparison part 656 when the template block size of 16 rows and 16 columns is specified. When the template block size of eight rows and eight columns is specified, on the other hand, the selector 658 successively selects and outputs the motion vector data mvA to mvD outputted from the comparison parts 654*a* to 654*d* every processing unit time. The multibit signal φLAT is supplied from an external control unit to the selector 658. The external control unit generates the mode specifying signal φM shown in FIG. 55, to read the search window pixel data and the template block pixel data from the reference and current picture image memories at prescribed timings respectively for supplying the same to the operation part, while controlling the selecting operation of the selector 658. The motion vector detecting device comprising the external control unit is similar in overall structure to that described with reference to FIG. 38, and hence the description thereof is omitted.

[Modification]

Figure 59A:
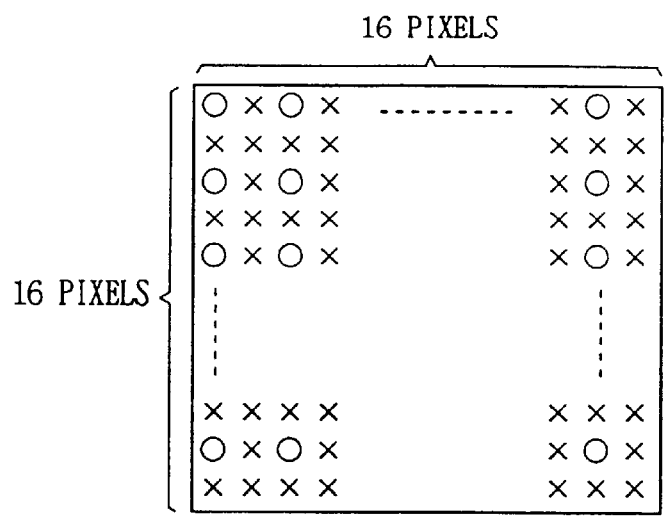
FIGS. 59A–59D illustrate a construction of a subsampled picture image used in the sixth embodiment.
Figure 59B:
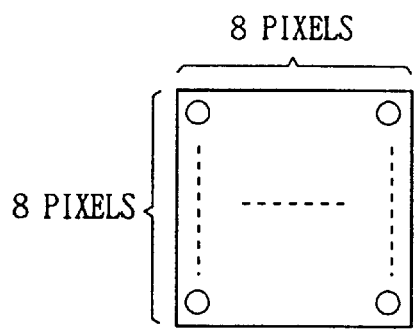
Figure 59C:
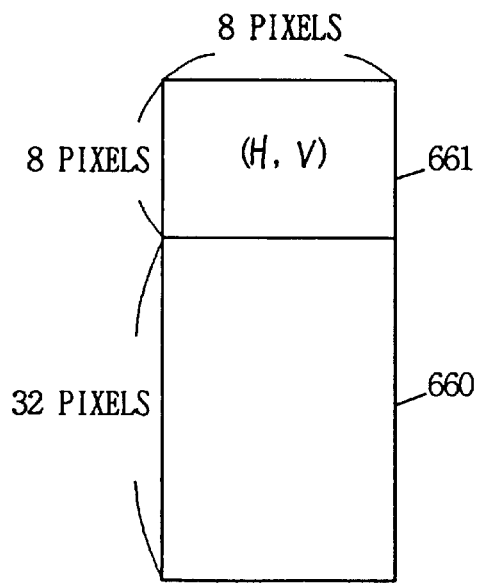
Figure 59D:
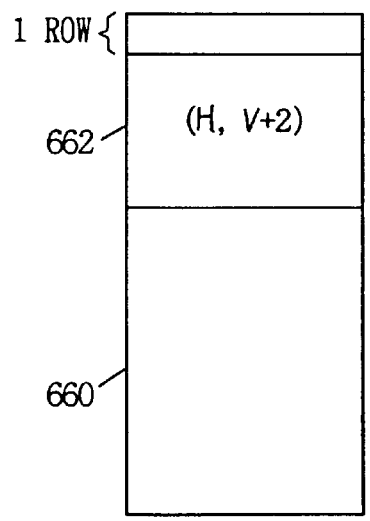

Consider that pixels are horizontally and vertically subsampled in a template block of 16 rows and 16 columns, as shown in FIG. 59A. Referring to FIG. 59A, evaluation function value components are derived as to pixels shown by the marks of O, while no evaluation function value components are derived as to those shown by the marks of X. When only the pixels from which the evaluation function value components are derived are extracted, a template block consisting of pixels which are arranged in eight rows and eight columns is obtained as shown in FIG. 59B. Search window data are also horizontally and vertically subsampled. A search window 660 comprises pixels which are arranged in 40 rows and eight columns. Evaluation function value components must be derived from all pixels included in the search window 660. Assuming that the displacement vector of a search window block 661 is (H, V), that of a search window block 662 is (H, V+2) in a next cycle as shown in FIG. 59D, since the pixels shown by the marks of X in FIG. 59A are omitted. The change of the displacement vector is also 2 along the column direction. When the motion vector is detected by a subsampling picture image shown in FIG. 59B, therefore, horizontal and vertical movement search ranges are 15 displacements and 65 displacements in horizontal and vertical directions, whereby the motion vector search ranges are equivalently expanded. Thus, it is possible to carry out further correct motion vector detection by expanding the motion vector search ranges, also when subsampling pixels are employed.

The 2:1 subsampling picture image can be expanded to a general subsampling picture image, as a matter of course. When the structure shown in FIGS. 56 and 57A to 57D is expanded to a general structure, the structure of the processor block PBA may simply be expanded or repeated as such upwardly in the figures.

While the processor array is made rearrangeable by the control signal in accordance with the template block size in the aforementioned structure, the following structure can be employed when the application thereof is predetermined fixedly. Namely, only processor groups and data buffers are arranged while paths for transmitting search window pixel data and template block pixel data are set by mask wires, depending on the application. It is possible to readily accommodate a plurality of template block sizes by the same chip.

When a template block of 16 rows and 16 columns is simply divided into template blocks of eight rows and eight columns and only the structure of the motion vector detecting part is brought into that shown in FIG. 58, it is possible to simultaneously detect motion vectors as to four template blocks of eight rows and eight columns (in this case, displacement vectors as to all template blocks are at the same values).

According to the structure of the sixth embodiment of the present invention, as hereinabove described, the arrangement of the element processors included in the operation part is changeable in accordance with the template block size, whereby it is possible to form a picture image coding system having a high degree of freedom or a high flexibility.

[Embodiment 7]

Figure 60:
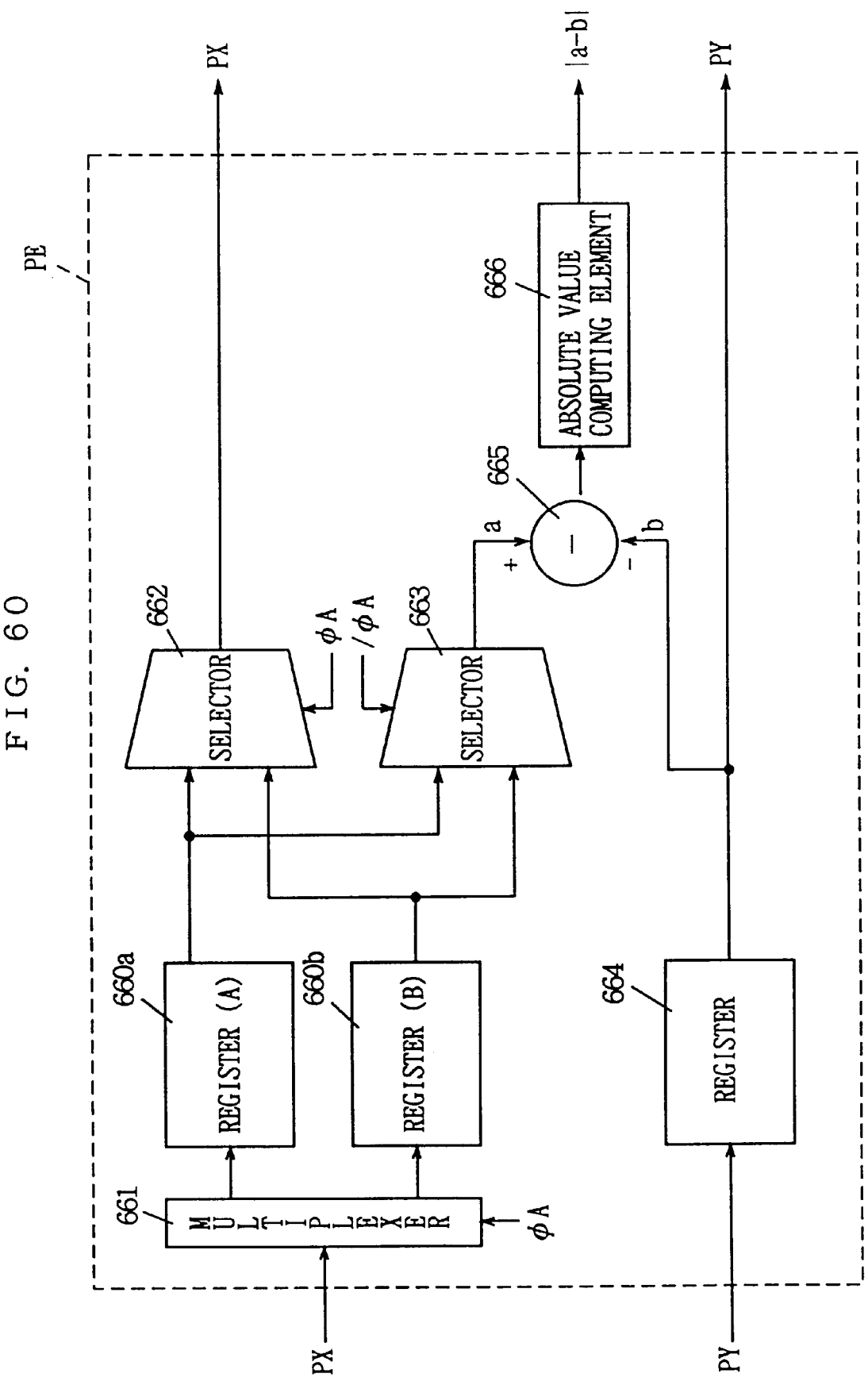
FIG. 60 illustrates a construction of a processor element according to a seventh embodiment of the present invention.

FIG. 60 illustrates the structure of a principal part of a motion vector detecting device according to a seventh embodiment of the present invention. The structure of one element processor PE is shown in FIG. 60. Referring to FIG. 60, the element processor PE includes a register (A) 660*a* and a register (B) 660*b* storing pixel data of different template blocks respectively, a selector 662 which selects one of pixel data outputted from the registers (A) and (B) 660*a* and 660*b* in accordance with a control signal φA and transmits the selected data to an adjacent element processor or data buffer, a multiplexer 661 which supplies template block pixel data received from another adjacent element processor or an input part to one of the registers (A) and (B) 660*a* and 660*b* in response to the signal φA, a selector 663 which selects and outputs the pixel data stored in the registers (A) and (B) 660*a* and 660*b* in response to the signal φA, a register 664 which stores search window pixel data received from the adjacent element processor or data buffer and transmits the same to another adjacent element processor or data buffer in response to a clock signal (not shown), a subtracter 665 which carries out subtraction of pixel data a outputted from the selector 663 and pixel data b outputted from (stored in) the register 664, and an absolute value computing element 666 which obtains the absolute value of the output data of the subtracter 665.

When the signal φA designates the register (A) 660*a*, template block pixel data PX received from the adjacent element processor or the input part are supplied to the register (A) 660*a* through the multiplexer 661, while pixel data stored in or outputted from the register (A) 660*a* are selected by the selector 662 and supplied to the adjacent element processor or an output part. At this time, the selector 663 is in a state of selecting pixel data stored in (or outputted from) the register (B) 660*b*. The absolute value computing element 666 outputs absolute differential values |a−b| as an evaluation function value component, which are summed up in a summing part (not shown) for forming evaluation function values.

The registers (A) and (B) 660*a* and 660*b* and the register 664 may have structures of shift registers including transfer gates therein, or structures simply latching data with data transfer parts arranged in the exterior of the element processor PE.

In the structure shown in FIG. 60, the arithmetic operation is performed through the template block pixel data stored in the register (A) or (B) 660*a* or 660*b*. Pixel data of another template block are supplied to and stored in the remaining register. Namely, second template block pixel data are loaded in the second register during the motion vector detecting operation as to the first template block.

Figure 61:
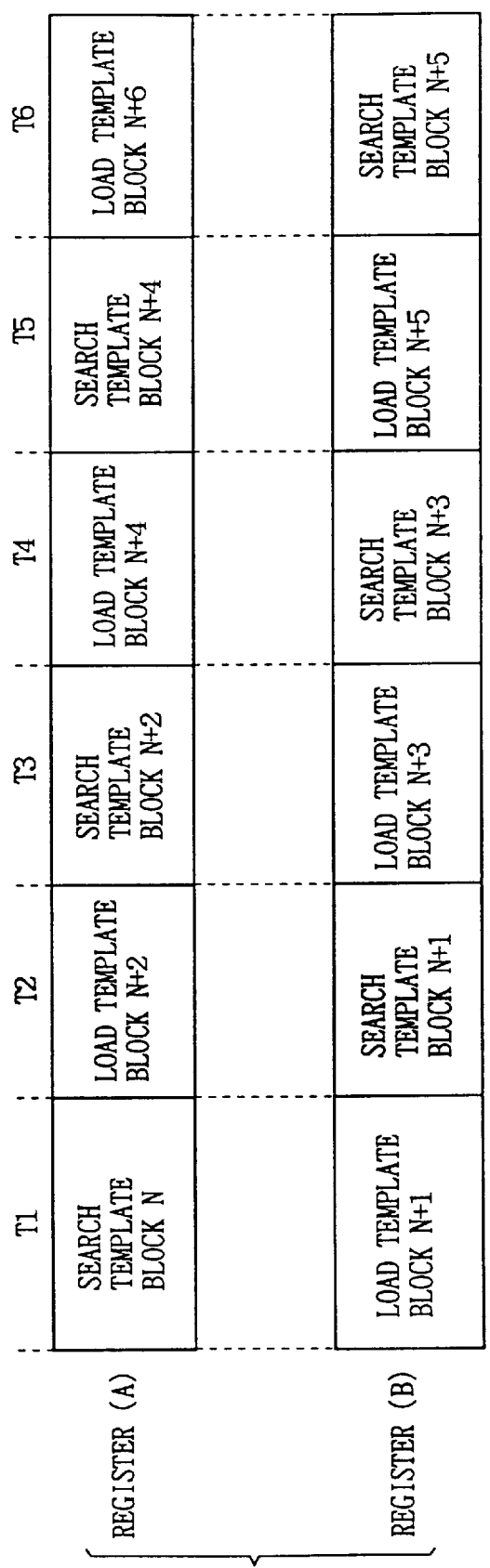
FIG. 61 is a diagram used for explaining an operation of the processor element shown in FIG. 60.

FIG. 61 illustrates exemplary processing operation sequences in the motion vector detecting device including the element processor PE shown in FIG. 60. The processing operation in the seventh embodiment of the present invention is now described with reference to FIG. 61.

At a time T1, an arithmetic operation (absolute differential value operation) is carried out through pixel data of a template block N stored in the register (A) 660*a*, and a motion vector detecting operation with respect to the template block N is carried out by successively shifting search window pixel data PY stored in the register 664 shown in FIG. 60. Namely, the selector 663 shown in FIG. 60 is set in a state of selecting the pixel data stored in the register 660*a* by a signal /φA. The multiplexer 661 and the selector 662 are set in states of selecting the register (B) 660*b* by the signal φA. Thus, pixel data of a template block (N+1) to be subsequently designated are successively stored in the register (B) 660*b* by a shift operation.

When the period T1 is lapsed to complete the motion vector detecting operation for the template block N, the loading of pixel data of the template block N+1 to be subsequently processed are completed at this time. The multiplexer 661 and the selector 662 are set in states of selecting the register (A) 660*a* in accordance with the signal φA. The selector 663 is set in a state of selecting the register (B) 660*b*. In this state, a motion vector detecting operation is performed through the pixel data of the template block N+1 stored in the register (B) 660*b*. In the motion vector detecting operation, a reference picture image memory is accessed, since it is necessary to shift in the search window pixel data in the operation part. However, a current picture image memory storing the template block pixel data is not accessed. Therefore, it is possible to read pixel data of a template block to be subsequently processed from the current picture image memory for supplying the read pixel data to the operation part during this period. Namely, pixel data of a template block N+2 are loaded in a period T2, so that the pixel data are successively stored in the register (A) 660*a*.

Thereafter motion vector search as to the template block N+2, loading of pixel data of a template block N+4, motion vector search for the template block N+4, and loading of pixel data of a template block N+6 are carried out for the register (A) 660*a* in periods T3, T4, T5 and T6 respectively. As to the register (B) 660*b*, on the other hand, loading of pixel data of a template block N+3, motion vector search for the template block N+3, loading of pixel data of a template block N+5 and motion vector detection for the template block N+5 are carried out in the periods T3 to T6 respectively.

As hereinabove described, two registers are provided in each element processor PE for storing template block pixel data so that template block pixel data to be subsequently processed are stored in the second register while a motion vector detecting operation is carried out through the template block pixel data stored in the first register. Thus, it is possible to execute input of template block pixel data and motion vector detection processing as to the template block in parallel with each other, thereby remarkably reducing the processing time.

Figure 62:
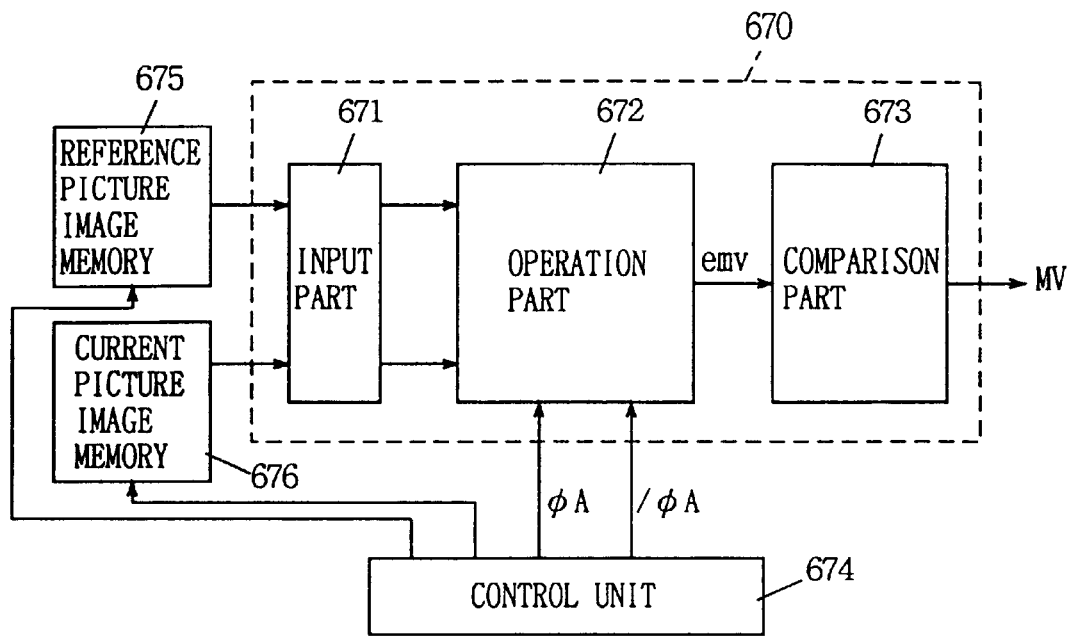
FIG. 62 illustrates a construction of a motion vector detecting device according to the seventh embodiment.

FIG. 62 schematically illustrates the overall structure of a motion vector detecting device 670 according to the seventh embodiment of the present invention. The motion vector detecting device 670 includes an input part 671 for inputting search window pixel data and template block pixel data, an operation part 672 for performing prescribed arithmetic operations on the template block pixel data and the search window block pixel data which are received from the input part 671 and generating evaluation function values, emv, and a comparison part 673 for deciding motion vector MV in accordance with the evaluation function values emv received from the operation part 672. FIG. 62 shows only the evaluation function values emv and the motion vector MV which are decided in accordance with one of a plurality of predictive modes. The operation part 672 and the comparison part 673 detect evaluation function values and motion vector in accordance with the plurality of predictive modes. A control unit 674 is provided for controlling storage of the template block pixel data in the operation part 672. The control unit 674 alternatively activates the signals φA and /φA every unit processing time, and switches registers for inputting the template block pixel data in the operation part 672. This control unit 674 also controls data read operations with respect to a reference picture image memory 675 storing the search window pixel data and a current picture image memory 676 storing the template block pixel data. While pixel data in a search area are supplied from the reference picture image memory 675 to the input part 671 to be inputted in the operation part 672 as to one template block under control by the control unit 674, pixel data of a template block to be subsequently processed are read from the current picture image memory 676 to be supplied to the operation part 672 through the input part 671.

[Modification 1]

Figure 63:
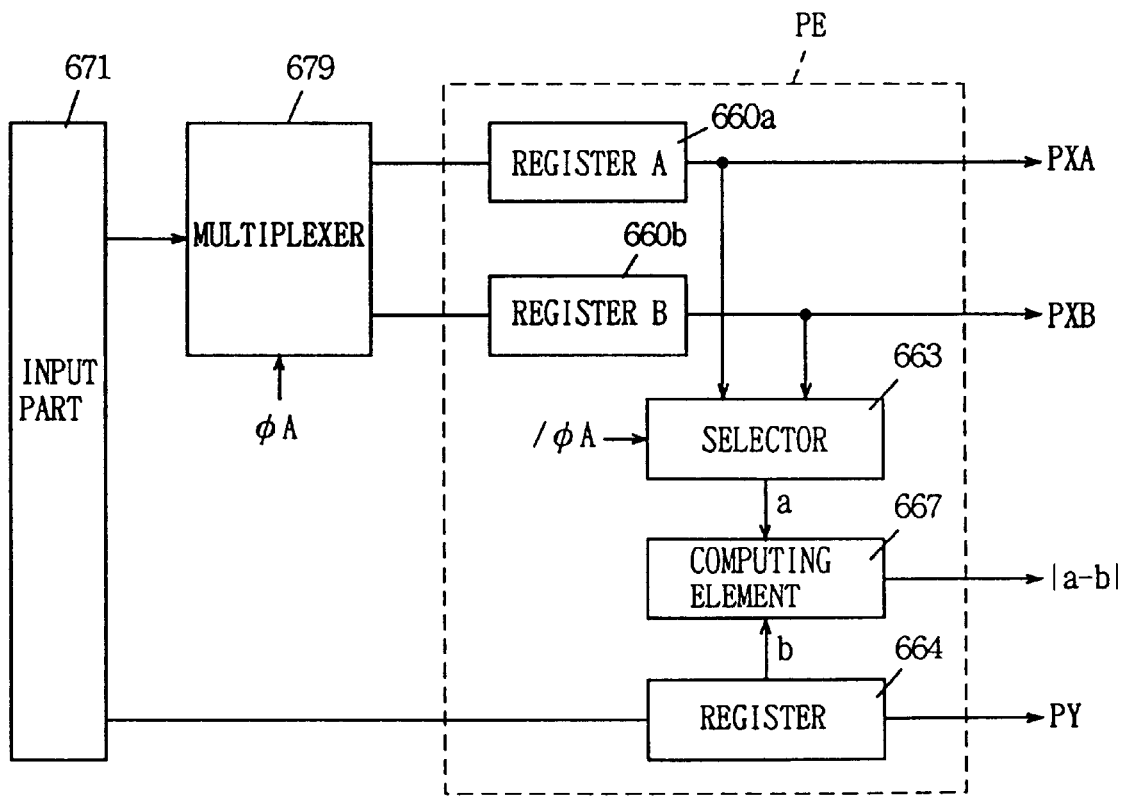
FIG. 63 illustrates a construction of a first modification of the processor element according to the seventh embodiment.

FIG. 63 illustrates the structure of a first modification of the seventh embodiment of the present invention. FIG. 63 shows the structure of an initial stage element processor PE which receives template block pixel data from an input part 671. The remaining element processors are identical in structure to that shown in FIG. 63. The element processor PE shown in FIG. 63 includes neither multiplexer nor selector for sorting template block pixel data. The remaining structure of this element processor PE is identical to that shown in FIG. 60, and portions corresponding to those in FIG. 60 are denoted by the same reference numerals. A multiplexer 679 is provided between the input part 671 and the initial stage element processor PE, for transmitting template block pixel data to one of a register (A) 660*a* and a register (B) 660*b* in accordance with a signal φA. Template block pixel data outputted from the register (A) 660*a* are supplied to a register (A) 660*a* of an adjacent element processor in a shift operation. Similarly, template block pixel data stored in the register (B) 660*b* are supplied to a register (B) 660*b* of the adjacent element processor in a shift operation. Namely, the multiplexer 679 provided next to the input part 671 switches transmission paths for the template block pixel data to be stored in the registers (A) and (B) 660*a* and 660*b*. Between such element processors, the registers (A) are connected with each other, while the registers (B) are also connected with each other. In the structure shown in FIG. 63, it is not necessary to provide a multiplexer and selectors for transferring template block pixel data between adjacent element processors in the element processor PE, whereby the scale of the element processor PE can be reduced.

While the registers (A) and (B) 660*a* and 660*b* are illustrated as having only functions of storing data in the structure shown in FIG. 63, these registers (A) and (B) may also have data shift functions similar to shift registers. When such shift register structures are employed, a clock signal is supplied to perform a transfer operation only in one of the two registers in data transfer, while no clock signal for pixel data transfer is supplied to the other register.

[Modification 2]

Figure 64A:
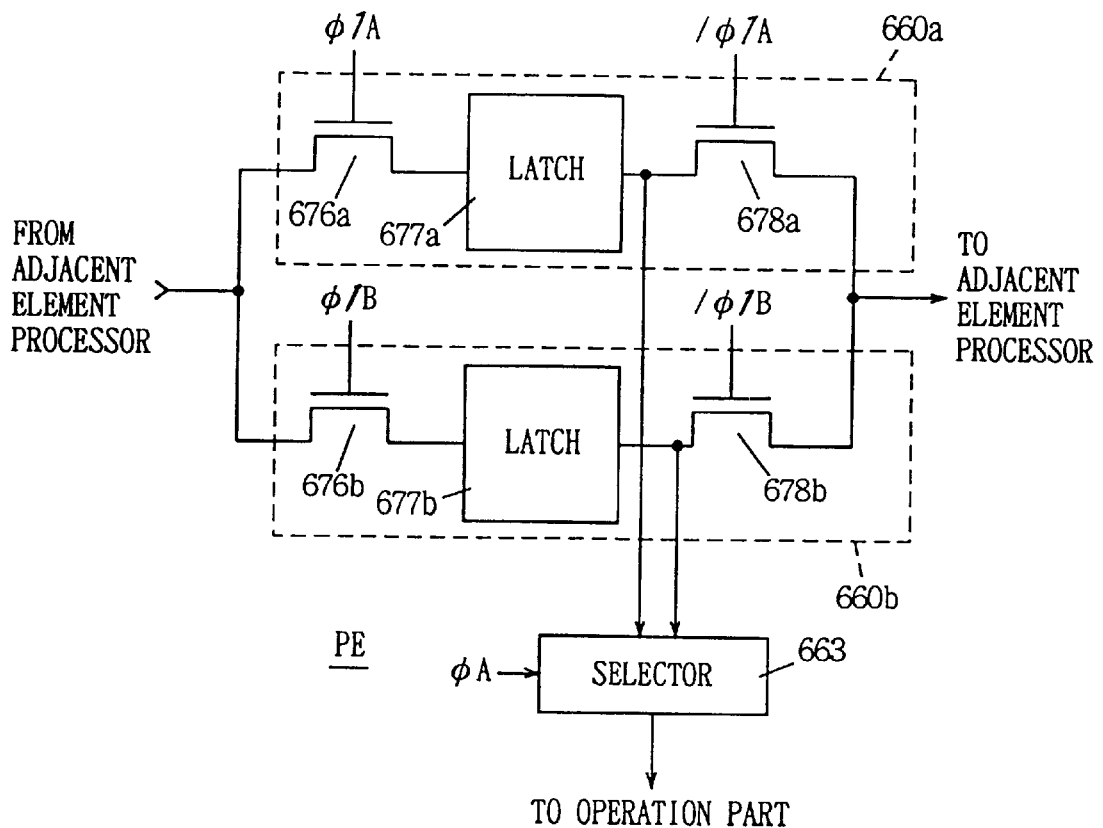
FIGS. 64A and 64B show a construction and an operational waveform of a second modification of the processor element according to the seventh embodiment, respectively.

FIG. 64A illustrates the structure of a second modification of the seventh embodiment of the present invention. FIG. 64A shows structures of registers (A) and (B) 660*a* and 660*b* of one element processor for storing template block pixel data. The remaining structure of this modification is identical to that of the element processor PE shown in FIG. 60 or 63.

Referring to FIG. 64A, the register (A) 660*a* includes a transfer gate 676*a* which transmits template block pixel data received from a downstream adjacent element processor or an input part in response to a clock signal φ1A, a latch 677*a* which latches the template block pixel data received through the transfer gate 676*a*, and a transfer gate 678*a* which transmits the pixel data stored in the latch circuit 677*a* to an upstream adjacent element processor or an output part in response to a clock signal /ϕ1A.

On the other hand, the register (B) 660*b* includes a transfer gate 676*b* which transmits template block pixel data received from the downstream adjacent element processor or the input part in response to a clock signal ϕ1B, a latch circuit 677*b* which latches the template block pixel data received through the transfer gate 676*b*, and a transfer gate 678*b* which transmits the pixel data stored in the latch circuit 677*b* to the upstream adjacent element processor or the output part in response to a clock signal /ϕ1B. A selector 663 for supplying the template block pixel data to an operation part (a subtracter and an absolute value circuit) is supplied with the pixel data which are latched by the latch circuits 677*a* and 677*b* respectively. When a signal PA designates the register (A) 660*a*, the selector 663 selects the pixel data latched by the latch 677*a*. When the signal MA specifies the register (B) 660*b*, on the other hand, the selector 663 selects the pixel data latched by the latch 677*b*.

Figure 64B:
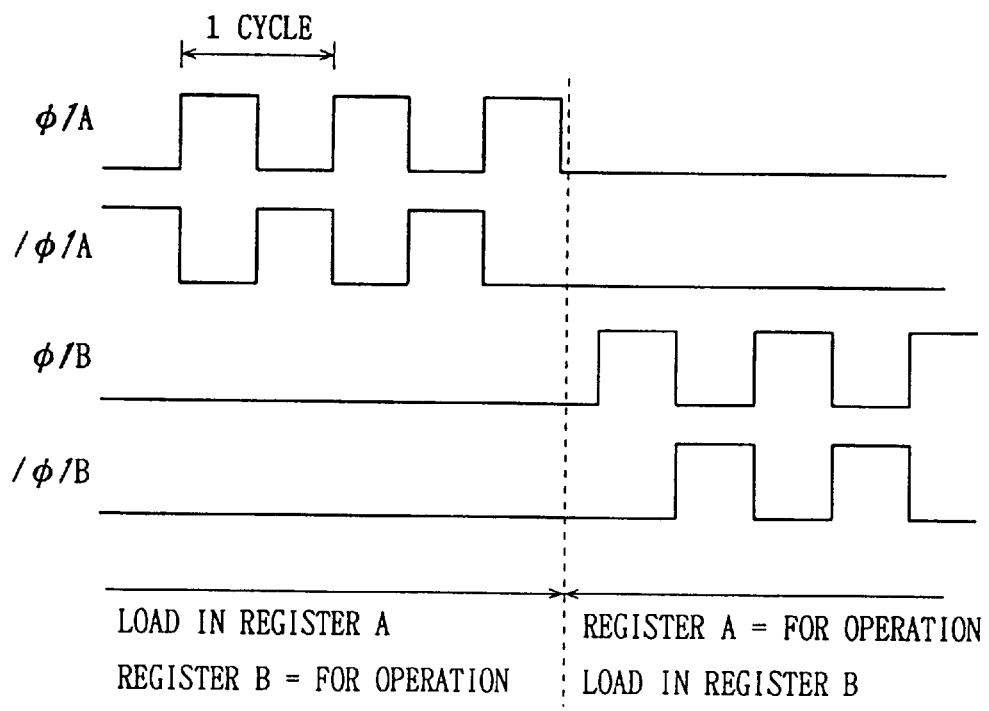

The registers (A) and (B) 660*a* and 660*b* shown in FIG. 64 are essentially shift registers in structure. Inputs of these registers 660*a* and 660*b* are interconnected with each other, while output thereof are also interconnected with each other. The clock signals ϕ1A and /ϕ1A (or ϕ1B and /ϕ1B) are supplied only to registers for loading template block pixel data. When latched pixel data are arithmetically processed, both of the clock signals ϕ1B and /ϕ1B (or ϕ1A and /ϕ1A) are brought into inactive states of low levels, and internal latches thereof are separated from the register exterior. Thus, it is possible to prevent a template block pixel data transfer operation for one register from exerting an influence on the pixel data stored in the other register. The operation of the element processor shown in FIG. 64A is now described with reference to an operation waveform diagram shown in FIG. 64B.

When the template block pixel data are loaded in the register (A) 660*a*, the signals ϕ1A and /ϕ1A are successively brought into high levels. The clock signals ϕA and /ϕA are non-overlapping two-phase clock signals. On the other hand, both of the clock signals ϕ1B and /ϕ1B for the register (B) 660*b* are brought into low levels, and both of the transfer gates 676*b* and 678*b* are turned off. The selector 663 selects the pixel data latched by the latch 677*b* in accordance with the signal ϕA, and supplies the selected pixel data to the operation part. Thus, a motion vector detecting operation is carried out with the template block pixel data stored in the latch 677*b*, i.e., the register (B) 660*b*. During this motion vector detecting operation, the clock signals ϕ1A and /ϕ1A are successively activated so that shift-in/shift-out operations for other template block pixel data are carried out. The transfer gate 676*a* enters an ON state when the clock signal ϕ1A goes high, while the signal /ϕ1A is at a low level and the transfer gate 678*a* is in an OFF state at this time. Therefore, template block pixel data supplied from the downstream adjacent element processor or the input part are latched in the latch 677*a*. Then, the clock signal ϕ1A goes low, the transfer gate 676*a* enters an OFF state, the clock signal /ϕ1A goes high, the transfer gate 678*a* enters an ON state, and the pixel data stored in the latch 677*a* are transmitted to the upstream element processor or the output part. Thus, it is possible to successively transfer template block pixel data to be subsequently processed through the register (A) 660*a* for storing the template block pixel data in the corresponding register (A) 660*a*.

When the motion vector detecting operation is completed through the pixel data stored in the register (B) 660*b*, the register (A) 660*a* already stores template block pixel data to be subsequently processed at this time. In this state, both of the clock signals ϕ1A and /ϕ1A are brought into low levels and both of the transfer gates 676*a* and 678*a* are brought into OFF states. At the same time, the selector 663 is set in a state for selecting the register (A) 660*a* by the signal ϕA. Thus, a motion vector detecting operation is carried out with the template block pixel data stored in the register (A) 660*a*. At this time the clock signals ϕ1B and /ϕ1B are successively brought into high levels so that template block pixel data to be subsequently processed are stored in the register (B) 660*b*.

In the structure shown in FIG. 64, the registers having shift register structures are simply employed and it is not necessary to provide a multiplexer and selectors for switching transfer paths for template block pixel data. Thus, it is possible to further reduce the scale of the element processor.

According to the seventh embodiment of the present invention, as hereinabove described, two registers are provided in the element processor for storing pixel data of different template blocks, so that template block pixel data to be subsequently processed are stored (loaded) in the second register in parallel with a motion vector detecting operation employing pixel data stored in the first register, whereby it is possible to carry out template block pixel data input and the motion vector detecting operation in parallel with each other, to apparently omit a time required for updating the template block pixel data and to remarkably reduce the motion vector detection processing time.

[Embodiment 8]

Figure 65:
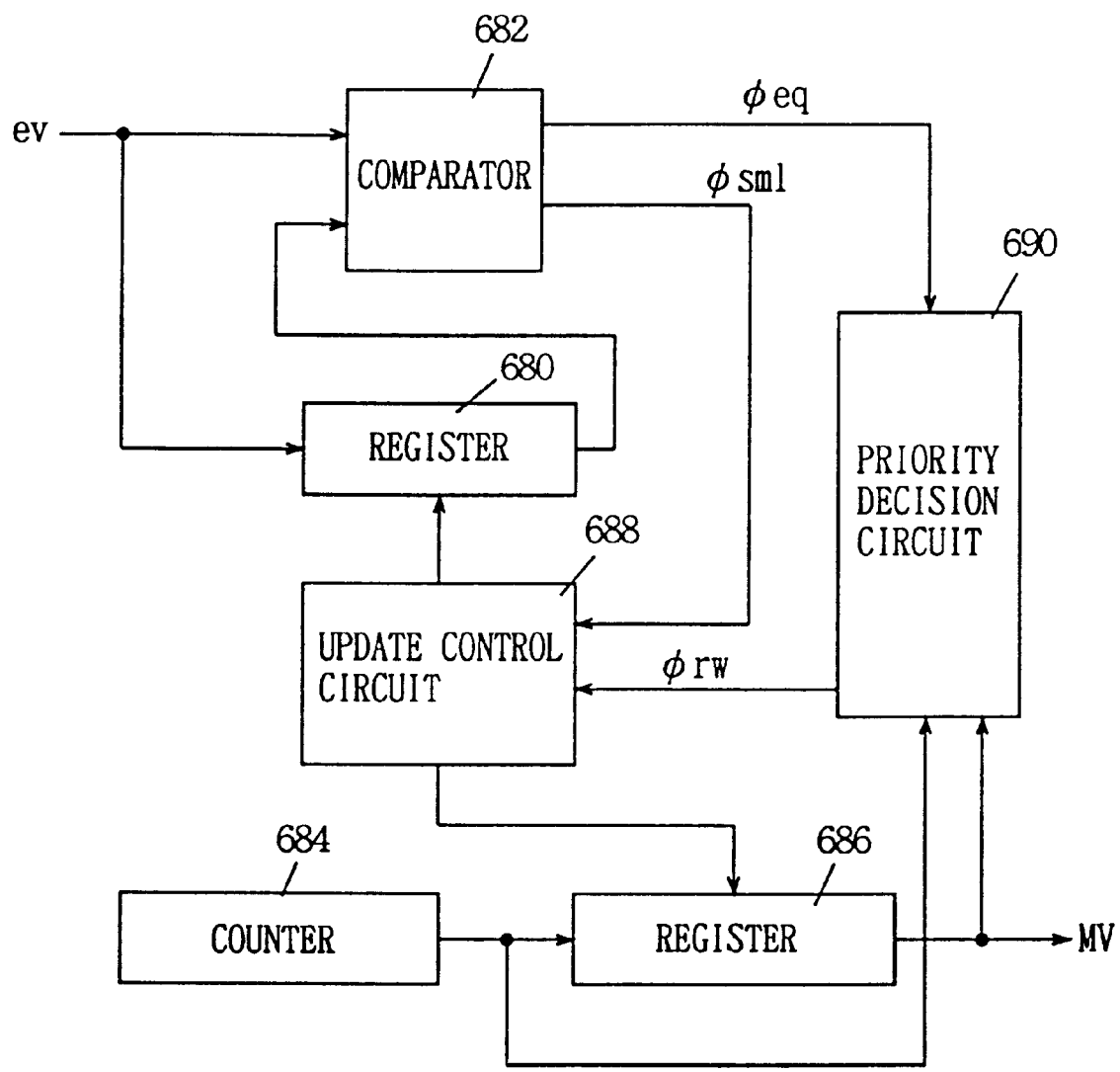
FIG. 65 illustrates a construction of a comparison part of a motion vector detecting circuit according to an eighth embodiment of the present invention.

FIG. 65 illustrates the structure of a principal part of a motion vector detecting device according to an eighth embodiment of the present invention. FIG. 65 shows the structure of a comparison part of the motion vector detecting device for detecting motion vectors. Referring to FIG. 65, the comparison part includes a register 680 for storing the minimum one of evaluation function values ev calculated in an operation part, a comparator 682 for comparing the evaluation function value stored in the register 680 with a supplied evaluation function value, a counter 684 generating information indicating a displacement vector having the supplied evaluation function value, a register 686 for storing a displacement vector corresponding to the minimum evaluation function value as a motion vector candidate, a priority decision circuit 690 which is activated in response to an equivalence indicating signal ϕeq from the comparator 682 and receives a count value outputted from the counter 684 and the displacement vector value stored in the register 686 for deciding the priority, and an update control circuit 688 for updating the contents of the registers 680 and 686 in response to a signal ϕsml indicating that the supplied evaluation function signal from the comparator 682 is smaller and an update instructing signal ϕrw from the priority decision circuit 690. The update control circuit 688 updates the contents of the registers 680 and 686 when one of the signals ϕsml and ϕrw is in an active state.

The counter 684 may be formed by an ordinary binary counter, or a counter generating count values indicating horizontal and vertical vectors H and V separately. When the counter indicates the horizontal and vertical vectors H and V separately, the count values are set in accordance with the size of a vertical search range, so that the count value of the horizontal vector counter is incremented by 1 when the vertical vector counter counts up a prescribed value. Either structure is employable.

The priority decision circuit 690 is formed to be capable of implementing three priority criteria, for selecting one of the three priority criteria and deciding the priority in accordance with the selected priority criterion.

FIGS. 66 and 67 show lists of first priority criteria which are employed in the priority decision circuit 690 shown in FIG. 65. FIGS. 66 and 67 show the priority criteria for the horizontal search range of −16 to +15 and the vertical search range of −16 to +16. FIG. 66 shows a priority criterion for regions having zero or negative horizontal H vectors, while FIG. 67 shows a priority criterion for horizontal displacement vectors H of positive values.

In the case of the first priority criteria shown in FIGS. 66 and 67, the priority of each displacement vector is set in accordance with P(H, V)=|H|+|V|. When evaluation function values are the same, it is assumed that a displacement vector having a smaller priority evaluation value P(H, V) has higher priority, so that the displacement vector having the higher priority is selected as a motion vector candidate.

In the case of the priority criteria shown in FIGS. 66 and 67, the priority is maximized at the right back region (vector 0, 0) and successively reduced with a distance from this central portion.

FIGS. 68 and 69 illustrate second priority criteria of the priority decision circuit 690 shown in FIG. 65. FIGS. 68 and 69 also show lists of priority evaluation values as to horizontal and vertical motion vector search ranges of −16 to +15 and −16 to +16. In the case of the priority criteria shown in FIGS. 68 and 69, the priority evaluation value P(H, V) of a displacement vector (H, V) is enhanced in P(H, V)=|H|= (−V+16). The priority is enhanced as the priority evaluation reference value P(H, V) is reduced.

In the case of the priority criteria shown in FIGS. 68 and 69, the priority is maximized at a displacement vector (0, 16) and successively reduced with a distance from this position. Namely, the central lower most portion has the highest priority in a search area.

FIGS. 70 and 71 illustrate third priority criteria of the priority decision circuit 690 shown in FIG. 65. The horizontal direction of the third priority criteria shown in FIG. 60 indicate priority criterion values in negative regions, while FIG. 71 shows priority evaluation reference values in horizontal positive regions of the search range. In the third priority criteria, a priority evaluation value P(H, V) is expressed in P(H, V)=|H|+(V+16). A displacement vector having a smaller priority evaluation value P(H, V) is supplied with higher priority. According to the third priority criteria, the highest priority is supplied to the vertical uppermost end portion (vertical displacement vector: displacement vector having the smallest V vector value) in the horizontal central portion. It is possible to readily accommodate expansion of a vertical search range for motion vector detection by providing the aforementioned three priority criteria, as described below.

Figure 72A:
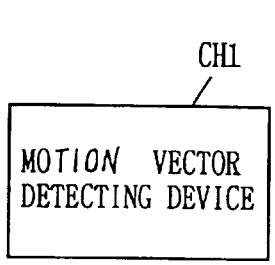
FIGS. 72A and 72B illustrate a construction of a motion vector detecting device using the first priority decision criterion.
Figure 72B:
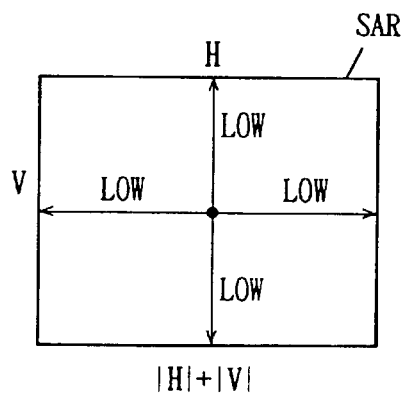

FIG. 72A shows such a state that a motion vector detection device is formed by a single chip CH1. In this state, the priority of each displacement vector is decided in accordance with the first priority criterion. In this case, the priority is decided in accordance with |H|+|V|in a motion vector search range SAR as shown in FIG. 72B, whereby a central displacement vector (0, 0) is supplied with the highest priority. Thus, the highest priority is supplied to a search window block which is just at the back of a template block.

Figure 73A:
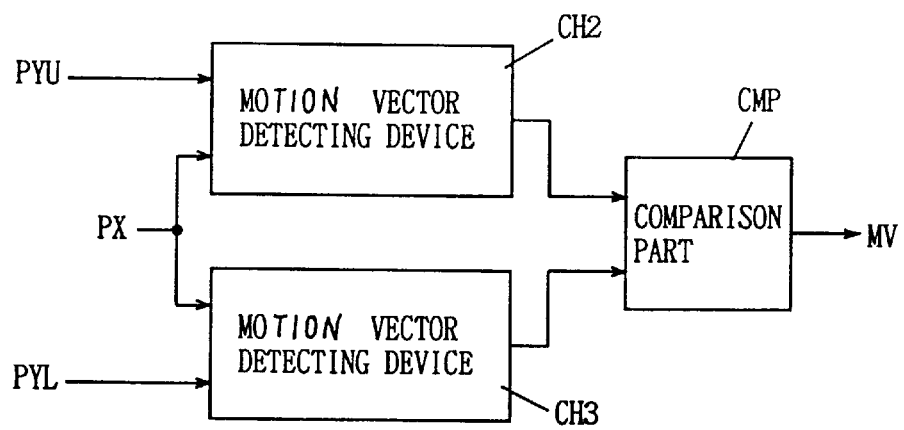
FIGS. 73A and 73B show a construction of a motion vector detecting device using the second and third priority decision criteria.

When the motion vector search range is doubly expanded in the vertical direction, two motion vector detecting device chips CH2 and CH3 are employed as shown in FIG. 73A. The motion vector detecting device chip CH2 is supplied with upper half search window pixel data PYU of the search range, so that motion vector detection as to the upper half of the search range is carried out in this motion vector detecting device chip CH2. On the other hand, the motion vector detecting device chip CH3 is supplied with lower half search window pixel data PYL of the search range, for carrying out motion vector detection on the lower half region of the search range. The motion vector detecting device chips CH2 and CH3 are supplied with the same template block pixel data PX in common. The motion vector detecting device chip CH2 decides the priority of each displacement vector in accordance with the second priority criterion, while the motion vector detecting device chip CH3 decides the priority of each displacement vector in accordance with the third priority criterion.

Figure 73B:
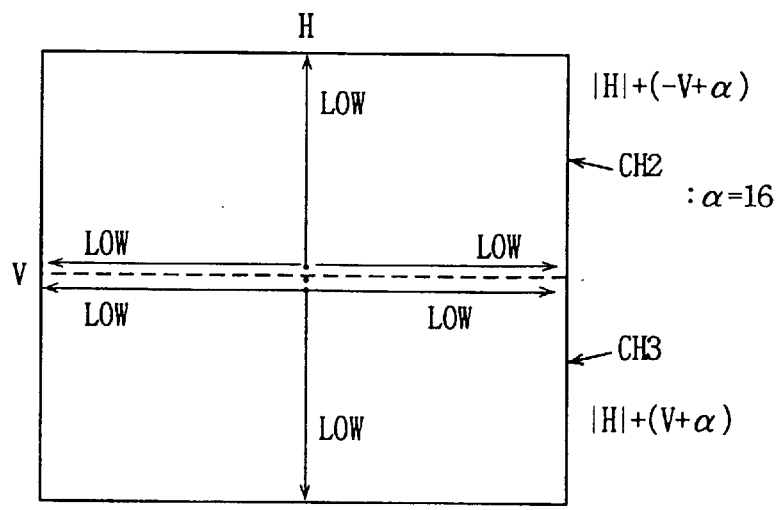

In the motion vector detecting device chip CH2, the highest priority is given to a displacement vector at a center in a horizontal direction in the lower end in a vertical direction of the search range, as shown in FIG. 73B. In the motion vector detecting device chip CH3, on the other hand, the highest priority is given to a displacement vector at a center in a horizontal direction and in the upper end in the vertical direction of the search range. Therefore, it is possible to carry out motion vector detection while giving the highest priority to the displacement vector at the right back position also with respect to the expanded motion vector search range, by further deciding the optimum vector from the motion vectors detected by the motion vector detecting device chips CH2 and CH3 in accordance with evaluation function values by a comparison part CMP shown in FIG. 73A. Thus, it is possible to regularly carry out motion vector detection in accordance with the priority about the displacement vector (0, 0) also in vertical-directional expansion of the motion vector search range, thereby carrying out motion vector selection for detecting a search window block which is closer to a template block as a predictive picture image block. Since two motion vector detecting device chips are employed, the time required for the motion vector detection as to the doubled vertical search range is identical to the processing time required in a case of no expansion, due to the parallel operations of the two motion vector detecting device chips, whereby high-speed processing is enabled.

The vertical motion vector search range can be readily expanded by three or four times, in addition to twice.

Assuming that a unit vertical search range to be expanded is −α to +α in expansion of the motion vector vertical search range, the second and third priority criteria are expressed as P(H, V)=|H|+(−V+α) and |H|+(V+α) respectively. While priority decision circuits having the three priority criteria can be formed independently of each other in accordance with the applications of the chips, it is possible to utilize one of the three priority criteria simply in accordance with a control signal, as described below.

Figure 74:
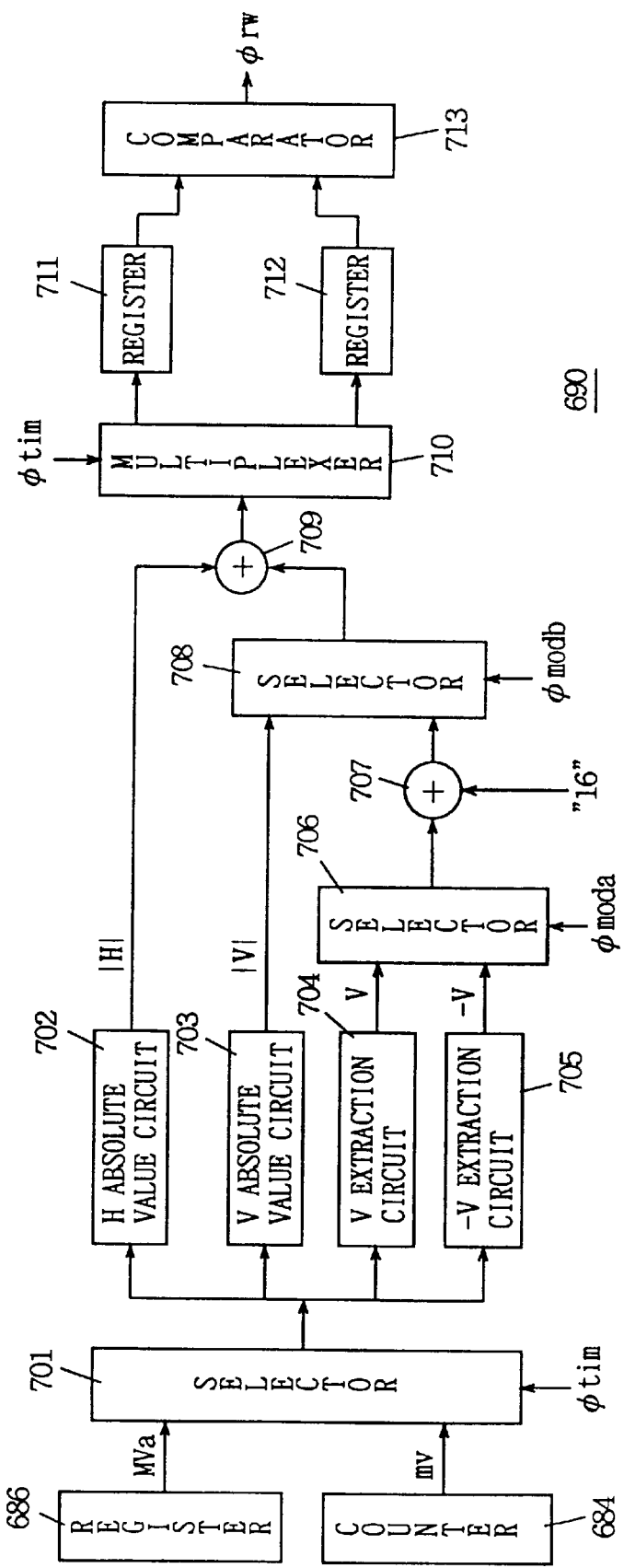
FIG. 74 illustrates an exemplary construction of the priority decision circuit shown in FIG. 65.

FIG. 74 illustrates an exemplary structure of the priority decision circuit 690 shown in FIG. 65.

Referring to FIG. 74, the priority decision circuit includes a selector 701 which successively time-division multiplexedly selects data mv indicating the displacement vectors of a search window block under processing outputted from a counter 684 and vectors MVa from a register 686 storing motion vector candidates in accordance with a timing signal φtim, an H absolute value circuit 702 which extracts horizontal vector components from vectors received from the selector 701 and forming absolute values thereof, a V absolute value-circuit 703 which forms data indicating the absolute values of vertical components V from vector data received from the selector 701, a V extraction circuit 704 which extracts vertical vector components V of vectors received from the selector 701, and a −V extraction circuit 705 which forms values −V by inverting the sign of the vertical vector components received from the selector 701.

When vector information outputted from the counter 684 indicates mere binary count values, the circuits 702 to 705 may include decoder circuits for forming H and V components therein respectively. When the counter 684 is adapted to form H and V components separately, on the other hand, the circuits 702 to 705 simply receive corresponding is components and carry out desired arithmetic processing for forming required data. Further, the circuits 703 and 705 may be so formed as to receive the output of the V extraction circuit 704. In such a case, the V absolute value circuit 703 is replaced by an absolute value circuit receiving the data outputted from the V extraction circuit 704, while the −V extraction circuit 705 is replaced by a sign change circuit for inverting the sign of the data outputted from the V extraction circuit 704.

The priority decision circuit 690 further includes a selector 706 which selects one of the vertical component data V outputted from the V extraction circuit 704 and the sign-inverted vertical components −V outputted from the −V extraction circuit 705 in accordance with a mode specifying signal φmoda, an adder 707 which adds up the data outputted from the selector 706 with a constant value 16 (=α), a selector 708 which selects one of the data |V| outputted from the V absolute value circuit 703 and data outputted from the adder 707 in accordance with a mode specifying signal φmodb, and an adder 709 which adds up data outputted from the selector 708 and the H absolute value circuit 702. The selector 706 selects the data −V outputted from the −V extraction circuit 705 when the mode specifying signal φmoda specifies the second priority criterion, while selecting the data V outputted from the V extraction circuit 704 when the signal φmoda specifies the third priority criterion. On the other hand, the selector 708 selects the data |V| outputted from the V absolute value circuit 703 when the mode specifying signal φmodb specifies the first priority criterion, while selecting the data outputted from the adder 707 when the mode specifying signal φmodb specifies the second or third priority criterion.

The priority decision circuit 690 further includes a multiplexer 710 which transmits the output of the adder 709 to either one of its two outputs in accordance with the timing signal φtim, registers 711 and 712 which are provided in correspondence to the two outputs of the multiplexer 710 respectively, and a comparator 713 which compares values of data stored in the registers 711 and 712. The comparator 713 generates an update control signal φrw. The multiplexer 710 time-division multiplexedly stores output data of the adder 709 in the registers 711 and 712 in accordance with the timing signal φtim. When the timing signal φtim is set in a state of selecting the count value of the counter 684, the selector 701 selects the count value of the counter 684 while the multiplexer 710 transmits the output of the adder 709 to the register 712. When the timing signal φtim is set in a state of selecting the data MVa outputted from the register 686, on the other hand, the multiplexer 710 stores the data outputted from the adder 709 in the register 711 in accordance with the timing signal φtim. Thus, the register 711 stores priority criterion values for the motion vector candidates stored in the register 686, while the register 712 stores priority criterion data for the displacement vectors of the search window block currently under processing outputted from the counter 684. After the priority criterion data are stored in the registers 711 and 712 respectively, the comparator 713 compares the values thereof. When the priority criterion data for the displacement vector of the search window block under processing is smaller than that of the displacement vector of the motion vector candidate stored in the register 686, the comparator 713 outputs the update control signal φrw which is in an active state.

Figure 75:
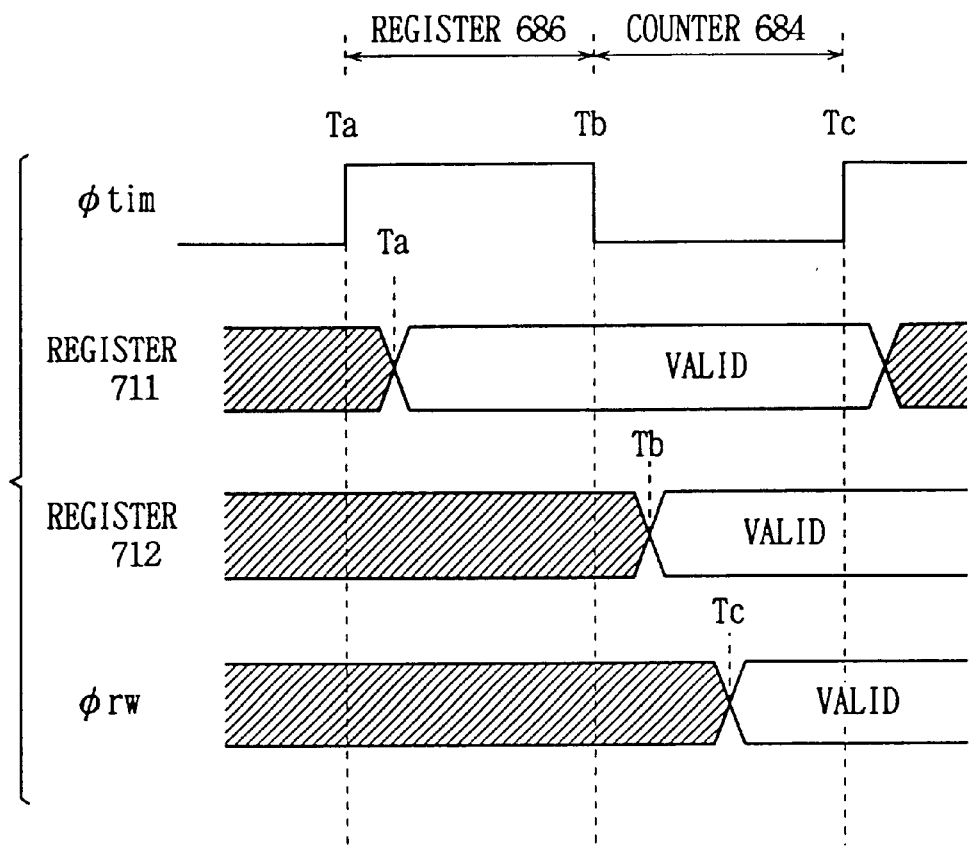
FIG. 75 is a diagram used for explaining an operation of the priority decision circuit shown in FIG. 74.

FIG. 75 illustrates an exemplary operation sequence of the priority decision circuit 690 shown in FIG. 74. FIG. 75 shows only one priority decision operation cycle. The mode specifying signals φmoda and φmodb are previously set in prescribed states respectively, for setting priority criteria for the corresponding motion vector detecting devices. When it is indicated that the evaluation function value of the motion vector candidate stored in the register 686 is equal to that of the displacement vector outputted from the counter 684, this priority decision circuit 690 is activated. The timing signal φtim is activated in this activated state of the priority decision circuit 690. When the timing signal φtim rises to a high level at a time Ta, the selector 701 selects motion vector data having the minimum one of evaluation function values theretofore supplied, which is stored in the register 686. A prescribed priority criterion calculating operation is performed in accordance with the data from the register 686, to ascertain the data stored in the register 711 at the time Ta.

When the timing signal φtim goes low at a time Tb, the selector 701 selects the data outputted from the counter 684. A prescribed priority criterion calculating/deciding operation is carried out in accordance with the data outputted from the counter 684, so that the priority criterion value as calculated is stored in the register 712 at the time Tb. When the contents of the register 712 are ascertained, the comparator 713 makes a comparing operation at a time Tc, so that the state of the update control signal φrw outputted from the comparator 713 is decided at the time Tc. It is possible to reduce the device scale by forming the priority criterion values in time-division multiplexing.

Figure 76:
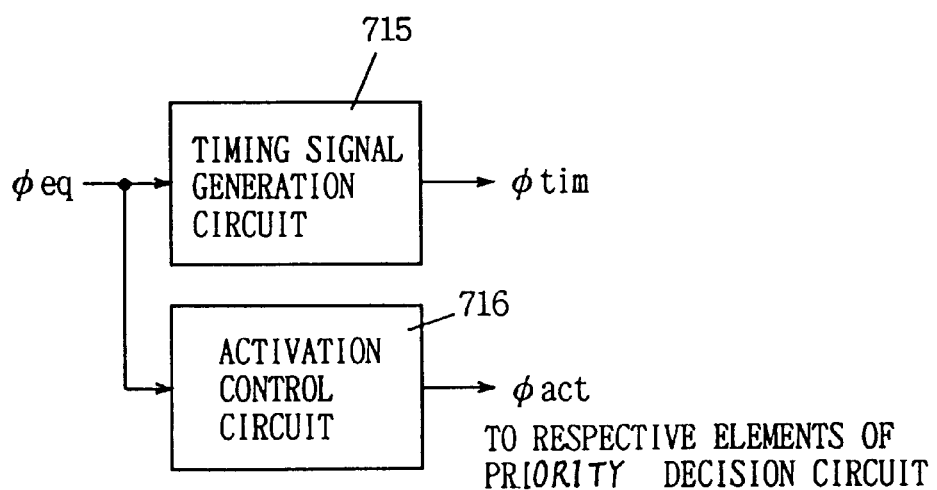
FIG. 76 shows constructions of generating selector and multiplexer switching signals shown in FIG. 75.

FIG. 76 illustrates the structure of a timing signal generation part. As shown in FIG. 76, a timing signal generation circuit 715 outputs the timing signal φtim which enters an active state/inactive state for a prescribed period in response to an equivalence indicating signal φeq from the comparator 682 shown in FIG. 65. This timing signal generation circuit 715 is formed by an oscillation circuit (ring oscillator, for example) which is brought into an operable state in response to the equivalence indicating signal φeq, for example. FIG. 76 also shows an activation control circuit 716 which generates an activation control signal tact for activating the respective elements of the priority decision circuit 690 in response to the equivalence indicating signal φeq. Due to the activation control circuit 716, the priority decision circuit 690 is brought into an operable state only when priority decision is required, for reducing current consumption.

In the structure shown in FIG. 74, the multiplexer 710 provided on the inputs of the registers 711 and 712 storing the priority criterion values may be omitted so that the timing signal φtim is directly supplied to the registers 711 and 712 (refer to the structure shown in FIG. 64A).

According to the structure of the eighth embodiment of the present invention, as hereinabove described, the priority of each displacement vector can be varied with the motion vector search range, whereby it is possible to carry out a motion vector detecting operation with the highest priority for the displacement vector (0, 0) also when the motion vector search range is expanded in the vertical direction, whereby the optimum motion vectors can be selected also in the expanded motion vector search range.

[Embodiment 9]

Figure 77:
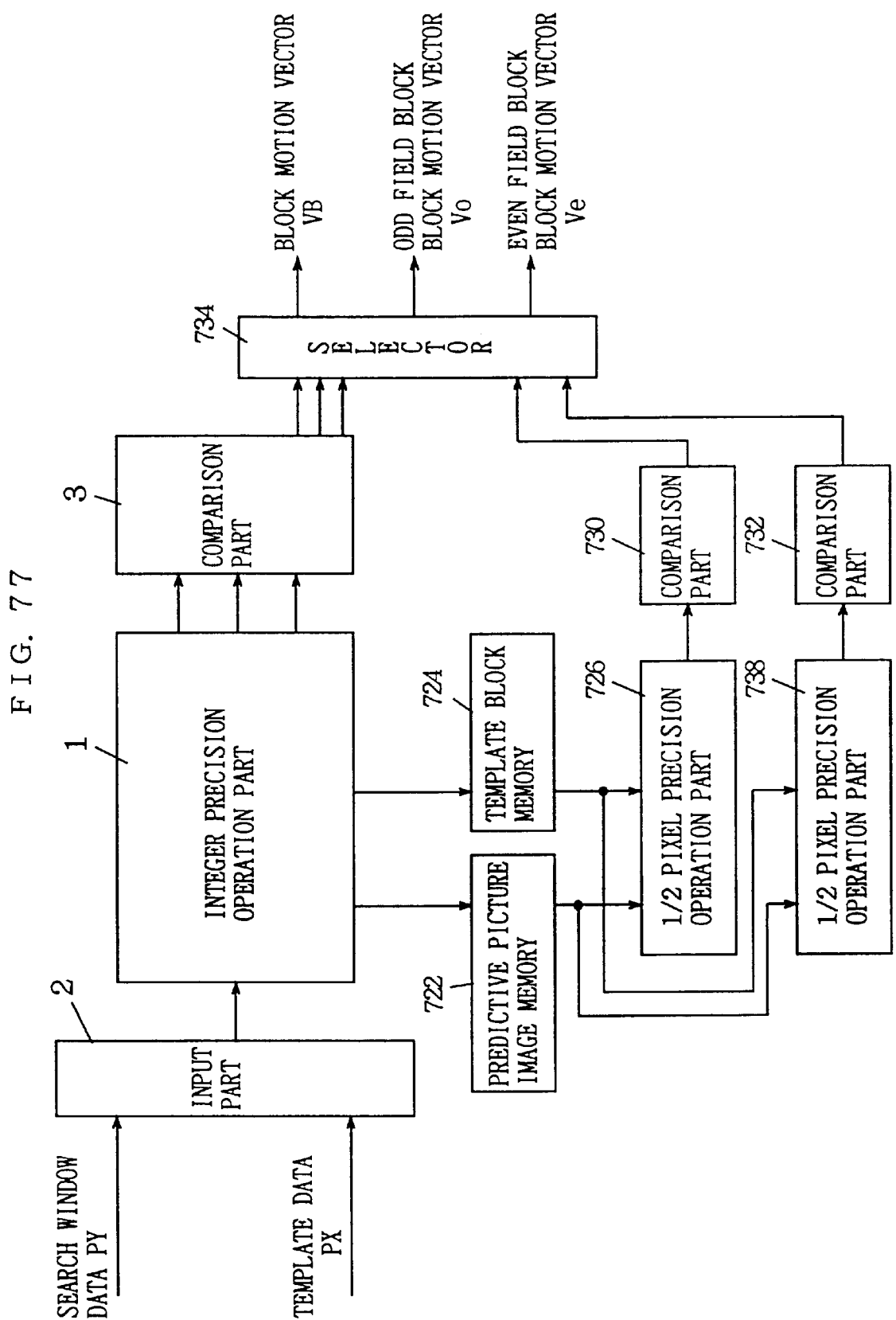
FIG. 77 illustrates a construction of a motion vector detecting device according to a ninth embodiment of the present invention.

FIG. 77 schematically illustrates the overall structure of a motion vector detecting device according to a ninth embodiment of the present invention. FIG. 77 shows a structure for coding pixels in units of frames. Referring to FIG. 77, the motion vector detecting device includes an input part 2 which receives search window pixel data PY and template block pixel data PX and outputs the supplied data PX and PY at prescribed timings respectively, an integer precision operation part 1 which calculates a plurality of evaluation function values (absolute differential values) in accordance with a plurality (three in this embodiment) of predictive modes in accordance with the pixel data supplied from the input part 2, and a comparison part 3 for deciding optimum motion vectors for the plurality of predictive modes respectively in accordance with the evaluation function values supplied from the operation part 1. The integer precision operation part 1 is identical in structure to the operation part described above with reference to FIG. 1, for example. This integer precision operation part 1 calculates evaluation function values as to displacement vectors of respective search window blocks in accordance with a block motion vector predictive mode, an odd field block predictive mode and an even field block predictive mode respectively. The comparator 3 decides displacement vectors corresponding to the minimum values of the function values for the respective modes received from the integer precision operation part 1 as motion vectors of the respective predictive modes.

The motion vector detecting device further includes a fractional precision predictive picture image memory 722 which detects regions (predictive picture image regions) in search areas expressed by displacement vectors providing the minimum evaluation values in response to the detection of the minimum values in the comparator 3 and stores fractional precision (½ pixel precision; half pell precision) evaluation predictive picture image regions obtained by horizontally and vertically expanding the predictive picture image regions by one pixel, and a template block memory 724 which stores the template block pixel data PX supplied from the integer precision operation part 1. The predictive picture image memory 722 stores predictive picture image region pixel data for the plurality of predictive modes respectively. When each of template blocks and the search window blocks are formed by pixels of 16 rows and 16 columns, the predictive picture image memory 722 has a region storing pixel data of 18 rows and 18 columns including a search window block determined by motion vectors which are decided in accordance with the block predictive mode, and regions storing pixel data of predictive picture image regions of 18 columns and 10 rows enclosing the regions of 16 columns and 8 rows corresponding to odd and even field pixels specified by motion vectors which are decided in accordance with the odd and even field block predictive modes respectively.

The motion vector detecting device further includes a ½ pixel precision operation part 726 which receives the template block pixel data PX stored in the template block memory 724 and pixel data included in the predictive picture image block decided by the block predictive mode stored in the predictive picture image memory 722 and carries out prescribed arithmetic processing in fractional precision (½ pixel (half pell) precision) for forming evaluation function values with respect to respective displacement vectors in fractional precision (½ pixel precision), a ½ pixel precision operation part 738 which receives the template block pixel data PX stored in the template block memory 724 and the pixel data included in the predictive picture image regions corresponding to the odd and even field block predictive modes stored in the predictive picture image memory 722 and carries out prescribed arithmetic operations in ½ pixel precision respectively for forming evaluation function values, a comparison part 730 which decides a motion vector in fractional precision by the block motion vector predictive mode by obtaining the minimum value of the evaluation function values outputted from the ½ pixel precision operation part 726, and a comparison part 732 which detects the minimum values in accordance with the evaluation function values from the ½ pixel precision operation part 738 for detecting motion vectors for the odd and even field block predictive modes respectively. The ½ pixel precision operation part 738 time-division multiplexedly executes motion vector detecting operations in accordance with the odd and even field block predictive modes in fractional precision. These operations are described later in detail.

The motion vector detecting device further includes a selector 734 which receives the motion vectors, which are decided in accordance with the plurality of predictive modes respectively, and outputted from the comparison part 3 and the motion vectors in the plurality of predictive modes respectively in fractional precision, supplied from the comparison parts 730 and 732 for outputting a block motion vector VB in accordance with the block predictive mode and motion vectors Vo and Ve decided in accordance with the odd and even field block predictive modes respectively. The selector 734 is provided since the motion vector Vo according to the odd field block predictive mode and the motion vector Ve of fractional precision in accordance with the even field block predictive mode are time-division multiplexedly supplied from the comparison part 732.

Figure 78:
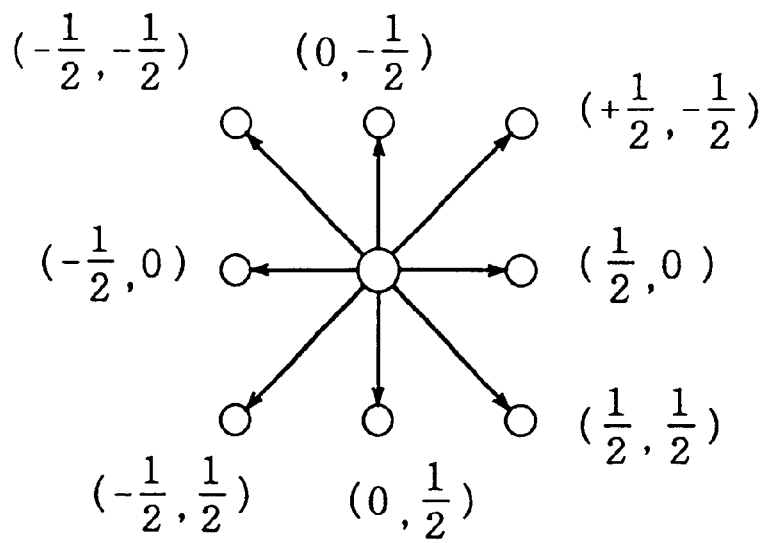
FIG. 78 is a diagram used for explaining an operation of a fractional precision arithmetic part of the motion vector detecting device shown in FIG. 77.

As shown in FIG. 78, evaluation values are calculated in eight neighborhood points about each motion vector which is decided for each of the plurality of predictive modes by the integer precision operation part 1 in motion vector detection in ½ pixel precision. A vector providing the minimum value among nine neighborhood evaluation function values including that in the motion vector position in integer precision is decided as the motion vector. Namely, the motion vector is decided through nine evaluation points of (−½, −½), (0, −½), (+½, −½), (−½, 0), (0, 0), (½, 0), (−½, ½), (0, ½) and (½, ½).

Figure 79:
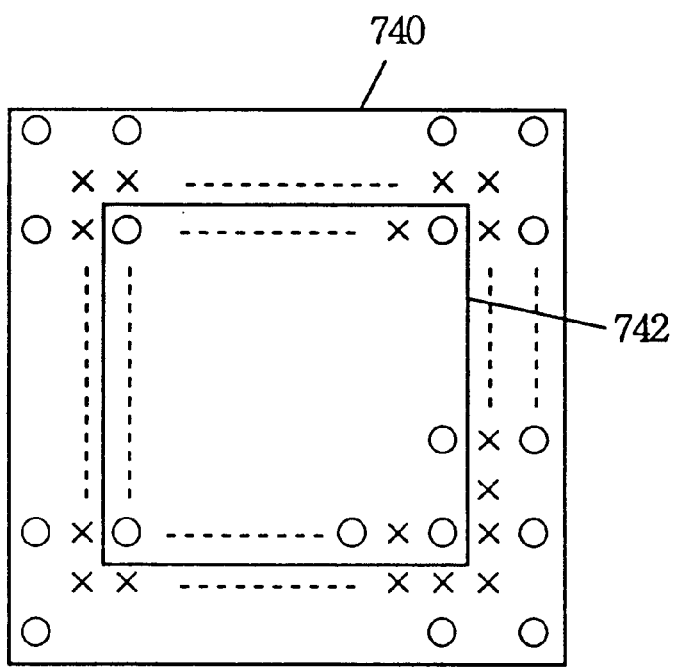
FIG. 79 illustrates a construction of a predictive picture image produced upon detection of a fractional precision motion vector.

FIG. 79 illustrates pixel distribution in a predictive picture image region employed in the motion vector detection in ½ pixel precision. As shown in FIG. 79, employed are pixel data included in a region 740 obtained by expanding a predictive picture image region 742 designated by the motion vector in each of positive and negative horizontal and vertical directions by a pixel. Pixel data (shown by X in FIG. 79) to be employed in the operation in ½ pixel precision are produced from pixel data (shown by the mark O in FIG. 79). In evaluation function value calculation of the displacement vectors in ½ pixel precision, only the pixel data shown by the mark X in FIG. 79 are employed. Evaluation function values for the respective displacement vectors shown in FIG. 78 are generated by the pixel data shown by the mark X and the template block pixel data.

When the template block includes pixels of 16 rows and 16 columns, the region 740 includes pixels of 18 rows and 18 columns. The template block has a size of 8 rows and 16 columns in the even and odd field predictive modes. In this case, therefore, the region 740 includes pixels of 10 rows and 18 columns.

Figure 80:
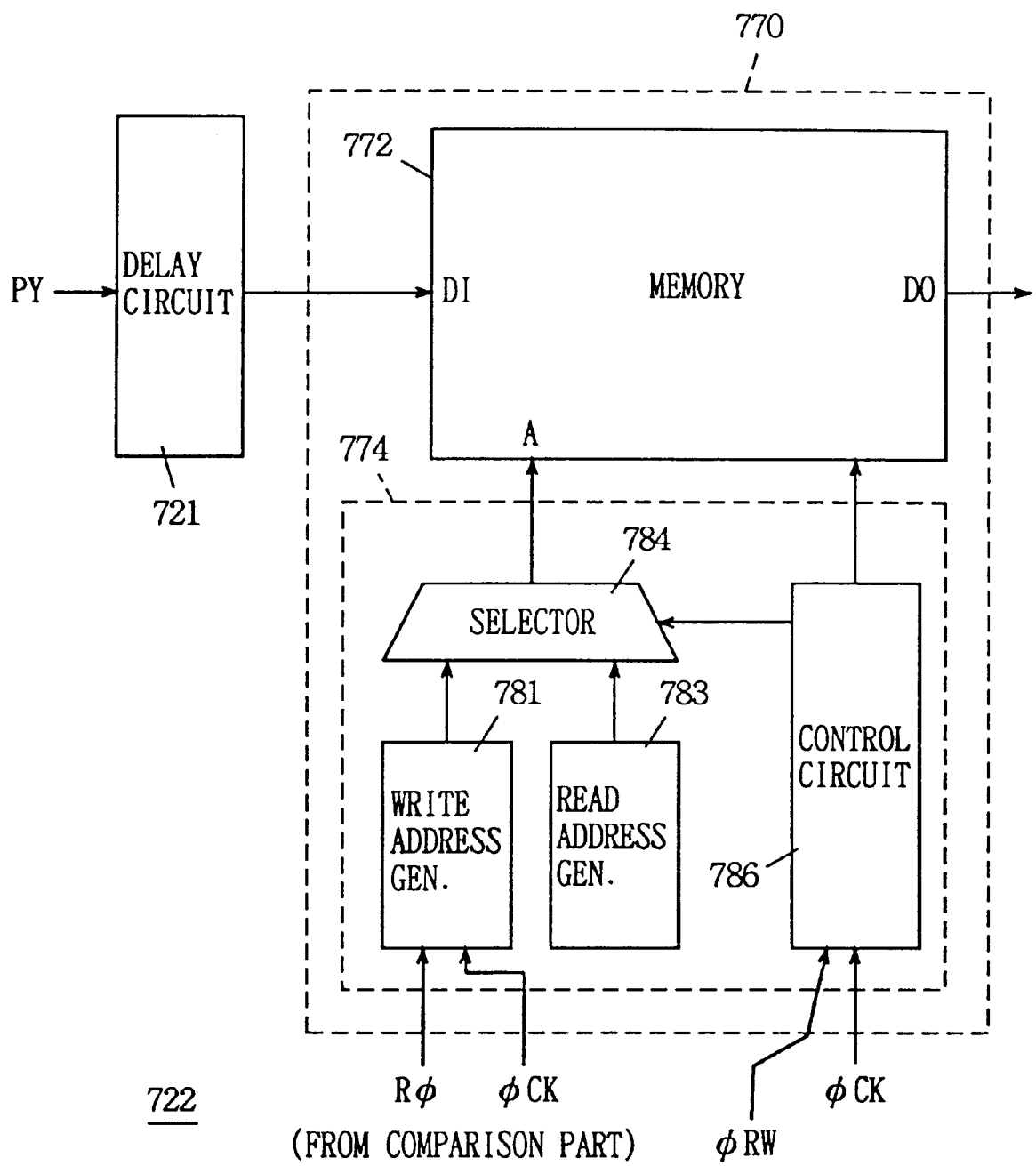
FIG. 80 shows constructions of a predictive image memory and a template block memory shown in FIG. 77, respectively.

FIG. 80 illustrates a memory structure of the predictive picture image memory 722 shown in FIG. 77 for storing pixel data of one predictive picture image region. The following description is made on the structure and operation of a memory device storing pixel data of a predictive picture image region corresponding to the motion vector which is decided in accordance with the block predictive mode. This is readily applicable to structures of memory devices for storing pixel data of predictive picture image regions of the even and odd field predictive modes.

Referring to FIG. 80, the predictive picture image memory 722 includes a delay circuit 721 for delaying the search window pixel data PY received from the integer precision operation part 1 by a prescribed time, a memory 772 for storing the pixel data outputted from the delay circuit 721, and a write/read control circuit 774 for controlling data writing and reading of the memory 772. An output node DO of the memory 772 is connected to the ½ pixel precision operation part 726 shown in FIG. 77. The memory 772 may be formed by a static random access memory, or a dynamic random access memory. When the memory 772 is formed by a dynamic random access memory, a high-speed access mode such as a page mode or a static column mode is employed.

The write/read control circuit 774 includes a write address generation circuit 781 for generating write addresses for the memory 772, a read address generation circuit 783 for generating read addresses of the memory 772, a control circuit 786 for generating signals designating read and write modes of the memory 772, and a selector 784 for selecting one of the write and read addresses and supplying the same to an address input node A of the memory 772 under control by the control circuit 786.

The write address generation circuit 781 generates the write addresses in response to a latch instructing signal Rφ which is outputted from the comparison part 3 shown in FIG. 77. The latch instructing signal Rφ is activated when the evaluation function value and the vector of the stored motion vector candidates are updated in the comparison part 3, and the signal Rφ corresponds to the update control signal φrw of the update control circuit 688 included in the comparison part shown in FIG. 65, for example. When the latch instructing signal Rφ is activated, the write address of the write address generation circuit 781 is reset at an initial value. The write address generation circuit 781 successively generates the write addresses from an address 0, for example, in response to a clock signal φck. This clock signal φck is used to shift search window pixel data in the integer precision operation part 1. The read address generation circuit 783 also successively generates the read addresses from an address 0. When the control circuit 786 indicates data writing, the selector 784 selects the write addresses from the write address generation circuit 781 and supplies the same to the memor 772. When the control circuit 786 indicates a read mode, on the other hand, the selector 784 selects the read addresses from the read address generation circuit 783 and supplies the same to the memory 772.

The control circuit 786 generates signals for deciding data write and data read timings for the memory 772 in response to the search window pixel data transfer clock signal φck. The control circuit 786 also generates a chip enable signal (chip selection signal) for designating a write or read operation mode of the memory 772 and bringing the memory 772 into a selected state in response to an operation mode designating signal φRW. The operation mode designating signal φRW may be supplied to the control circuit 786 from a controller which is provided in the exterior. Alternatively, a count-up signal may be generated when the counter for forming displacement vector information included in the comparison part 3 attains a count-up state, and the count-up signal is employed as the operation mode designating signal φRW. This is because derivation of evaluation function values with respect to one template block is persistently executed until the count value of the counter for forming displacement vector information included in the comparison part 3 reaches a prescribed value. A write operation to the memory 772 is carried out during a motion vector detecting operation so that new template block pixel data are stored in the integer precision operation part 1 upon decision of a motion vector as to one template block, whereby pixel data of a search window with respect to a next template block are stored in parallel with this operation when an evaluation function value as to only one template block is formed. When pixel data are read from the memory 772 in parallel at this time, therefore, it is possible to read data of the predictive picture image region from the predictive picture image memory 722 in loading of desired data in the integer precision operation part 1. The operation is now described.

Figure 81:
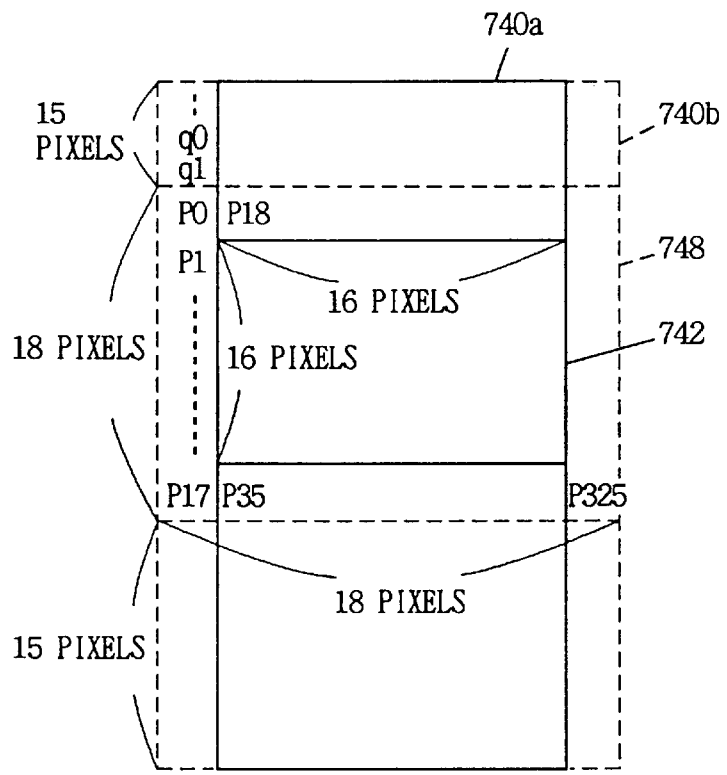
FIG. 81 is a diagram used for explaining an operation of the predictive image memory shown in FIG. 80A.

Consider that the search window is formed by 48 pixel rows and 16 column pixels and each of macro blocks (template and search window blocks) is formed by 16 pixel rows and 16 pixel columns, as shown in FIG. 81. It is assumed that an evaluation function value calculating operation is carried out as to a search window block 742. A region 748 of 18 by 18 pixels including the region 742 is required for obtaining a motion vector in fractional precision with respect to the search window block 742. The region 748 includes search window pixel data P0 to P325.

Figure 82:
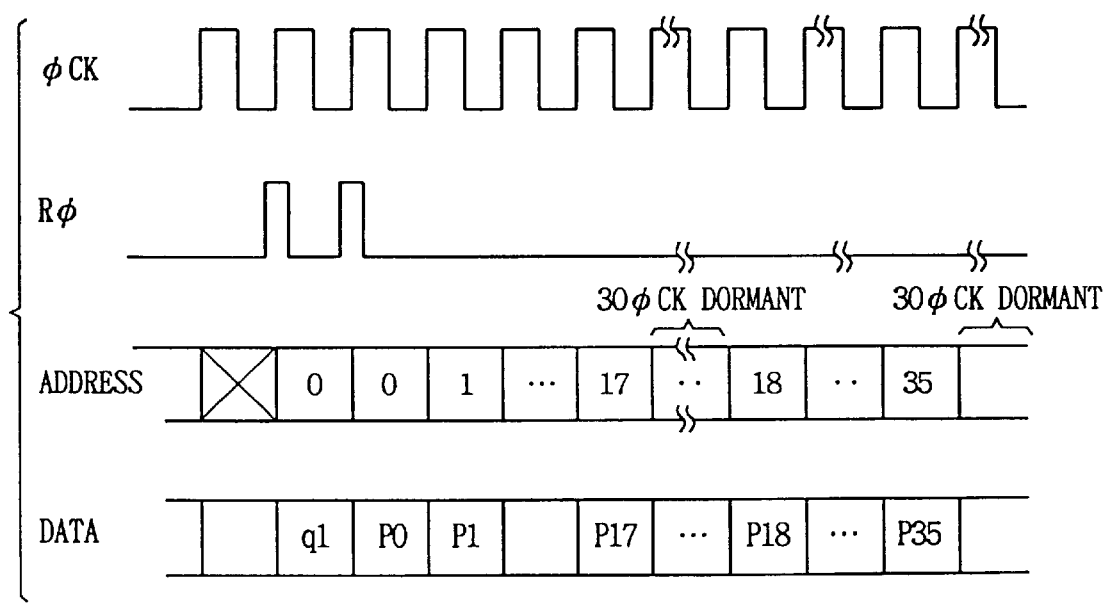
FIG. 82 is a waveform diagram representing an operation of the predictive image memory shown in FIG. 80.

As shown in FIG. 82, the search window data transfer clock signal φck is generated every transfer of the search window pixel data. Upon each generation of clock signal φck, the search window pixel data are shifted out by one pixel. In the evaluation function calculating operation for the search window block 742, the delay circuit 721 shown in FIG. 80 outputs data corresponding to the pixel P0. The delay circuit 721 provides a delay time which is equivalent to a time required for transferring one column of pixels of a search window 740a. When the evaluation function value of the search window block 742 is the minimum one of evaluation function values theretofore obtained, the comparison part 3 generates (activates) the latch instructing signal Rφ (evaluation function value update instructing signal). In response to the latch instructing signal Rφ, the write address of the write address generation circuit 781 shown in FIG. 80 is reset to the initial value 0. The pixel data P0 is written in the address of the reset initial value 0. Thereafter, pixel data P1 to P17 are successively stored in the positions of addresses 1 to 17 of the memory 772 unless the signal Rφ is activated. Then, the write address generation circuit 781 enters a dormant state and the memory 772 enters a write inhibited state for a 30 clock period, i.e., 30 φck, in order to inhibit writing of unnecessary data. In the write inhibit (dormant) period, the control circuit 786 brings the memory 772 into a nonselected state for the period 30 φck after counting the clock signal φck 18 times after supply of the activated latch instructing signal Rφ. It is assumed that the latch instructing signal Rφ is not activated during this period. When the latch instructing signal Rφ is activated in any period, the write address of the write address generation circuit 781 is reset to the initial value 0, as described above.

After a lapse of the φ30 clock period (30 φck cycle period), the write address generation circuit 781 again generates a write address φ18, so that the pixel data P18 is stored in the position of this address φ18. When the pixel data P18 is supplied from the delay circuit 721 (see FIG. 80), the search window 740a is shifted to a search window 740b of a next column.

In a template block change, a search area is shifted in a positive horizontal direction by one macro block size (16 columns). Even when a macro block (search window block) providing the motion vector is in contact with the boundary of the search area, it is possible to obtain all pixel data which are required for motion vector detection in fractional precision. In this case, a structure of neglecting pixel data outside the search area may be employed as described later. In the template block change, further, the search window pixel data are also shifted out. When a write operation for the memory 772 is inhibited, the delay circuit 721 outputs a first pixel data of a precedent column of the search area after completion of a first displacement vector detecting operation of a next template block. Particularly in the delay circuit 721, therefore, it is not necessary to reset its content in template block updating, and the search window pixel data outputted from the integer precision operation part 1 can be intactly employed.

Due to the aforementioned series of operations, the memory 772 regularly stores only the pixel data of the search window block corresponding to the displacement vector serving as a motion vector candidate.

Figure 83:
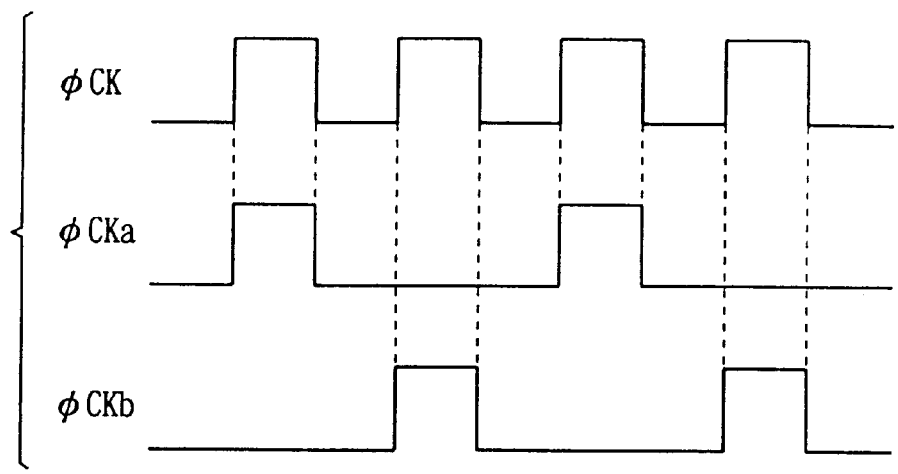
FIG. 83 illustrates a clock sequence of clock signals applied to a memory part of the predictive image memory of FIG. 80 in a block predictive mode, an odd field predictive mode, and an even field predictive mode.

When odd and even field pixel data are stored, a similar structure may be employed so that clock signals φcka and φckb are alternately generated every other cycle of the clock signal φck to be employed as clock signals for writing odd and even field pixel data respectively, as shown in FIG. 83. Write address generation circuits for even and odd field pixel data are supplied with reset signals Rφ from the comparison parts carrying out motion vector detecting operations in accordance with the odd and even field predictive modes respectively. Due to such structure, it is possible to store pixel data which are required for motion vector detection in a desired fractional precision in accordance with the plurality of predictive modes respectively.

The template block memory 724 successively stores template block pixel data which are successively outputted from the integer precision operation part 1 in updating of the template block pixel data.

Figure 84:
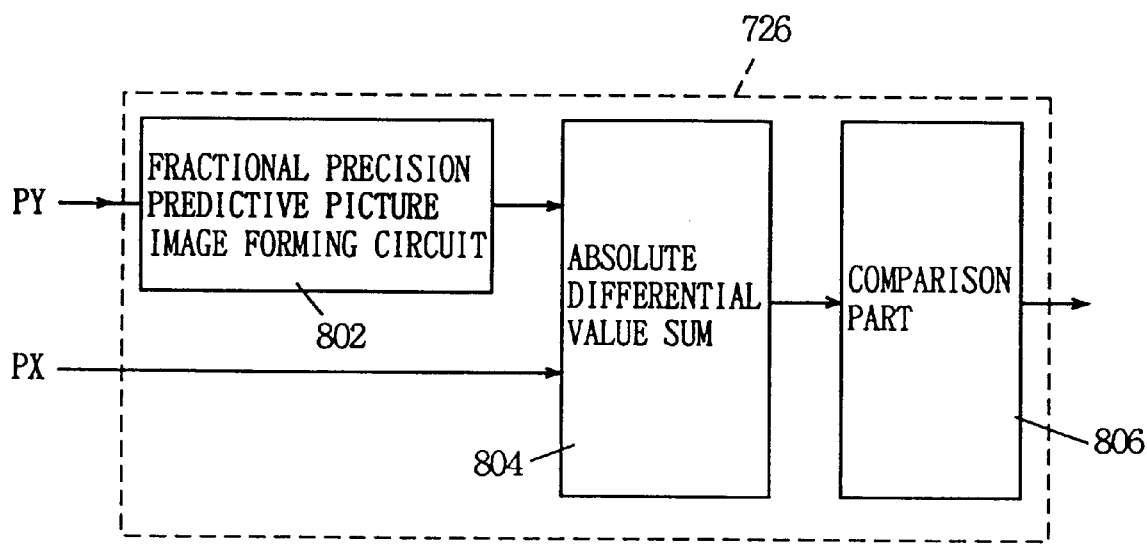
FIG. 84 illustrates a construction of a half pixel precision arithmetic part shown in FIG. 77.

FIG. 84 illustrates an exemplary structure of the ½ pixel precision operation part shown in FIG. 77. FIG. 84 shows only the structure of the ½ pixel precision operation part 726, since the structures of the ½ pixel precision operation parts 726 and 738 are identical to each other.

Referring to FIG. 84, the ½ pixel precision operation part 726 includes a fractional precision predictive picture image forming circuit 802 which receives search window pixel data from the predictive picture image memory 722 for forming predictive picture images required for calculating the evaluation values in fractional precision, an absolute differential value sum circuit 804 which obtains absolute differential value sums of the pixel data of the predictive picture images formed in the fractional precision predictive picture image forming circuit 802 and the template block pixel data PX supplied from the template block memory 724, and a comparison part 806 which detects a displacement vector providing the minimum absolute differential value from output values of the absolute differential value sum circuit 804.

The fractional precision predictive picture image forming circuit 802 forms a plurality of predictive picture image data in parallel with each other. This structure is described later in detail. The absolute differential value sum circuit 804 also forms evaluation values for displacement vectors serving as motion vector candidates in a parallel mode. The comparison part 806 decides a displacement vector corresponding to the minimum one of the plurality of absolute differential value sums supplied from the absolute differential value sum circuit 804 and the evaluation function value of the motion vector in the integer precision from the comparison part 3 shown in FIG. 77 as the motion vector. Specific structures of the respective circuits shown in FIG. 84 are now described.

Figure 85:
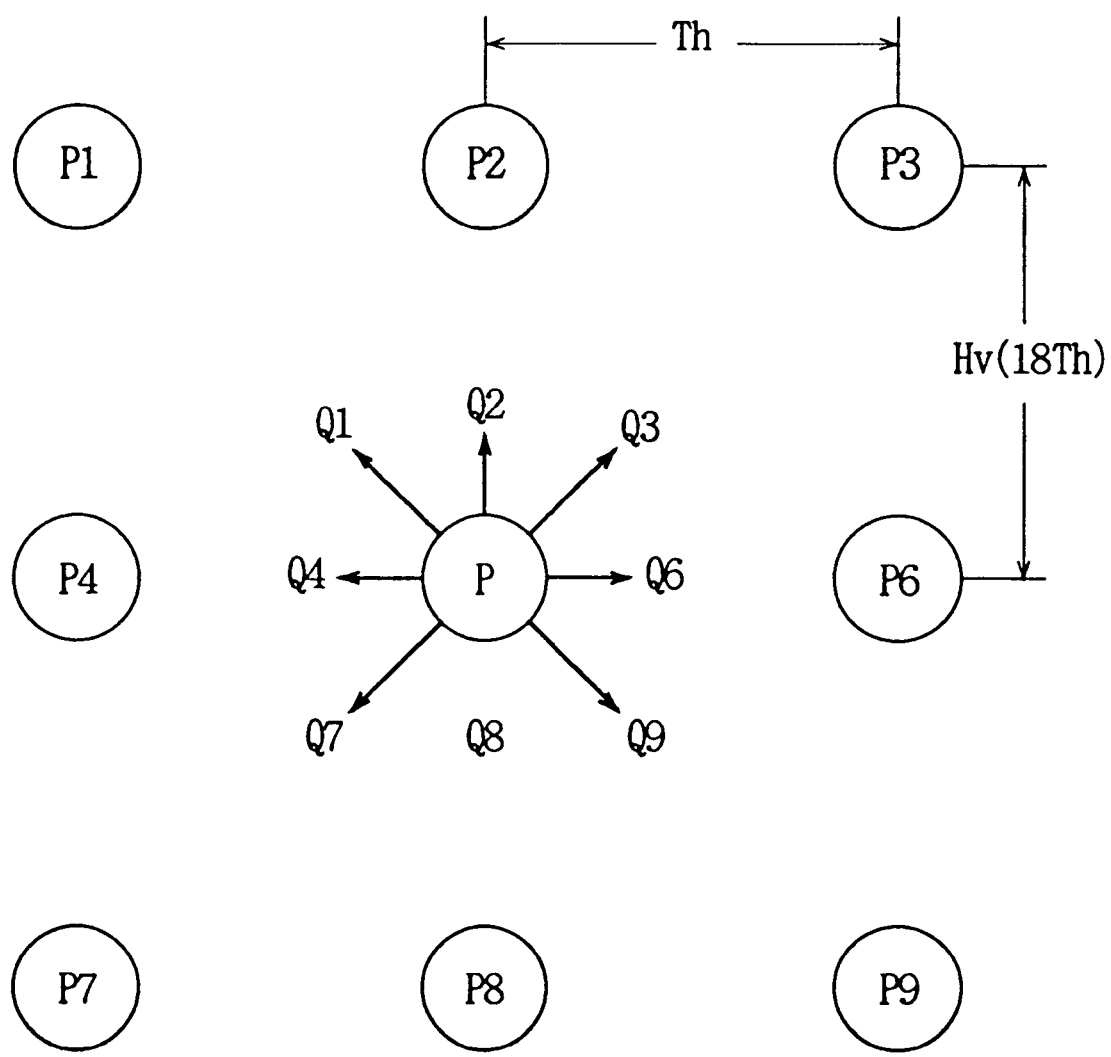
FIG. 85 is a diagram used for explaining an operation of a fractional precision predictive pixel generating circuit shown in FIG. 84.

In order to detect the motion vectors in ½ pixel precision, it is necessary to obtain pixel data of eight neighborhoods Q1 to Q4 and Q6 to Q9 as to a noted pixel P by interpolation, as shown in FIG. 85. It is assumed that symbols P1 to P9 stand for search window pixel data, symbol Th stands for a transfer period between pixels of adjacent columns along the horizontal direction, and symbol Hv (18Th for a search window block size of 18 by 18 pixels in fractional precision) stands for a delay time between adjacent rows. The fractional ½ pixel precision operation parts 726 and 738 are supplied with data corresponding to the pixels P1 to P9 shown in FIG. 85, for forming interpolated data Q1 to Q9 therein.

Figure 86:
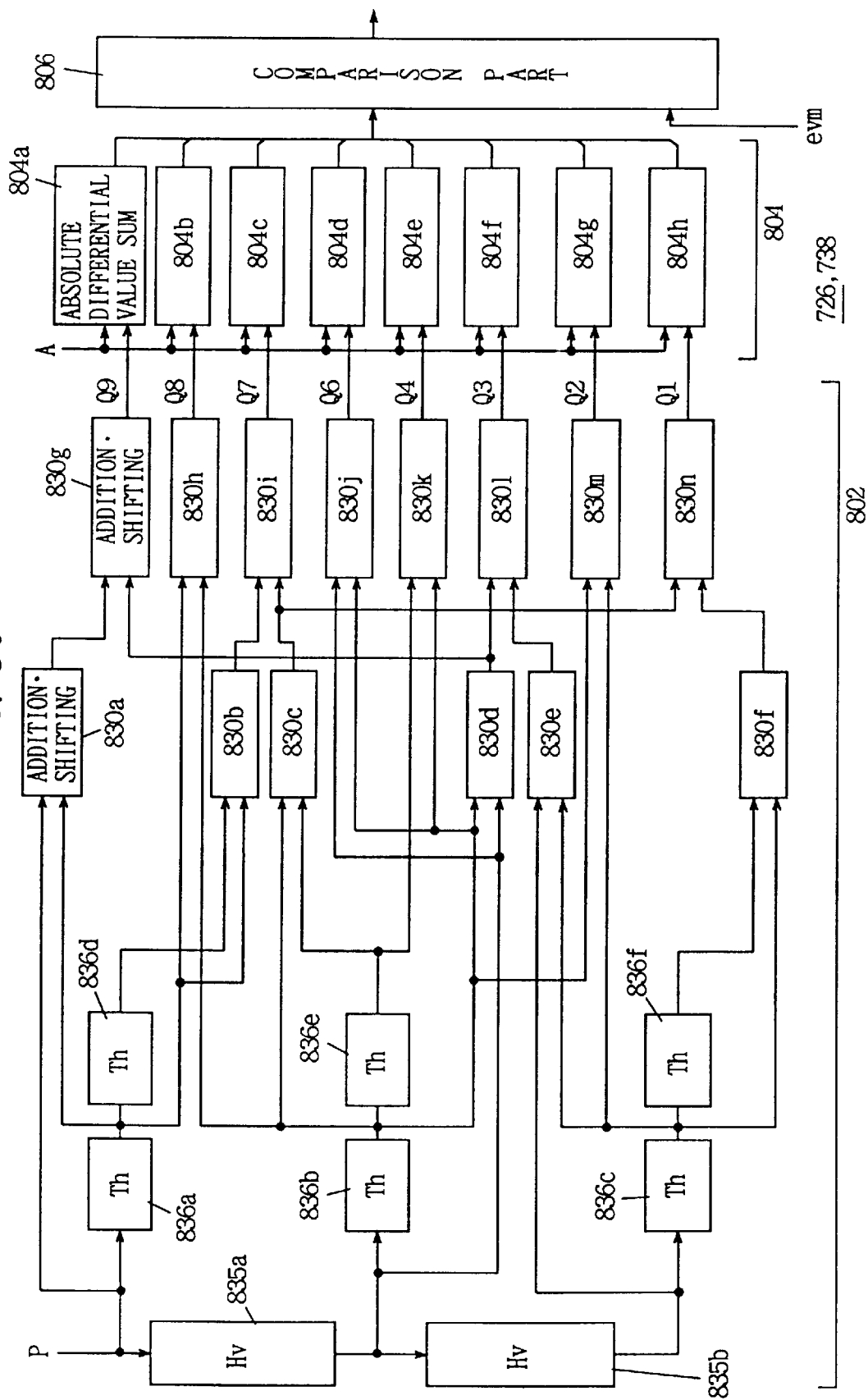
FIG. 86 illustrates a specific construction of the half precision arithmetic part shown in FIG. 84.

FIG. 86 illustrates the specific structure of the ½ pixel precision operation part 726 or 738 shown in FIG. 77. The ½ pixel precision operation part 726 (or 738) includes a delay circuit 835a for delaying supplied search window pixel data by a 1 Hv period, and a delay circuit 835b for delaying data outputted by the delay circuit 835a further by a 1 Hv period. The two stage cascade-connected delay circuits 835a and 835b form a path for generating data corresponding to the respective rows shown in FIG. 85.

The ½ pixel precision operation part 726 (or 738) further includes a delay circuit 836a for delaying input search window pixel data P by a 1 Th period, a delay circuit 836d for delaying output data of the delay circuit 836a further by a 1 Th period, a delay circuit 836b for delaying output data of the 1 Hv delay circuit 835a by a 1 Th period, a delay circuit 836e for delaying output data of the delay circuit 836b by a 1 Th period, a delay circuit 836c for delaying output data of the 1 Hv delay circuit 835b by a 1 Th period, and a delay circuit 836f for delaying output data of the delay circuit 836c further by a 1 Th period. The 1 Th delay circuits 836a to 836f form search window pixel data which are required for interpolation.

The ½ pixel precision operation part 726 (or 738) further includes an addition-shifting circuit 830a which adds up the input search window pixel data P and output data of the 1 Th delay circuit 836a and multiplies a coefficient (½). The addition-shifting circuit 830a implements the multiplication of the coefficient (½) by a pixel data bit shift operation in a lower bit direction. The ½ pixel precision operation part 726 (or 738) further includes an addition-shifting circuit 830b for executing an addition-shifting operation on output data of the 1 Th delay circuits 836a and 836e, an addition-shifting circuit 830c for executing an addition-shifting operation on output data of the 1 Th delay circuits 836b and 836e, an addition-shifting circuit 830d for executing an addition-shifting operation on output data of the 1 Hv delay circuit 835a and the 1 Th delay circuit 836b, an addition-shifting circuit 830e for executing an addition-shifting operation on output data of the 1 Hv delay circuit 835b and the 1 Th delay circuit 836c, and an addition-shifting circuit 830f for executing an addition shifting operation on output data of the 1 Th delay circuits 836c and 836f. These addition-shifting circuits 830a to 830f form data for generating interpolated data between four pixels.

The ½ pixel precision operation part 726 (or 738) further includes an addition-shifting circuit 830g for executing an addition-shifting operation on output data of the addition-shifting circuits 830a and 830d, an addition-shifting circuit 830h for executing an addition-shifting operation on output data of the 1 Th delay circuits 836a and 836b, an addition-shifting circuit 830l for executing an addition-shifting operation on output data of the addition-shifting circuits 830b and 830c, an addition-shifting circuit 830j for executing an addition-shifting operation on output data of the 1 Th delay circuit 836*b* and the 1 Hv delay circuit 835*a*, an addition-shifting circuit 830*k* for executing an addition-shifting operation on output data of the 1 Th delay circuits 836*e* and 836*b*, an addition-shifting circuit 830*l* for executing an addition-shifting operation on output data of the addition-shifting circuits 830*d* and 830*e*, an addition-shifting circuit 830*m* for executing an addition-shifting operation on output data of the 1 Th delay circuits 836*b* and 836*c*, and an addition-shifting circuit 830*n* for executing an addition-shifting operation on output data of the addition-shifting circuits 830*c* and 830*f*. These addition-shifting circuits 830*g* to 830*n* form pixels provided on the positions of the interpolated pixels Q9 to Q6 and Q4 to Q1 shown in FIG. 85.

The absolute differential value sum circuit 804 includes absolute differential value sum circuits 804*a* to 804*h* which receive the outputs Q9 to Q6 and Q4 to Q1 from the addition-shifting circuits 830*g* to 830*l* and template block pixel data A for obtaining absolute differential values of supplied signals. The search window block pixel data P and the template block pixel data A are in relations of the right back state. The absolute differential value sum circuits 804*a* to 804*h* correspond to displacement vectors (in fractional precision) respectively, and are provided with unique codes respectively. The comparison part 806 is supplied with the evaluation function value evm corresponding to the motion vector detected in integer precision. The comparison part 806 receives the outputs of the absolute differential value sum circuits 804*a* to 804*h* and the evaluation function value evm to detect an absolute differential value sum providing the minimum value, and decides a displacement vector corresponding to the minimum absolute differential value sum as a motion vector in fractional precision.

In the structure shown in FIG. 86, only one or four absolute differential value circuits may alternatively be provided to be time-division multiplexedly activated for successively adding up and accumulating the output data of the addition-shifting circuits 830*g* to 830*n*.

In the aforementioned structure, the motion vectors are detected in ½ pixel precision. Alternatively, a structure for detecting motion vectors in finer fractional precision such as ¼ pixel precision may be employed. Further, a structure employing evaluation points larger in number than nine points may be employed.

FIG. 87 illustrates an operation sequence of the motion vector detecting device according to the ninth embodiment of the present invention, with time shown on the axis of abscissas. The integer precision operation part 1 and the comparison part 3 process an N-th block (template block), for carrying out a motion vector detecting operation. A motion vector detecting operation in frame fractional precision is carried out as to the template block N, while a motion vector detection in fractional precision as to an odd field of the template block N (sub template block) is carried out in parallel therewith. When the motion vector detection for the odd field in fractional precision is completed, a motion vector of an even field of this block N is then detected in fractional precision.

On the other hand, the integer precision operation part 1 executes a motion vector detecting operation as to a next template block N+1 in integer precision. When the motion vector detecting operation as to the block N+1 is completed, motion vector detecting operations as to the frame and the odd field with respect to the block N+1 are again executed. When the motion vector detection of the odd field in fractional precision is completed, a motion vector detecting operation as to an even field in fractional precision is executed.

It is possible to execute arithmetic operations of the integer precision operation part 1 and the ½ pixel precision operation parts 726 and 738 separately in time by pipelining these operations as described above, thereby executing motion vector detection in fractional precision without restrictions imposed on timing conditions with respect to the arithmetic operations. Also in this case, the integer precision operation part 1 and the ½ pixel precision operation parts 726 and 738 are driven in parallel with each other, whereby motion vector detection in fractional precision can be carried out at a high speed.

In the motion vector detecting operation in fractional precision in the integer precision operation part 1, search window pixel data are outputted therefrom. In this case, it may be possible that search window pixel data stored in the predictive picture image memory 722 are rewritten by those supplied from the integer precision operation part 1 while the ½ pixel precision operation part 738 carries out an evaluation function calculating operation. When a buffer memory is provided between the integer precision operation part 1 and the predictive picture image memory 722 in this case, it is possible to prevent pixel data stored in the predictive picture image memory 722 from being rewritten by the search window pixel data supplied from the integer precision operation part 1 while the data stored in the predictive picture image memory 722 are utilized in the ½ pixel precision operation part 738, thereby reliably carrying out the arithmetic operation in fractional precision. When such a buffer is provided, further, it is possible to relax timing conditions of operations in integer precision and fractional precision, thereby executing the operations of integer precision and fractional precision in a parallel mode with a sufficient margin.

In the aforementioned embodiment, the block predictive mode and the even and odd field predictive modes are assumed as the predictive modes. When pixels are coded in units of fields, however, it is possible to detect motion vectors in accordance with the block predictive mode and upper and lower half predictive modes, and the structure of the ninth embodiment is also applicable to such predictive modes. Only periods for writing pixel data in predictive picture image memories for the upper and lower half block predictive modes are simply changed.

According to the ninth embodiment of the present invention, as hereinabove described, motion vector detection in fractional precision is carried out through the template block pixel data and the search window pixel data received from the integer precision operation part 1, whereby it is possible to carry out motion vector detection in fractional precision for a plurality of predictive modes respectively, to select further optimum motion vectors, and to carry out highly accurate motion vector detection.

[Embodiment 10]

Figures 88, 89:
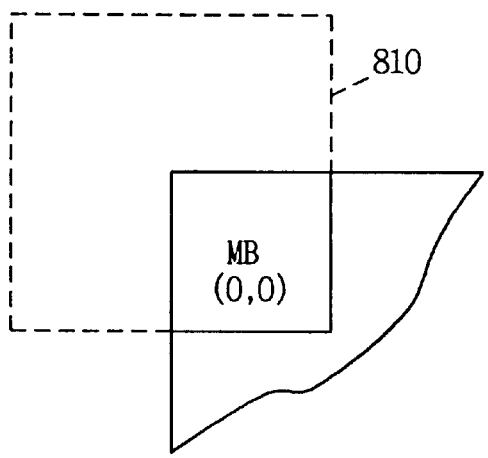
FIG. 88 shows a position of a template block on a current screen.
FIG. 89 is a diagram used for explaining an operation principle of a motion vector detecting device according to a tenth embodiment of the present invention.

FIG. 88 illustrates positions of 25 macro blocks (template blocks) MB(0, 0) to MB(4, 4) which are obtained by dividing a current screen into 5 by 5 blocks. The positions of the template blocks are indicated by vectors along horizontal and vertical positive directions with reference to an origin of the left uppermost template block. Each of the template blocks MB(0, 0) to MB(4, 4) is formed by 16 pixel rows and 16 pixel columns. In a motion vector detecting operation, motion vectors are detected as to all template blocks of the current screen picture image. The same size motion vector search range is set for the respective template blocks. In this case, no search window pixels with respect to the template block MB(0, 0) are present in a region 810 enclosed with broken lines as shown in FIG. 89, for example. Therefore, it is necessary to inhibit a motion vector detecting operation with respect to pixels included in this region 810. Description is now made on a method and a structure for limiting the motion vector search range according to a tenth embodiment of the present invention.

Figure 90:
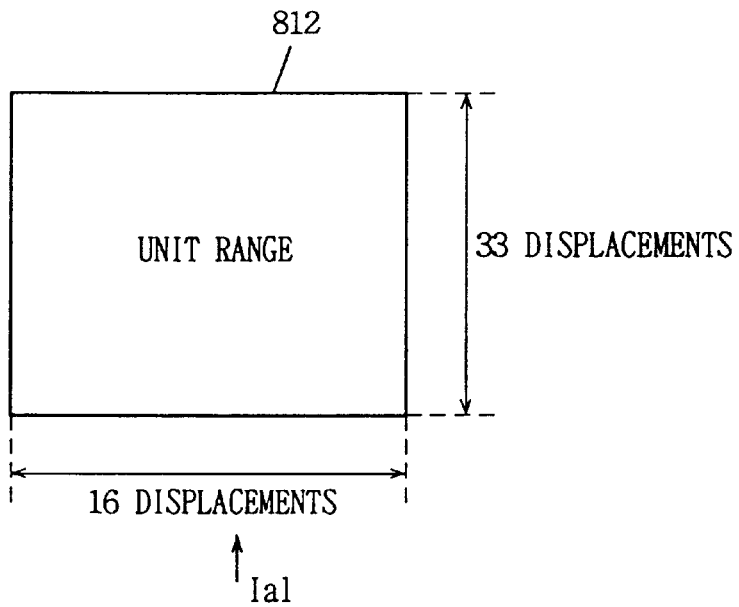
FIG. 90 illustrates a construction of a unit search area used in the tenth embodiment.

FIG. 90 illustrates the structure of a search range which is utilized as a processing unit. The unit search range includes 16 horizontal displacements and 33 vertical displacements. A period required for calculating motion vector evaluation function values in this unit search range is 1 processing time T (33·16=768 cycles). When a full inhibiting signal Ial is supplied in this unit search range, evaluation of displacement vectors in this search range is inhibited as to both of horizontal and vertical directions.

Figure 91A:
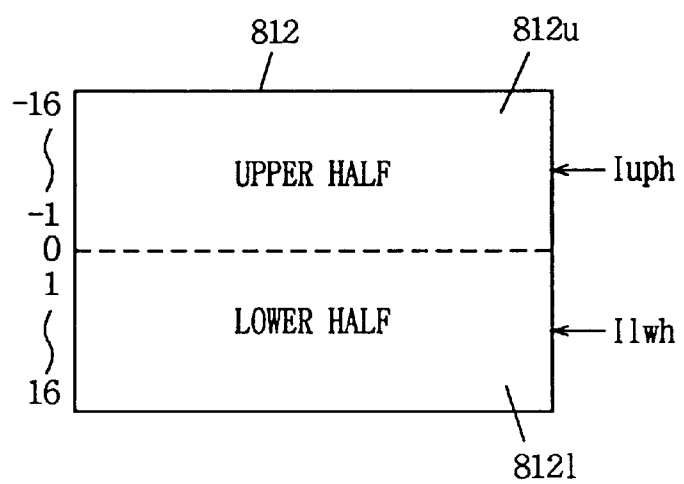
FIGS. 91A and 91B are diagrams for explaining the operational effects of an upper half inhibition signal and a lower half inhibition signal used in the tenth embodiment, respectively.

When an upper half inhibiting signal Iuph is activated as shown in FIG. 91A, displacement vector evaluation is inhibited in an upper half region of a unit search range 812, i.e., in a region having vertical vectors (V vectors) which are at minus values (−1 to −16). When a lower half inhibiting signal Ilwh is activated, on the other hand, evaluation is inhibited in a lower half region 812l of the unit search range 812, i.e., a positive region having vertical displacements of 1 to +16.

Figure 91B:
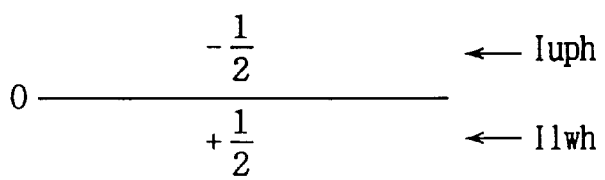

When the upper half inhibiting signal Iuph is supplied in evaluation in ½ pixel precision as shown in FIG. 91B, a region having a vertical displacement vector −½ is excluded from the search range. When the lower half inhibiting signal Inwh is activated, on the other hand, a region having a vertical displacement vector +½ is excluded in ½ pixel precision motion vector evaluation.

Figure 92:
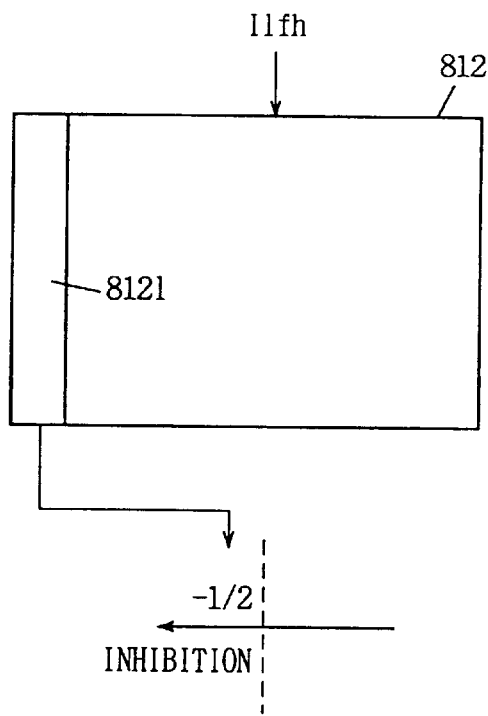
FIG. 92 is a diagram used for explaining an operational effect of a left half inhibition signal used in the tenth embodiment.

When a left half inhibiting signal Ilfh is supplied as shown in FIG. 92, all displacement vectors in this unit search range are evaluated in motion vector evaluation in integer precision. When motion vectors in integer precision are present in a left end region 812l of this unit search range 812 in motion vector calculation in ½ pixel precision, however, evaluation of displacement vectors having horizontal vector component (H vector) of −½ is excluded.

This is because pixels used for forming −½ vertical component are present in the exterior of this search range region 812 and hence desired interpolated pixel data cannot be formed.

Figure 93:
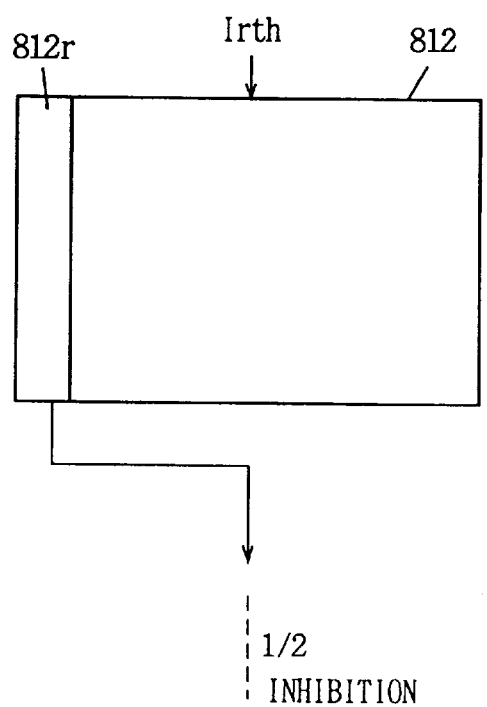
FIG. 93 is a diagram used for explaining an operational effect of a right half inhibition signal used in the tenth embodiment.

When a right half inhibiting signal Irth is activated as shown in FIG. 93, motion vector detection is carried out in the search range 812 only with respect to vectors of a left end region 812r as to the horizontal direction. When a vector of the region 812r is selected as an optimum vector, i.e., a motion vector, fractional precision vectors (½ pixel precision vectors) in the horizontal positive direction are excluded from evaluation in a fractional precision(½ pixel precision) operation part.

It is possible to set a motion vector search range as to one template block in a region having only correct pixel data by employing the five types of inhibiting signals Ial, Iuph, Ilwh, Ilfh and Irth. A concrete operation of motion vector search range limitation is now described.

First, a range of 16 horizontal displacements and 33 vertical displacements is assumed to be a unit search range. It is assumed that an integer precision operation part has a structure similar to that of the fourth embodiment. Namely, a motion vector search operation in integer precision is carried out through element processors which are arranged in 16 rows and 16 columns and a train of data buffers each storing 32 pixel data. In this case, a processing unit time T is formed by 16×(16+32)=768 cycles. It is assumed here that a horizontal search range is −16 to +15 and a vertical search range is −16 to +16, as hereinabove described. In this case, integer precision displacement vectors include −16 to +15 as horizontal components H, and two processing unit times 2T are required for evaluating these integer precision and displacement vectors. It is also assumed that a fractional precision operation part carries out the motion vector detecting operation in ½ pixel precision.

Consider that motion vector detection is carried out on the upper left template block MB(0, 0) of the current screen shown in FIG. 88. In this case, no pixels are present in left and upper regions with respect to the template block MB(0, 0). Therefore, motion vector evaluation for these regions is excluded in the following manner.

Figure 94:
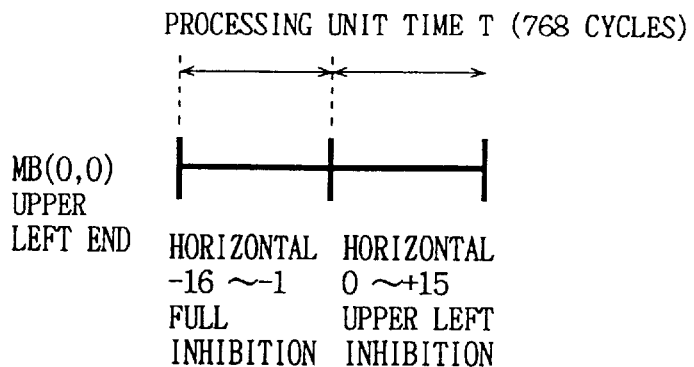
FIG. 94 is a diagram used for explaining an operational effect of a lower half inhibition signal used in the tenth embodiment.
Figure 95A:
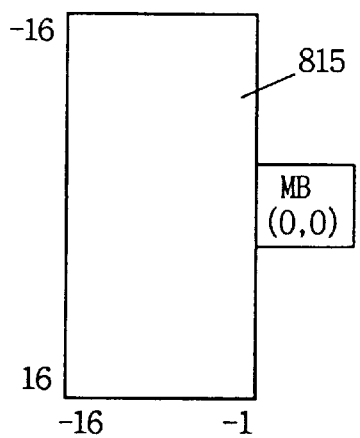
FIGS. 95A and 95B are diagrams used for explaining an operation of limiting a search area for a template block at an upper left end on a screen.

As shown in FIG. 94, motion vector search is carried out in the horizontal range of −16 to −1 in the first processing unit time T. During this processing time, a motion vector search operation is inhibited in a region 815 since no pixel data are present in this region 815, as shown in FIG. 95A. Namely, the full inhibiting signal Ial is generated to inhibit displacement vector evaluation in the region 815.

Figure 95B:
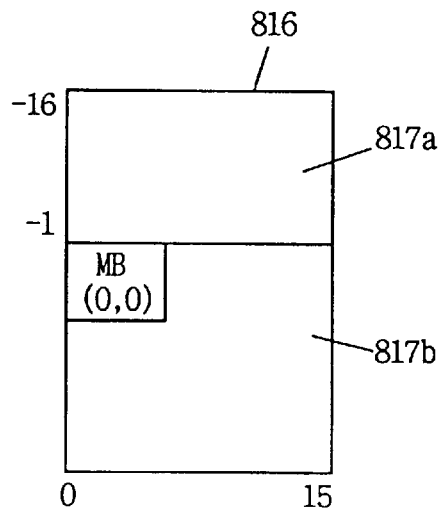

In the next processing unit time T, displacement vector evaluation is carried out in a region of horizontal displacements 0 to +15. In this case, no pixels are present in a region 817a having vertical displacements of −1 to −16, as shown in FIG. 95B. In this case, therefore, displacement vectors in the region 817a are first excluded from evaluation. In order to carry out motion vector detection in ½ pixel precision, it is necessary to employ only pixels in a region 817b. In predictive picture image formation in ½ pixel precision, therefore, displacement vector evaluation in fractional precision for such region is inhibited since no pixel data are present with respect to displacement vectors of the horizontal displacement of −½. Therefore, a left inhibiting signal is activated at this time. Thus, it is possible to carry out motion vector detection through only pixel data which are present in the current screen in a full search range.

Figure 96:
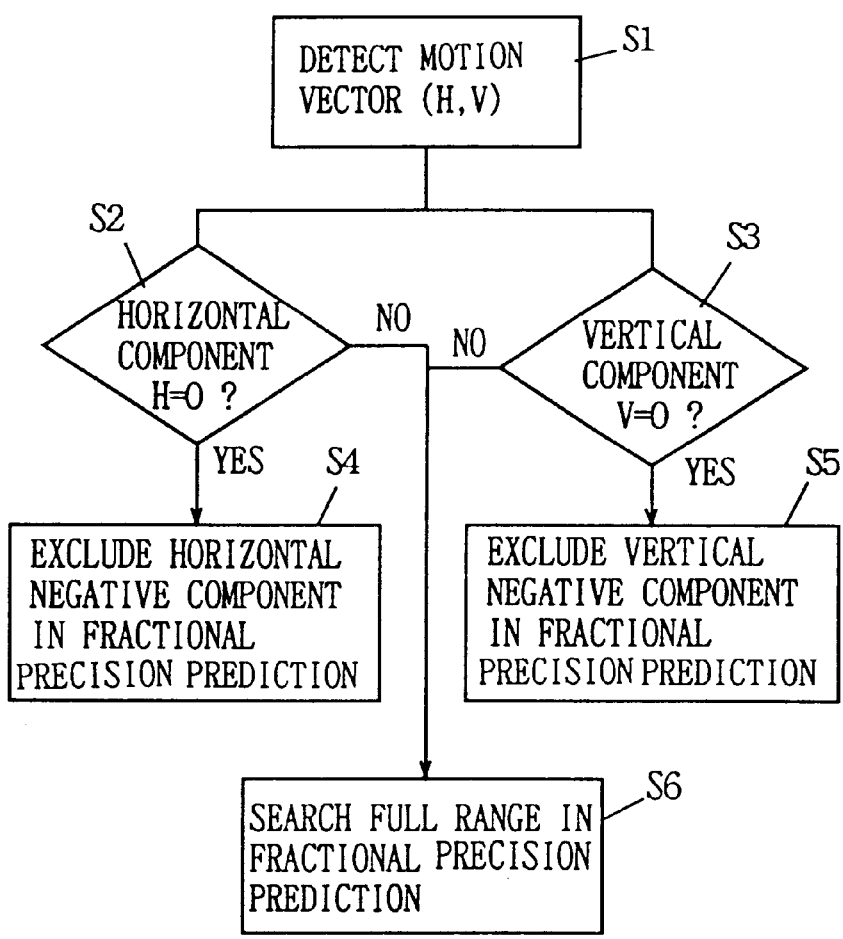
FIG. 96 is a flow chart describing an operation of detecting a motion vector in a fractional precision for the template block at the upper left end on the screen.

FIG. 96 is a flow chart showing a motion vector search operation in fractional precision(½ pixel precision) as to the template block MB (0, 0). First, a motion vector (H, V) in integer precision is detected (step S1). Then, determinations are made at steps S2 and S3 as to whether or not horizontal and vertical components H and V of this motion vector (H, V) are zero. When the horizontal component H of the integer precision motion vector is determined to be zero at the step S2, the left inhibiting signal Ilfh is supplied and hence displacement vectors of negative horizontal components (horizontal component −½) are excluded from evaluation in fractional precision prediction at a step S4. When the vertical component V is determined to be zero at the step S3, on the other hand, a fractional precision predicted picture image is formed about the macro blocks on the upper end of the current screen and hence displacement vectors of negative vertical component (−½) including pixels not included in the current screen are excluded from evaluation at this time (step S5). When both of the horizontal and vertical components H and V are not zero, all displacement vectors of fractional precision are evaluated about motion vectors of integer precision (step S6).

Figure 97:
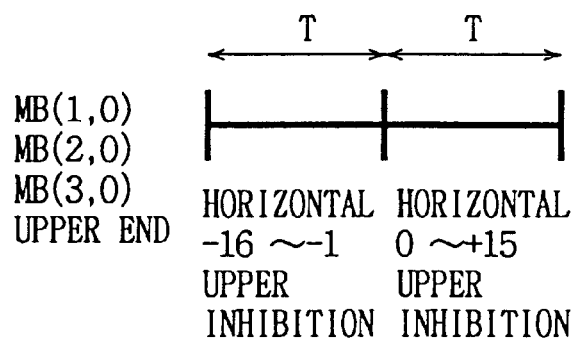
FIG. 97 is a diagram showing a generation mode of the inhibition signals for the template block at the upper left end on the screen.

As to the template blocks MB(1, 0), MB(2, 0) and MB(3, 0) on the upper end of the current screen, evaluation of displacement vectors having negative vertical components V is inhibited. Therefore, only the upper inhibiting signal Iuph is activated in a full evaluation period, as shown in FIG. 97.

Figure 98A:
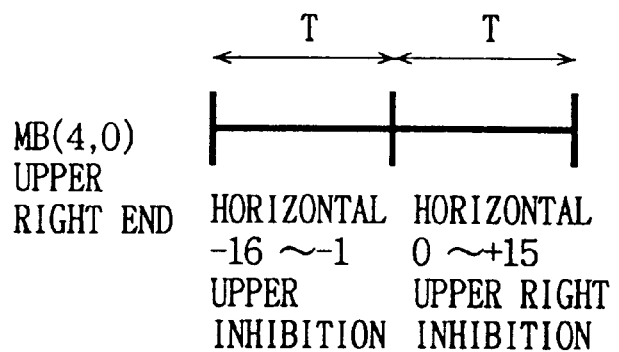
FIGS. 98A thru 98C are diagrams for explaining generation modes of the inhibition signals and an operation of limiting a motion vector search area for a template block at an upper right end on a screen.
Figure 98B:
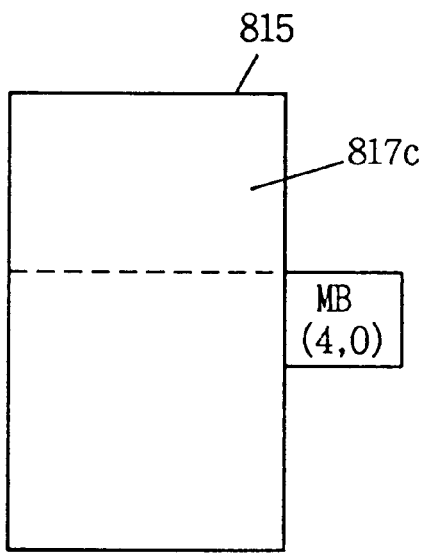

As to the template block MB(4, 0) provided on the upper right end of the current screen, the upper inhibiting signal Iuph is activated in a first processing unit time, as shown in FIG. 98A. In this case, a motion vector search operation in an upper half region 817c (region having negative vertical displacements) is inhibited in the first search region 815, as shown in FIG. 98B.

Figure 98C:
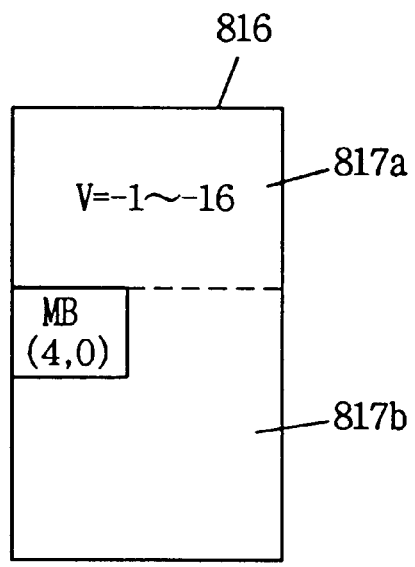
Figure 100:
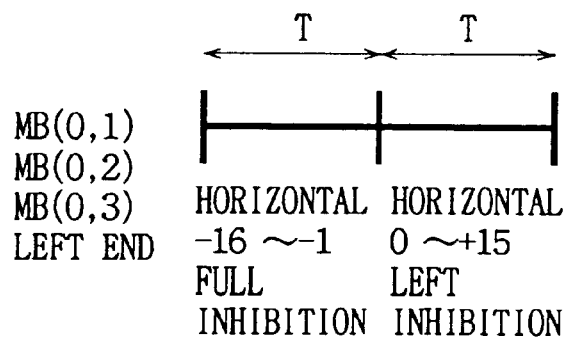
FIG. 100 is a diagram showing inhibition signals generated for a template block at a left end on a screen.

In a next processing unit time, both of upper and right inhibiting signals are activated. In this state, displacement vector evaluation in an upper half region 817a is inhibited in a next search region 816, as shown in FIG. 98C. In a lower region (region having vertical components V of no less than 0) 817b, evaluation is carried out only on displacement vectors which are present in a left end region of this region 817b. Namely, only an evaluation operation with respect to displacement vectors (H, V) of H=0 and V≧0 is carried out. Thus, the motion vectors are decided through screen picture image pixel data only in integer precision with respect to the template block MB(4, 0). Then, motion vectors in fractional precision are decided in accordance with the decided motion vectors in integer precision. The motion vector detecting operation in fractional precision includes processing steps shown in FIG. 99.

As shown at steps S20 to S22 in FIG. 99, motion vector search is carried out while excluding vertical displacement vectors in the first processing unit time, and evaluation is made on displacement vectors having horizontal components H of zero and vertical components V of no less than zero in the next processing unit time. Motion vectors (H, V) in integer precision are decided through these steps S20 and S22. Then, motion vector detection in fractional precision is carried out. At steps S23 and S24, determinations are made as to whether or not horizontal and vertical components H and V of the integer precision motion vectors (H, V) are equal to zero. When the horizontal component H is determined to be zero at the step S23, it is necessary to employ a search window block which is positioned on the right end of the current screen as a predictive picture image. In this case, motion vector search in fractional precision is carried out while excluding displacement vectors having the horizontal components of +½ (step S25). When the vertical component V is determined to be zero, on the other hand, pixels corresponding to the motion vector of V=−1 are not included in the current screen and hence motion vector search in fractional precision is carried out while excluding displacement vectors of negative vertical components (−½) in fractional precision. When both of the horizontal and vertical components H and V are zero, the operations of the steps S25 and S26 are carried out. When both of the horizontal components H and V of the integer precision motion vectors (H, V) are not zero, on the other hand, motion vector search is carried out in the full search range of fractional precision about the integer precision motion vector (H, V) (step S27).

As to the template blocks MB(0, 1), MB(0, 2) and MB(0, 3) on the left end of the current screen, the full inhibiting signal is activated in the first processing unit time so that displacement vectors in the horizontal displacement region of −16 to −1 are excluded from evaluation. Left inhibiting signal Ilfh is activated in the next processing time. In motion vector search in integer precision, all vectors of horizontal displacements 0 to +15 are evaluated. In motion vector detection in integer precision, the steps S2, S4 and S6 shown in FIG. 96 are carried out.

Figure 101:
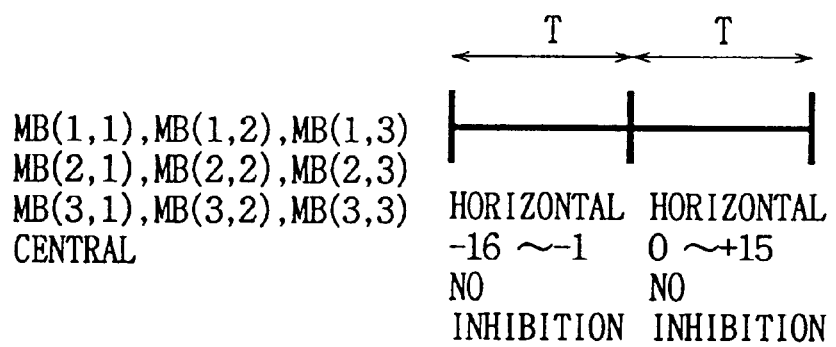
FIG. 101 is a diagram showing inhibition signals generated for a template block at a center on a screen.

As to a template block MB (i, j) with i+0 and j+0 on the central portion of the current screen, all displacement vectors in a search range are evaluated during two processing unit times, as shown in FIG. 101.

Figure 102:
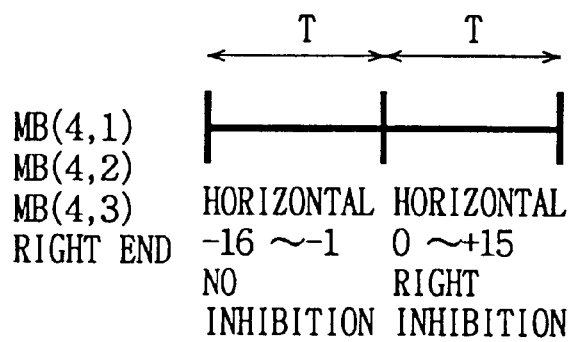
FIG. 102 is a diagram showing inhibition signals generated for a template block at a right end on a screen.

As to the template blocks MB(4, 1), MB(4, 2) and MB(4, 3) on the right end of the current screen, evaluation function values for all displacement vectors of the search ranges are formed in the first processing unit time T, as shown in FIG. 102. Only the right inhibiting signal is activated in the next processing time. Namely, only displacement vectors of the horizontal displacement of zero are evaluated for motion vector search. In the motion vector search operation in fractional precision on the template blocks of the right end, the steps S23, S25 and S27 shown in FIG. 99 are executed.

Figure 103A:
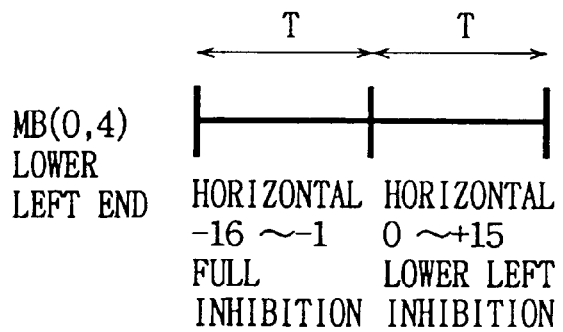
FIGS. 103A thru 103C are diagrams showing inhibition signals generated for a template block at a lower left end on a screen and limitation of a search area therefor, respectively.
Figure 103B:
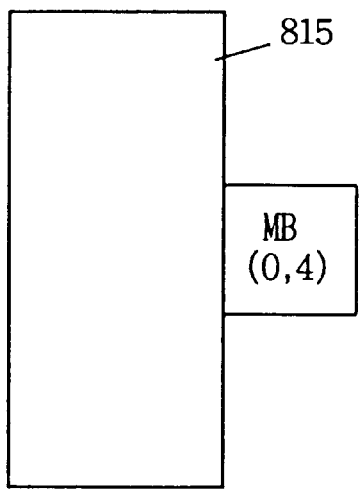

As to the template block MB(0, 4) on the lower left end of the current screen, the full inhibiting signal is activated in the first processing unit time, as shown in FIG. 103A. In this state, all displacement vectors in the first search region 815 are excluded from evaluation as shown in FIG. 103B.

Figure 103C:
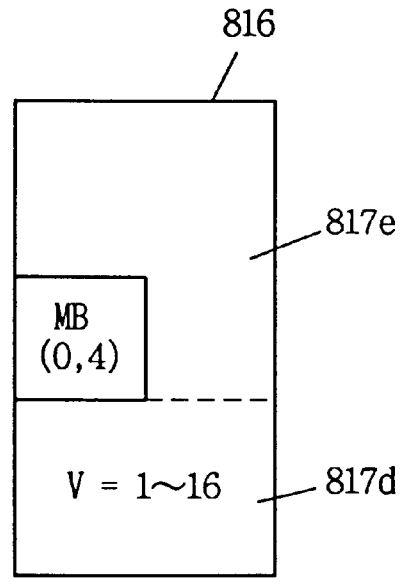

In the next processing unit time, both of the lower and left inhibiting signals are activated. In this state, displacement vectors in a lower half region (V=1 to 16) 817d in the search region 816 are excluded from evaluation, as shown in FIG. 103C. Namely, motion vector search for the template block MB(0, 4) is carried out only through displacement vectors in a region 817e.

Figure 104:
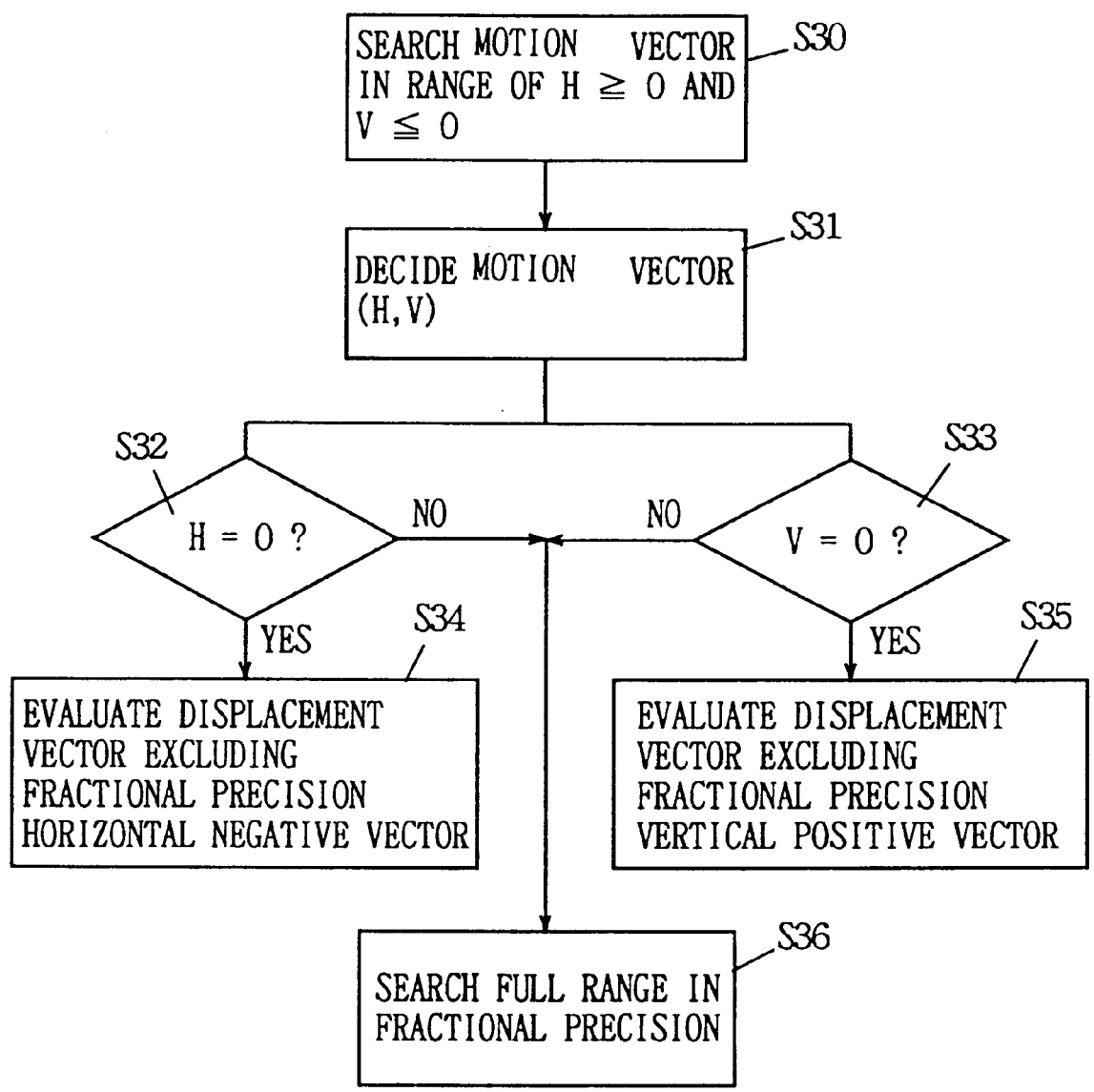
FIG. 104 is a flow chart describing an operation of detecting a motion vector in a fractional precision for the template block at the lower left end on the screen.

FIG. 104 is a flow chart showing the motion vector search operation in fractional precision for the template block MB(0, 4).

Motion vector search in integer precision is carried out in a region having horizontal components of no less than zero and vertical components of not more than zero at a step S30, so that the motion vectors in integer precision are decided in accordance with the results of the search (step S31). In accordance with the motion vector (H, V) decided in integer precision, determination is made as to whether or not horizontal and vertical components H and V are zero (steps S32 and S33). When the horizontal component H is determined to be zero at the step S32, displacement vector evaluation is carried out while excluding all negative horizontal vectors in fractional precision (step S34). When the vertical component V is determined to be zero at the step S33, on the other hand, displacement vector evaluation in fractional precision is carried out while excluding positive vertical displacement vectors (step S35). When both of the horizontal and vertical components H and V of the motion vector (H, V) in integer precision are determined to be nonzero, all displacement vectors in the search range in fractional precision are evaluated (step S36).

As to the template blocks MB(1, 4), MB(2, 4) and MB(3, 4) on the lower end of the current screen, the lower inhibiting signal is activated over the processing time, as shown in FIG. 105. In integer precision motion vector search in activation of the lower inhibiting signal, motion vector search is carried out in the range of vertical components V of not more than zero. In motion vector search in fractional precision, the processing operations shown in the steps S33, S35 and S36 of FIG. 104 are executed.

As to the template block MB(4, 4) in the lower right end of the current screen, the lower inhibiting signal is activated in the first processing unit time T, as shown in FIG. 106A. In this state, displacement vectors in a lower half region (V=1 to 16) 817f in the minimum search region 815 are excluded from evaluation, as shown in FIG. 106B.

In the next processing unit time, both the lower and right inhibiting signals are activated as shown in FIG. 106A. In this state, only displacement vectors included in a region 817g having horizontal components H of zero in the latter half search region 816 are evaluated. Motion vector detecting operations in fractional precision upon activation of the lower and right inhibiting signals are identical to the processing operations in the aforementioned steps S33, S35 and S36 and the steps S23, S25 and S27 respectively.

As hereinabove described, it is possible to decide motion vectors only through pixel data which are included in the current screen picture image by selectively activating the inhibiting signals depending on the positions of the template blocks to be processed, to detect motion vectors in high precision, and to form a correct predictive picture image.

Although it is not clearly shown in the above description, the motion vectors are decided in accordance with a plurality of predictive modes respectively in motion vector detection in integer precision. Also in motion vector detection in fractional precision, therefore, motion vector search ranges in fractional precision are decided for the respective predictive modes in accordance with combinations of values of horizontal and vertical components of motion vectors decided in accordance with the respective predictive modes and inhibiting signals currently being activated.

FIG. 107 schematically illustrates the overall structure of a motion vector detecting device according to the tenth embodiment of the present invention. Referring to FIG. 107, the motion vector detecting device includes a reference picture image memory 820 storing reference picture image pixel data, a current picture image memory 821 storing current screen picture image pixel data, an integer precision motion vector detecting part 830 receiving search window pixel data PY and template block pixel data PX from the reference and current picture image memories 820 and 821 respectively for detecting motion vectors in integer precision, and a fractional precision motion vector detecting part 832 receiving the search window pixel data PY, the template pixel data PX, integer precision motion vector data MVI and evaluation function value evm of the integer precision motion vector MVI from the integer precision motion vector detecting part 830 for detecting motion vectors in fractional precision. Referring to FIG. 107, only motion vectors decided in accordance with one predictive mode are representatively shown for simplifying the illustration. Motion vectors in integer precision and fractional precision are detected in accordance with each of a plurality of predictive modes. The fractional precision motion vectors from the fractional precision motion vector detecting part 832 are representatively shown by a vector MVF.

The motion vector detecting device further includes a read control circuit 838 for generating read addresses for the reference and current picture image memories 820 and 821 and controlling pixel data read operations in these memories 820 and 821, a search range setting part 834 receiving read addresses for the current picture image memory 821 included in the read control circuit 838, i.e., template block pixel position information, for setting motion vector search ranges, and a search operation control part 836 controlling motion vector search operations, i.e., displacement vector evaluating operations, in the integer and fractional precision motion vector detecting parts 830 and 832 in accordance with the motion vector search range information from the search range setting part 834. The search operation control part 836 controls the displacement vector evaluating operation in the integer precision motion vector detecting part 830 in accordance with the search range information from the search range setting part 834. This search operation control part 836 also controls the displacement vector evaluating operation in the fractional precision motion vector detecting part 832 in accordance with the integer precision motion vector information MVI from the integer precision motion vector detecting part 830 and the search range set information from the search range setting part 834, i.e., the inhibiting signals.

Figure 108:
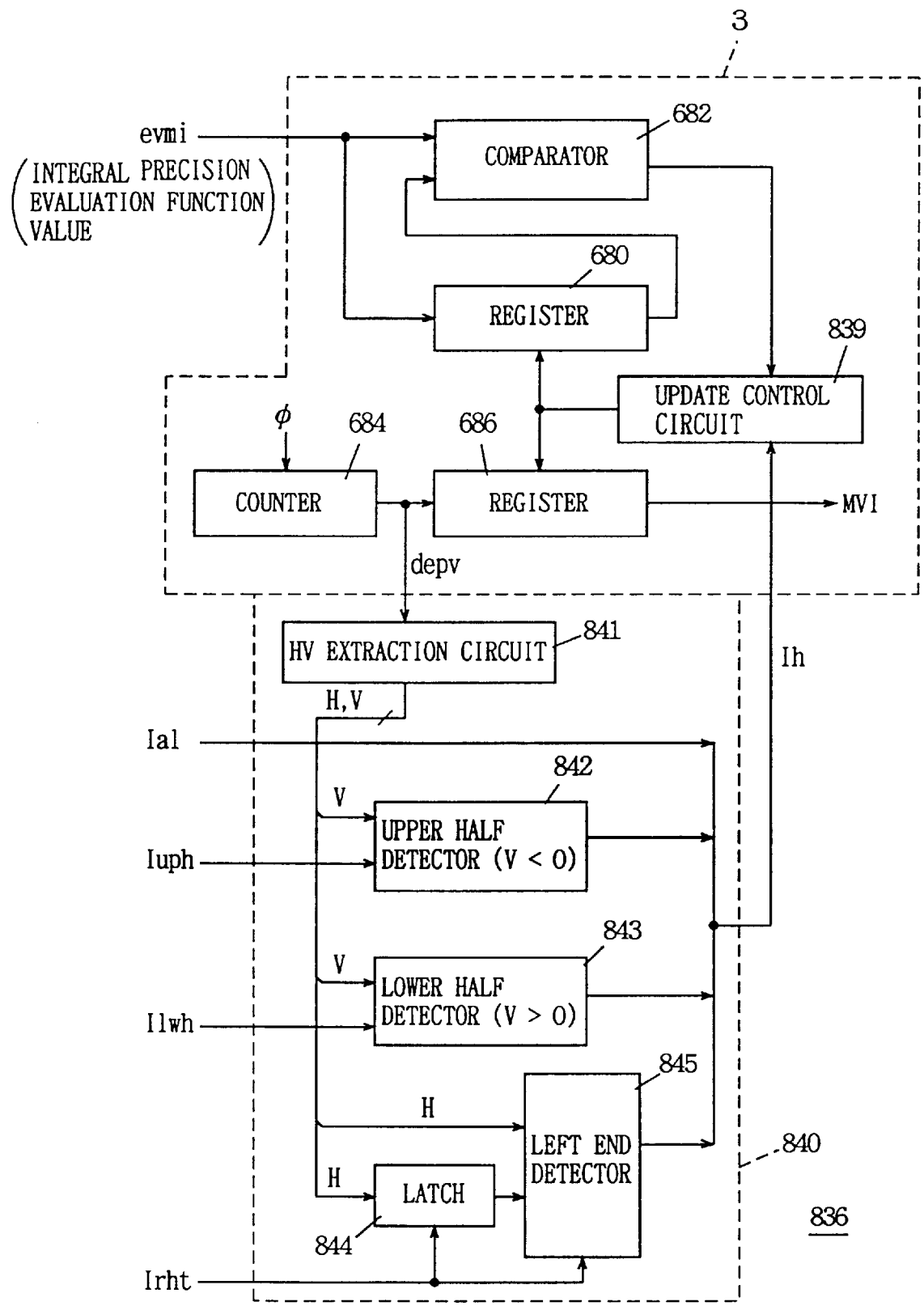
FIG. 108 illustrates constructions of a search operation control part and a comparison part of an integer precision motion vector detecting part shown in FIG. 107.

FIG. 108 illustrates the structure of an evaluating operation control part of an integer precision motion vector selecting part which is included in the search operation control part 836 shown in FIG. 107. FIG. 108 also shows the structure of a comparison part 3 included in the integer precision movement detecting part 830. The comparison part 3 included in the integer precision movement detecting part 830 includes a register 680 for storing evaluation function values, a comparator 682 for comparing evaluation function values evmi supplied from an operation part with the evaluation function values stored in the register 680, a counter 684 for generating displacement vector information related to the evaluation function values supplied from the operation part, and a register 686 storing displacement vector information providing the minimum evaluation function value. The structures of the register 680, the comparator 682, the counter 684 and the register 686 are substantially similar to those of the comparison part shown in FIG. 65. However, the priority decision circuit 690 shown in FIG. 65 is not illustrated in FIG. 108, for the purpose of simplification. When an update instructing signal is supplied from the comparator 682, an update control circuit 839 updates the contents of the registers 680 and 686. This update control circuit 839 inhibits update operations of the registers 680 and 686 in activation of an inhibiting signal Ia from an integer precision search operation control part 840, regardless of an output signal from the comparator 682.

The integer precision search operation control part 840 includes an HV extraction circuit 841 which receives displacement vector information depv from the counter 684 for extracting horizontal and vertical components H and V, an upper half detector 842 which is brought into an operating state in activation of the upper half inhibiting signal Iuph for outputting an active signal when the vertical component V received from the HV extraction circuit 841 is negative, a lower half detector 843 which is brought into an operating state in activation of the lower half inhibiting signal Ilwh for outputting an active signal when the vertical component V from the HV extraction circuit 841 is in a positive region, a latch circuit 844 which latches horizontal component H data first outputted from the HV extraction circuit 841 in activation of the right half inhibiting signal Irht, and a left end detector 845 which is brought into an operating state in activation of the right half inhibiting signal Irht for outputting an active state signal when the horizontal component H outputted from the HV extraction circuit 841 coincides with that latched by the latch circuit 844. The full inhibiting signal Ial, an output of the upper half detector 842, an output signal of the lower half detector 843 and an output signal of the left end detector 845 are wired OR connected with each other, for example, for forming an inhibiting signal Ih which is supplied to the update control circuit 839. In place of the wired OR connection, the inhibiting signal Ih may be outputted by an OR gate which receives the signal Ial and the output signals of the right half detector 842, the lower half detector 843 and the left end detector 845.

When the full inhibiting signal Ial is in an active state, the update control circuit 839 regularly brings the update instructing signal into an inactive state, for inhibiting updating of the contents of the registers 680 and 686. The upper half detector 842 outputs an active state signal when the displacement vector information depv outputted from the counter 684 indicates negative vertical displacement vectors and the upper half inhibiting signal Iuph is in an active state. When the upper half inhibiting signal Iuph is in an active state, therefore, the register 680 stores no evaluation function values of displacement vectors having negative vertical components regardless of the output signal of the comparator 682, while no displacement vectors of the register 686 are updated.

When the lower half inhibiting signal Ilwh is in an active state, the lower half detector 843 outputs a signal which is in an active state when the displacement vector information depv outputted from the counter 684 has a positive vertical component. Thus, the inhibiting signal Ih is activated so that updating of the registers 680 and 686 is inhibited. When the right half inhibiting signal Irht is in an active state, the latch circuit 844 latches the horizontal component of displacement vector information outputted from the counter 684 which is generated first in the processing unit time. Thus, first horizontal component information on a left end region of a negative vector search range, i.e., the first horizontal component information in the processing unit time when the right half inhibiting signal Irht is activated is latched. The left end detector 845 outputs an active state signal when the horizontal component of the displacement vector information depv outputted from the counter 684 is different from that stored in the latch circuit 844. Thus, an evaluating operation is carried out only on displacement vectors positioned on the left end column in a search range in the processing unit time.

Due to the aforementioned structure, it is possible to decide the motion vector search range in motion vector detection in integer precision in accordance with the inhibiting signals. No left half inhibiting signal Ilft is supplied to the integer precision search operation control part 840, since a displacement vector evaluating operation is carried out along the full horizontal range when this signal is supplied.

In the structure shown in FIG. 108, the inhibiting signal Ih may alternatively be supplied to the comparator 682 for inhibiting the comparing operation of the comparator 682. The comparator 682 which is inhibited from the comparing operation maintains the update instructing signal in an inactive state.

Figure 109:
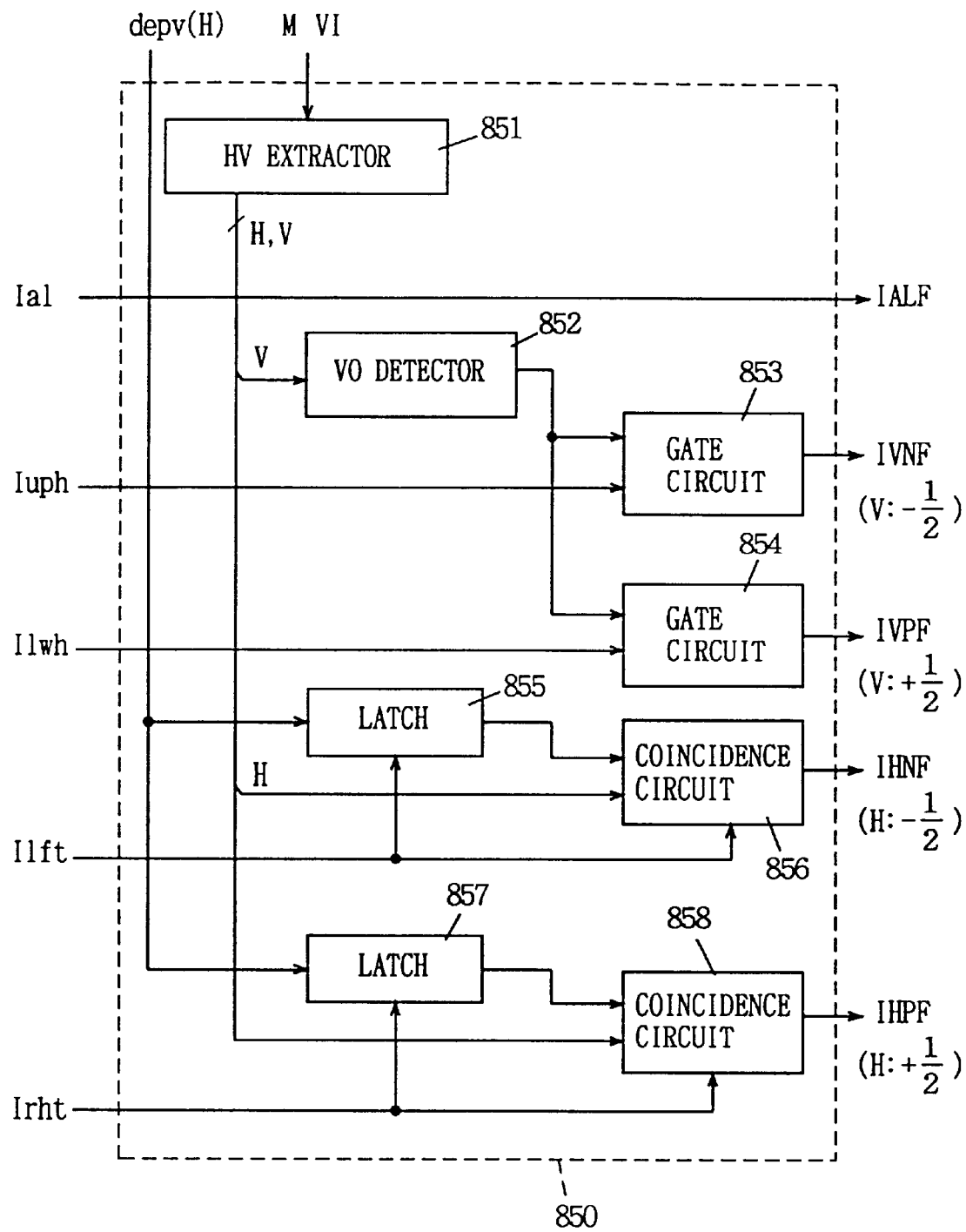
FIG. 109 illustrates a construction of a fractional precision search area control part included in the search area control part shown in FIG. 107.

FIG. 109 schematically illustrates the structure of a fractional precision search operation control part 850 which is included in the search operation control part 836 shown in FIG. 107. Referring to FIG. 109, the fractional precision search operation control part 850 includes an HV extractor 851 extracting horizontal and vertical components H and V from integer precision motion vector information MVI outputted from the comparator 3 shown in FIG. 108, a V0 detector 852 outputting an active signal when the vertical component V from the HV extractor 851 is zero, a gate circuit 853 activating a vertical negative component inhibiting signal IVNF for inhibiting evaluation of displacement vectors of negative vertical components in fractional precision when both of the upper half inhibiting signal Iuph and an output signal of the V0 detector 852 are in active states, a gate circuit 854 activating a vertical positive component inhibiting signal IVPF for inhibiting evaluation of positive vertical displacement vectors in fractional precision when both of the lower half inhibiting signal Ilwh and the output signal of the V0 detector 852 are in active states, a latch circuit 855 latching the horizontal component depv (H) of the displacement vector first received from the counter 684 (see FIG. 108) in the processing unit time in activation of the left half inhibiting signal Ilft, a coincidence circuit 856 which is activated in activation of the left half inhibiting signal Ilft for activating a horizontal negative component inhibiting signal IHNF for inhibiting evaluation of horizontal negative displacement vectors in fractional precision when the horizontal component latched in the latch circuit 855 and the horizontal component H of the motion vector outputted from the HV extractor 851 are equal to each other, a latch circuit 857 latching the horizontal component depv (H) of the displacement vector first supplied in the processing unit time in activation of the right half inhibiting signal Irht, and a coincidence circuit 858 which is activated in activation of the right half inhibiting signal Irht for activating a horizontal positive component inhibiting signal IHPF for inhibiting evaluation of positive displacement vectors in fractional precision when the horizontal component data latched by the latch circuit 857 and the horizontal component of the integer precision motion vector MVI from the HV extractor 851 coincide with each other.

It is possible to form the gate circuits 853 and 854 by AND gates, for example, forming active state output signals when signals supplied to both inputs thereof are in active states (when the active states are high levels). The coincidence circuits 856 and 858 can be formed by EXNOR and AND gates, for example. The AND gates are so employed as to AND output signals of the respective EXNOR gates, since the horizontal component data each are multibit signals.

The structure of the HV extractor 851 can be selected from various structures, in response to the structure of the motion vector information MVI. When the integer precision motion vector information MVI is formed by ordinary binary count values, a circuit for decoding the count values may be employed. When the integer precision motion vector information MVI has horizontal and vertical components H and V separately, these components H and V may be employed.

The full inhibiting signal Ial is utilized as a signal IALF for inhibiting evaluating operations on all displacement vectors of the fractional precision motion vector detecting part 832.

The inhibiting signals IALF, IVNF etc. shown in FIG. 109 are supplied to a comparison part which is included in the fractional precision motion vector detecting part 832 shown in FIG. 107. The application mode for the inhibiting signals is modified in various manners depending on the structure of the comparison part. When displacement vector evaluation in ½ pixel precision is sequentially executed on respective displacement vectors, it is possible to control a motion vector detecting range in fractional precision by a structure similar to that shown in FIG. 108.

Figure 110:
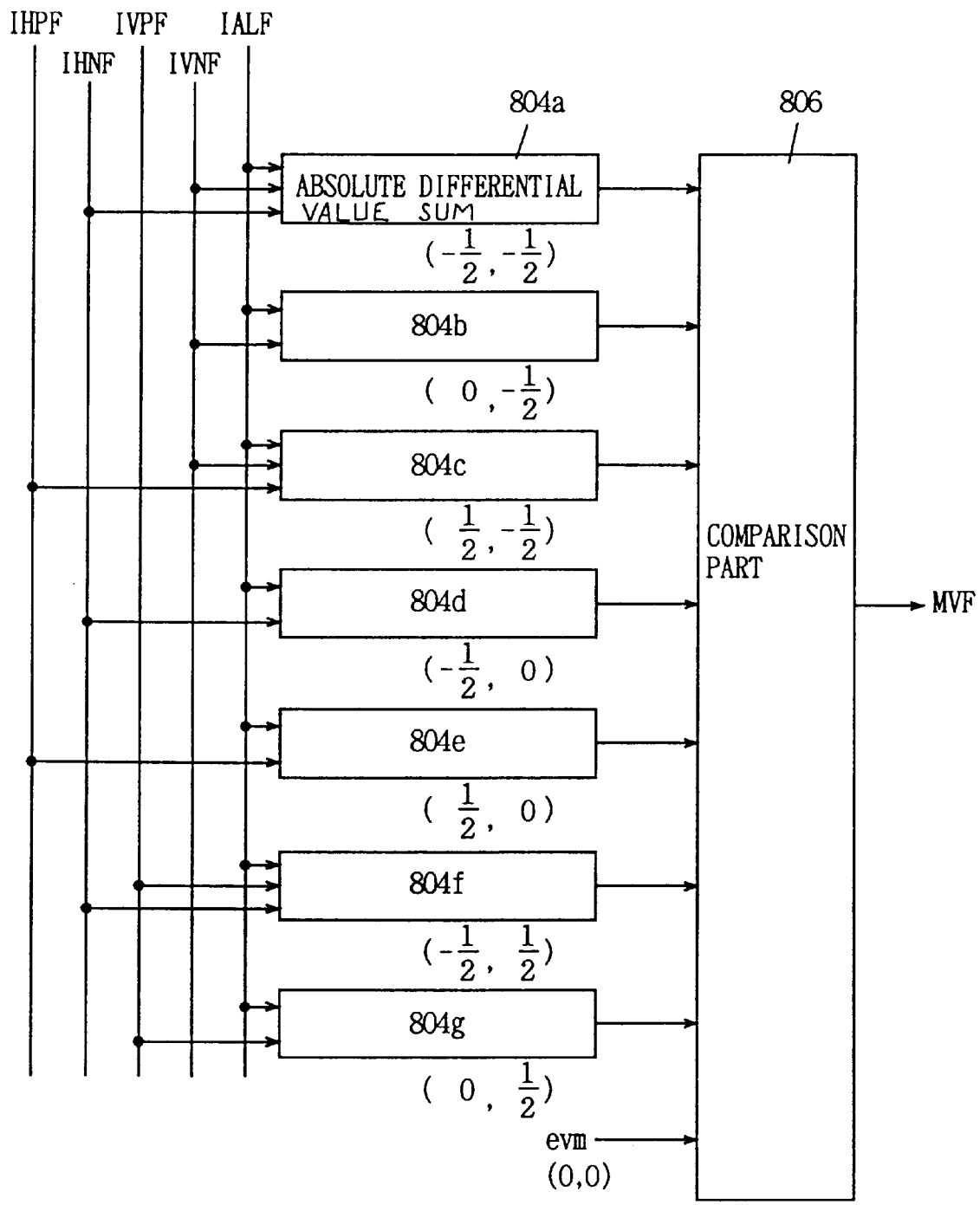
FIG. 110 illustrates constructions of an arithmetic part and a comparison part included in a fractional precision motion vector detecting part shown in FIG. 107 and inhibition signals applied thereto.

FIG. 110 illustrates an exemplary structure of a principal part of the fractional precision motion vector detecting part 832. The structure of a fractional precision motion vector detecting device shown in FIG. 110 corresponds to that of the fractional precision(½ pixel precision) motion vector detecting device shown in FIG. 86. The fractional precision motion vector detecting device shown in FIG. 110 includes absolute differential sum circuits 804a to 804g for forming evaluation function values of eight neighborhood evaluation points, and a comparison part 806 detecting the minimum evaluation function value from the absolute differential value sum circuits 804a to 804g and the integer precision motion vector evaluation function value evm and outputting information indicating a displacement vector corresponding to the minimum evaluation function value as a fractional precision motion vector MVF. The absolute differential value sum circuits 804a to 804g are uniquely associated with eight neighborhood displacement vectors (evaluation points) in fractional precision respectively. The absolute differential value sum circuits 804a, 804b and 804c correspond to displacement vectors (−½, −½), (0, −½) and (½, −½) respectively.

The absolute differential value sum circuits 804d, 804e, 804f and 804g correspond to displacement vectors (−½, 0), (½, 0), (−½, ½) and (0, ½) respectively. The evaluation function value evm corresponds to a displacement vector (0, 0).

The absolute differential value sum circuit 804a is supplied with the inhibiting signals IHNF, IVNF and IALF. The absolute differential value sum circuit 804b is supplied with the inhibiting signals IVNF and IALF. The absolute differential value sum circuit 804c is supplied with the inhibiting signals IHPF, IVNF and IALF. The absolute differential value sum circuit 804d is supplied with the inhibiting signals IHNF and IALF. The absolute differential value sum circuit 804e is supplied with the inhibiting signals IHPF and IALF. The absolute differential value sum circuit 804f is supplied with the inhibiting signals IHNF, IVPF and IALF. The absolute differential value sum circuit 804g is supplied with the inhibiting signals IHNF and IALF. These absolute differential value sum circuits 804a to 804g set output values thereof at maximum values when the inhibiting signals are activated. Assuming that the bit numbers of output data of the absolute differential value sum circuits 804a to 804g each are N, for example, each of the absolute differential value sum circuits 804a to 804g sets all N-bit outputs at "1" when at least one of the corresponding inhibiting signals is activated. Thus, displacement vectors included in the regions where the inhibiting signals are activated are brought into nonselected states in the comparison part 806, to be excluded from evaluation of motion vectors. In the structure of setting the output data of the absolute differential value sum circuits 804 (804a to 804g) when the inhibiting signals are activated, gates for ORing the inhibiting signals and the output bits of the absolute differential value sum circuits 804 may be provided for the respective output bits, for example. The inhibiting signals are at high levels when they are activated, and a bit "1" is related to the high-level signals.

In the aforementioned structure, it is possible to readily set regions for displacement vector evaluation in fractional precision.

The structures shown in FIGS. 108 to 110 are arranged in correspondence to the plurality of predictive modes respectively.

Figure 111:
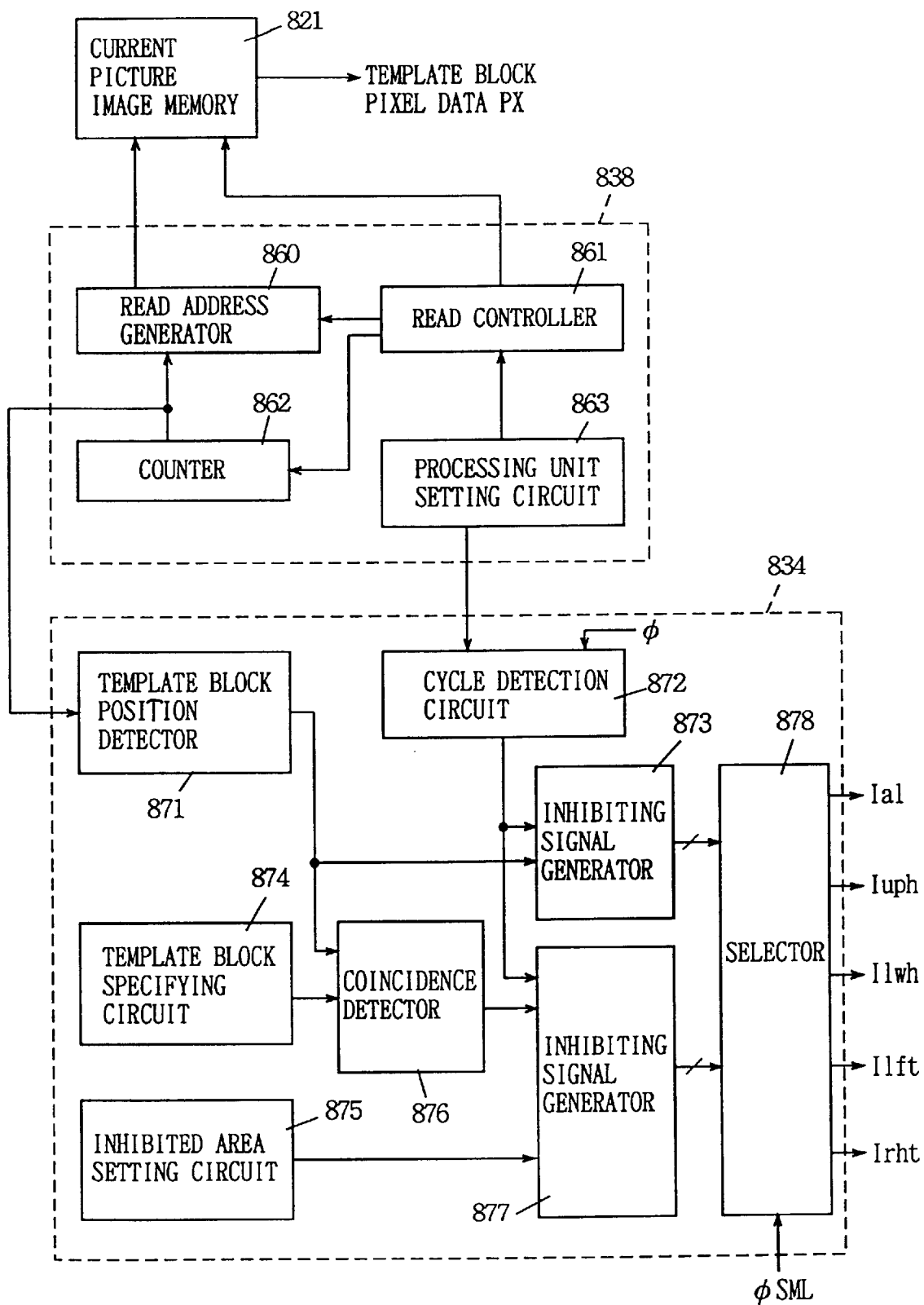
FIG. 111 illustrates constructions of a search area setting part and a read control circuit shown in FIG. 107.

FIG. 111 schematically illustrates the structures of the search range setting circuit 834 and the read control circuit 838 shown in FIG. 107. Referring to FIG. 111, the read control circuit 838 includes a counter 862 outputting information indicating positions of template blocks in the current screen, a processing unit setting circuit 863 setting motion vector search times in units of processing unit times, a read address generator 860 generating read addresses of the current picture image memory 821, and a read controller 861 controlling updating of the counter 862, address updating of the read address generator 860 and a data read operation of the current picture image memory 821 in accordance with processing time information set by the processing unit setting circuit 863.

The read address generator 860 converts the count value of the counter 862 to head address information, and successively generates the read addresses of the current picture image memory 821 from the head address information. In general, the current picture image memory 821 includes memory cells which are arranged in a matrix of rows and columns. When the current picture image memory 821 stores pixel data such that each row corresponds to pixels of one horizontal line on the screen, the read address generator 860 reads 16 pixel data in one row and thereafter reads pixel data which are arranged on the same columns of a next row, under control by the read controller 861. Namely, the read address generator 860 reads 16 pixel data from a row specified by the head address generated by template block information of the counter 862 and thereafter reads 16 pixel data in the next row starting at the same column as the head address. The read address generator 860 has this address conversion function. As to the structure of the address generator 860, a structure of reading 16 pixel data in the head row of the head address (including row and column addresses) and thereafter reading 16 pixel data starting at a column specified by the head address again may be employed, for example. The read controller 861 updates the count value of the counter 862 in accordance with the processing time information set by the processing unit setting circuit 863, and sets the current picture image memory 821 in a data read state in a motion vector detecting operation as to a new template block. The processing time information (not shown) may be supplied from the exterior, or the storage processing time information of the processing unit setting circuit 863 may be fixedly set depending on the application.

The search range setting circuit 834 includes a template block position detector 871 receiving the count value from the counter 862 for detecting the position of the template block to be processed, a cycle detecting circuit 872 for detecting which cycle is now executed in accordance with the processing time set in the processing unit setting circuit 863 and a search window pixel data transfer clock signal $\phi$ in units of the processing unit times, and an inhibiting signal generator 873 for generating inhibiting signals such as the full inhibiting signal Ial, the upper half inhibiting signal Iuph and the like in accordance with template block position information detected by the template block position detector 871 and cycle information detected by the cycle detecting circuit 872. The inhibiting signal generator 873 brings the respective inhibiting signals into the active states in accordance with the sequences shown in FIGS. 92 to 106. When the template block position detector 871 detects the left upper template block MB(0, 0) on the screen, for example, the inhibiting signal generator 873 activates the full inhibiting signal Ial in a first processing time, and activates the upper and left half inhibiting signals Iuph and Ilwh in a next processing unit time.

The search range setting circuit 834 further includes a template block specifying circuit 874 forming information for specifying a template block to be subjected to limitation of a motion vector search range, a coincidence detector 876 for deciding whether or not the template block specified by the template block specifying circuit 874 coincides with the template block position information specified by the template block position detector 871, an inhibited area setting circuit 875 for setting a region having a displacement vector evaluating operation inhibited, an inhibiting signal generator 877 for generating an inhibiting signal in accordance with a coincidence detection signal from the coincidence detector 876 and inhibited area information from the inhibited area setting circuit 875, and a selector 878 for selecting one of the outputs of the inhibiting signal generators 873 and 877 in accordance with a mode specifying signal $\phi$SML. The selector 878 supplies the inhibiting signals to the search operation control part 836 (FIG. 107). Prescribed information is set in the template block specifying circuit 874 and the inhibited area setting circuit 875 from an external controller (not shown). Thus, it is possible to limit the motion vector search range as to only a desired template block. The inhibiting signal generator 877 activates the inhibiting signal for inhibiting a motion vector search operation (displacement vector evaluating operation) in an inhibited area set by the inhibited area setting circuit 875. As a default mode, inhibiting information from the inhibiting signal generator 873 is selected by the selector 878. When a search range which is different from the motion vector search range decided in accordance with the position of the template block on the screen is set, the selector 878 is set in a state of selecting the inhibiting signals outputted from the inhibiting signal generator 877 by the mode specifying signal φSML. It is possible to set the motion vector search range in accordance with a processing mode thereby setting the motion vector search range in accordance with the structure of the picture image to be processed, by providing the template block specifying circuit 874, the inhibited area setting circuit 875, the coincidence detector 876 and the inhibiting signal generator 877.

Figure 112A:
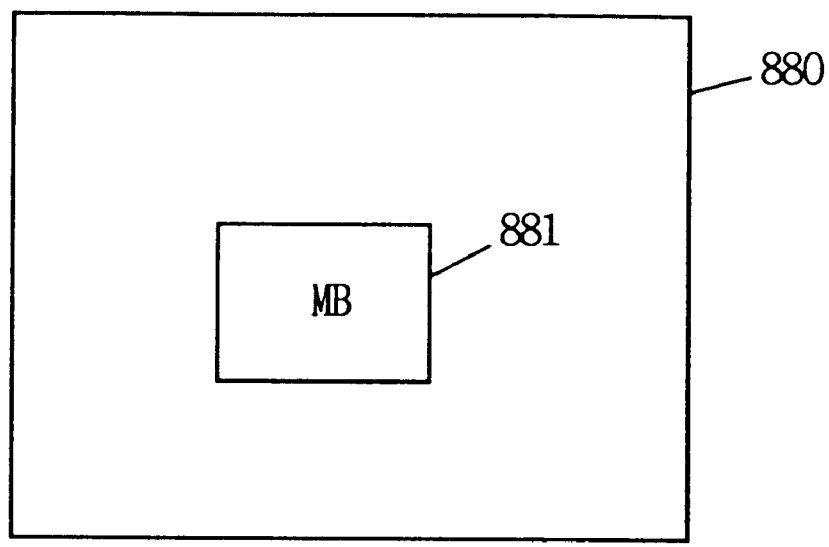
FIGS. 112A and 112B are diagrams used for explaining an operational effect of a template block setting circuit and an inhibition area setting circuit shown in FIG. 107.
Figure 112B:
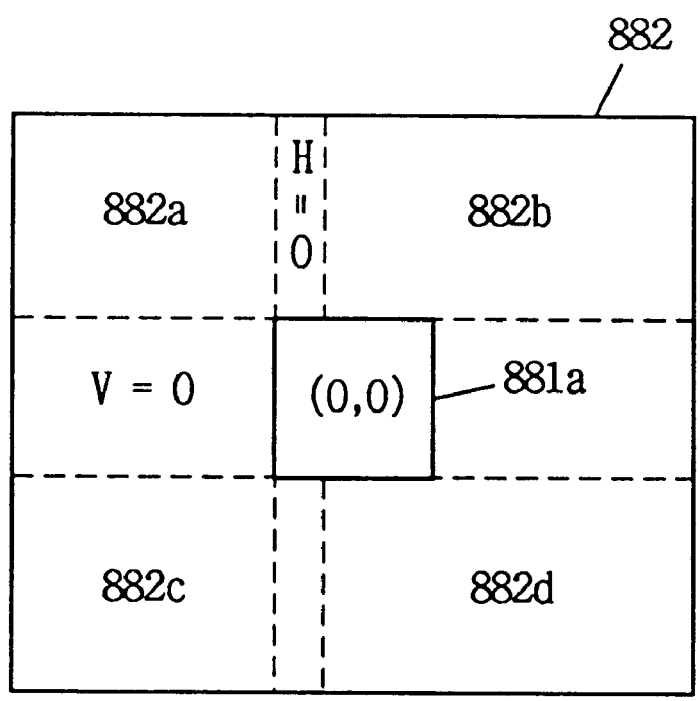

For example, it is possible to inhibit motion vector search in four regions 882a, 882b, 882c and 882d in a search region 882 as shown in FIG. 112B, as to a template block 881 which is positioned at the center of a screen 880, as shown in FIG. 112A. When the screen is moved only in one direction, for example, there is a high possibility that motion vectors are detected only in a direction opposite to the direction of movement. In this case, it is possible to detect motion vectors having higher correlation by carrying out motion vector search only with respect to the opposite direction. When a picture image subject to in-frame prediction such as a P picture dissimilar to a picture image subject to frame-to-frame prediction such as an I picture is inserted and motion vectors are detected in frame-to-frame prediction, precision of motion vectors employing a screen region formed by an in-frame predictive mode in this P picture is deteriorated as compared with the case of the frame-to-frame prediction, and hence it is possible to detect motion vectors in high precision by inhibiting a motion vector detecting operation in the frame-to-frame prediction employing such an in-frame predicted region.

According to the tenth embodiment of the present invention, as hereinabove described, the motion vector search range can be limited as to the template block, whereby it is possible to carry out motion vector detection in higher accuracy. Since the vector search range is limited also as to a motion vector detecting operation in fractional precision, in particular, it is possible to detect the motion vectors while employing only data of actually present pixels, to detect motion vectors of higher accuracy, and to construct a picture image coding system of high accuracy.

[Structure of Input Part]

Figure 113:
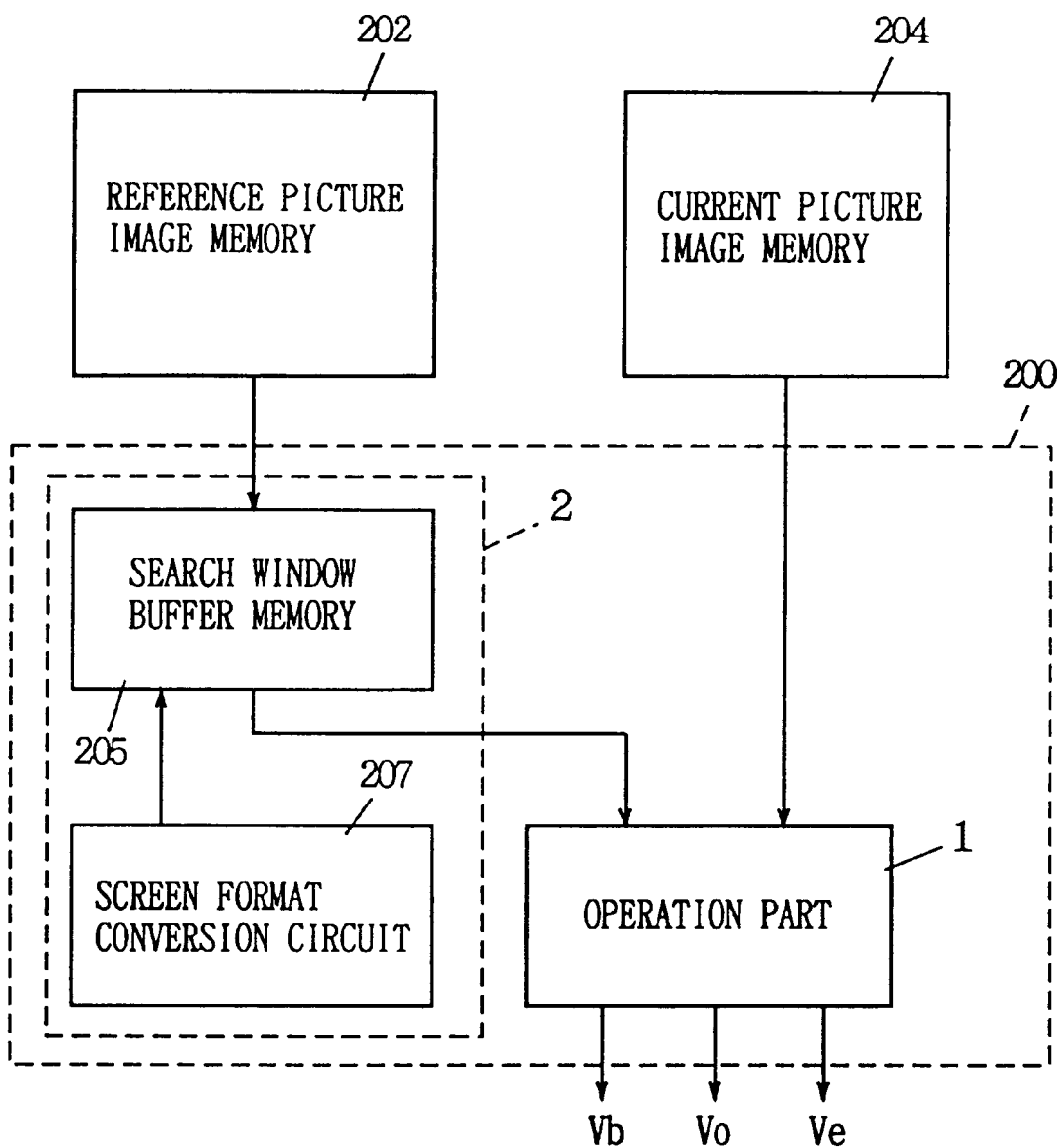
FIG. 113 illustrates the structure of a reference picture image pixel data input part of the motion vector detecting device according to the present invention.

FIG. 113 schematically illustrates the structure of the input part of the motion vector detecting device. Referring to FIG. 113, this motion vector detecting device 200 performs prescribed operations in accordance with template block data received from a current picture image memory 204 storing current screen picture data and search area pixel data read from a reference picture image memory 202 storing reference screen picture data, to detect motion vectors. Template block pixel data are read from the current picture image memory 204 every cycle of motion vector detection, to be supplied to an operation part 1. Element processors included in the operation part 1 are substantially linearly arranged, whereby it is possible to arrange pixel data of a subsequent template block in the processor array of the operation part 1 by reading a prescribed number of pixel data of a macro block (the subsequent template block) which is located in a column adjacent to and the same row as a template block processed in a precedent cycle.

The reference picture image memory 202 successively reads pixel data in a search area and supplies the same to the input part 2. Storage contents in the reference picture image memory 202 are changed by an output of an adder circuit 934 shown in FIG. 152.

The input part 2 includes a search window buffer memory 205 for storing the search area pixel data received from the reference picture image memory 202, and a screen format conversion circuit 207 for converting the screen format of the picture data stored in the search window buffer memory 205 to a specified screen format. The search window buffer memory 205 stores pixel data of a search window which is on an adjacent column of that stored in the processor array of the operation part 1 in a search area, for example. The screen format of picture data read from the reference picture image memory 202 is either a frame format or a field format. If the predictive mode of the motion vector detecting device 200 is adapted to the frame format, the screen format of the pixel data to be processed is changed in accordance with the internal predictive mode. It is not necessary to convert a pixel data train in accordance with the predictive mode of the motion vector detecting device 200 by an external processor for converting the screen format, whereby the load of the external processor is reduced, while it is not necessary to provide a circuit required for converting the screen format in the exterior and hence the external hardware volume can be reduced. Further, it is possible to execute motion detection in the units of frames regardless of whether the screen format of the input picture data to be processed is the field or frame format, thereby implementing a motion vector detecting device having high flexibility.

Figure 114:
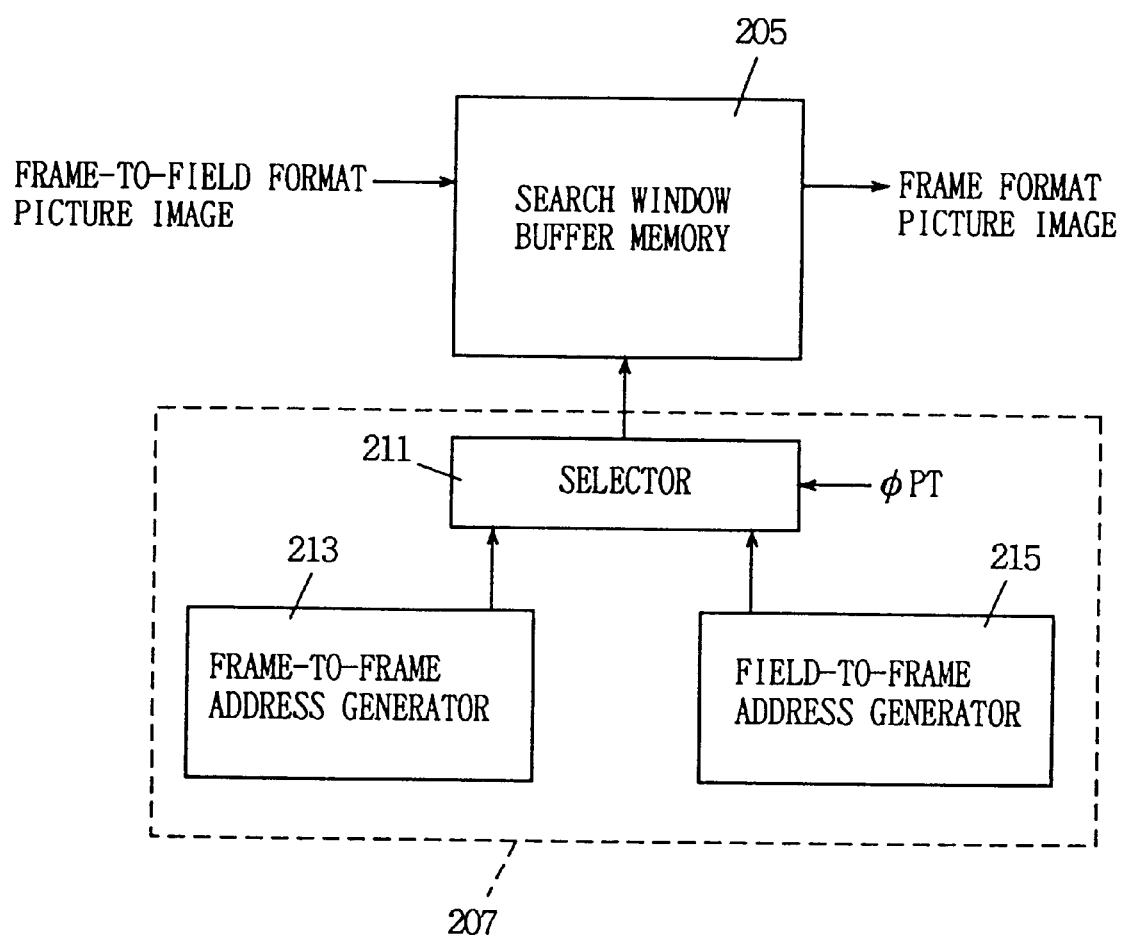
FIG. 114 schematically illustrates the structure of a screen format conversion circuit shown in FIG. 113.

FIG. 114 schematically illustrates the structure of the screen format conversion circuit 207 shown in FIG. 113. Referring to FIG. 114, the screen format conversion circuit 207 includes a frame-to-frame address generator 213 for generating write and read addresses when the screen format of an input picture data is the frame format, a field-to-frame address generator 215 for generating write and read addresses when the screen format of the input picture data is the field format, and a selector 211 which selects one of outputs of the address generators 213 and 215 in accordance with a screen format specifying signal φPT and supplies the same to the search window buffer memory 205.

FIG. 115 illustrates an exemplary structure of the frame-to-frame address generator 213 shown in FIG. 114. The structure shown in FIG. 115 is adapted to generate addresses when the search window buffer memory 205 has a structure for storing pixel data on 48 rows and 14 columns. The structure shown in FIG. 115 is appropriately modified in accordance with the storage capacity of the search window buffer memory 205.

Referring to FIG. 115, the frame-to-frame address generator 213 includes a write address generator 220 for generating a write address in picture data writing, and a read address generator 222 for generating a read address for reading data from the buffer memory 205 and supplying the data to the operation part 1. The write address generator 220 includes a hexadecimal counter 220a which counts a write clock signal φCW providing timing for writing picture data generated in a writing mode and generates the count value as a column address pointer AYPW, and a 48-ary counter 220a which counts a count-up signal φUPY of the hexadecimal counter 220a and generates the count value as a row address pointer AXPW. The 48-ary counter 220b can be formed by a 6-bit binary counter, and its maximum count value is set at 48 so that the count value is initialized at 1 in a next clock cycle when the count value reaches 48.

The read address generator 222 has a similar structure, and includes a 48-ary counter 222b which counts a read clock signal φCR generated in data reading and generates the count value as a row address pointer AXPR in data reading, and a hexadecimal counter 222a which counts a count-up signal φUPX of the 48-ary counter 222*b* and generates the count value as a column address pointer AYPR in data reading.

The frame-to-frame address generator 213 further includes a multiplexer (MUX) 224*a* which passes one of the column address pointers AYPW and AYPR generated in data writing and in data reading as a column address pointer AYP in accordance with a read/write signal R/WZ indicating data writing or reading, and a multiplexer 224*b* which passes one of the row address pointers AXPW and AXPR generated in data writing and in data reading as a row address pointer AXP in accordance with the read/write signal R/WZ. The address pointers AYP and AXP from the multiplexers 224*a* and 224*b* are supplied to one input of the selector 211 shown in FIG. 114. The operation is now described.

Figure 116A:
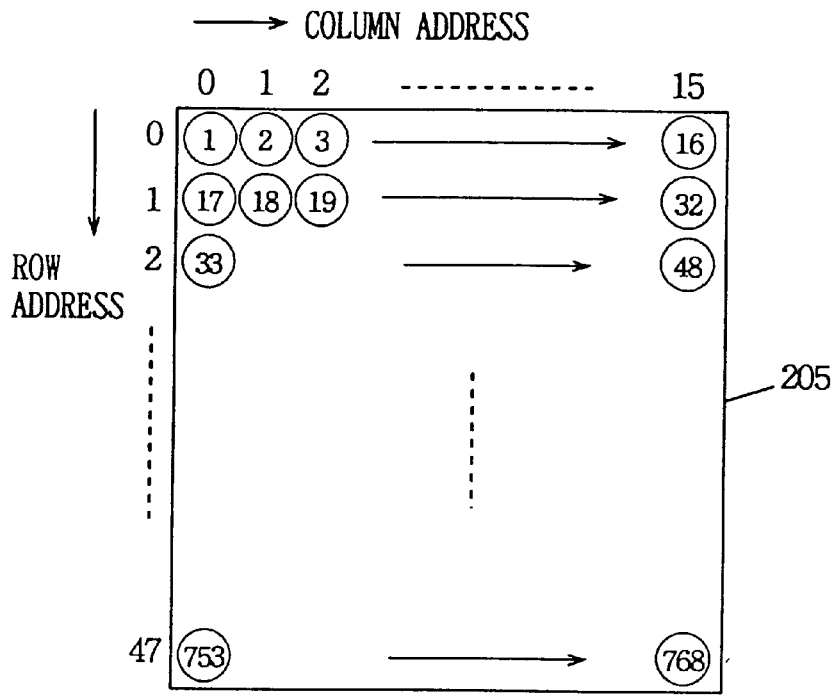
FIG. 116A illustrates address generation order of the address generator shown in FIG. 115 in data writing.

With reference to FIG. 116A, the operation in picture data writing is now described. In this case, the write address generator 220 shown in FIG. 115 operates, and the read address generator 222 does not operate. In the write address generator 220, the counters 220*a* and 220*b* are reset at initial values. The first row and column address pointers AXPW and AYPW are zeroed to specify addresses X and Y, (X, Y) (0, 0) of the buffer memory 205. Thus, the data transmitted from the reference picture image memory 202 is written in the address (0, 0). Then, the write clock signal φCW is generated and the count value of the hexadecimal counter 220*a* is incremented by 1. Thus, the column address pointer AYPW is incremented by 1, while the row address pointer AXPW remains unchanged. An address (0, 1) is specified so that second pixel data is written therein. Thereafter pixel data are successively stored on the zeroth row in the buffer memory 205 until the count value of the hexadecimal counter 220*a* reaches 15. After 16 pixel data are stored in the buffer memory 205, the count-up signal φUPY is generated from the hexadecimal counter 220*a*, to increment the count value of the 48-ary counter 220*b* by 1. Thus, the row address pointer AXPW is changed to 1, while the count value of the hexadecimal counter 220*a* is zeroed. Therefore, subsequently supplied 17th pixel data is written in an address (1, 0). This operation is thereafter repeated so that the count value of the 48-ary counter 220*b*, i.e., the row address pointer AXPW, is incremented by 1 every time 16 pixel data are written, whereby the data are successively written in the respective rows. In general, picture data supplied to the reference picture image memory 202 are pixel data which are scanned in a raster scan system, and hence pixel data which are horizontally arranged on one row are successively supplied. Thus, the data are successively stored in accordance with the raster scan system in data writing (since the data are written in the reference picture image memory 202 also in accordance with the raster scan system and similarly read in accordance with the raster scan system).

Figure 116B:
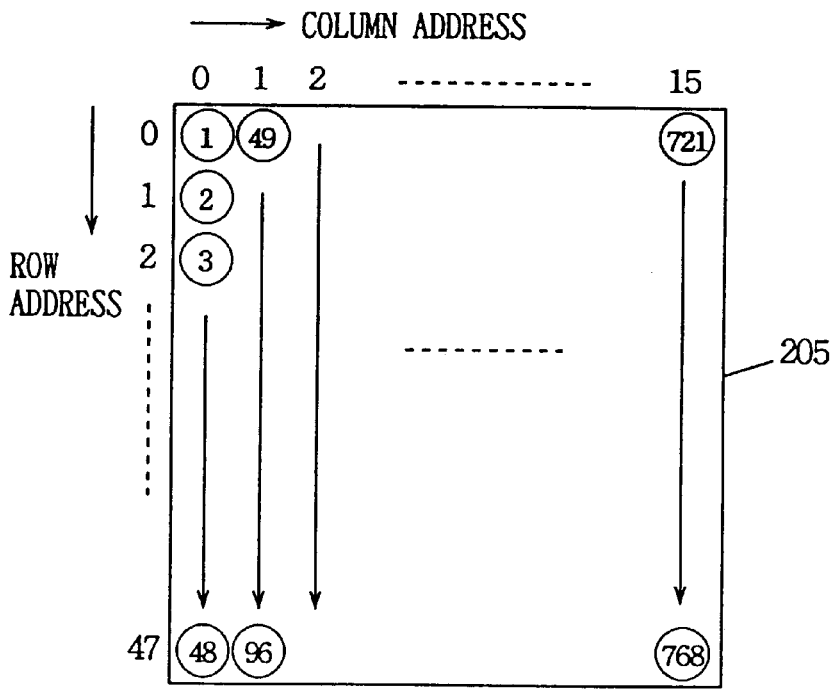
FIG. 116B illustrates an address generation sequence of the address generator shown in FIG. 115 in pixel data reading.

With reference to FIG. 116B, the operation of successively reading the pixel data from the search window buffer memory 205 shown in FIG. 114 and supplying the same to the operation part 1 is now described. In pixel data reading, the read address generator 222 operates, with no operation of the write address generator 220. Initial values of the hexadecimal counter 222*a* and the 48-ary counter 222*b* are set at zero, and hence the address at which data is read first is (0, 0). Then, the read clock signal φCR is generated so that the count value of the 48-ary counter 222*b* is incremented by 1 while the value of the row address pointer AXPR is also incremented by 1. Since no count-up signal φUPX is generated, the count value of the hexadecimal counter 222*a* is maintained at zero. Thus, pixel data of an address (1, 0) is read second. Thereafter 48 data are read in accordance with the read clock signal φCR. When the count value of the 48-ary counter 222*b* reaches 47, the count-up signal φUPX is generated in a next clock cycle, and the count value of the hexadecimal counter 222*a* is incremented by 1 to become 1. The count value of the 48-ary counter 222*b* is reset at the initial value in synchronization with the generation of the count-up signal φUPX. Therefore, 49th pixel data is stored in an address (0, 1). Thereafter this operation is so repeated that the pixel data are read along the direction successively incrementing the row addresses. Due to the structure of reading the data by successively incrementing the row addresses, it is possible to scan the pixels in the search area along the address increase direction or in a row address ascending order, whereby the operation part 1 is supplied with all necessary data for operation by simply successively shifting data as received.

[Modification of Frame-to-Frame Address Generator]

Figure 117:
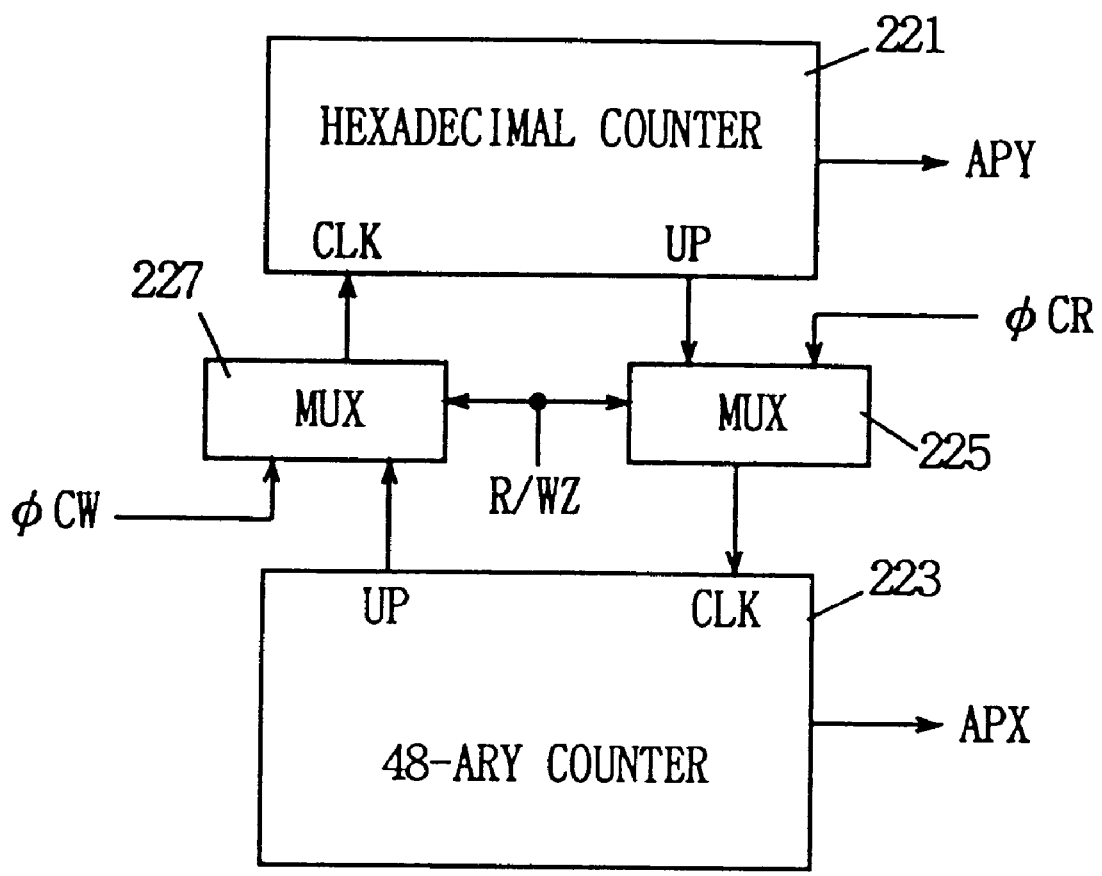
FIG. 117 illustrates a modification of the address generator shown in FIG. 115.

FIG. 117 illustrates a modification of the frame-to-frame address generator 213. Referring to FIG. 117, this frame-to-frame address generator 213 includes a hexadecimal counter 221 which counts a clock signal received at a clock input CLK and outputs a count-up signal and is reset to an initial value when the count value reaches 15, and a 48-ary counter 223 which counts a signal received at a clock input terminal CLK and outputs a count-up signal from an output terminal up when the count value reaches 47 and enters a next new clock cycle. The clock input terminal CLK of the hexadecimal counter 221 is supplied with a write clock signal φCW or the count-up signal of the 48-ary counter 223 through a multiplexer 227. The clock input terminal CLK of the 48-ary counter 223 is supplied with either a read clock signal φCR or the count-up signal of the hexadecimal counter 221 through a multiplexer 225. Selection of the multiplexers 225 and 227 is set by a read/write signal R/WZ. When the read/write signal R/WZ indicates a data write mode, the multiplexer 225 supplies the count-up signal of the hexadecimal counter 221 to the clock input terminal CLK of the 48-ary counter 223. The multiplexer 227 supplies the write clock signal φCW to the clock input terminal CLK of the hexadecimal counter 221. The structure shown in FIG. 117 requires only a single counter for each of hexadecimal and 48-ary countings, whereby the device scale can be reduced.

Figure 118:
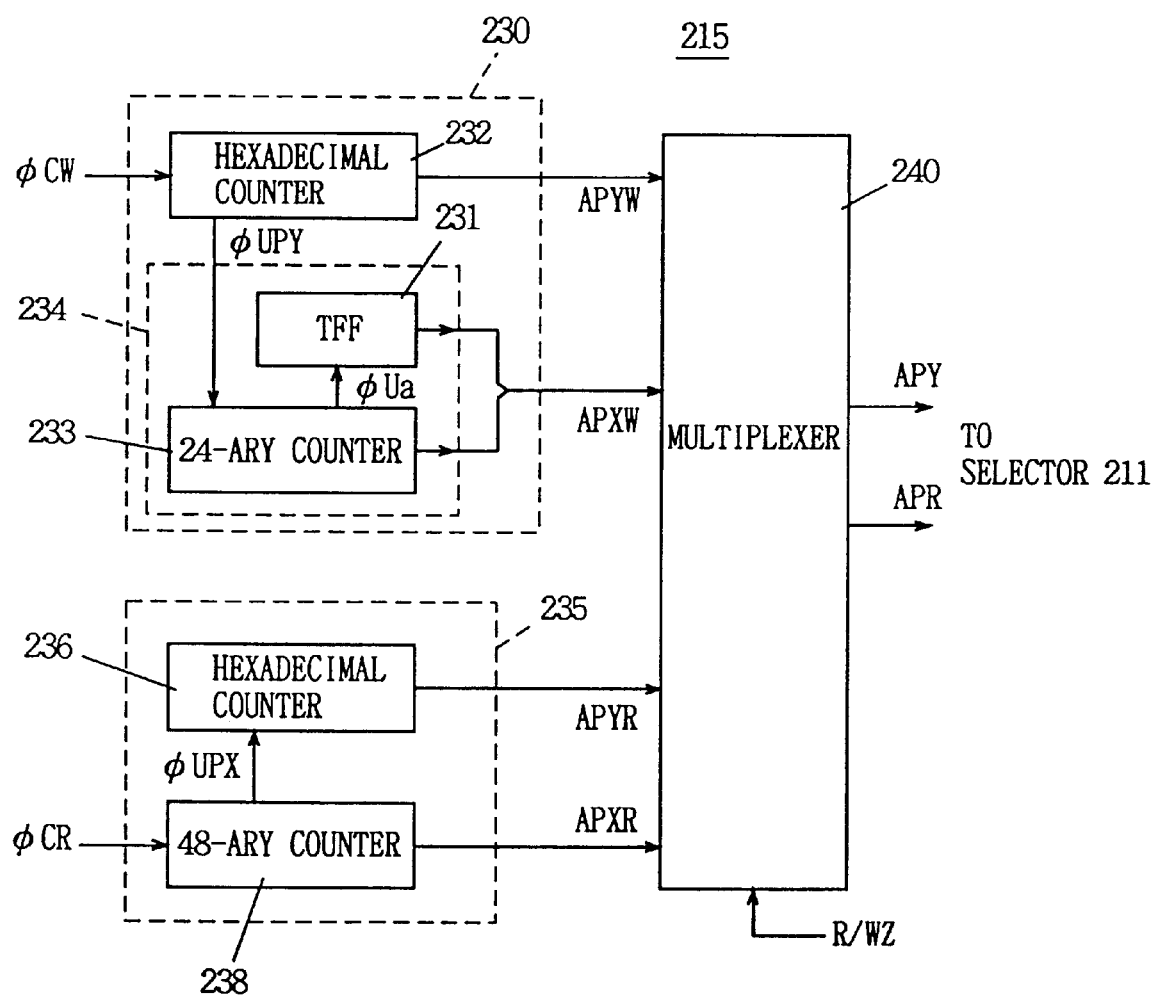
FIG. 118 illustrates an exemplary structure of a field-to-frame address generator shown in FIG. 114.

FIG. 118 illustrates a specific structure of the field-to-frame address generator 215 shown in FIG. 114. Referring to FIG. 118, the field-to-frame address generator 215 includes a write address generator 230 for generating row and column address pointers APXW and APYW in pixel data writing, and a read address generator 235 for generating column address pointers APXR and APYR in pixel data reading.

The write address generator 230 includes a write address pointer generator 234 for counting a count-up signal φUPY from a hexadecimal counter 232, which in turn counts the write clock signal φCW generated in pixel data writing and generates the count value as a write column address pointer APW, and generating the count value as a write address pointer APXW. The write address pointer generator 234 includes a 24-ary counter 233 which counts the count-up signal φUPY from the hexadecimal counter 232, and a T flip-flop 231 whose output logic state is changed in accordance with a count-up signal φUa of the 24-ary counter 233. The output of the T flip-flop 231 is employed as the least significant bit of the write row address pointer APXW, while the output of the 24-ary counter 233 is employed as the remaining upper bits of the write row address pointer APXW.

The read address generator 235 includes a 48-ary counter 238 which counts the read clock signal φCR generated in pixel data writing and generates the count value as a read row address pointer APXR, and a hexadecimal counter 236 which counts the count-up signal φUPX from the 48-ary counter 238 and outputs the count value as a read column address pointer APYR. The address pointers APYW, APXW, APYR and APXR from the write address generator 230 and the read address generator 235 are supplied to a multiplexer 240. The multiplexer 240 selects one of the write address pointers APYW and APXW or one of the read address pointers APYR and APXR in accordance with the read/write signal R/WZ and transmits the same to the selector 211 (see FIG. 35) as address pointers APY and APX respectively. The operation is now described.

Figure 119:
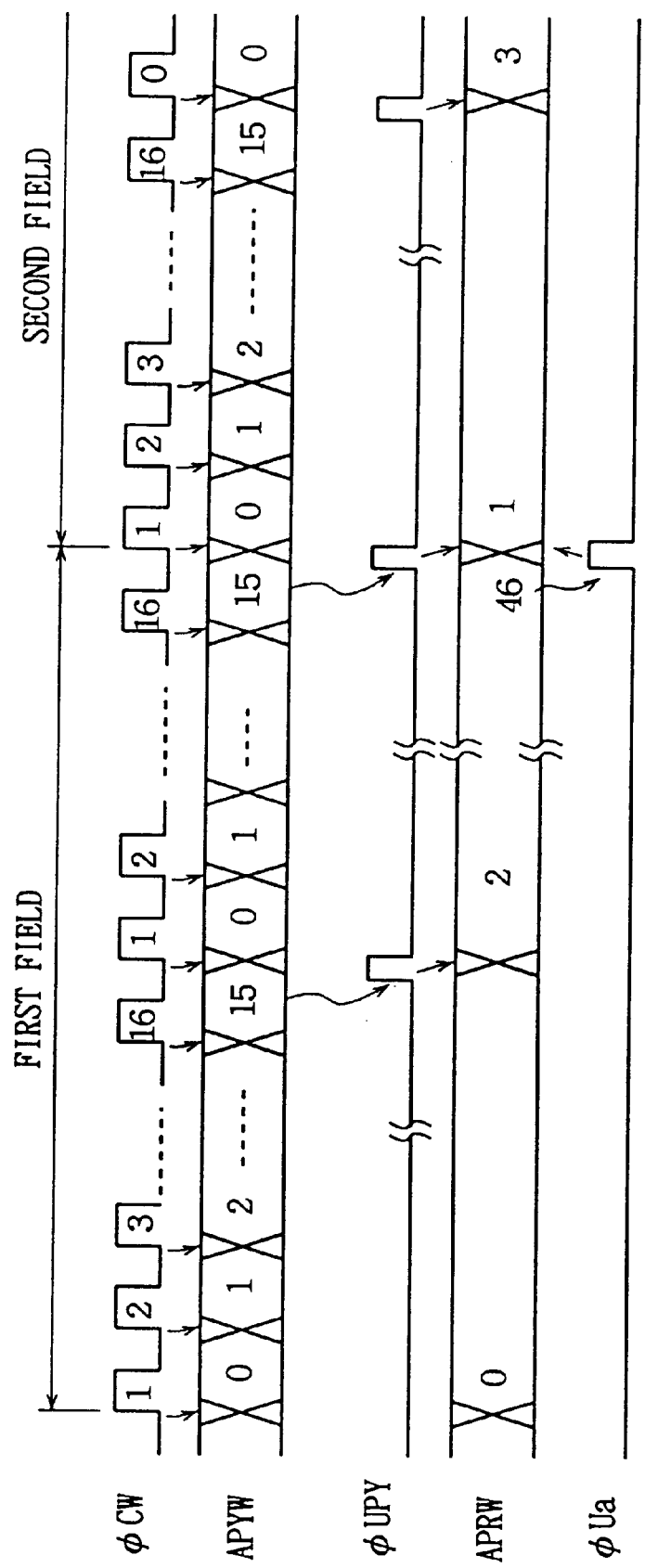
FIG. 119 is a timing chart showing the operation of the address generator shown in FIG. 118.

First, the operation of the write address generator 230 is described with reference to FIG. 119. The hexadecimal counter 232 and the 24-ary counter 233 are initialized at the count values 15 and 0 respectively. The T flip-flop 231 is initialized in a zero outputting state. When the write clock signal φCW is supplied, the output of the hexadecimal counter 232 is zeroed. At this time, no count-up signal φUPY is generated since the same is generated in a precedent cycle and employed for initializing the 24-ary counter 233 at zero or generation of this count-up signal φUPY is inhibited in the initial value setting. When the write clock signal φCW is supplied at first, therefore, both of the row and column address pointers APXW and APYW are zeroed to specify an address (0, 0). Then the next write clock φCW is supplied so that the count value of the hexadecimal counter 232 is incremented by 1. The read address pointer APXW from the read address generator 234 is not changed but maintained at zero. Therefore, pixels are successively addressed with respect to the zeroth row.

When the write clock signal φCW is counted 16 times and the count value of the hexadecimal counter 232, i.e., the write column address pointer APYW reaches 15, the count-up signal φUPY is generated at prescribed timing. An address (0, 15) is designated so that pixel data is written therein and thereafter the count value of the 24-ary counter 233 is incremented by 1 in accordance with this count-up signal φUPY. On the other hand, the count value of the hexadecimal counter 232 is returned to zero when the write clock signal φCW is supplied. The output of the 24-ary counter 233 may be changed in synchronization with the write clock signal φCW. Thus, addressing for successively storing pixel data of the second row is carried out when an address (2, 0) is designated and thereafter the write clock signal φCW is supplied.

The above operation is repeated until the count value of the 24-ary counter 233 reaches the maximum value (23), whereby the count-up signal φUa is generated to change the output state of the T flip-flop 231. In other words, the output of the T flip-flop 231 is changed to "1". The output of the 24-ary counter 233 is returned to zero in accordance with the count-up signal from the hexadecimal counter 232. Since the output of the 24-ary counter 233 is zero and that of the T flip-flop 231 is 1, the read row address pointer APXW indicates 1. Therefore, an address (1, 0) is designated when the write clock signal φCW is supplied next, so that positions for storing the pixel data of the first row are thereafter successively addressed and the read row address pointer APXW becomes 3 when the count value of the 24-ary counter 233 is thereafter changed in accordance with the count-up signal φUPY of the hexadecimal counter 232, so that positions for storing pixel data of a third row are successively addressed.

Figure 120A:
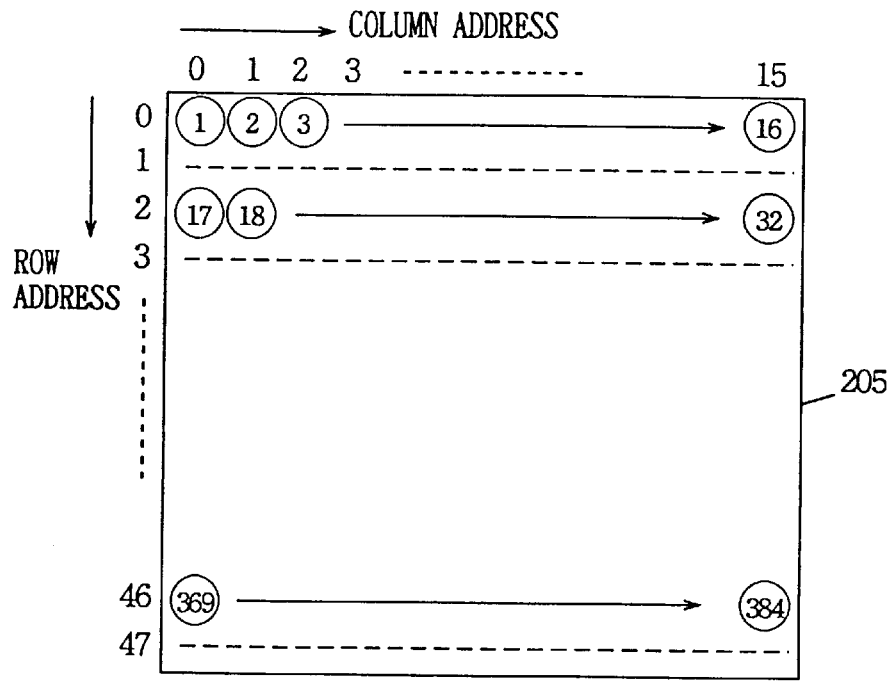
Figure 120B:
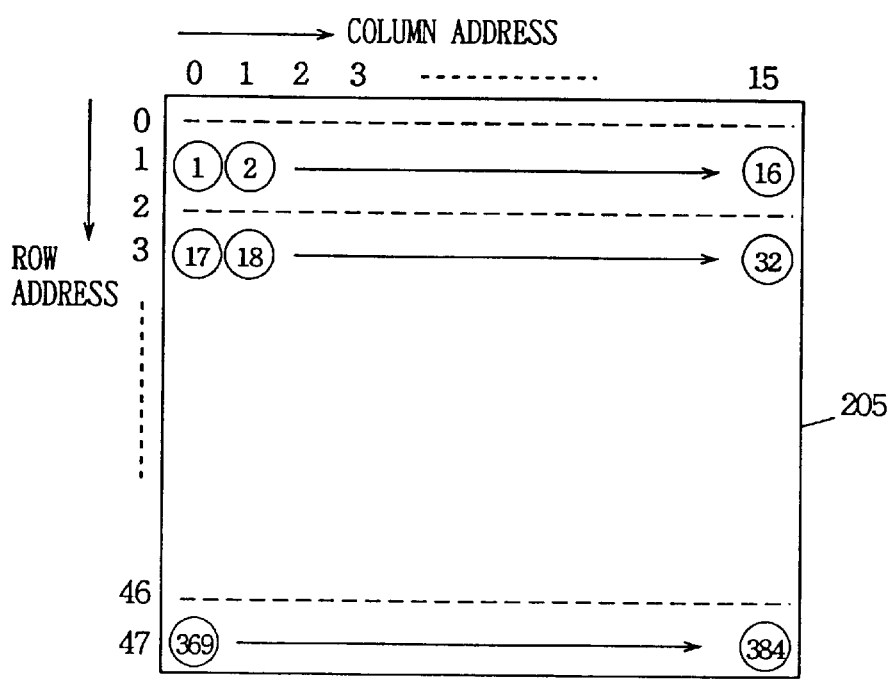

Therefore, pixel data which are included in a first field (even or odd field) are successively stored in even rows of the search window buffer memory 205 as shown in FIG. 120A, while pixel data belonging to a second field (odd or even field) are successively stored in odd rows as shown in FIG. 120B. While correspondence between the first and second fields and the even and odd fields are arbitrary, the first field corresponds to an even field and the second field corresponds to an odd field in the above description. Therefore, the pixel data such as picture data in accordance with the general NTSC system which are supplied in units of fields are stored in the buffer memory 205 in units of two fields, so that pixel data included in a one-frame picture image are stored in the search window buffer memory 205 in the frame format.

The operation of the read address generator 235 is identical to that of the read address generator 222 described above with reference to FIG. 115. Pixel data on the zeroth column are successively read from the zeroth to 47th rows in accordance with the read clock signal φCR and then the pixel data on the first column are read so that this operation is thereafter repeated. The read sequence for the pixel data in this read operation is identical to that shown in FIG. 116B.

As hereinabove described, it is possible to entirely convert picture data of either a frame format or a field format to those of the frame format for transmitting the same to the operation part 1. Thus, the operation part 1 can execute motion vector detection in units of the frames regardless of the screen format of the input picture data.

[Second Structure of Input Part]

Figure 121:
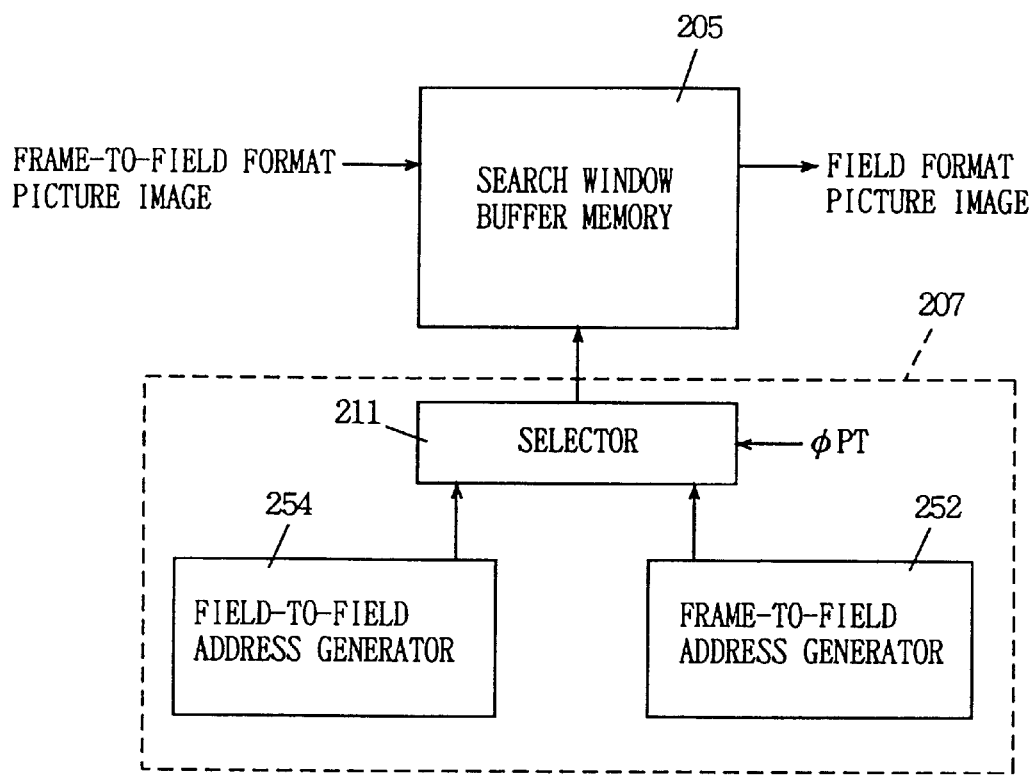

FIG. 121 schematically illustrates a second structure of the input part. The structure shown in FIG. 121 is adapted to convert a frame or field format picture image pixel data to a field format picture image pixel data train.

A screen format conversion part 207 includes a field-to-field address generator 254 which generates an address pointer for the search window buffer memory 205 when a field format picture image pixel data train is received, a frame-to-field address generator 252 which generates an address pointer for converting a frame format picture image pixel data train as received to a field format picture image pixel data train, and a selector 211 which selects one of the address pointers outputted from the field-to-field address generator 254 and the frame-to-field address generator 252 in accordance with a screen format specifying signal φPT for supplying the selected one to the search window buffer memory 205. The field-to-field address generator 254 is identical in structure to the frame-to-frame address generator 213 shown in FIG. 115, except that the pixel data train to be processed is in the field format.

Figure 122A:
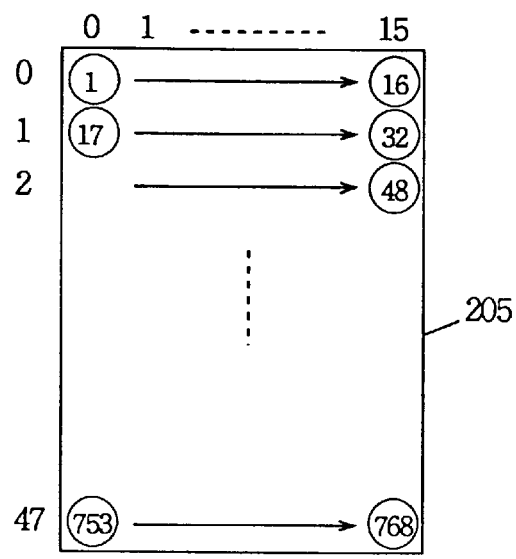

FIG. 122A shows correspondence between contents of address pointers generated by the field-to-field address generator 254 and pixel data trains stored in the search window buffer memory 205. When a field format picture image pixel data train is supplied, the field-to-field address generator 254 first designates the zero row and successively designates the zeroth to 15th columns on this zeroth row, as shown in FIG. 122A. The first row is subsequently designated after pixel data is written in the 15th column on the zeroth row, and 16 pixel data are written in the first row. This operation is repeated up to the 47th row. It is assumed here that the size of the search window employed in the operation part 1 is 48 pixels (rows) by 16 pixels (columns).

Figure 122B:
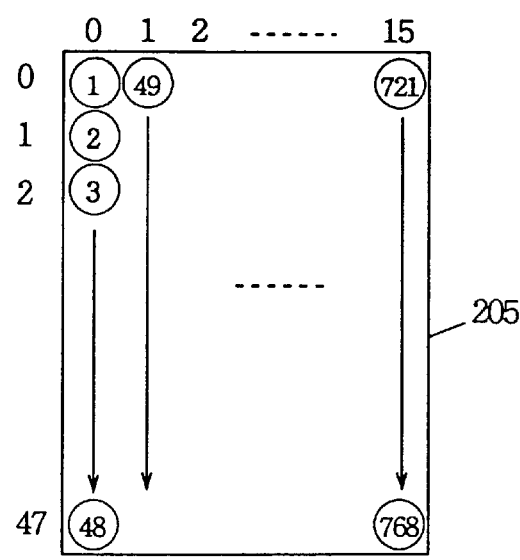

In pixel data reading, the field-to-field address generator 254 first selects the zero column and successively designates the zeroth to 49th rows, as shown in FIG. 122B. Thus, the pixel data on the zeroth column are successively read out.

When the pixel data (48 pixels) are read from the zeroth column, then 48 pixels on the first column are successively read out. This operation is repeated. Thus, the pixel data trains are read from the search window buffer memory 205 in the order of the search window block pixel data stored in the processor array of the operation part 1.

Figure 123A:
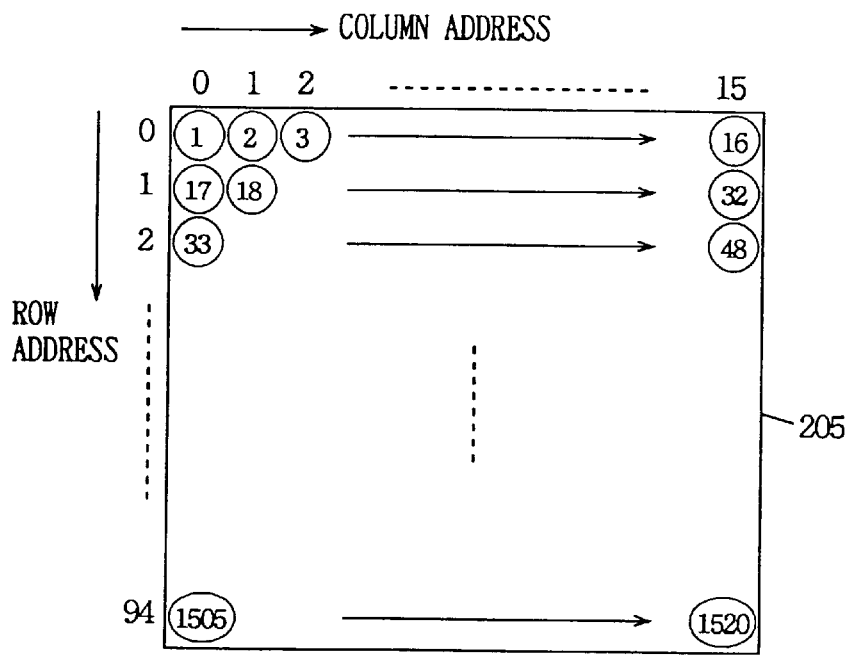
Figure 123B:
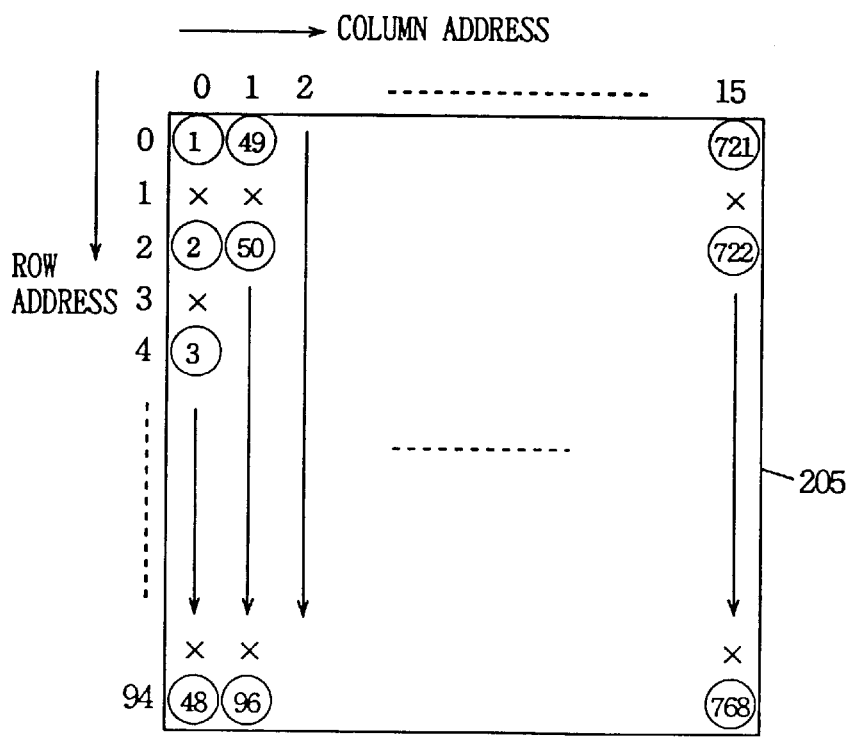

FIGS. 123A and 123B show the order of address pointers generated by the frame-to-field address generator 252. The frame-to-field address generator 252 generates an address pointer indicating pixel data storage positions of the search window buffer memory 205 when a frame format picture image pixel data train is received. In pixel data writing, the frame-to-field address generator 252 generates the address pointers for successively storing the pixel data row by row, similarly to field format picture image data inputting, as shown in FIG. 123A. In this pixel data writing, the frame-to-field address generator 252 causes the storage of the pixel data in units of 95 pixels (rows) by 16 pixels (columns). This is because a frame format picture image includes even and odd fields (first and second fields) and it is necessary to extract pixel data of a single field picture image from the frame picture image in order to form a field format picture image. In pixel data reading, on the other hand, the frame-to-field address generator 252 generates the address pointers for reading only pixel data of even rows on every column, as shown in FIG. 123B. Thus, only the pixel data of the first field are extracted to obtain pixel data of the search window of 48 pixel rows by 16 pixel columns.

Figure 124:
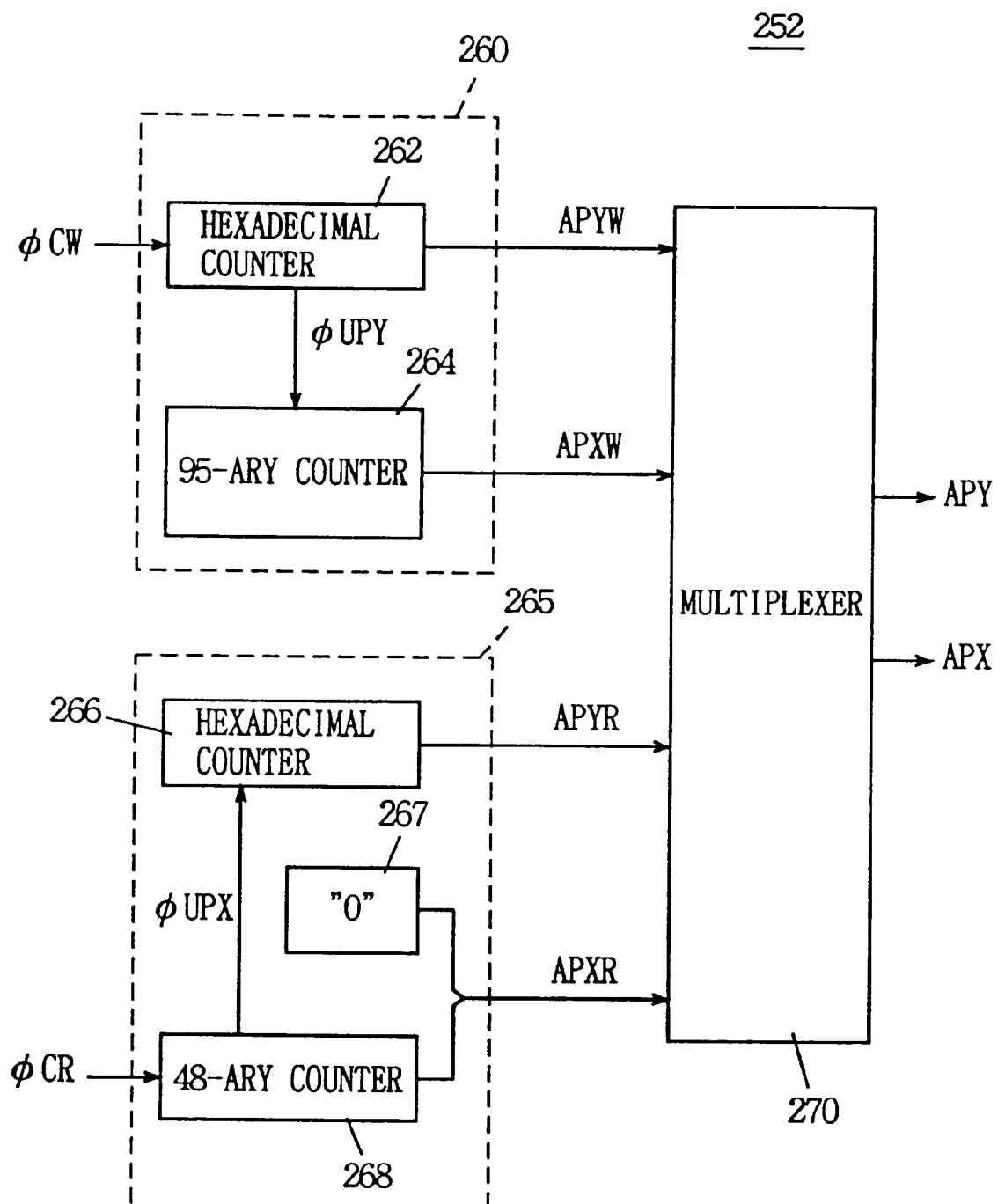

FIG. 124 illustrates the specific structure of the frame-to-field address generator 252 shown in FIG. 121. Referring to FIG. 124, the frame-to-field address generator 252 includes a write address generator 260 and a read address generator 265 generating the address pointers in pixel data writing and in pixel data reading respectively. The write address generator 260 includes a hexadecimal counter 262 which counts the write clock signal φCW generated in pixel data writing and outputs the count value as a column address pointer APYW, and a 95-ary counter 264 which counts a count-up signal φUPY of the hexadecimal counter 262 and outputs the count value as a row address pointer APXW. The write address generator 260 carries out an operation which is similar to that of the write address generator 220 described above with reference to FIG. 115, so that addresses of a next row are designated when all pixel data storage positions of a single row are designated by the hexadecimal counter 262. The 95-ary counter 264 successively designates 95 row addresses.

The read address generator 265 includes a 48-ary counter 268 which counts the read clock signal φCR generated in pixel data reading, a hexadecimal counter 266 which counts a count-up signal φUPX of the 48-ary counter 268 and outputs the count value as a column address pointer APYR, and a 1-bit address generator 267 which generates a fixed value "0". Outputs of the 48-ary counter 268 and the 1-bit address generator 267 are employed as the row address pointer APXR. The fixed bit value "0" from the 1-bit address generator 267 is utilized as the least significant bit of the row address pointer APXR which is employed in pixel data reading. Therefore, the row address pointer APXR points only even rows. Due to this structure of the read address generator 265, it is possible to successively point zeroth, second, fourth, . . . , and 94th rows for reading pixel data, while incrementing the count value of the hexadecimal counter 266 by 1 after reading the pixel data of one column for successively reading pixel data of the next column.

According to the structure shown in FIG. 121, it is possible to form a field format picture image pixel data train regardless of whether the screen format of input picture image pixel data is the field format or the frame format, thereby detecting motion vectors in units of the fields regardless of the screen format of the input picture image. Further, it is not necessary to provide a circuit for converting a frame format picture image pixel data train to a field format picture image pixel data train in the exterior, and a motion vector detecting device having high flexibility can be implemented to be adapted to an arbitrary screen format without increasing the device scale.

[Third Structure of Input Part]

Figure 125:
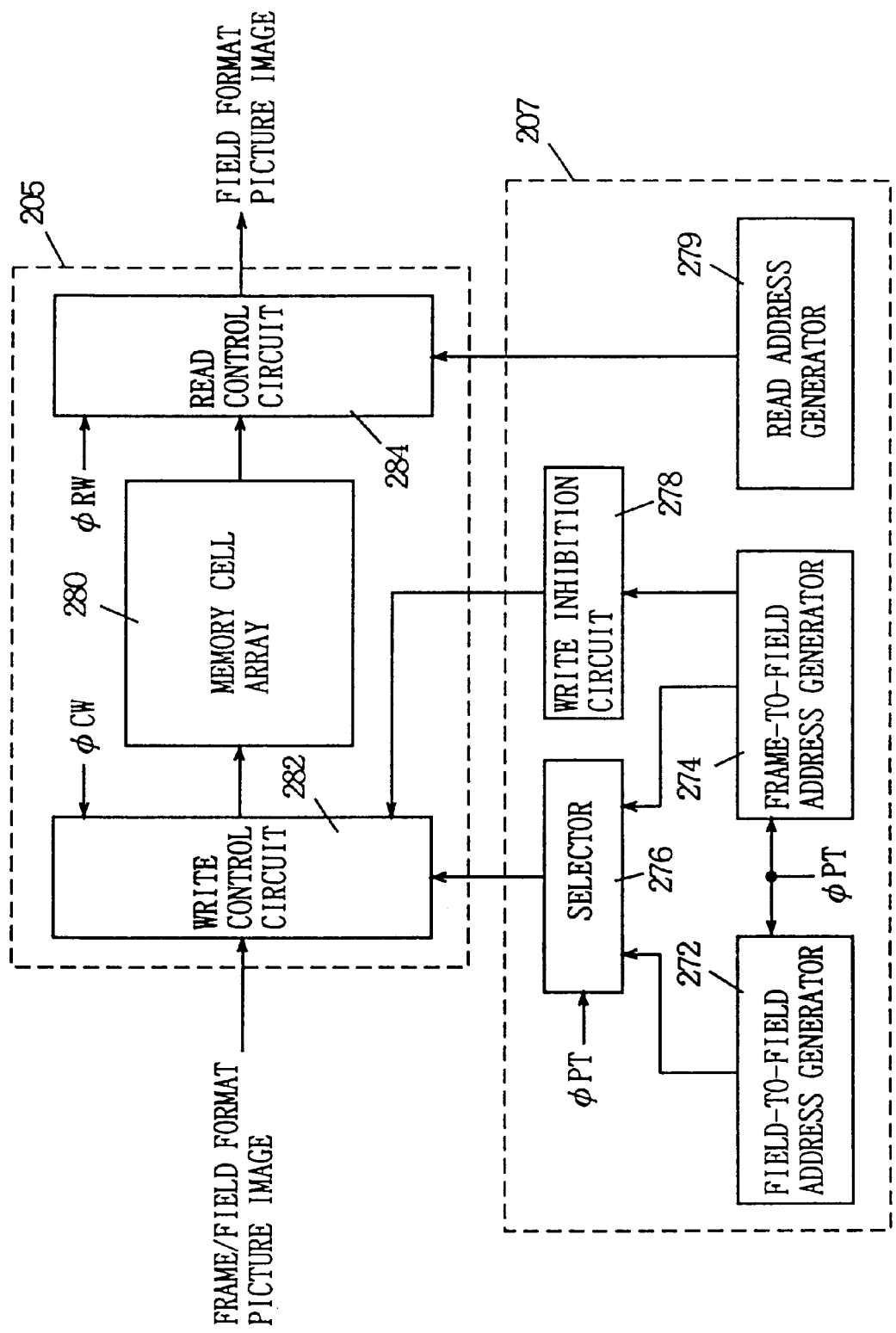

FIG. 125 illustrates a third structure of the input part of the motion vector detecting device according to the present invention. Referring to FIG. 125, a screen format conversion circuit 207 includes a field-to-field address generator 272 which generates a write address pointer when a field format picture image pixel data train is received, a frame-to-field address generator 274 which generates a write address pointer when a frame format picture image pixel data train is received, a selector 276 which selects one of the address pointers outputted from the address generators 272 and 274 in accordance with a screen format specifying signal φPT, a write inhibition circuit 277 which inhibits data writing in the search window buffer memory 205 in accordance with the value of the least significant bit of the address pointer generated from the frame-to-field address generator 274, and a read address generator 279 which generates a read address pointer in pixel data reading from the buffer memory 205. Only one of the field-to-field address generator 272 and the frame-to-field address generator 274 is activated in accordance with the screen format specifying signal φPT. Such a structure that one of the address generators 272 and 274 is activated in accordance with the screen format specifying signal φPT is similar to those in the first and second screen format conversion circuits.

The search window buffer memory 205 includes a memory cell array 280 having a plurality of memory cells (SRAM cells, for example) which are arranged in a matrix of rows and columns, a write control circuit 282 which selects memory cells in the memory cell array 280 in accordance with the write address pointer received through the selector 276 of the screen format conversion circuit 207 in data writing for writing input picture image pixel data in the selected memory cells, and a read control circuit 284 which selects corresponding memory cells from the memory cell array 280 in accordance with the address pointer received from the read address generator 279 in data reading for reading data stored in the memory cells. The write control circuit 282 and the read control circuit 284 operate in accordance with clock signals φCW and φRW respectively. The write control circuit 282 executes no data writing when the write inhibition circuit 278 indicates data write inhibition, even if pixel data are received from the exterior.

The field-to-field address generator 272 is identical in structure to the write address generator 220 shown in FIG. 115. It is assumed that the memory cell array 280 has memory cells which are arranged in 48 rows and 16 columns, in order to store data of the search window. When a field format picture image pixel data train is received, the field-to-field address generator 272 is activated so that the field format pixel data train is successively written in the memory cell array 280 under control by the write control circuit 282 similarly to the above description. When a frame format picture image pixel data train is received, on the other hand, the pixel data are written in accordance with the address pointers generated by the frame-to-field address generator 274. When pixel data are written in a single row in accordance with the address pointer generated by the frame-to-field address generator 274, pixel data of another field in the frame are to be written in the next row and the data writing is inhibited. Namely, pixel data of a single field (even or odd field: first or second field) of the frame format picture image are extracted in accordance with the address pointers generated by the frame-to-field address generator 274 so that data writing in the memory cell array 280 is performed by the write control circuit 282 with respect to only the single field, while writing of pixel data of another field is inhibited under control by the write inhibiting circuit 278. Thus, pixel data of a field format picture image are stored in the memory cell array 280 regardless of whether the input picture image is in a frame format or a field format.

The read address generator 279, which is similar in structure to the read address generator 235 shown in FIG. 118, generates the address pointers so that the memory cells are successively selected every column in the memory cell 280. The read control circuit 284 selects memory cells in the memory cell array 280 in accordance with the address pointers from the read address generator 279 along the read clock signal φRW, to read pixel data in the selected memory cells. Thus, the read control circuit 284 successively outputs a pixel data train of a field format picture image.

Figure 126:
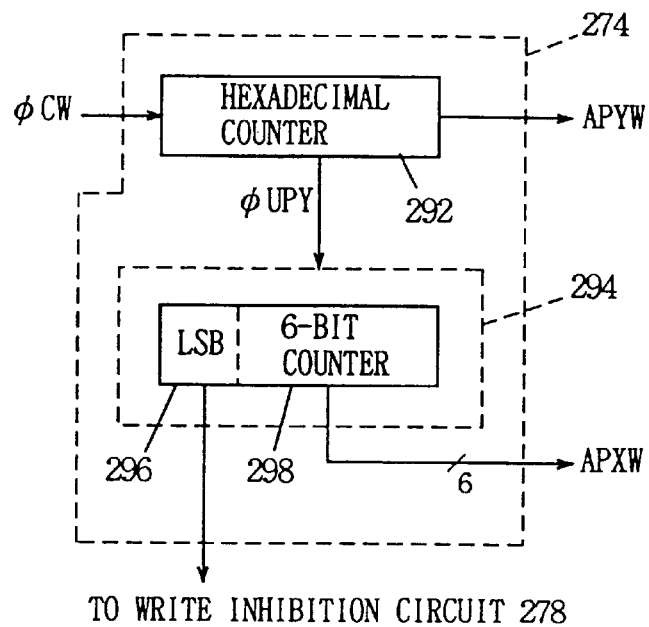

FIG. 126 illustrates the specific structure of the frame-to-field address generator 274 shown in FIG. 125. Referring to FIG. 126, the frame-to-field address generator 274 includes a hexadecimal counter 292 which counts the write clock signal φCW and generates the count value as a column address pointer APYW, and a 7-bit counter (95-ary counter) 29 which counts a count-up signal φUPY of the hexadecimal counter 292. The 7-bit counter 294 includes a 1-bit counter 296 generating only the least significant bit (LSB) and a 6-bit counter 298 outputting remaining upper 6-bit count value. The count value of the 1-bit counter 296 is supplied to a write inhibition circuit 278 as a write inhibition instructing signal. When the count value (LSB) of this 1-bit counter 296 is "1", the write inhibition circuit 278 inhibits data writing by the write control circuit 282 assuming that the write inhibition is designated. The count value of the 6-bit counter 298 is outputted as a row address pointer APXW. The operation of the frame-to-field address generator 274 shown in FIG. 126 is now described with reference to FIG. 127, which is an operation timing chart.

In an initial state, count values of both of the hexadecimal counter 292 and the 7-bit counter 294 are set at zero. The hexadecimal counter 292 counts the write clock signal φCW and generates the column address pointer APYW. When the count value of the hexadecimal counter 292 reaches 15, data writing is completed as to 16 pixels of a single row, i.e., the zeroth row. The written pixel data belong to a first field.

Then, the count value of the hexadecimal counter 292 is returned to zero. In response to the return of the count value of the hexadecimal counter 292 to the initial value, the count value of the 7-bit counter 294 is incremented by 1. At this time, the count value of the 1-bit counter 296 outputting the least significant bit LSB becomes 1, while that of the 6-bit counter 298 remains unchanged. Thus, the row address pointer APXW remains at zero. At this time, the write inhibition circuit 278 inhibits the write control circuit 282 from writing data since the count value (LSB) of the 1-bit counter 296 is 1. Thus, the writing of pixel data belonging to a second field is inhibited until the count value of the hexadecimal counter 292 reaches 15.

Then, the count value of the hexadecimal counter 292 is again returned to zero, whereby the count value of the 7-bit counter 294 is incremented by 1 in accordance with the count-up signal φUPY. Thus, the count value (LSB) of the 1-bit counter 296 becomes zero, while that of the 6-bit counter 298 becomes 1. Since the count value (LSB) of the 1-bit counter 296 is zero, the write inhibition circuit 278 cancels the write inhibition. Thus, the write control circuit 282 successively writes a pixel data train of a frame format picture image. The current pixel data belong to the first field, and are written in the first row.

Then, the count value of the hexadecimal counter 292 again reaches 15 to complete the writing of pixel data in the first row, whereby the count-up signal φUPY is generated. Thus, the count value of the 7-bit counter 294 is incremented by 1 and that of the 1-bit counter 296 becomes 1, while that of the 6-bit counter 298 remains at 1. In this case, therefore, the writing of pixel data is inhibited in accordance with the count value 1 of the 1-bit counter 296. This operation is thereafter repeated so that the pixel data of the second field is inhibited for being written in writing the pixel data train of the frame format picture image and only pixel data of the first field are written in the memory cell array 280.

Figure 128:
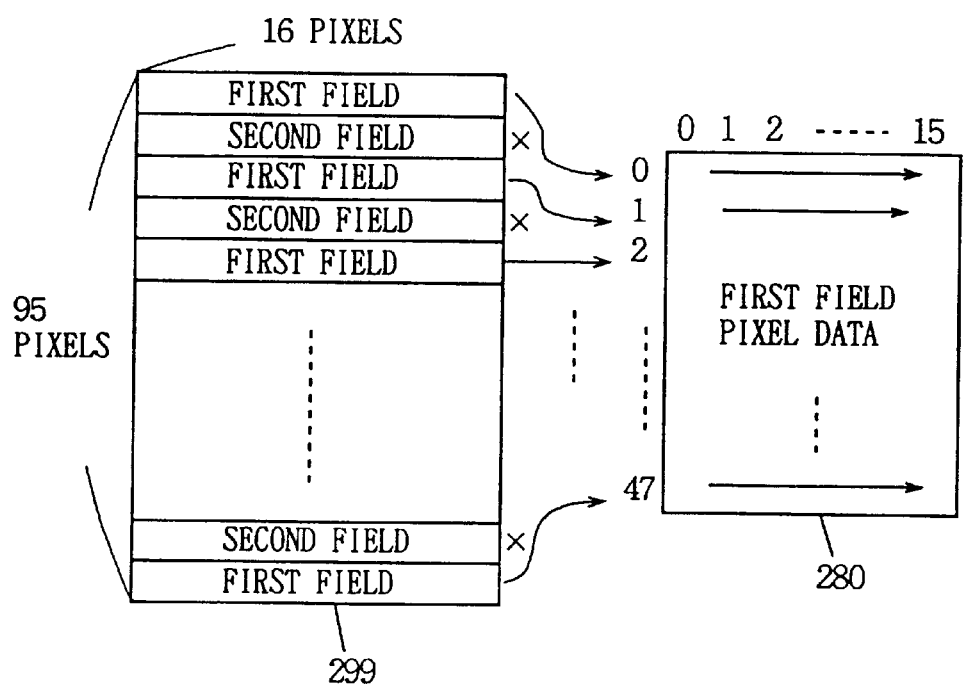

Namely, it is possible to select only required pixel data of the first field from a frame format picture image 299 to be written in the memory cell array 280 as shown in FIG. 128, so that the search window can be formed only by the first field pixel data and picture data of a field format picture image can be obtained from the pixel data train of the frame format picture image.

Data reading is identical to the aforementioned data reading operation (see FIG. 122B) for the field-to-field picture image.

As hereinabove described, it is possible to regularly detect motion vectors in units of fields regardless of the picture image format of input picture data, by extracting only picture data of a required field from a frame format picture image and storing the same in the memory cells.

[Structure of Data Buffer]

Figure 129:
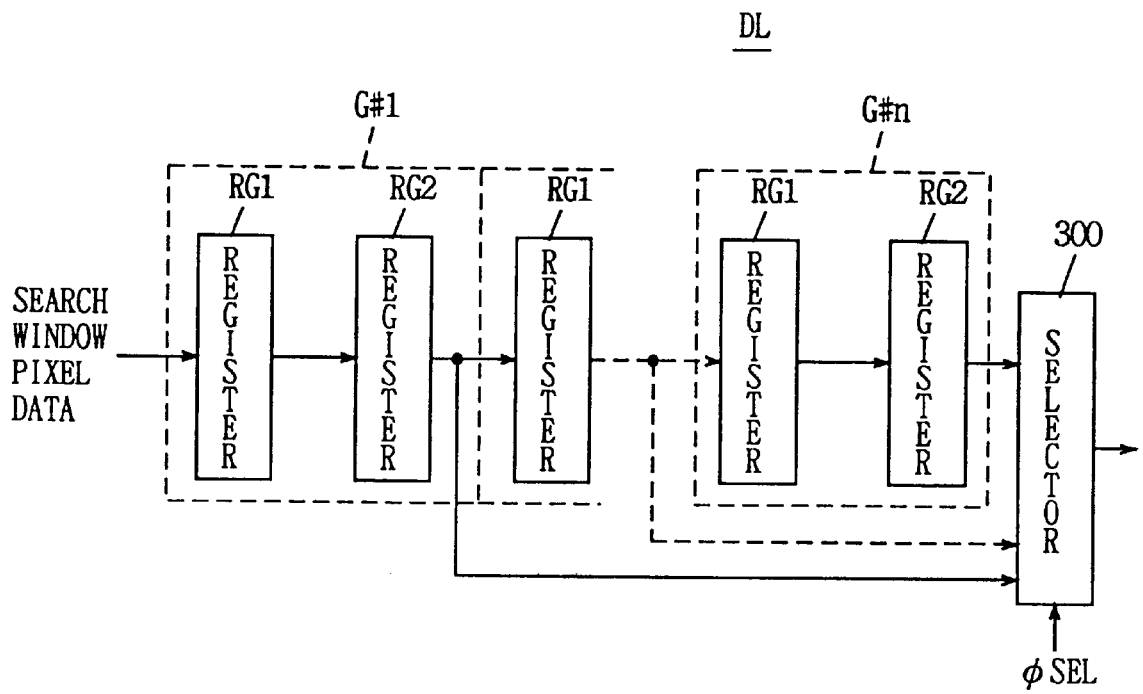

FIG. 129 illustrates the structure of each data buffer DL for storing side window block data included in the processor array. Referring to FIG. 129, the data buffer DL includes a plurality of cascade-connected registers having data transfer functions. The plurality of registers are divided into groups of pairs. FIG. 129 representatively shows two register groups G#1 and G#n. Each of the register groups G#1, . . . , G#n includes cascade-connected registers RG1 and RG2. These register groups G#1 to G#n have functions of unidirectionally transmitting the search window pixel data in response to a clock signal (not shown).

The data buffer DL further includes a selector 300 for selecting any of the outputs from the register groups G#1 to G#n in accordance with a selection signal φSEL, which is supplied from the exterior. It is possible to change the number of register stages of the data buffer DL. When the register group G#1 is selected, for example, the data buffer DL has two register stages and can store two pixels of the search window pixel data. When the register group G#n is selected, the data buffer DL can store search window pixel data by the stage number of registers included therein.

The data buffer DL stores the pixel data of the side window block (see FIG. 8). Therefore, it is possible to change the size of the side window block by changing the stage number of the registers included in the data buffer DL, thereby changing the size of the search window, i.e., the range of the search area. Thus, it is possible to accommodate changes of the search area in different specifications. The number of the registers included in each register group and that of the register groups can be arbitrarily selected.

[Modification 1 of Data Buffer]

Figure 130:
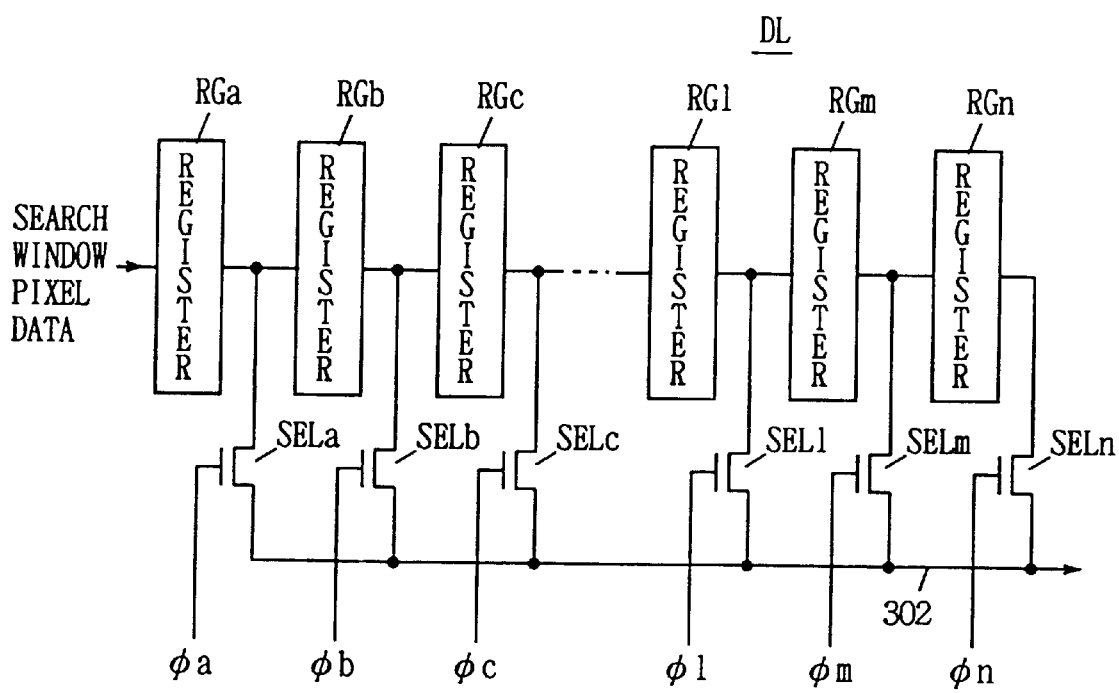

FIG. 130 illustrates a modification of the data buffer DL. Referring to FIG. 130, the data buffer DL includes a plurality of cascade-connected registers RGa to RGn. It is possible to transfer data through these registers RGa to RGn. The registers RGa to RGn are provided at output parts with selection gates SELa to SELn which conduct in response to activation signals φa to φn respectively. One of the selection signals φa to φn supplied from the exterior is activated. A selection gate SELi which is brought into a conducting state transmits the output of a corresponding register RGi to a data line 302. This data line 302 is connected to an input part of the lowermost element processor PEm of the same linear processor array in the element processor array.

In accordance with the structure shown in FIG. 130, it is possible to set the register stage number of the data buffer in units of the registers in accordance with the selection signals φa to φn, thereby more flexibly accommodating a specification change of the search area.

[Another Structure of Data Buffer]

FIG. 131 illustrates another specific structure of the data buffer DL. Referring to FIG. 131, the data buffer DL includes an input circuit 310 inputting search window pixel data, a register file 312 including a plurality of files for storing the search window pixel data received from the input circuit 310, a write address generation circuit 316 for generating a write address pointer in data writing in the register file 312, a read address generation circuit 314 for generating a read address pointer employed in data reading from the register file 312, an output circuit 318 for reading the content of a file designated by the read address generation circuit 314 from the register file 312, and an initial address setting circuit 319 for setting an initial address of the read address generation circuit 314. The register file 312 stores one pixel data in one file which is formed by SRAM cells, for example. The write address generation circuit 316 and the read address generation circuit 314 increment or decrement addresses one by one in accordance with a write clock signal φW and a read clock signal φR respectively. In this structure of the data buffer DL, data writing is executed after data reading is carried out, in order to prevent data to be read from being replaced by newly supplied data when read and write addresses are set to designate the same address. The operation of the data buffer DL shown in FIG. 131 is described with reference to FIG. 132.

FIG. 132 shows such an exemplary structure that the register file 312 has eight files so that addresses 0 to 7 are allotted to the eight files respectively. Referring to FIG. 132, further, the initial address setting circuit 319 sets the address 4 as the initial address of the read address generator 314.

The write address generation circuit 316 successively designates write addresses from the address 0 in accordance with the write clock signal φW. In accordance with the write address pointer from the write address generation circuit 316, the input circuit 310 writes received search window pixel data in a corresponding file of the register file 312. Thus, search window pixel data SY1, SY2, . . . as inputted are successively written in the addresses 0, 1, . . . in the register file 312. The read address generation circuit 314 successively designates the addresses from the initial address 4 set by the initial address setting circuit 319, in accordance with the read clock signal φR. When the read address pointer generated by the read address generation circuit 314 becomes zero, the pixel data SY1 stored in the address 0 of the register file 312 is read by the output circuit 318. Thereafter the pixel data SY2, SY3, . . . stored in the register file 312 are successively read in accordance with the read clock signal φR. In this structure, therefore, input search window pixel data are outputted in a delay of five clock cycles. Thus, it is possible to change the delay time of the data buffer DL by changing the initial read address by the initial address set circuit 319, thereby changing the number of effective search window pixel data stored in this data buffer DL as well as the vertical size of the search area (search window). Such change of the vertical size of the search area by change of the delay time of the data buffer DL is now described more specifically.

Figure 133A:
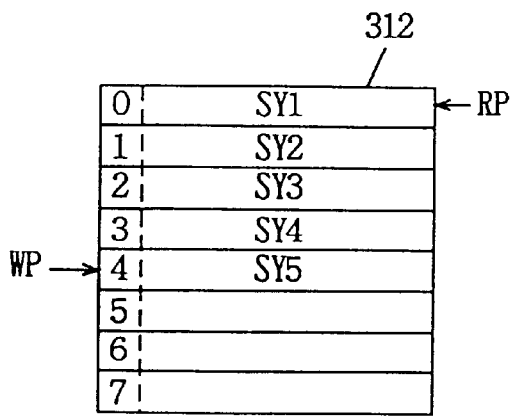

Consider that a read address pointer RP indicates the address 0 when a write address pointer WP indicates the address 4, as shown in FIG. 133A. In this state, the register file 312 stores the search window pixel data SY1 to SY5.

Figure 133B:
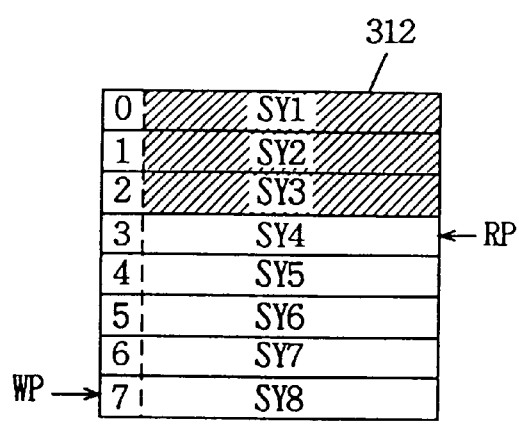

When the write address pointer WP indicates 7, the read address RP indicates the address 3 as shown in FIG. 133B. In this state, the pixel data SY1 to SY3 stored in the files of the addresses 0, 1 and 2 are already read out. Before the pixel data SY4 is read, therefore, the register file 312 stores the pixel data SY4 to SY8 as effective pixel data (pixel data to be thereafter read).

Figure 133C:
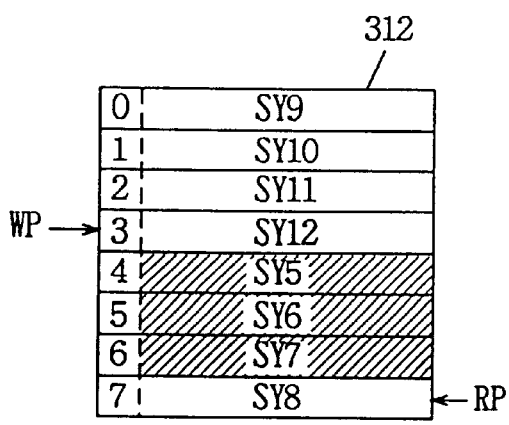

When the clock cycle further progresses and the write address pointer WP indicates the address 3, the read address pointer RP indicates the address 7 as shown in FIG. 133C. In this state, the pixel data SY5 to SY7 stored in the addresses 4 to 6 are already read and consumed. Also in this case, the pixel data SY8 to SY12 stored in the register file 312 are effective pixel data.

Figure 133D:
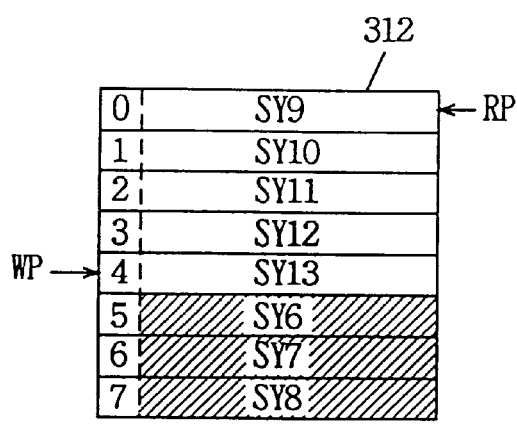

In a next cycle, the write address pointer WP designates the address 4 and the read address pointer RP designates the address 0 as shown in FIG. 133D. In this state, the pixel data SY9 to SY13 are effective pixel data.

Figure 133E:
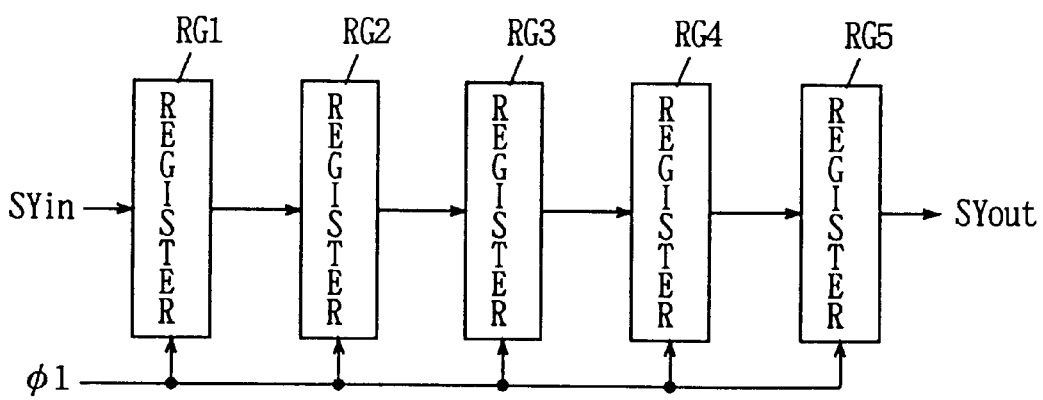

Namely, the input search window pixel data are stored in all files (eight files in the shown example) of the register file 312, while the number of the effective search window pixel data (five in the shown example) is smaller than that of all register files. The number of the effective search window pixel data stored in the register file 312 is equal to a value obtained by adding 1 to the initial address specified by the initial address set circuit 319. Therefore, this register file 312 has a structure which is equivalent to that of a shift register formed by cascade-connecting five stages of registers RG1 to RG5, as shown in FIG. 133E. The data buffer DL stores the pixel data of the side window block shown in FIG. 8. The stage number of the registers shown in FIG. 133E is equal to the number of vertical pixels of the side window block. Therefore, it is possible to change the vertical length of the side window block through the structure shown in FIG. 131, thereby adjusting the vertical length of the search window.

Due to the aforementioned structure, it is possible to flexibly accommodate an arbitrary search area size.

[Hierarchized Motion Vector Detection System]

FIG. 134 shows structures of a search area and a template block employed for a hierarchized motion vector detection system according to the present invention. Referring to FIG. 134, a template block 350 is formed by 16 pixels (rows) by 16 pixels (columns), similarly to that employed in the aforementioned full search system motion vector detecting device. The motion vector search range is for ±64 pixels in each of horizontal and vertical directions. Therefore, a search area 352 is formed by (64+16+64)×(64+16+64)= 144×144 pixels.

In the hierarchized motion vector detection system, motion vectors are searched in two stages. In the first stage, evaluation points (points, which correspond to displacement vectors, for obtaining evaluation function values: respective points of (−64, −64) to (64, 64)) in the search area 352 are culled and block matching is carried out to calculate evaluation function values. Optimum evaluation function values exhibiting the best correlation and corresponding displacement vectors are obtained from the evaluation function values as calculated. Such optimum evaluation function values and corresponding displacement vectors are detected as to a plurality of predictive modes in a parallel manner. The block matching of the first stage is now described more specifically.

As shown in FIG. 135A, an evaluation function value of a search window 354$a$ of an evaluation point (−64, −64) with respect to the template block 350 is first calculated. As to calculation of the evaluation function value, absolute differential values between corresponding pixels are calculated and the absolute differential values as obtained are summed up, similarly to the aforementioned calculating operation in the full search system motion vector detecting device. The evaluation function values may be formed by differential square sums or the like, in place of the sums of the absolute differential values.

Then, seven evaluation points (−64, −63) to (−64, 57) are skipped (culled) so that an evaluation function value of a search window block 354$b$ corresponding to an evaluation point (−64, −56) is calculated as shown in FIG. 135B. The evaluation function value calculation is repeated while skipping seven evaluation points so that evaluation function values are calculated again from an upper side of the search area 352 when evaluation function value calculation on a lower evaluation point (64, 64) is completed. In changing of evaluation point columns, the evaluation points are horizontally skipped by seven pixels as shown in FIG. 135C, so that the evaluation function value is subsequently calculated for an evaluation point (−56, −64). Thereafter evaluation points are skipped every seven pixels in the vertical direction to calculate evaluation function values, and evaluation points are horizontally skipped by seven pixels upon reaching a lower evaluation point of the search area 352 for successively calculating evaluation function values from the upper part of the search area 352.

The series of operations shown in FIGS. 135A to 135C is so repeated that evaluation function values are calculated for all representative evaluation points E of the search area 352, which are evaluation points for calculating even evaluation point values arranged every eight evaluation points along each of horizontal and vertical directions, as shown in FIG. 136. An evaluation function value exhibiting the highest correlation is detected from those of these representative evaluation points, to decide the corresponding evaluation point Est. The optimum representative evaluation point Est is obtained for each of a plurality of predictive modes. The aforementioned series of operations forms a coarse search operation sequence of a first stage, and then a search operation of a second stage is carried out.

In the search operation of the second stage, a peripheral region (full search area) 356 of the optimum representative evaluation point Est is regarded as a search area as shown in FIG. 137, to search all evaluation points in the peripheral region 356. The peripheral region 356 includes at least skipped evaluation points. In the structure shown in FIG. 137, the peripheral region 356 is assumed to be formed by ±16 evaluation points about the representative evaluation point Est in each of the horizontal and vertical directions. Therefore, the peripheral region 356 includes 32 by 32 evaluation points. Evaluation function values are calculated as to all 32×32=1024 evaluation points and the optimum evaluation point is obtained in accordance with the calculated evaluation function values, so that a displacement vector corresponding to the optimum evaluation point is decided as a motion vector. Such full search operations are executed in parallel with respect to a plurality of predictive modes.

The number of the evaluation points in the first stage is (8+1+8)×(8+1+8)=17×17=289 while that in the second stage is 32×32 1024, and the total number is 1313. Therefore, it is possible to detect the motion vectors in the search area of a picture image area which is wider as compared with that in the full search system. Further, it is also possible to effectively decide the motion vectors without increasing the device scale due to the parallel decision for the plurality of predictive modes. The specific structure is now described.

[First Embodiment of Hierarchical Search System Motion Vector Detecting Device]

FIG. 138 schematically shows the structure of a first embodiment of a hierarchical search system motion vector detecting device. Referring to FIG. 138, the hierarchical search system motion vector detecting device includes a rough search operation part 402 which simultaneously calculates evaluation function values for representative evaluation points in a search area in accordance with a field predictive mode, an upper sub template block predictive mode and a lower sub template block predictive mode for supplying evaluation function values ef, eu and el as calculated to a comparison selection part 404 with corresponding displacement vectors vf, vu and vl indicating evaluation point positions. The rough search operation part 402 executes the first stage search operation as described above with reference to FIGS. 135A to 135C and 136, as described later more specifically. The motion vector detecting device detects motion vectors in units of fields. The evaluation function values and corresponding displacement vectors calculated in accordance with the field predictive mode, the upper sub template block predictive mode and the lower sub template block predictive mode are denoted by ef and vf, eu and vu, and el and vl respectively.

The comparison selection part 404 receives the evaluation function values ef, eu and el and the displacement vectors vf, vu and vl from the rough search operation part 402 to decide optimum representative evaluation points for the field predictive mode, the upper sub template block predictive mode and the lower sub template block predictive mode respectively and outputs displacement vectors vfst, vust and vlst indicating optimum representative evaluation points of the respective predictive modes. The optimum displacement vectors vfst, vust and vlst are those for the field predictive mode, the upper sub template block predictive mode and the lower sub template block predictive mode respectively.

The motion vector detecting device further includes a dense search operation part 406 which extracts optimum representative evaluation point peripheral regions for the respective optimum displacement vectors vfst, vust and vlst received from the comparison selection part 404, to perform the full searching in the extracted peripheral regions. The dense search operation part 406 includes first to third full search operation parts 410, 412 and 414 which are provided for the optimum displacement vectors vfst, vust and vlst respectively. The first full search operation part 410 extracts the optimum representative evaluation point peripheral region in accordance with the displacement vector vfst and calculates optimum evaluation points in accordance with the field predictive mode, the upper sub template block predictive mode and the lower sub template block predictive mode respectively, to supply displacement vectors Vf1, Vu1 and Vl1 indicating the optimum evaluation points and corresponding evaluation function values Ef1, Eu1 and El1 to a comparison selection part 408.

The second full search operation part 412 extracts an optimum representative evaluation peripheral region in accordance with the optimum displacement vector vust obtained in accordance with the upper sub template block predictive mode and obtains evaluation function values for the optimum representative evaluation point peripheral region in accordance with the three predictive modes, to supply the same to the comparison selection part 408 with corresponding displacement vectors.

The third full search operation part 414 extracts an optimum representative evaluation point peripheral region in accordance with the optimum displacement vector vlst decided in accordance with the lower sub template block predictive mode and calculates evaluation function values for the optimum representative evaluation point peripheral region in the full search system, to supply evaluation function values Ef3, Eu3 and El3 for the respective predictive modes to the comparison selection part 408 with corresponding displacement vectors Vf3, Vu3 and Vl3.

The comparison selection part 408 obtains an evaluation function value having the highest degree of correlation (minimum evaluation value) from the nine evaluation function values Ef1, Eu1, El1, Ef2, Eu2, El2, Ef3, Eu3 and El3 and outputs the corresponding predictive mode indicating data, the displacement vector MV and the evaluation function value EV.

FIG. 139 schematically illustrates the structures of the rough search operation part 402 and the comparison selection part 404 shown in FIG. 138. Referring to FIG. 139, the rough search operation part 402 includes a memory cell array 412 storing pixel data of the search window block size from reference picture data stored in an external plane memory, a write address generator 414 for generating a write address pointer in writing pixel data in the memory cell array 412, a read address generator 416 for generating a read address pointer in reading pixel data from the memory cell array 412, an output circuit 418 for latching and transferring a single row of data read from the memory cell array 412, an element processor array 419 including element processors which are arranged in a matrix of rows and columns in correspondence to pixels of a template block, and a summing part 420 for summing up absolute differential values outputted from the element processors of the element processor array 419 in accordance with the respective predictive modes and outputting evaluation function values $\Sigma|a-b|$, $\Sigma u|a-b|$ and $\Sigma l|a-b|$ corresponding to the respective predictive modes. A template block data memory 425 transfers template block pixel data to template block pixel data storage portions of the element processors of the element processor array 419.

The comparison selection part 404 includes a comparison part 422 which receives the evaluation function values from the summing part 420 in parallel with each other and outputs displacement vectors vfst, vust and vlst indicating optimum evaluation points for the respective predictive modes. The comparison selection part 404 is similar in structure to the comparison parts described above with reference to FIGS. 30 and 27, and hence no further description is provided.

FIG. 140 shows the specific structure of the element processor array 419. Referring to FIG. 140, the element processor array 419 includes element processors PE which are arranged in a matrix of rows and columns. 16 element processors PE0 to PE15 which are horizontally arranged in FIG. 140 form a linear processor array LA, so that 16 such linear processor arrays LA0 to LA15 are arranged. Each of the element processors PE (PE0 to PE15) can transfer search window block pixel data and template block pixel data to an adjacent element processor (right side in FIG. 140) in each of the linear processor arrays LA (LA0 to LA15).

Figure 127:
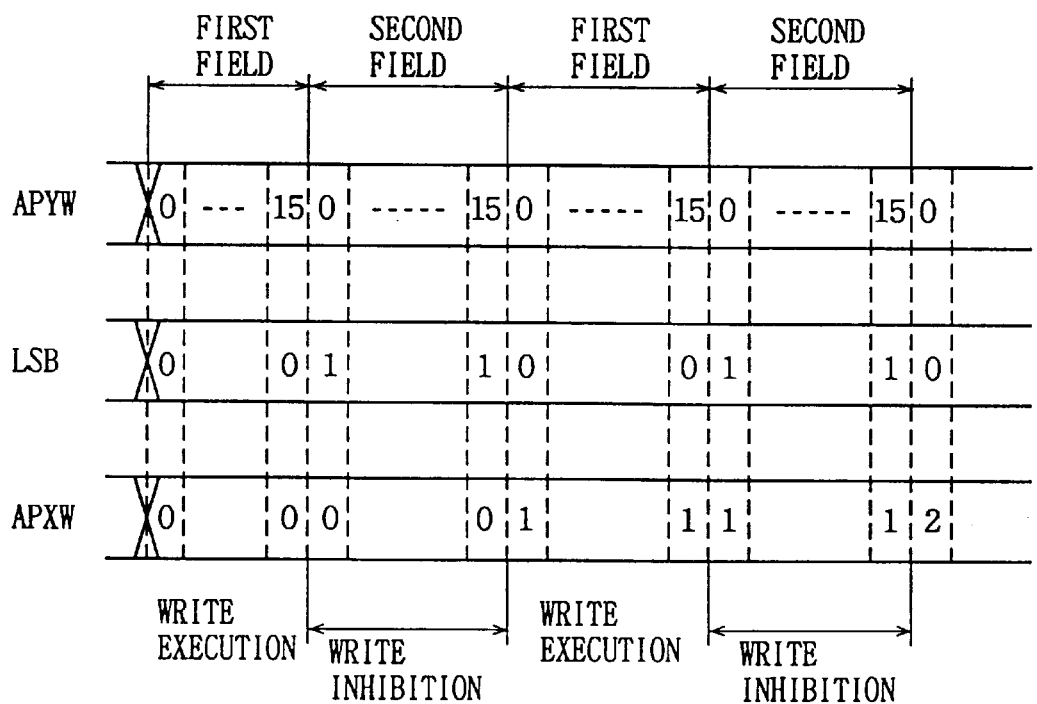

The memory cell array 412 includes memory cells which are arranged in 16 rows and 16 columns. FIG. 140 shows 16 word lines WL0 to WL15 which are arranged in correspondence to the memory cells of 16 rows. In data reading from the memory cell array 412, data of memory cells of one row are simultaneously selected and supplied to the output circuit 418. In writing of search window pixel data from the external plane memory, one word line is selected as shown in FIG. 114 or 127, so that the pixel data are successively written in the selected word line since the pixel data are received from the exterior of the device. This memory cell array 412 is preferably formed by an array of SRAM cells, in order to enable high-speed access.

FIG. 141 illustrates the structure of each element processor PE15 included in the element processor array 419. Referring to FIG. 141, the element processor PE15 includes a data register 431 for storing and transferring the search window pixel data from the output circuit 418, a data register 432 for storing the template block pixel data from the template block data memory 425, and an absolute differential value circuit 433 for obtaining absolute differential values of the data stored in the data registers 431 and 432. The element processor PE15 shown in FIG. 141 is identical in structure to that shown in FIG. 20, except that the pixel data are received from the output circuit 418, in place of the search window pixel data simply received from the data buffer. Since no data buffer is provided, the search window pixel data are transferred only in the linear processor arrays LA (LA0 to LA15). The data transfer operation from the memory cell array 419 to the element processors shown in FIG. 140 is now described with reference to FIGS. 142A to 142C.

Consider that the element processor array 419 stores a search window block 354a of a displacement vector (−64, −64) as shown in FIG. 142A. At this time, the write address generator 414 shown in FIG. 139 successively changes row addresses from 0 to 7, to store 16 pixel data of −48th to −41st rows in the search area 352 in the respective row addresses 0 to 7. In this state, the memory cell array 412 stores pixel data of a displacement vector (−56, −64).

When evaluation function values are completely calculated for the displacement vector (−64, −64), the read address generator 416 generates the read address pointer RP successively for 0 to 7. Pixel data of the −48th row are stored in the row address 0. Pixel data of one row are read and transmitted to the element processor array 419 through the output circuit 418, so that the pixel data of the −48th to −41st rows are successively stored in the element processor array 419. At this time, the element processor array 419 transfers the search window block pixel data between the adjacent element processors. When the pixel data of the −41st row of the row address 7 are stored in the element processor array 419, all pixel data of the displacement vector (−56, −64) are stored in the element processor array 419, since the pixel data are shifted row by row in the element processor array 419 simultaneously with the storage of the pixel data of one row in the element processor array 419.

The write address pointer WP from the write address generator 414 changes the row address from 8 to 15 in parallel with the pixel data reading from the memory cell array 412, so that pixel data of −40th to −33rd pixel data are stored. When evaluation function values as to the displacement vector (−56, −64) with respect to the search window block 354b are completely calculated, pixel data of row addresses 8 to 15 are successively read from the memory cell array 412 in units of rows in accordance with the read address pointer RP, to be supplied to the element processor array 419. Thus, the element processor array 419 stores pixel data corresponding to the displacement vector (−48, −64). In parallel with this data read operation, pixel data of −32nd to −25th rows are stored in positions of the row addresses 0 to 7 in accordance with the write address pointer WP. The above operation is thereafter repeated to execute calculation of evaluation function values for the representative evaluation points in the search area 352.

It is possible to store search window block data for next representative evaluation points in the element processor array 419 by simply reading the pixel data of half the search window block by executing pixel data reading in units of rows and shifting the data in the element processor array 419.

FIG. 143 shows a structure for transferring peripheral region pixel data with respect to the dense search operation part 406 in accordance with the displacement vectors vfst, vust and vlst corresponding to optimum representative evaluation points from the comparison selection part 404. Referring to FIG. 143, data transfer control circuitry includes an input/output control circuit 454 which activates a read control circuit 452 and provides data write timings and addresses for first, second and third full search operation part memories 455a, 455b and 455c when completion of an optimum representative evaluation point detecting operation in the rough search operation part 402 is detected (this completion can be readily identified by counting a clock signal defining a rough search operation cycle since the number of the representative evaluation points in the search area is previously determined).

In an activated state, the read control circuit 452 successively decodes the displacement vectors vfst, vust and vlst corresponding to optimum representative evaluation points, generates addresses including displacement vector peripheral regions, and successively reads peripheral region pixel data for the displacement vectors vfst, vust and vlst respectively from a reference picture image memory 450. The peripheral region pixel data read from the reference picture image memory 450 are successively stored in the memories 455a, 455b and 455c under control by the input/output control circuit 454. In parallel with the operation for storing the pixel data in the memories 455a to 455c, the memories 455a to 455c are subject to reading of the data stored therein to transfer the peripheral region pixel data to the corresponding first, second and third full search operation parts 410, 412 and 414 respectively. The memories 455a to 455c store all peripheral region pixel data which are 32 by 32 evaluation pixel data, and these memories are not required of large storage capacities. The pixel data stored in the full search operation part memories 455a to 455c are read in synchronization with a search operation in the dense search operation part 406, to be transmitted to input parts of the corresponding full search operation parts 410, 412 and 414 respectively. The first, second and third full search operation parts 410, 412 and 414 are identical in structure to that of the motion vector detecting device described above with reference to FIG. 28, except the search area size. The full search operation parts 410, 412 and 414 carry out similar operations, to calculate evaluation function values in accordance with a plurality of predictive modes (the field predictive mode, the upper sub template predictive mode and the lower sub template predictive mode). Thus, displacement vectors corresponding to the plurality of predictive modes are outputted.

The comparison selection part 408 obtains the minimum value of evaluation function values corresponding to nine types of optimum displacement vectors received from the dense search operation part 406, and outputs the minimum evaluation function value and a displacement vector corresponding thereto as a motion vector MV and an evaluation function value EV. This structure, which is simply adapted to obtain the minimum value of nine inputs, can be readily implemented.

[Second Embodiment of Hierarchical Search System Motion Vector Detecting Device]

FIG. 144 shows the structure of a second embodiment of the hierarchical search system motion vector detecting device. The motion vector detecting device shown in FIG. 144 is different in structure from that shown in FIG. 138 in a point that a dense search operation part 406 outputs only evaluation function values and optimum displacement vectors for three predictive modes, i.e., only three types of evaluation function values and three types of optimum displacement vectors.

The dense search operation part 406 includes first, second and third full search operation parts 460, 462 and 464 which are provided in parallel with each other. The first full search operation part 460 performs block matching on all evaluation points which are included in a peripheral region having a displacement vector vfst corresponding to an optimum representative evaluation point decided in accordance with a field predictive mode received from a comparison selection part 404 as a central evaluation point, and obtains a displacement vector Vf corresponding to an optimum evaluation point and an evaluation function value Ef thereof.

The second full search operation part 462 receives a displacement vector vust corresponding to an optimum representative evaluation point decided in accordance with an upper sub template block predictive mode received from the comparative selection part 404, obtains an optimum evaluation point with respect to all evaluation points included in a peripheral region of the optimum representative evaluation point in accordance with the upper sub template block predictive mode, and outputs a displacement vector Vu corresponding to the obtained optimum evaluation point and an evaluation function value Eu.

The third full search operation part 464 obtains an optimum evaluation point with respect to all evaluation points included in a peripheral region of an evaluation point indicated by a displacement vector vlst corresponding to an optimum representative evaluation point decided in accordance with a lower sub template block predictive mode received from the comparison selection part 404 in accordance with the lower sub template block predictive mode, and outputs a corresponding displacement vector Vs and an evaluation function value Es.

A comparison selection part 408 receives the optimum displacement vectors Vf, Vu and Vs and the evaluation function values Ef, Eu and Es which are outputted from the dense search operation part 406, obtains the (smallest) evaluation function value exhibiting the highest similarity from the three evaluation function values Ef, Eu and Es, and outputs the minimum evaluation function value EV and the corresponding displacement vector as motion vectors MV.

FIGS. 145A and 145B are used to explain the structure of the first full search operation part 460. As shown in FIG. 145A, a template block 472 has a size of 16 by 16 pixels and a search window block 470 also has a size of 16 by 16 pixels when the evaluation function value is decided in accordance with the field predictive mode. The sum of absolute differential values of corresponding pixels of the search window block 470 and the template block 472 is obtained.

As shown in FIG. 145B, a search range is in a size of 32 by 32 pixels (±8 pixels in each of the horizontal and vertical directions). A search window has a size of 32 by 16 pixels. The first full search operation part 460 includes a processor array which is similar in structure to that shown in FIG. 4. Element processors are arranged in 16 rows and 16 columns, while data buffer groups are so arranged as to store rows pixel data of 16 rows and 16 columns. Search window pixel data in a search area 474 are successively shifted for calculation of the evaluation function values.

FIG. 146 schematically illustrates the second full search operation part 462. In the second full search operation part 462, a template block has a size of 8 pixels (rows) by 16 pixels (columns), since only pixel data included in an upper half of a template block of 16 by 16 pixels are employed. In this case, a search window block also has a size of 8 pixels (rows) by 16 pixels (columns). When a search range is in a size of 32 by 32 pixels, pixel data of lower 8 rows are not utilized in a region of 32 by 32 pixels in an upper sub template block predictive mode, since evaluation function values are calculated in units of blocks of 16 by 16 pixels. When a search window block 477 reaches the lowermost portion of a search window 476, pixel data of a remaining region 478 in the search range of 32 by 32 pixels are not utilized. Therefore, a search area 479 in the upper sub template block predictive mode has a size of 24 pixel rows by 32 pixel columns. The second full search operation part 462 is similar in structure to that shown in FIG. 4, while element processors are arranged in 8 rows and 16 columns, and data buffer groups are so arranged as to store pixel data of 16 rows and 16 columns. The second full search operation part 462 calculates the evaluation function values and detects the optimum displacement vector by successively shifting the pixel data in the search area 479.

FIG. 147 is a diagram for explaining the structure of the third full search operation part 464. In the lower sub template block predictive mode, pixel data included in a lower half of a template block of 16 by 16 pixels are utilized. Therefore, a search window block 482 is in a size of 8 pixel rows by 16 pixel columns. Among pixel data of a peripheral region of 32 pixel rows by 32 pixel columns, those of upper 8 rows are not utilized. When evaluation function values for the positions of blocks 482 and 483 are calculated in FIG. 147, for example, pixel data of the block 483 are not utilized but only pixel data included in the block 482 are utilized. Therefore, a search area 484 in the lower sub template block predictive mode is formed by pixel data of lower 24 rows by 32 pixels among those of 32 pixel rows by 32 pixel columns. Therefore, the third full search operation part 464, which is similar in structure to that shown in FIG. 4, includes element processors which are arranged in 8 rows and 16 columns, and data buffer groups for storing pixel data arranged in 16 rows and 16 columns. The pixel data in the search area 484 are successively shifted pixel by pixel, and evaluation function values are calculated.

In the structure according to this second embodiment, the dense search operation part 406 includes three operation parts. These three operation parts calculate optimum displacement vectors in accordance with different predictive modes respectively, whereby the device scale can be reduced, while the optimum displacement vectors are detected in parallel with each other in accordance with a plurality of predictive modes so that the motion vectors are decided in accordance with the detected optimum displacement vectors, whereby the optimum motion vectors can be detected at a high speed, and an optimum predictive picture image can be obtained.

The pixel data of the search areas can be transmitted to the full search operation parts 460, 462 and 464 through structures similar to that shown in FIG. 143.

[Third Embodiment of Hierarchical Search System Motion Vector Detecting Device]

FIG. 148 illustrates a third embodiment of the hierarchical search system motion vector detecting device. Referring to FIG. 148, a comparison selection part 492 receives evaluation function values ef, eu and el and corresponding displacement vectors vf, vu and vl supplied from rough search operation part 402 to obtain an optimum representative evaluation point and detect an optimum predictive mode, and outputs a displacement vector vst and an evaluation function value est corresponding to the optimum representative evaluation point corresponding to the detected optimum predictive mode.

A dense search operation part 406 includes a single full search operation part 494. The full search operation part 494 decides optimum displacement vectors Vf, Vu and Vl and corresponding evaluation function values Ef, Eu and El for all pixel data (or evaluation points) included in a peripheral region of the displacement vector vst corresponding to the optimum representative evaluation point vst received from the comparison selection part 492 in accordance with a field predictive mode, an upper sub template block predictive mode and a lower sub template block predictive mode respectively. The full search operation part 494 can be formed in the structure of the motion vector detecting device shown in FIG. 1.

A comparison selection part 408 decides the optimum predictive mode from the evaluation function values Ef, Eu and El received from the full search operation part 494, and outputs a displacement vector and an evaluation function value corresponding to the optimum predictive mode as a motion vector MV and an evaluation function value EV respectively.

FIG. 149 illustrates an exemplary structure of the comparison selection part 492 shown in FIG. 148. Referring to FIG. 149, the comparative selection part 492 includes a first comparison part 502 which receives the evaluation function value ef calculated in accordance with the field predictive mode and the corresponding displacement vector vf and outputs a displacement vector vfst and an evaluation function value efst corresponding to the optimum representative evaluation point, a second comparison part 504 which receives the evaluation function value eu calculated in accordance with the upper sub template block predictive mode and the corresponding displacement vector vu and outputs an evaluation function value eust corresponding to the optimum representative evaluation point and a corresponding displacement vector vust, and a third comparison part 506 which receives the evaluation function value el calculated in accordance with the lower sub template block predictive mode and the corresponding displacement vector vl and outputs a displacement vector vlst corresponding to the optimum representative evaluation point and a corresponding evaluation function value elst. The first, second and third comparison parts 502, 504 and 506 are similar in structure to that shown in FIG. 27, and the minimum evaluation function value is decided as the one corresponding to the optimum representative evaluation point.

The comparison selection part 492 further includes an adder circuit 508 which adds up the optimum evaluation function values eust and elst outputted from the second and third comparison parts 504 and 506, a comparator 510 which compares the output of the adder circuit 508 with the optimum evaluation function value efst from the first comparison part 502, a gate circuit 514 which transmits the optimum evaluation function value efst and the displacement vector vfst from the first comparison part 502 when the output of the comparator 510 indicates that the optimum evaluation function value efst is smaller than the output of the adder circuit 508, a comparator 512 which is activated when the output of the comparator 510 indicates that the output of the adder circuit 508 is larger to compare the evaluation function values eust and elst from the second and third comparators 504 and 506 with each other, and a selector 516 which passes either the evaluation function value eust and the displacement vector vust from the second comparison part 504 or the evaluation function value elst and the displacement vector vlst from the third comparison part 506 in accordance with the output of the comparator 512.

The comparison selection part 492 shown in FIG. 149 performs the following judgement:

if efst<eust+elst
   est=efst, vst=vfst
else
   if eust<elst
     est=eust, vst=vust
   else est=elst, vst=vlst The comparison selection part 408 shown in FIG. 148 is also similar in structure to the comparison selection part 492 shown in FIG. 149. Namely, the comparison selection part 408 shown in FIG. 148 has such a structure that the comparison parts 502, 504 and 506 at the input stage are removed from the structure shown in FIG. 149.

The motion vector detecting device according to the third embodiment employs one full search operation part in the dense search operation part, whereby the device scale can be reduced.

[Fourth Embodiment of Hierarchical Search System Motion Vector Detecting Device]

FIG. 150 illustrates the structure of a fourth embodiment of the hierarchical search system motion vector detecting device. In the motion vector detecting device shown in FIG. 150, a comparison selection part 522 receives evaluation function values ef, eu and el and corresponding displacement vectors vf, vu and vl from rough search operation part 402 and outputs a displacement vector vst corresponding to an optimum representative evaluation point and an optimum predictive mode indicating data pst indicating a predictive mode providing the optimum representative evaluation point.

A dense search operation part 404 includes one full search operation part 520. This full search operation part 520 performs a full search operation on a peripheral region, which is regarded as a search area, around the displacement vector vst corresponding to the optimum representative evaluation point received from the comparison selection part 522 to detect a motion vector. In this case, the full search operation part 520 executes block matching only in accordance with a predictive mode which is specified by the optimum predictive mode command data pst received from the comparison selection part 522. The comparison selection part 522 can be formed through the structure of the comparison selection part 492 shown in FIG. 149. Namely, structures for outputting identification bits as predictive mode command data may be added to the first, second and third comparison parts 502, 504 and 506 shown in FIG. 149 respectively. The predictive mode identification bits are supplied to the gate circuit 514 and the selector 516 of FIG. 149 to be selected and outputted with corresponding evaluation function values and displacement vectors. Thus, it is possible to readily form the optimum predictive mode command data.

In the full search operation part 520, the predictive mode is decided in accordance with the optimum predictive mode specifying data pst. The full search operation part 520 may be formed in the structure of the motion vector detecting device shown in FIG. 1. Namely, a structure of selecting one displacement vector and one evaluation function value from the vectors and values decided in accordance with three predictive modes along the optimum predictive mode command data pst may be utilized. Alternatively, the full search operation part 520 may be formed in the structure shown in FIG. 138. When the structure of the dense search operation part shown in FIG. 138 is employed, one of the first to third full search operation parts is brought into an operating state in accordance with the optimum predictive mode command data pst. The full search operation part 520 outputs predictive mode command data Ps. In this case, the optimum predictive mode command data pst is utilized to generate the predictive mode command data Ps.

Each of the hierarchical search system motion vector detecting devices according to the first to third embodiments thereof is not illustrated as outputting the predictive mode command data Ps. However, each embodiment may be so structured as to output the predictive mode command data.

The judging method which is employed, when the comparison selection part 522 decides a optimum predictive mode, for detecting the optimum displacement vector decided in accordance with the optimum predictive mode may use a judgement step which is different from that of the comparison selection part shown in FIG. 149.

The dense search operation part 404 executes the detection of motion vectors in integer precision. Alternatively, the motion vectors may be detected in fractional precision such as half-pel precision. A structure described with reference to FIG. 77 et seq., for example, may be utilized as that for detecting motion vectors in fractional precision.

In each of the hierarchical search system motion vector detecting devices according to the first to fourth embodiments thereof, the motion vectors are detected when carrying out coding, i.e., detecting a predictive picture image, in units of fields. Alternatively, the coding may be carried out in units of frames. In this case, it is possible to employ a structure of detecting motion vectors in accordance with a frame predictive mode, an odd field predictive mode and an even field predictive mode in the full search system motion vector detecting device described with reference to FIG. 1 and others.

In each hierarchical search system motion vector detecting device, the rough search operation part may not search the positions of representative evaluation points every eight pixels, but the evaluation points may be culled in accordance with another condition for deciding representative evaluation points. The search range of the dense search operation part can be any size, as far as culled evaluation points are included therein at the least.

Hierarchical searching is performed as to a plurality of predictive modes for detecting motion vectors as hereinabove described, whereby the motion vectors can be detected by searching a search area of a wide range with a small hardware volume or a small number of operation times in high accuracy to correctly form a predictive picture image, thereby implementing high accuracy coding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detecting device, for obtaining motion vectors employed for a motion compensated predictive coding through a block matching process of picture images of a current screen and a reference screen, said motion vector detecting device comprising:

evaluation means for obtaining evaluation function values indicating similarity levels of a current picture image block of a prescribed size in said current screen and a plurality of reference picture image blocks in a region related to said current picture image block in said reference screen said evaluation function values obtained in parallel in accordance with a plurality of predetermined predictive modes for each respective reference block; and motion vector decision means receiving said evaluation function values for the respective reference blocks and the respective predictive modes from said evaluation means for deciding motion vectors of the respective predictive modes with respect to said current picture image block in a parallel manner, wherein each of said current and reference screens is formed by a single field, each of said current screen and said reference screen including pixels arranged in a two-dimensional array of a horizontal direction and a vertical direction; wherein said plurality of predictive modes includes motion predictive modes employing pixels in an upper half block of said current picture image block divided into half blocks along a vertical direction of said current screen, pixels in a lower half block of said two half blocks of said current picture image block, and all pixels in said current picture image block, respectively.

2. A motion vector detecting device, for obtaining motion vectors employed for a motion compensated predictive coding through a block matching process of picture images of a current screen and a reference screen, said motion vector detecting device comprising:

evaluation means for obtaining evaluation function values indicating similarity levels of a current picture image block of a prescribed size in said current screen and a plurality of reference picture image blocks in a region related to said current picture image block in said reference screen, said evaluation function values obtained in parallel in accordance with a plurality of predetermined predictive modes for each respective reference block; and motion vector decision means receiving said evaluation function values for the respective reference blocks and the respective predictive modes from said evaluation means for deciding motion vectors of the respective predictive modes with respect to said current picture image block in a parallel manner;

wherein said evaluation means includes:

a plurality of first arithmetic means including storage means arranged in correspondence to pixels included in said current picture image block for temporarily storing corresponding pixel data in said reference picture image blocks and said current picture image block on a block basis, for performing operations forming a part of said evaluation function on the pixel data stored in said storage means, and second arithmetic means for sorting outputs of said plurality of first arithmetic means in accordance with the respective predictive modes and performing remaining operations of said evaluation function on said outputs of said first arithmetic means for respective sorts in parallel, wherein said second arithmetic means includes a first summing means coupled to receive outputs of first arithmetic means provided corresponding to pixels on odd rows in an upper half block of said current picture image block, for summing up these received outputs, a second summing means coupled to receive outputs of first arithmetic means provided corresponding to pixels on odd rows in a lower half block of said current picture image block, for summing these received outputs, a third summing means coupled to receive outputs of first arithmetic means provided corresponding to pixels on even rows in said upper half block of said current picture image block, for summing up these received outputs, a fourth summing means coupled to receive outputs of first arithmetic means provided corresponding to pixels on even rows in said lower half block of said current picture image block, for summing up these received outputs, a first selecting means coupled to receive outputs of said second and third summing means and responsive to a predictive mode specifying signal for selecting one of the outputs of said second and third summing means for passage, a second selecting means coupled to receive the outputs of said second and third summing means responsive to said predictive mode specifying signal for selecting another of the outputs of said second and third summing means for passage;

a first adding means coupled to receive an output of said first summing means and an output of said first selecting means, for adding up the outputs of said first summing means and said first selecting means, a second adding means coupled to receive an output to said fourth summing means and an output of said second selecting means, for adding up the outputs of said fourth summing means and said second selecting means, and a third adding means coupled to receive outputs of said first and second adding means, for adding up the outputs of said first and second adding means, the outputs of said first to third adding means supplied in parallel.

3. A motion vector detecting device for obtaining motion vectors employed for predictive coding with motion compensation by block matching of a reference frame picture image and a current frame picture image, each of said frame including even and odd fields, said motion vector detecting device comprising:

arithmetic means including a plurality of processors arranged in correspondence to respective pixels of a current frame picture image block, being a target of motion vector detection, for inputting pixel data of said current picture image block and pixel data of a reference picture image block in a search region of said reference frame picture image related to said current frame picture image block, for performing prescribed operations on corresponding pixel data of said blocks;

a first summing circuit for summing up operation results for the odd field output from said arithmetic means to produce an estimation value for the odd field;

a second summing circuit for summing up operation results for the even field output from said arithmetic means to produce an estimation value for the even field;

a third summing circuit for producing an estimation value for the frame using the estimation values for the odd and even fields output from the first and second summing circuits; and motion vector decision means for deciding motion vectors for the odd field pixel block, for even field pixel block and the frame pixel block of the current picture image block in accordance with the estimation values received from the first to third summing circuits.

4. A motion vector detecting device for obtaining motion vectors employed for predictive coding with motion compensation by block matching of a reference field picture image and a current field picture image, each of said reference field picture image and said current field picture image including pixels arranged in a two-dimensional array of a horizontal direction and a vertical direction, said motion vector detecting device comprising:

arithmetic means including a plurality of processors arranged in correspondence to respective pixels of a current field picture image block, being a target of motion vector detection, in said current field picture image for receiving pixel data in said current field picture image block and data of pixels in a reference field picture image block in a search region of said reference field picture image related to said current field picture image block and performing prescribed operations on corresponding pixel data of received pixel data of received pixel data of said blocks;

summing means dividing outputs of said arithmetic means into an upper half block and a lower half block along a vertical direction on field of said current field picture image block, sorting said outputs of said arithmetic means into an operation result for said pixels of said upper half block, that for said pixels of said lower half block and that for all said pixels in said current picture image block for adding and summing up said outputs of said arithmetic means for the respective sorts; and motion vector decision means for deciding motion vectors for said upper half block, said lower half block and said current picture image block in a parallel mode in accordance with outputs of said summing means.

5. A motion vector detecting device for obtaining motion vectors employed for predictive coding with motion compensation by block matching of a reference screen picture image and a current screen picture image, each of said reference field picture image and said current field picture image including pixels arranged in a two-dimensional array of a horizontal direction and a vertical direction, said motion vector detecting device comprising:

arithmetic means including a plurality of processors arranged in correspondence to respective pixels of a current picture image block of said current screen picture image, being a target of motion vector detection, for inputting pixel data of said current picture image block and data of pixels of a reference picture image block in a search region of said reference screen picture image related to said current picture image block and performing prescribed operations on corresponding pixels of said current and reference blocks, said plurality of processors including a first processor group corresponding to pixels in an upper half block of said current picture image block in a vertical direction on said current screen and arranged in correspondence to pixels of an odd field when said current screen includes a frame, a second processor group corresponding to pixels of said upper half block and arranged in correspondence to pixels of an even field when said current screen includes a frame, a third processor group corresponding to pixels in a lower half block of said current picture image block in said vertical direction on said current screen and arranged in correspondence to pixels of said odd field, and a fourth processor group corresponding to pixels of said lower half block and arranged in correspondence to pixels of said even field;

sorting means including first combination means receiving outputs of said first to fourth processor groups in parallel with each other for combining said outputs of said first and second processor groups with each other while combing said outputs of said third and fourth processor groups with each other thereby forming two groups of output signals, and second combination means for combining said outputs of said first and third processor groups with each other while combining said outputs of said second and fourth processor groups with each other thereby forming two groups of output signals, for activating one of said first and second combination means in response to a mode specifying signal and transmitting said two groups of outputs from activated combination means;

evaluation value forming means for adding and summing up said two groups of outputs from said sorting means for respective groups and forming evaluation values for the respective groups and an evaluation value for an overall current picture image block in a parallel mode; and motion vector decision means for deciding motion vectors of said current picture image block for the respective groups and said current picture image block in a parallel mode in accordance with outputs of said evaluation value forming means.

6. A motion vector detecting device for obtaining motion vectors employed for a motion compensated predictive coding through a block matching process of picture images of a current screen and a reference screen, said motion vector detecting device comprising:

evaluation means for obtaining evaluation function values indicating similarity levels of a current picture image block of a prescribed size in said current screen and a plurality of reference picture image blocks in a region related to said current picture image block in said reference screen said evaluation function values obtained in parallel in accordance with a plurality of predetermined predictive modes for each respective reference block;

motion vector decision means receiving said evaluation function values for the respective reference blocks and the respective predictive modes from said evaluation means for deciding motion vectors of the respective predictive modes with respect to said current picture image block in a parallel manner;

wherein said evaluation means includes:

a plurality of first arithmetic means including storage means arranged in correspondence to pixels included in said current picture image block for temporarily storing corresponding pixel data in said reference picture image blocks and said current picture image block on a block basis, for performing operations forming a part of said evaluation function on the pixel data stored in said storage means;

second arithmetic means for sorting outputs of said plurality of first arithmetic means in accordance with the respective predictive modes and performing remaining operations of said evaluation function on said outputs of said first arithmetic means for respective sorts in parallel;

wherein said current picture image block includes two regions of rows of pixels, and said second arithmetic means includes;

a first summing means receiving outputs of first arithmetic provided corresponding to pixels of one region of said two regions of rows of pixels and summing up these received outputs;

a second summing means receiving outputs of first arithmetic means provided corresponding to pixels of another region of said two regions and summing up these received outputs, and an adding means coupled to receive outputs of said first and second summing means to add these received outputs.

7. A motion vector detecting device for obtaining motion vectors employed for a motion compensated predictive coding through a block matching process of picture images of a current screen and a reference screen, said motion vector detecting device comprising:

evaluation means for obtaining evaluation function values indicating similarity levels of a current picture image block of a prescribed size in said current screen and a plurality of reference picture image blocks in a region related to said current picture image block in said reference screen said evaluation function values obtained in parallel in accordance with a plurality of predetermined predictive modes for each respective reference block;

motion vector decision means receiving said evaluation function values for the respective reference blocks and the respective predictive modes from said evaluation means for deciding motion vectors of the respective predictive modes with respect to said current picture image block in a parallel manner;

wherein said evaluation means includes:

a plurality of first arithmetic means including storage means arranged in correspondence to pixels included in said current picture image block for temporarily storing corresponding pixel data in said reference picture image blocks and said current picture image block on a block basis, for performing operations forming a part of said evaluation function on the pixel data stored in said storage means;

second arithmetic means for sorting outputs of said plurality of first arithmetic means in accordance with the respective predictive modes and performing remaining operations of said evaluation function on said outputs of said first arithmetic means for respective sorts in parallel;

wherein said second arithmetic means includes switching means for dividing said current picture image block into four blocks including upper and lower half blocks vertically divided on a frame screen and pixel blocks of even and odd fields and receiving outputs of corresponding first arithmetic means in a parallel manner for respective divided blocks and switching structures of said four divided blocks in response to a mode specifying signal, thereby implementing three sorts including a frame predictive mode of employing pixels in said frame, odd and even field predictive modes employing pixels in said odd and even fields or a motion predictive mode employing all said pixels in said current picture image block, and upper and lower half motion predictive modes employing pixels respectively in said upper and lower half blocks of said current picture image block.

* * * * *